US006249241B1

(12) United States Patent
Jordan et al.

(10) Patent No.: US 6,249,241 B1
(45) Date of Patent: Jun. 19, 2001

(54) MARINE VESSEL TRAFFIC SYSTEM

(75) Inventors: Robert J. Jordan; Douglas C. Herndon; Joseph A. McMorrow, all of Lexington Park, MD (US); John E. Harrington, Long Beach, MS (US); Harold E. Constantine, Stafford, VA (US); Michael R. Linzey, Rio Grande, NJ (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/530,387

(22) Filed: Sep. 21, 1995

(51) Int. Cl.⁷ .................................................... G01S 13/93
(52) U.S. Cl. .............................. 342/41; 342/59; 364/461
(58) Field of Search ............................ 342/41, 59, 176, 342/177, 178, 179; 364/461

(56) References Cited

U.S. PATENT DOCUMENTS

| | | | | |
|---|---|---|---|---|
| 3,705,404 | * | 12/1972 | Chisholm | 342/465 |
| 3,737,902 | * | 6/1973 | O'Hagan et al. | 342/41 |
| 3,766,552 | * | 10/1973 | Hajduk | 342/37 |
| 3,870,992 | * | 3/1975 | Hanna, Jr. | 342/58 |
| 3,890,616 | * | 6/1975 | Kojima et al. | 342/41 |
| 3,971,018 | * | 7/1976 | Isbister et al. | 342/41 |
| 4,403,220 | * | 9/1983 | Donovan | 342/29 |
| 4,428,057 | * | 1/1984 | Setliff et al. | 364/521 |
| 4,590,569 | * | 5/1986 | Rogoff et al. | 364/452 |
| 4,684,949 | * | 8/1987 | Kalafus | 342/41 |
| 5,056,411 | * | 10/1991 | Baker | 89/41.22 |
| 5,153,836 | * | 10/1992 | Fraughton et al. | 364/461 |
| 5,179,385 | * | 1/1993 | O'Loughlin et al. | 342/176 |
| 5,243,530 | * | 9/1993 | Stanifer et al. | 364/452 |
| 5,268,690 | * | 12/1993 | Shibata | 342/41 |
| 5,307,074 | * | 4/1994 | Janex | 342/41 |
| 5,432,542 | * | 7/1995 | Thibadeau et al. | 348/6 |
| 5,450,329 | * | 9/1995 | Tanner | 364/449 |
| 5,519,618 | * | 5/1996 | Kastner et al. | 364/439 |

* cited by examiner

Primary Examiner—John B. Sotomayor
(74) Attorney, Agent, or Firm—Ron Billi

(57) ABSTRACT

The marine Vessel Traffic System (VTS) is an improved radar harbor surveillance sensor, computer and display system that monitors marine harbor traffic, provides advisories to vessels in areas selected by the system operators, and provide the operators of the system with an early warning of unacceptable traffic conflicts in the confined waterways of the harbor. The VTS collects harbor traffic information from multiple remote sensor collection sites around the harbor and integrates, records, merges and presents the remote site data onto a single operator display, selected from a plurality of operator displays. VTS provides quick accurate computer generated graphic display of the harbor traffic, possible surface and subsurface conflicts, and key vessel identification information and the VTS documents incidents and traffic conditions for the Coast Guard or other waterway authorities.

8 Claims, 96 Drawing Sheets

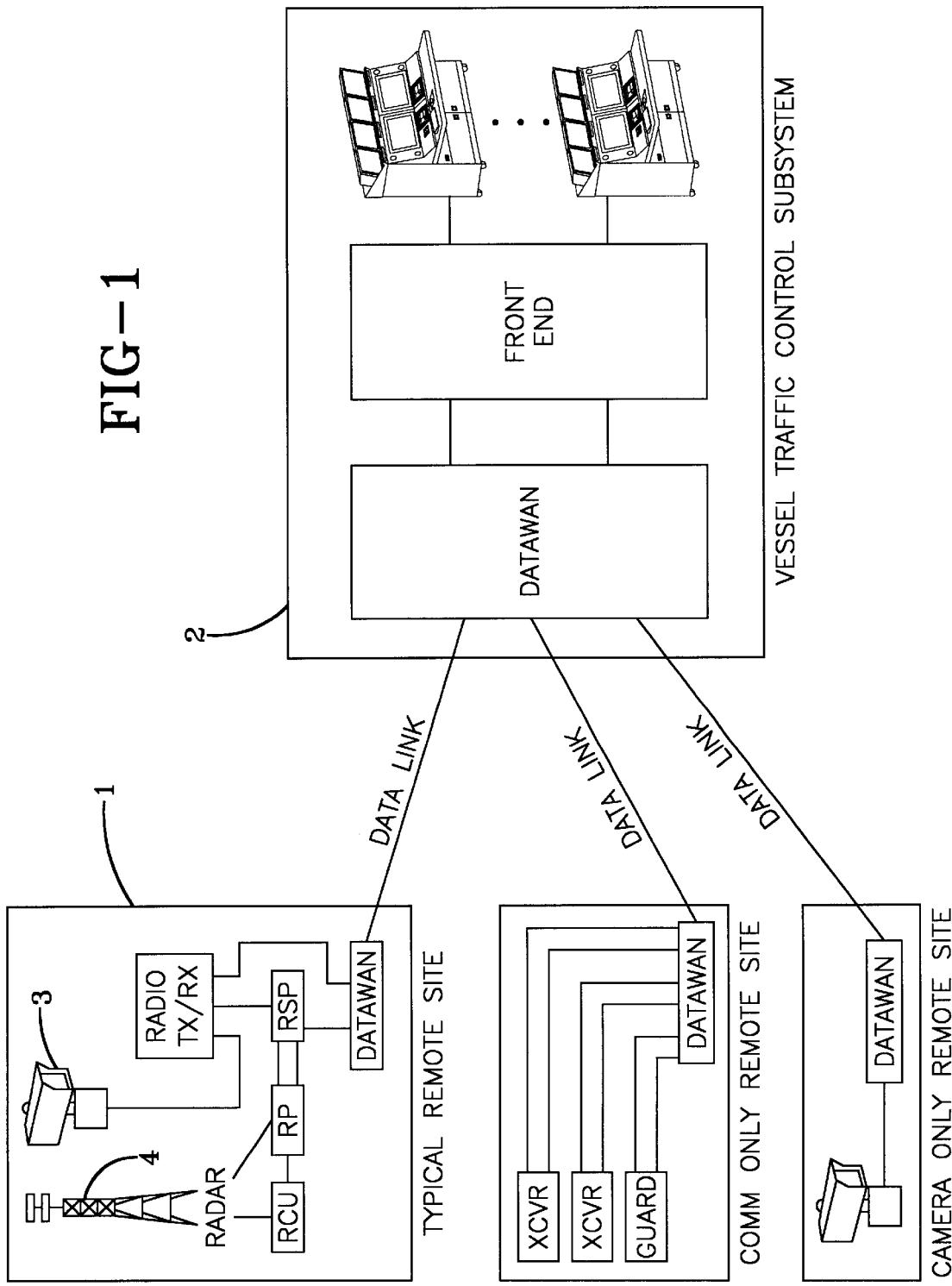

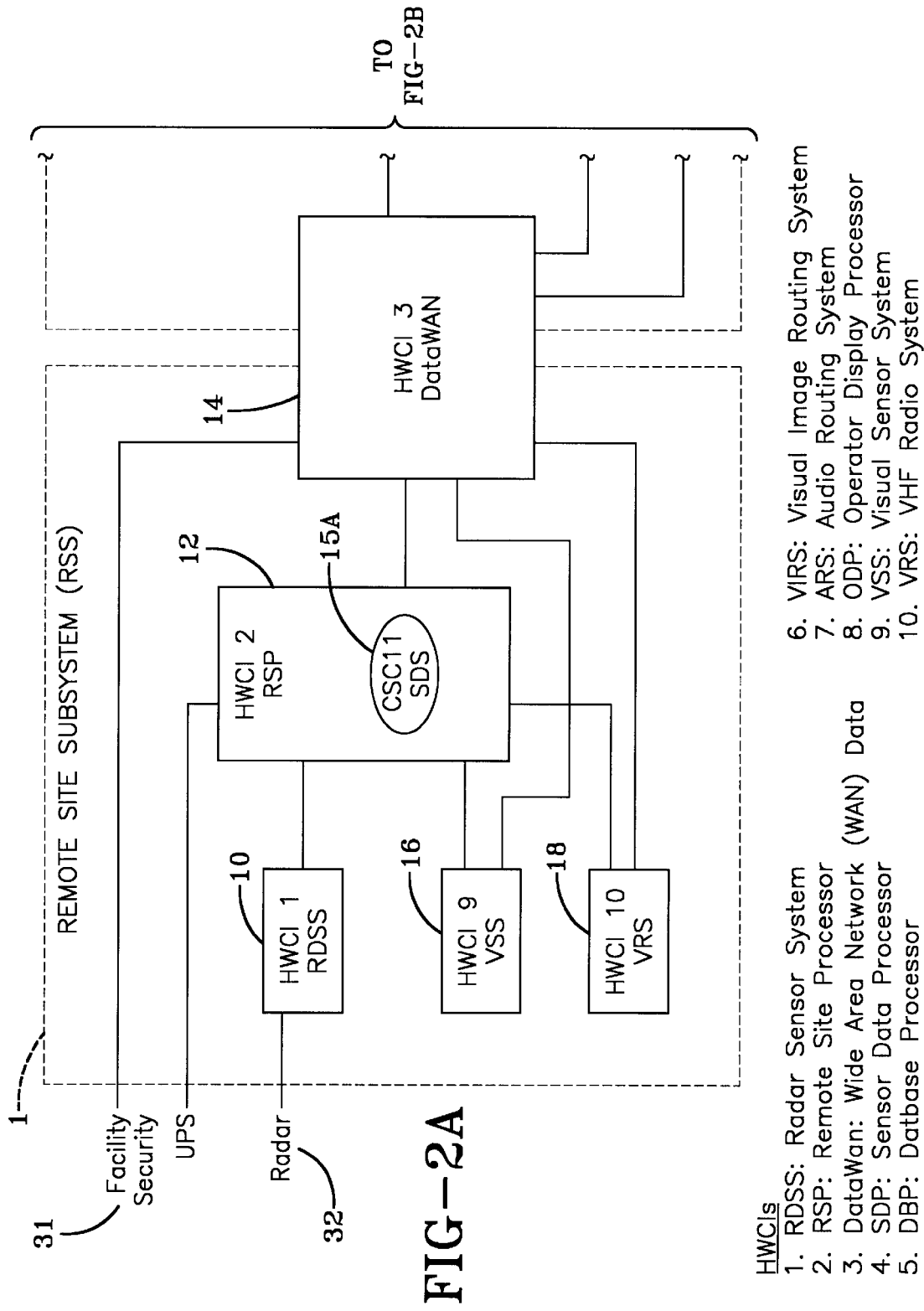

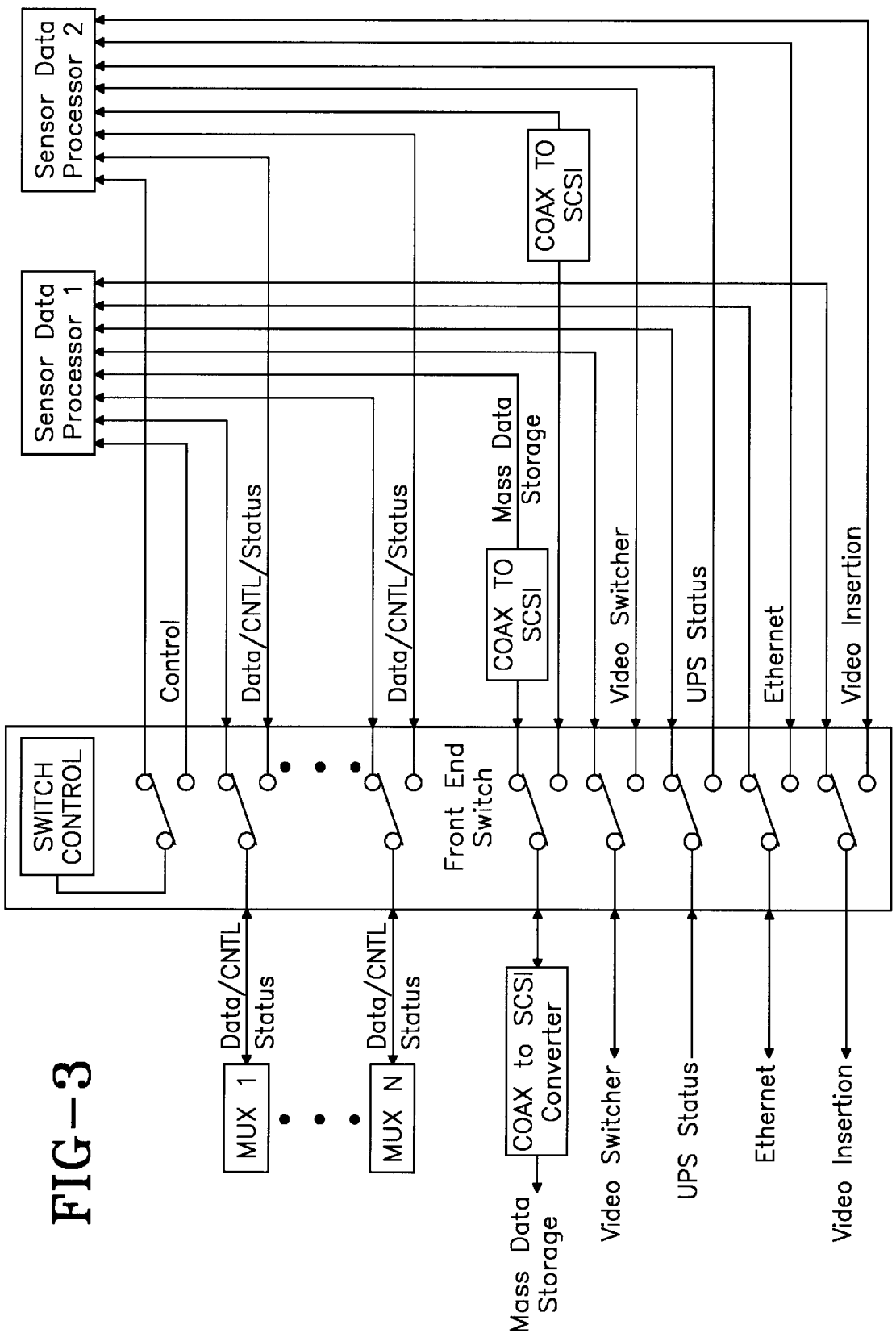

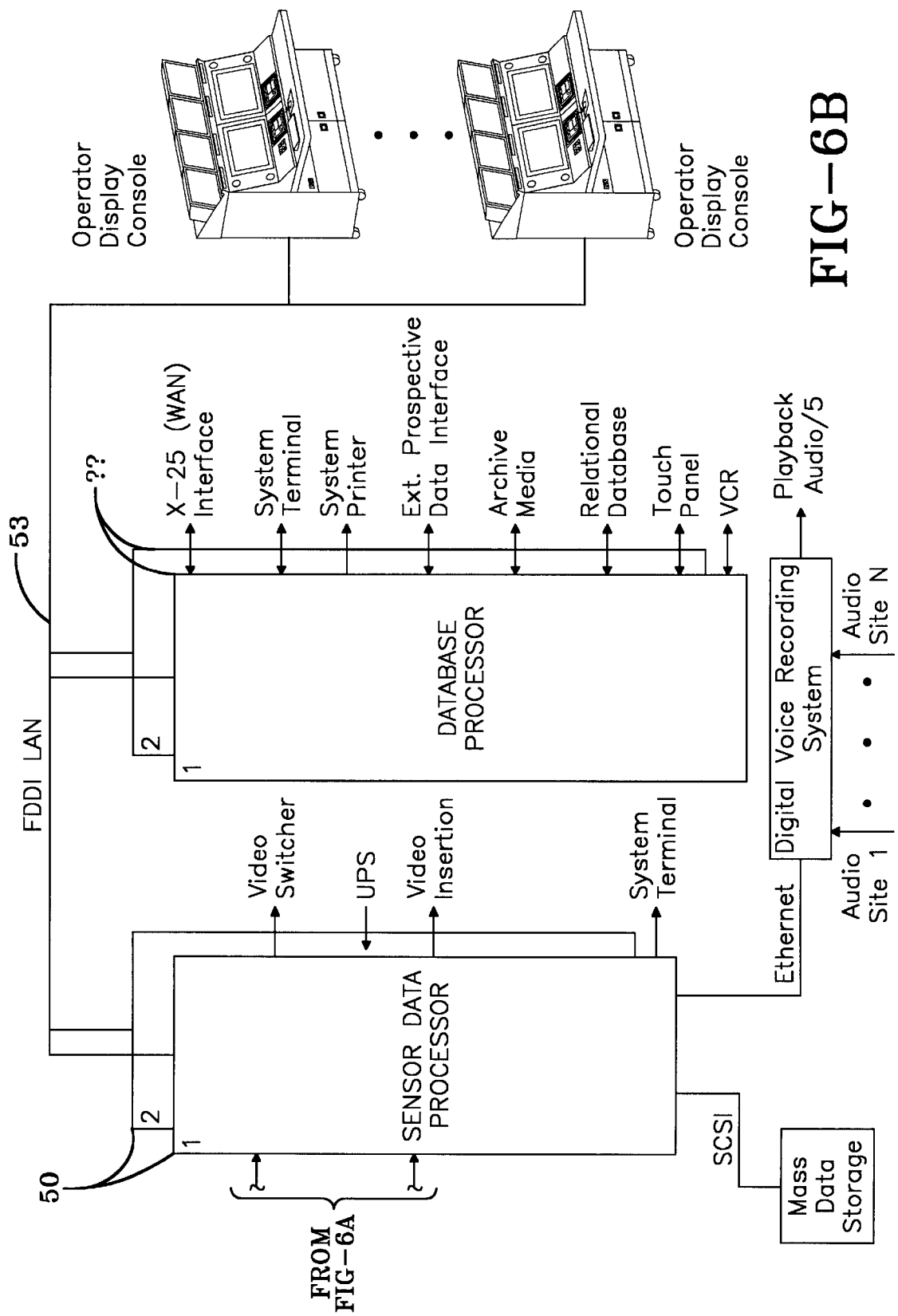

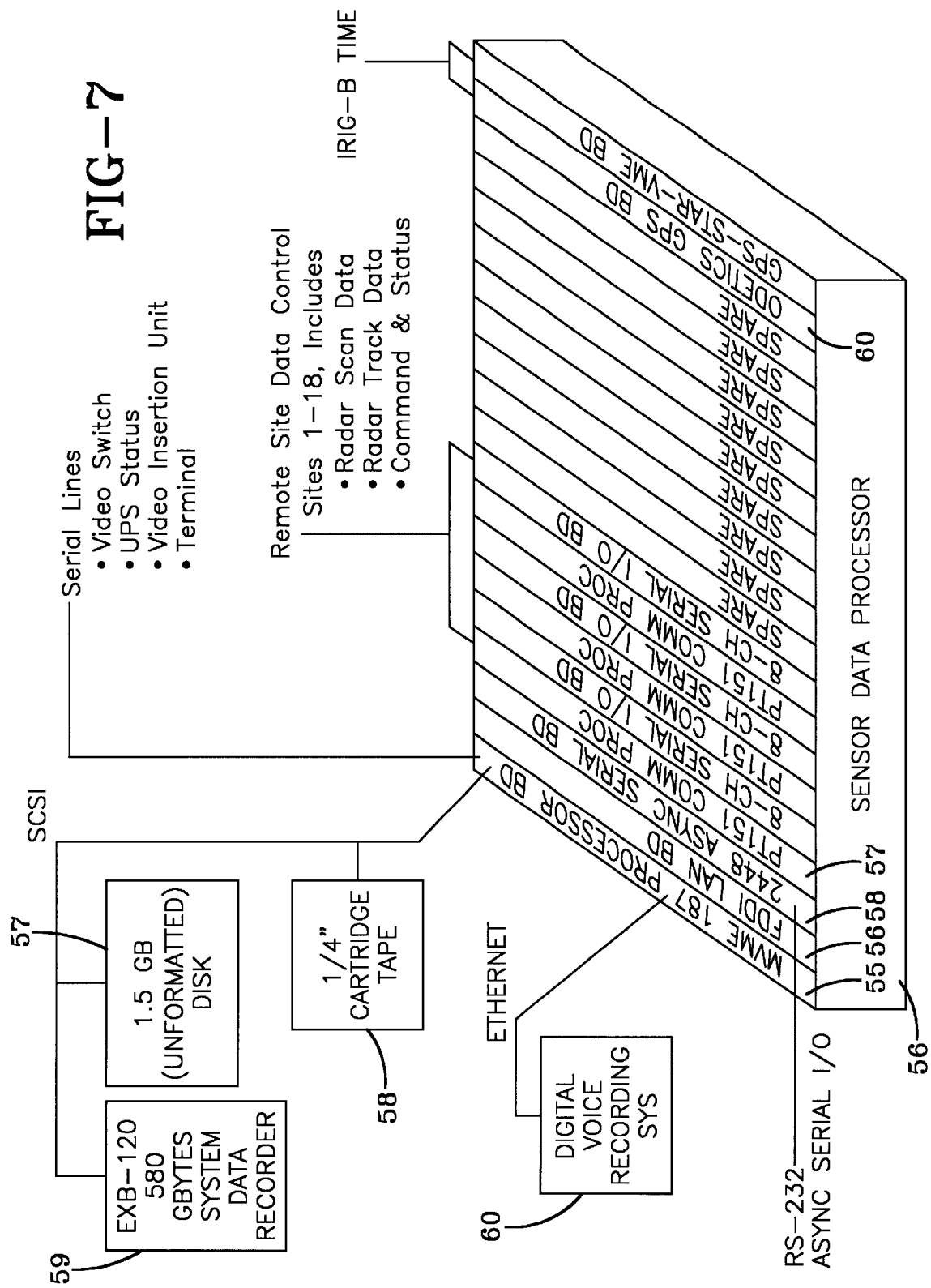

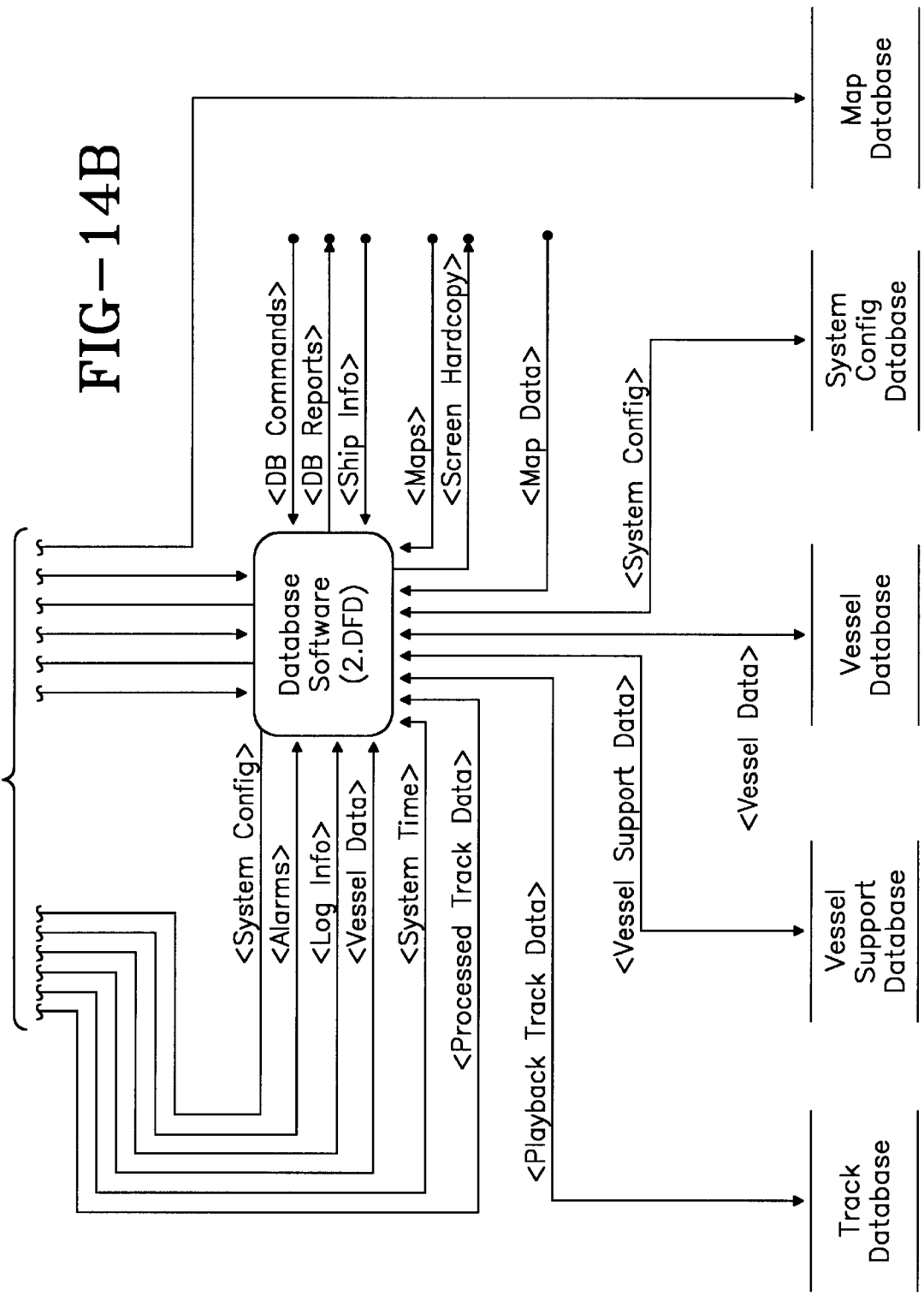

Terminal Window

VESSEL TRAFFIC SERVICE

Equipment Administration Menu

1. Equipment Configuration
2. Remote Site Configuration
3. Radar Configuration
4. Radio Configuration
5. Record Replay Configuration
6. Remote Site Equipment Status
7. Camera Configuration
8. Video Insertion Configuration
9. Video Switcher Configuration
10. Previous Menu Enter your choice: 1

| Application: CGVTS | | | Menu: EQUIPMENT_ v | | | <OSC> | <DBG> | | <Rep> |
|---|---|---|---|---|---|---|---|---|---|
| Enter Query | Execute Query | Menu | List | Terminal | Help | Show Keys | Exit/ Cancel | | Accept/ Commit |

FIG-33

```
Terminal Window

VESSEL TRAFFIC SERVICE

Vessel Status Menu

1. Prospective List
    2. Anchored List
    3. Docked List
    4. Previous Menu Enter your choice: [1]
```

| Application: CGVTS | | Menu: VESSEL_STA | v | | `<OSC>` | `<DBG>` | `<Rep>` |
|---|---|---|---|---|---|---|---|
| Enter Query | Execute Query | Menu | List | Terminal | Help | Show Keys | Exit/ Cancel | Accept/ Commit |

FIG-34

```
Terminal Window

VESSEL TRAFFIC SERVICE

Vessel Administration Menu

1. Vessel Support Data Screen
2. Vessel Registry Type Administration
3. Vessel Country Administration
4. Vessel Category Administration
5. Vessel Special Category Administration
6. Vessel Units Administration
7. Previous Menu Enter your choice: [1]
```

Application: CGVTS    Menu: VESSEL_ID  v        <OSC> <DBG>        <Rep>

| Enter Query | Execute Query | Menu | List | Terminal | Help | Show Keys | Exit/ Cancel | Accept/ Commit |

FIG-36

```
┌─────────────────────────────────────────────────────────────────┐
│ Terminal Window                                                 │
├─────────────────────────────────────────────────────────────────┤
│                  VESSEL TRAFFIC SERVICE                         │
│                  USER AUTHORIZATION SCREEN                      │
│                                                                 │
│                                              GRANTOR            │
│  LAST NAME, FIRST NAME MI / RANK             ┌──────┐           │
│  ┌──────┐                                    └──────┘           │
│  └──────┘                                                       │
│                     PASSWORD                                    │
│  USERNAME           ┌──────┐                                    │
│  ┌──────┐           └──────┘                                    │
│  └──────┘                                                       │
│                                                                 │
│  AUTHORIZATION LEVEL                                            │
│  ┌─┐ (00=External User, 10=Operator, 30=Supervisor, 50=System Administrator) │
│  └─┘                                                            │
├─────────────────────────────────────────────────────────────────┤
│ Enter Last Name, First name MI / Rank                           │
├─────────────────────────────────────────────────────────────────┤
│ Count: *0                                  <List>  <Replace>    │
│ Enter │Execute│Menu│List│Terminal│Help │Show │Exit/  │Accept/   │
│ Query │Query  │    │    │        │     │Keys │Cancel │Commit    │
└─────────────────────────────────────────────────────────────────┘
```

FIG-38

```
┌─────────────────────────────────────────────────────────────────┐
│                      Terminal Window                            │
├─────────────────────────────────────────────────────────────────┤
│                                                                 │
│               VESSEL TRAFFIC SERVICE                            │
│               SECTOR ADMINISTRATION                             │
│                                                                 │
│    SECTOR NAME  [            ]                                  │
│                                                                 │
│    SECTOR ID    [    ]                                          │
│                                                                 │
│         ========= SECTOR REMOTE SITES ========                  │
│                                                                 │
│         ********** REMOTE SITES **********                      │
│              ID           SITE NAME                             │
│           [      ]      [            ]                          │
│                                                                 │
│                                                                 │
├─────────────────────────────────────────────────────────────────┤
│ Count: *0                                       <Replace>       │
│ Enter  | Execute | Menu | List | Terminal | Help | Show  | Exit/  | Accept/ │
│ Query  | Query   |      |      |          |      | Keys  | Cancel | Commit  │
└─────────────────────────────────────────────────────────────────┘
```

Terminal Window

VESSEL TRAFFIC SERVICE
ANCHORAGE ADMINISTRATION

NAME

SITE

SITE IDENTIFIER

LATITUDE    LONGITUDE

LENGTH RESTRICTION

DRAFT RESTRICTION

TIME RESTRICTION    IN DAYS

Count: *0                                                                          <Replace>
| Enter | Execute | Menu | List |   | Terminal | Help | Show | Exit/   | Accept/ |
| Query | Query   |      |      |   |          |      | Keys | Cancel  | Commit  |

FIG-41

Terminal Window

VESSEL TRAFFIC SERVICE
EQUIPMENT CONFIGURATION SCREEN

HARDWARE ADDRESSES

| AUDIO DIGITIZER | /dev/audio | VIDEO DISTRIBUTION | /dev/tty02 |
| MASS STORAGE | /dev/mass | VIDEO INSERTION | /dev/tty01 |
| UPS (Power Supply) | /dev/tty03 | TOUCH PANEL | /dev/touch |
| | | JUKEBOX DEVICE | /dev/juke |
| EXABYTE 1 DEVICE | /dev/exabyte1 | EXABYTE 3 DEVICE | /dev/exabyte3 |
| EXABYTE 2 DEVICE | /dev/exabyte2 | EXABYTE 4 DEVICE | /dev/exabyte4 |

Count: *1   <Replace>

| Enter Query | Execute Query | Menu | List | Terminal | Help | Show Keys | Exit/ Cancel | Accept/ Commit |

FIG-42

Terminal Window

VESSEL TRAFFIC SERVICE
REMOTE SITE CONFIGURATION

SITE NUMBER  [    ]

SITE NAME    [                ]

UPS DEVICE   [/dev/null]

UPS MODEL    [1]

TRM DEVICE   [/dev/null]

DAP DEVICE   [/dev/null]

DAP NUMBER   [  ]

RSP BOOT MACRO [          ]

Count: *0                                                            <Replace>

| Enter | Execute | Menu | List | Terminal | Help | Show | Exit/ | Accept/ |
| Query | Query |      |      |          |      | Keys | Cancel | Commit |

FIG-43

```
┌─────────────────────────────────────────────────────────────────────┬──────────────┐
│                    Terminal Window                                  │              │
│                                                                     │              │
│               VESSEL TRAFFIC SERVICE                                │              │
│              RADAR CONFIGURATION SCREEN                             │              │
│                                                                     │              │
│ SITE NUMBER  □       SITE NAME    ┌──────────┐                      │              │
│ RADAR PROCESSOR □    RADAR TYPE   └──────────┘                      │              │
│ RADAR ELEVATION  0   RADAR LAT   □ ° □ ' 00.00 " N                  │              │
│                      RADAR LON   □ ° □ ' 00.00 " W                  │              │
│                                                                     │              │
│ RSC DEVICE  /dev/null/           COAST TIMEOUT      0               │              │
│ RCU DEVICE  /dev/null/           AZIMUTH CORRECTION 0               │              │
│                                                                     │              │
│            NUMBER OF CALIBRATION POINTS  0                          │              │
│                                                                     │              │
│            CAL PT1 LAT  00.000000    CAL PT1 LON  00.000000         │              │
│            CAL PT2 LAT  00.000000    CAL PT2 LON  00.000000         │              │
│            CAL PT3 LAT  00.000000    CAL PT3 LON  00.000000         │              │
│            CAL PT4 LAT  00.000000    CAL PT4 LON  00.000000         │              │
│                                                                     │              │
├─────────────────────────────────────────────────────────────────────┴──────────────┤
│ Enter SITE NUMBER 1 to 18.                                                         │
│ Count: *0                                                              <Replace>   │
│ Enter  │ Execute │ Menu │ List │   │ Terminal │ Help │ Show  │ Exit/  │ Accept/    │
│ Query  │ Query   │      │      │   │          │      │ Keys  │ Cancel │ Commit     │
└────────────────────────────────────────────────────────────────────────────────────┘
```

FIG-44

```
Terminal Window
        VESSEL TRAFFIC SERVICE
        RADAR CONFIGURATION SCREEN SITE NUMBER  [ ]      NAME [This site is not set up yet!]

RSC RANGE        [.5]    RSC OFFSET MODE   [0]      RCU TRANSCEIVER  [1]

RSC THRESHOLD    [0]     RSC OFFSET ANGLE  [.1]     RCU XSMIT MODE   [1]

RSC STC RANGE    [.2]    RSC OFFSET RANGE  [.5]     RCU TUNE LEVEL   [1]

RSC STC LEVEL    [0]     RSC OFFSET DIST   [0]      RCU RANGE MODE   [1]

RSC CTRL SELECT  [0]     RSC FADE RATE     [0]      RCU GAIN LEVEL   [1]

RSC CTRL LEVEL   [10]                               RCU FTC LEVEL    [1]

RSC CTRL MASK    [0]                                RCU STC LEVEL    [1]
```

Enter SITE NUMBER  1 to 18.

Count: *0                                            <Replace>

| Enter | Execute | Menu | List | Terminal | Help | Show | Exit/ | Accept/ |
| Query | Query |  |  |  |  | Keys | Cancel | Commit |

FIG-45

```
Terminal Window
         VESSEL TRAFFIC SERVICE
         RADAR CONTROL SCREEN

SITE NUMBER  [ ]

NAME  [        ]

RSC RANGE      [ ]     RSC OFFSET MODE   [ ]    RCU TRANSCEIVER  [ ]

RSC THRESHOLD  [ ]     RSC OFFSET ANGLE  [ ]    RCU TX MODE      [ ]

RSC STC RANGE  [ ]     RSC OFFSET RANGE  [ ]    RCU TUNE LEVEL   [ ]

RSC STC LEVEL  [ ]     RSC OFFSET DIST   [ ]    RCU RANGE MODE   [ ]

RSC CTRL SELECT [ ]    RSC FADE RATE     [ ]    RCU GAIN LEVEL   [ ]

RSC CTRL LVL   [ ]                              RCU FTC LEVEL    [ ]

RSC CTRL MASK  [ ]     RESET RSC  [N]           RSU STC LEVEL    [ ]
```

Count: *0        Enter SITE NUMBER (i.e. 1 – 18) then Press Return.

| Enter Query | Execute Query | Menu | List | Terminal | Help | Show Keys | <List> | <Replace> | Exit/Cancel | Accept/Commit |

FIG-46

Terminal Window

VESSEL TRAFFIC SERVICE
RADIO CONFIGURATION

SITE NUMBER [ ]    SITE NAME [                ]

RADIO ID [ ]    MODEL [  ]

UNIT NUMBER [ ]    HW ADDRESS [  ]

DEVICE [/dev/null]

POWER [1]    RADIO MODE [2]

PTT [0]    CHANNEL TYPE [1]

CHANNEL MODE [1]    CHANNEL NUMBER [  ]

SQUELCH LEVEL [5]

Press F1 to QUERY, Enter SITE NUMBER (1–18), Press F2 to Execute.

Count: *0

| Enter Query | Execute Query | Menu | List | Terminal | Help | Show Keys | <List> | Exit/ Cancel | <Replace> Accept/ Commit |

FIG-47

```
Terminal Window

VESSEL TRAFFIC SERVICE
         RECORD REPLAY INITIALIZATION

JUKEBOX ON       [N]

EXABYTE 1 ON  [N]          EXABYTE 2 ON  [N]

EXABYTE 3 ON  [N]          EXABYTE 4 ON  [N]

AUTO START RECORD  [N]

RECORD PATH  [/dev/null]

REPLAY PATH  [/dev/null]
```

Enter Y or N

| Count: *1 | | | | | | | <Replace> | |
|---|---|---|---|---|---|---|---|---|
| Enter Query | Execute Query | Menu | List | Terminal | Help | Show Keys | Exit/ Cancel | Accept/ Commit |

FIG-48

Terminal Window

VESSEL TRAFFIC SERVICE
CAMERA CONFIGURATION

SITE NUMBER [ ]   SITE NAME [                    ]

CAMERA ID [      ]

MODEL [ 1 ]   LATITUDE [ 0 ]   LONGITUDE [ 0 ]

ELEVATION [ 0 ]   AZIMUTH SLOPE [      ]   AZIMUTH OFFSET [   ]

FEEDBACK DEVICE [                    ]

CONTROL DEVICE [                    ]

Press F1 to QUERY record, Enter SITE NUMBER (1–18), F2 to Execute.

Count: *0

| Enter Query | Execute Query | Menu | List | Terminal | Help | Show Keys | Exit/ Cancel | Accept/ Commit |

<List>  <Replace>

FIG-50

Terminal Window

VESSEL TRAFFIC SERVICE
VIDEO INSERTION CONFIGURATION

SITE NUMBER ☐   SITE NAME ☐

CAMERA ID ☐   CHANNEL NUMBER ☐

Enter value for SITE NUMBER, 1-18
Count: *0   <Replace>

| Enter Query | Execute Query | Menu | List | Terminal | Help | Show Keys | Exit/ Cancel | Accept/ Commit |
|---|---|---|---|---|---|---|---|---|

FIG-51

```
Terminal Window

VESSEL TRAFFIC SERVICE
        VIDEO SWITCHER CONFIGURATION

====== VIDEO SWITCHER INPUT ======

CHANNEL NUMBER  [ ]        SOURCE [ ]

SITE OR CONSOLE [      ]

====== VIDEO SWITCHER OUTPUT ======

CHANNEL NUMBER  [ ]    CONSOLE NUMBER [ ]

MONITOR OR VCR NUMBER [      ]
```

| Count: *0 | | | | | | | <Replace> | |
|---|---|---|---|---|---|---|---|---|
| Enter Query | Execute Query | Menu | List | Terminal | Help | Show Keys | Exit/ Cancel | Accept/ Commit |

FIG-52

Terminal Window

VESSEL TRAFFIC SERVICE
VESSEL PROSPECTIVE LIST

VESSEL NAME
DEPARTURE POINT
DESTINATION
DRAFT      FT    M                    VIN
CARGO
TYPE       CONFIG
           BARGE
           TLOA             M
VESSEL STATUS  P  PROSPECTIVE SECTOR  FT  1
INITIAL CALL                    ETD         ETA
REMARKS

Count: *0                                          <List>  <Replace>
Enter    | Execute | Menu | List | Terminal | Help | Show  | Exit/   | Accept/
Query    | Query   |      |      |          |      | Keys  | Cancel  | Commit

FIG-53

Terminal Window

VESSEL TRAFFIC SERVICE
VESSEL ANCHORED LIST

| VESSEL NAME | ANCHORAGE | DEPART TIME | ARRIVAL TIME |
|---|---|---|---|

Count: *0

| Enter Query | Execute Query | Menu | List | | Terminal | Help | Show Keys | | Exit/Cancel | Accept/Commit |
|---|---|---|---|---|---|---|---|---|---|---|

<List> <Replace>

FIG-54

```
Terminal Window

VESSEL TRAFFIC SERVICE
         VESSEL ANCHORED LIST

TYPE    REG LEN  ****TOW LENGTH****
                     FT         FT          M

VESSEL NAME

Enter a query; press F2 to execute, ^B to cancel.
Count: *0
                                               <List>  <Replace>
Enter  | Execute | Menu | List | Terminal | Help | Show  | Exit/   | Accept/
Query  | Query   |      |      |          |      | Keys  | Cancel  | Commit
```

FIG-55

Terminal Window

VESSEL TRAFFIC SERVICE
VESSEL ANCHORED LIST

VESSEL NAME        **DRAFT**    DESTINATION
                   FT          M

Enter a query; press F2 to execute, ^B to cancel.
Count: *0                                                    <Replace>
| Enter | Execute | Menu | List | Terminal | Help | Show | Exit/ | Accept/ |
| Query | Query   |      |      |          |      | Keys | Cancel | Commit |

FIG-56

```
┌─────────────────────────────────────────────────────────────────────┐
│ │                    Terminal Window                                │
├─┴───────────────────────────────────────────────────────────────────┤
│                      VESSEL TRAFFIC SERVICE                         │
│                      VESSEL ANCHORED LIST                           │
│                                                                     │
│                STATUS  P  SECTOR      INITIAL CALL                  │
│  VESSEL NAME   ┌──────┐┌──┐           ┌──────────────┐              │
│  ┌──────────┐  │      ││  │           │              │              │
│  │          │  └──┬───┘└──┘           │              │              │
│  │          │     │                   │              │              │
│  │          │                         └──────────────┘              │
│  │          │                                                       │
│  │          │                                                       │
│  │          │                                                       │
│  │          │                                                       │
│  └──────────┘                                                       │
│                                                                     │
│ Enter a query; press F2 to execute, ^B to cancel.                   │
│ Count: *0                                                 <Replace> │
│ ┌──────┬───────┬──────┬──────┬──────────┬──────┬─────┬─────┬───────┐│
│ │Enter │Execute│Menu  │List  │Terminal  │Help  │Show │Exit/│Accept/││
│ │Query │Query  │      │      │          │      │Keys │Cancel│Commit││
│ └──────┴───────┴──────┴──────┴──────────┴──────┴─────┴─────┴───────┘│
└─────────────────────────────────────────────────────────────────────┘
```

FIG-57

Terminal Window

VESSEL TRAFFIC SERVICE
VESSEL ANCHORED LIST

VESSEL NAME

REMARKS

Enter a query; press F2 to execute, ^B to cancel.

Count: *0                                                                                                                                                                                                                                                                                   <Replace>

| Enter Query | Execute Query | Menu | List | Terminal | Help | Show Keys | Exit/ Cancel | Accept/ Commit |

```
                    Terminal Window
              VESSEL TRAFFIC SERVICE
                VESSEL DOCKED LIST VESSEL NAME          **DRAFT**     DESTINATION
                    FT        M Enter a query; press F2 to execute, ^B to cancel.
Count: *0                                      <Replace>
Enter   | Execute | Menu | List | Terminal | Help | Show | Exit/   | Accept/
Query   | Query   |      |      |          |      | Keys | Cancel  | Commit
```

FIG-61

```
┌─┬──────────────────────────────────────────────────────────────┐
│ │                    Terminal Window                            │
│ │         VESSEL TRAFFIC SERVICE                                │
│ │         VESSEL DOCKED LIST                                    │
│ │                                                               │
│ │ VESSEL NAME      STATUS  P  SECTOR   INITIAL CALL             │
│ │ ┌──────────┐     ┌────┐ ┌┐ ┌──────┐  ┌──────────┐             │
│ │ │          │     │    │ └┘ │      │  │          │             │
│ │ │          │     └────┘    └──────┘  │          │             │
│ │ │          │                         │          │             │
│ │ │          │                         └──────────┘             │
│ │ │          │                                                  │
│ │ │          │                                                  │
│ │ │          │                                                  │
│ │ └──────────┘                                                  │
└─┴──────────────────────────────────────────────────────────────┘
Enter a query; press F2 to execute, ^B to cancel.
Count: *0                                        <Replace>
┌─────┬───────┬────┬────┬────────┬────┬─────┬──────┬──────┐
│Enter│Execute│Menu│List│Terminal│Help│Show │Exit/ │Accept│
│Query│Query  │    │    │        │    │Keys │Cancel│Commit│
└─────┴───────┴────┴────┴────────┴────┴─────┴──────┴──────┘
```

FIG-62

Terminal Window

VESSEL TRAFFIC SERVICE
VESSEL DOCKED LIST

VESSEL NAME

REMARKS

Enter a query; press F2 to execute, ^B to cancel.

Count: *0                                                    <Replace>

| Enter Query | Execute Query | Menu | List | Terminal | Help | Show Keys | Exit/Cancel | Accept/Commit |

FIG-63

```
┌─────────────────────────────────────────────────────────────────────┐
│ Terminal Window                                                     │
│                                                                     │
│                    VESSEL TRAFFIC SERVICE                           │
│              TRAFFIC SUMMARY REPORT INPUT SCREEN                    │
│                                                                     │
│      Start Date                        End Date                     │
│      09-MAR-1994                       09-MAR-1994                  │
│                                                                     │
│                                                                     │
│         Enter 'S' print to screen, or 'P' send to system printer.   │
│                                                                     │
│                              [S]                                    │
│                                                                     │
│                      'Press F8 to run report'                       │
│                                                                     │
│- - - - - - - - - - - - - - - - - - - - - - - - - - - - - - - - - - │
│ Enter the value for START DATE (DD-MON-YYYY). Default is the current date. │
│ Count: *0                                              <Replace>    │
│ Enter  | Execute | Menu | List | Terminal | Help | Show  | Exit/   | Accept/│
│ Query  | Query   |      |      |          |      | Keys  | Cancel | Commit │
└─────────────────────────────────────────────────────────────────────┘
```

FIG-64

Terminal Window

VESSEL TRAFFIC SERVICE
VESSEL SUPPORT DATA SCREEN

REGISTRY TYPE
REGISTRY NUMBER                    CALL SIGN
                                   UPDATE SEQUENCE NO. 0
VESSEL NAME                        (-1 to query all records)
       TYPE UNK - UNKNOWN          DATE OF CHANGE  09-MAR-94

VESSEL INFO:
    FLAG
    REG LOA          METERS          FEET              GROSS TONNAGE
    BEAM             METERS          FEET              TONNAGE UNITS
    REG DRAFT        METERS          FEET DEAD WEIGHT TONNAGE
                                                        CARGO
    SPECIAL CATEGORY

REMARKS
    DISCREPANCY

Count: *0                                              <List>   <Replace>
Enter  | Execute | Menu | List | Terminal | Help | Show  | Exit/   | Accept/
Query  | Query   |      |      |          |      | Keys  | Cancel  | Commit

FIG-65

Terminal Window

VESSEL TRAFFIC SERVICE
PILOT IDENTIFICATION SCREEN

PILOT ID [ ] PILOT ASSOCIATION [ ]

LAST NAME [ ] FIRST NAME [ ] MI [ ] SUFFIX [ ]

Count: *0                                                      \<List\> \<Replace\>

| Enter | Execute | Menu | List | Terminal | Help | Show | Exit/ | Accept/ |
| Query | Query | | | | | Keys | Cancel | Commit |

Terminal Window

VESSEL TRAFFIC SERVICE
LIST OF PROSPECTIVE VESSELS

| VESSEL NAME | CALL SIGN | VIN |
|---|---|---|
| DEPARTURE POINT | DESIGNATION | |
| 1ST LT. ALEX BONNYMAN | WMFZ | D680897 |
| FA 25 | | |
| AKMAR 1 | TCHY | L7912070 |
| FA 21A | | |
| ACT 1 | GYXG | L6901426 |
| FIRST SECTOR | | |
| CALIFORNIA | 3EHP5 | L8111752 |
| 35th Street Pier | | |
| ALEXANDRA | WYR2956 | D572329 |
| AMOCO OIL CO. MT. VERNON | | |

CURSOR to VESSEL
EXIT with NO data ** ACCEPT data to VDC

| Count: 5 | | | | | | <List> | <Replace> | |
|---|---|---|---|---|---|---|---|---|
| Enter Query | Execute Query | Menu | List | Terminal | Help | Show Keys | Exit/ Cancel | Accept/ Commit |

FIG-74

```
****************************************************************
TRANSIT STATISTICS:    09-MAR-94 TO 09-MAR-94

PORT      INTRA
VESSEL TYPE              TRANSIT       MVMNTS      VTS     TOTALS
--------------------------------------------------------------
FERRY/HARBOR EXCURSION      0             0          0        0

GOVERNMENT                  0             0          0        0

TANKER/CARGO - GENERAL CARGO   0          0          0        0

TANKER/CARGO - HAZARDOUS    0             0          0        0

TANKER/CARGO - PETROLEUM    0             0          0        0

TOWING VESSEL - GENERAL CARGO  0          0          0        0

TOWING VESSEL - HAZARDOUS   0             0          0        0

TOWING VESSEL - PETROLEUM   0             0          0        0

UNKNOWN/DEAFULT             0             0          0        0
--------------------------------------------------------------
TOTALS                      0             0          0        0
****************************************************************
```

VESSEL TRAFFIC SERVICE
TRAFFIC SUMMARY REPORT
Mar 9 1994
16:13:04

FIG-75

MARINE VESSEL TRAFFIC SYSTEM

The invention described herein may be manufactured and used by or for the Government of the United States of America for governmental purposes without payment of any royalties thereon or therefor.

BACKGROUND OF THE INVENTION

1. Field of Invention

The invention relates to an improved radar harbor surveillance sensor, computer and display system to monitor marine harbor traffic and provide advisories to vessels in the areas selected by the system operators, and notify the operators of early warnings of unacceptable traffic conflicts in the confined waterways of the harbor. More particularly the invention relates to the collection of harbor traffic information from multiple remote sensor collection sites around the harbor and the integration, recording, merging and presentation of that remote site data onto a single operator display, selected from a plurality of operator displays. The invention provides a quick, accurate computer generated graphic display of the harbor traffic, possible surface and subsurface conflicts, and key vessel identification information.

2. Description of the Prior Art

A wide variety of sensor information, radio, radar, and camera, has been used in the past to monitor marine traffic from a shore based station and ensure safe passage and the orderly passage of vessels. The technology is based on the direct visual observation and radar sensing techniques and upon procedures developed for collision avoidance of mobile craft and vessels on the high seas. Typically, such harbor surveillance systems consist of one or more shore-based azimuth scanning radar systems, supported in the plural configuration by broadband data linking systems such as microwave relay links or co-axial cable wherever the radar data from a multiplicity of sensors is to be viewed at a single control or operational surveillance center.

The marine traffic pattern is viewed at one or more shore-based radar plan position indicators by operators whose function is to interpret the traffic situation and to generate alerts when unacceptable ship movements occur or more importantly are about to occur, and to communicate with and to receive communications from ships within their spheres of coverage, such communications being concerned with the identification of specific ships in relation to their present positions and future maneuver intentions. In the special conditions where ships lack and are unable to acquire information necessary to their safe navigation, the operators provide such information in a form intelligible to and convenient to the shipmaster or pilot on board the cooperating vessel. A specific function of the shore-based radar surveillance system is to provide information which is available to the shore station by virtue of the selected location of its radar sensors and which may not therefore be available by examination of similar radar equipment on a specifically located ship because of restricted radar coverage in land-locked constricted canals, rivers, or narrow estuaries.

Recent concern with the promotion of improved safety of marine operations for the purposes of environmental protection and preservation has also added encouragement to governmental agencies of the leading nations to promote legislation governing the establishment and efficient operation of maritime traffic surveillance systems. Initially, such systems will monitor traffic and issue advisory communications to voluntarily participating vessels. It can be expected that vessel participation will become mandatory.

Even though shore-based surveillance systems may possess advantages over shipborne equipment devoted to acquiring navigational and traffic information by reason of their carefully-planned deployment and of the deliberate sophistication of equipment matched to high orders of reliability and availability and supported by application of the accurate and rapid data processing capability of the digital computer, certain impediments occur. The individual vessel negotiating an area of difficulty in terms of navigation or traffic density may exercise some discretion in applying its available resources to address those problems of most immediate concern and consequence. In contrast, the shore-based surveillance system must perform its functions with respect to its total surveillance region. When traffic densities are high, the work load generated is known to reach overwhelming levels. The combination of all of the threats posed by encounters of all the traffic elements taken a pair at the time can reach high numerical values.

More recent shipboard collision threat assessment techniques use automatic target trackers to acquire radar target data and a digital computer to process the radar target data and to provide easily-assimilated presentations of collision threat information to the shipmaster. Efforts to exploit these techniques at the shore-based location have revealed severe limitations. In shipboard systems designed to cope with the pattern of encounters which occur in the open sea, it has been discovered that a more limited applicability results in situations where ships are forced to abandon their normal operating pattern, which is to proceed in general on steady courses with steady speed and to follow the sometimes torturous channels of an estuary or harbor.

In the latter situations, the likelihood of the ship continuing on at least a steady course is curtailed severely. Reliance upon the convention of prediction of future events based upon the extrapolation of the present positions, speeds, and courses of vessels becomes impossible. Instead, reliance is based on the convention that vessels will follow a predicted set of courses and speeds and normal radar displays are therefore used to monitor the situation to see that the ships do in fact follow the predicted courses. This allows prediction of the vessels future positions even in the usual situation in which a number of bends or changes in channel configuration intervene.

U.S. Pat. No. 3,971,018 issued to Isbister et al. discloses a marine traffic conflict assessment system that monitors harbor traffic with radar surveillance and permits rapid and accurate assessment of the degree of hazard or safety in the movement of the monitored vessels through the monitored harbor.

Other radar anti-collision systems for ships in ships in waters adjacent to land areas are focused on mounting the radar and display system on the vessel. U.S. Pat. No. 3,890,616 issued to Kojima et al., U.S. Pat. No. 4,706,090 issued to Hashiguchi et al., U.S. Pat. No. 4,081,802 issued to Elmore et al., and U.S. Pat. No. 4,339,751 issued to Pease.

SUMMARY OF THE INVENTION

The invention relates to an improved radar harbor urveillance sensor, computer and display system to monitor arine harbor traffic, provide advisories to vessels in areas elected by the system operators, and provide the operators of he system with an early warning of unacceptable traffic conflicts in the confined waterways of the harbor. Each marine Vessel Traffic System (VTS) consists of a number of remote sites providing radar, camera video, and audio communicated to a central Vessel Traffic Center (VTC). VTC data integration and display provides the ability to identify, monitor, and advice of potentially dangerous vessel traffic conditions and fuse multi-radars on a single display. Although the primary purpose of VTS is to insure safe passage of vessels throughout these waterways, the system also provides the ability to document incidents and traffic conditions.

It is an object of the present invention to monitor vessel traffic and provide advisories to vessels in transit or anchorage in key waterways. To accomplish this task, the VTS is capable of acquiring data from one to, in the initial fielded system, 18 (and scaleable beyond 18) remote sites in the form of radar track data, digitized radar image data, camera video, and audio. Data is processed and displayed in a form that provides for early recognition of potentially dangerous situations and communication of the impending condition to vessels of concern. This feature is intended to provide the capability to allow advised vessels to implement corrective actions in a timely manner. Each VTS functions continually, 24 hours a day, seven days a week with a system availability of 99.9%.

It is a further object of this invention to provides an aid to waterway authorities in the conduct of other mission roles including search and rescue, law enforcement, pollution control, and marine safety. Through data collection, the VTS system facilitates waterway authorities command and control capabilities to detect events and coordinated responses. Included as part of this secondary object is the need to provide operational and administrative reports for both local VTC use and for use by selected governmental authorities external to the VTCs. Report generation includes a query capability of the VTS database and provides integrated outputs of recent vessel tracking and support data. Reports include a summary of vessel traffic data, VTS equipment status, and vessel incident reports for selected periods of time.

BRIEF DESCRIPTION OF THE DRAWINGS

The invention is described in more detail, by way of example only, with reference to the following drawings. Additional features necessary to the invention will be evident from the drawings.

FIG. 1 is a VTS Overview
FIG. 3 is the Front End Switch Block Diagram
FIG. 7 is the SDP Hardware Configuration
FIG. 33 is the Equipment Administration Menu
FIG. 34 is the Vessel Status Menu
FIG. 36 is the Vessel Administration Menu
FIG. 38 is the User Administration Form
FIG. 39 is the Sector Administration Menu
FIG. 40 is the Docks Administration Menu
FIG. 41 is the Anchorage Administration Menu
FIG. 42 is the Equipment Configuration Menu
FIG. 43 is the Remote Site Configuration Menu
FIG. 44 is the Radar Configuration Menu
FIG. 45 is the Radar Configuration Menu con_t
FIG. 46 is the Radar Set Form
FIG. 47 is the Radar Configuration Form
FIG. 48 is the Record Replay Configuration Form
FIG. 50 is the Camera Configuration Form
FIG. 51 is the Video Insertion Configuration Form
FIG. 52 is the Video Switcher Configuration Form
FIG. 53 is the Prospective List Form
FIG. 54 is the Anchored List Form—A
FIG. 55 is the Anchored List Form—B
FIG. 56 is the Anchored List Form—C
FIG. 57 is the Anchored List Form—D
FIG. 58 is the Anchored List Form—E
FIG. 60 is the Docked List Form—B
FIG. 61 is the Docked List Form—C
FIG. 62 is the Docked List Form—D
FIG. 63 is the Docked List Form—E
FIG. 64 is the Traffic Summary Form
FIG. 65 is the Vessel Support Data Form
FIG. 72 is the Pilot Form
FIG. 73 is the Vessel Transit History Form
FIG. 74 is the Identify Vessel Form
FIG. 75 is the Traffic Summary Report

DETAILED DESCRIPTION

System Overview.

The VTS is comprised of multiple Remote Site Subsystems (RSS) 1 providing vessel tracking and communication sensors; and a centralized Vessel Traffic Control Subsystem (VTCS) 2 that integrates, processes, and displays RSS data.

An overview of the VTS system is shown in FIG. 1. This embodiment of the VTS can accommodate not less than 18 RSSs; all providing data to the VTCS 2 where data is merged, processed, recorded, and displayed. The VTS is modular in construction allowing any VTS to be configured with 1 to 18 remote sites and from 1 to 16 display consoles. In addition, each remote site may be configured to acquire sensor data from up to four video cameras 3; one radar 4 providing both digitized radar image data and track data for up to 60 tracks (and easily scaleable beyond the current 60 tracks); and audio for up to two transceivers and four guard receivers.

Sensor data will be multiplexed at each site for transmission to the VTC via terrestrial data links (for example T1 lines, Fiber Optic lines or a microwave link). Upon acquisition at the VTC, the VTCS will integrate, record, process, and display data, as denoted below:

Record Data

All incoming data including radar image data, radar track data, audio, and camera video are recorded for playback in an integrated and time correlated manner.

Figure 2B:
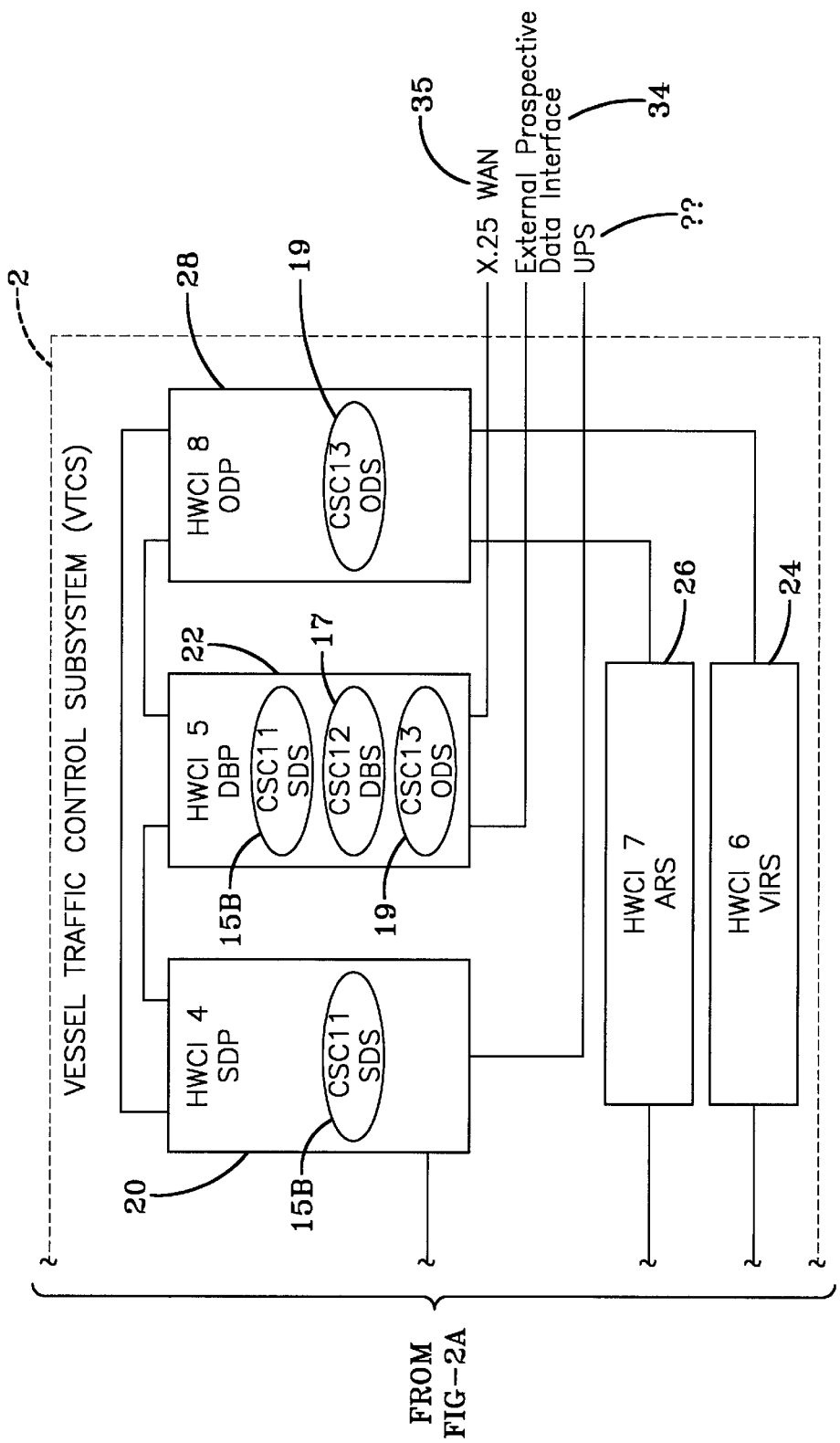
FIG. 2 is the VTS Top-Level HWCI/CSCI Block Diagram

Process Data Track and alarm data processing are performed. Data processing functions include:
Track data correlation
Estimated vessel position calculations
Projected vessel encounters
Alarm processing
Display Data All four types of sensor data are provided to the display consoles, including:
Camera Video Data.
Selectively acquired from the video switcher for routing up to four video monitors and a VCR at each display console.
Radar Image Data.
Acquired in compressed form. Each display console will decompress, integrate, and overlay chart displays with radar image data.
Radar Track Data.
Integrate and selectively overlay chart displays with radar track data.
Audio.
Acquired via the audio routing system and selectively routed to display console headsets and speakers.
Display Console operations shall provide the following capabilities:

Process and display chart data, radar data, and operational/administration vessel reports.
Control remote site sensors
Control audio selection and routing
Control camera video selection and routing
Hardware/Software Configuration
A top-level VTS system block diagram showing the primary Hardware Configuration Items (HWCI) and Computer Software Configuration Items (CSCI) are shown in FIG. 2. An overview of each area is provided below:

Remote Site Subsystem:

The Remote Site Subsystem (RSS) 1 consists of all components resident at a VTS remote site necessary for the setup, acquisition, and transmission of audio, camera, and radar sensor data to the VTCS. HWCIs comprising the RSS, include:

Radar Sensor System (RDSS) 10—HWCI 1:

The RDSS is composed of those components that provide radar image and track data to the remote site processor HWCI. Components include:
Radar Processor
Radar Control Unit
Radar Transmitter/Receiver
Radar Antenna
Remote Site Processor (RSP) 12—HWCI 2:

Processing system used for setup and control of RSS equipment and the acquisition and pre-processing of radar data, video data, and equipment status.

Wide Area Network Data Communications (DATAWAN) 14—HWCI 3:

Hardware consists of a data communications multiplexers and terrestrial data links used for the transmission of data between the VTCS and RSS.

Visual Sensor System (VSS) 16—HWCI 9:

The VSS is composed of the equipment needed to provide visual surveillance. Equipment, includes:
Color, B&W, and Low-Level-Light TV (LLLTV) cameras
Pan/Tilt camera bases and enclosures
Video compression hardware
VHF Radio System (VRS) 18—HWCI 10:

The VRS consists of the VHF radio equipment needed to transmit and receive audio signals, including:
VHF-FM transceivers
VHF-FM guard receivers
Radio control interfaces
Antennas VTR transceiver audio is routed through the RSS communications multiplexor.

Sensor Data Software (SDS) 15A—CSCI 1:

Sensor Data Software resident on the RSP is responsible for:
direct setup and control of all sensor equipment.
sensor data acquisition including radar scan and track data.
sensor equipment status acquisition.
track pre-processing.
communication of data to and from the VTCS.
data recording
Vessel Traffic Control Subsystem 2:

The Vessel Traffic Control Subsystem (VTCS) consists of all hardware located at the VTC necessary for the setup, acquisition, control, processing, and display of data from RSSs. As illustrated in FIG. 2 the primary hardware components comprising the VTCS, include:

Sensor Data Processor (SDP) 20—HWCI 4:

The SDP provides for the acquisition of RSS sensor data; setup and control of RSSs; record/replay of data; and processing and distribution of sensor data to other VTCS components.

Database Processor (DBP) 22—HWCI 5:

The DBP performs alarm data estimated track position processing as well as hosting the system's two resident databases, consisting of:

ORACLE database that provides a relational database for vessel information storage.

A Track Database Manager (Tdbm) for storage and distribution of vessel track data.

Visual Image Routing System (VIRS) 24—HWCI 6:

The VIRS performs the distribution of camera video data within the VTCS. It also includes video character insertion of camera azimuth, time, and site ID.

Audio Routing System (ARS) 26—HWCI 7:

The ARS is responsible for routing of audio to and from the RSSs as well as within the VTCS. This includes VHF-FM audio information, VTCS intercommunications, telephone, audio alarms, audio callback, and systems playback of recorded audio. The ARS is composed of an audio matrix switch and controlling hardware/software.

Operator Display Processor (ODP) 28—HWCI 8:

The ODP comprises all equipment making up the VTCS operator consoles including hardware for the setup and control of VTS; display of data including integrated radar track data, radar image data, and alarms; control and viewing of camera video data; and ability to communicate via audio with vessels and other VTS personnel.

Sensor Data Software 15B—CSCI 1:

The Sensor Data Software (SDS) performs sensor data acquisition and processing. SDS software resident capabilities on the SDP and DBP of the VTCS, include:

RSS Setup/Control acquisition of RSS sensor data track processing control of selected VTS functions data distribution to other VTCS components data record/replay Database Software 17—CSCI 2:

Database Software (DBS) resident on the DBP is responsible for maintaining the VTS database. This database provides for the storage of vessel information used in the generation of database reports, lists, and logs; and is integral to the VTS vessel control man-machine interface. Other key DBS capabilities, include:

anchorage reservation external prospective data interface database redundancy database backup and recovery Operator Display Software 19—CSCI 3:

The Operator Display Software (ODS) provides a VTS man-machine interface and integrated data display capability for VTS personnel conducting vessel monitoring and advisory operations. Capabilities include:

setup and control of equipment.

setup and control of track processing.

control of geographical chart data and data displays, including radar image data, radar track data, map features overlay, and display processing functions.

External Interfaces.

The VTS external interfaces are shown in FIG. 2 and consists of the following:

UPS communication interface 30

An Uninterruptable Power Supply (UPS) communication interface is required to acquire power loss signals from the UPS resident at each RSS and the VTCS. The UPS at the RSS is interfaced to the RSP for conveying UPS status back to the VTCS.

remote site security system 31

An interface to the security system is required for each RSS. The system provides alarms for intrusion, smoke detection, and environmental alarms (over temperature, under temperature, humidity). Individual sensors are integrated with the control panel which interfaces directly to the data WAN multiplexer at each RSS. Although the Site Security System is routed through the multiplexer, signals are essentially reconstructed at the VTCS data WAN multiplexer and are routed through an alarm notification system exclusive from the rest of the VTCS.

radar interface 32

The radar interfaces to the Radar Processor (RP) and Radar Control Unit (RCU). The radar processor interface receives radar video, trigger, and azimuth position data from the radar. The Radar Control Unit interface is an RS-232 interface.

wide-area network interface 33

An X.25 Wide Area Network interface is provided to allow remote access of the VTS vessel database and related database reports. This interface may additionally provide a future means of automatic access of external vessel database sources such as Lloyds of London and the Marine Safety Management System (MSMS).

external prospective data interface 34

An X.25 interface is provided for the input/output of vessel prospective data with other VTSs. The interface will involve the ability to handle fixed format prospective data messages and free text general information (mail) messages.

System Modes of Operation.

The VTS functions in the following modes of operation:

live processing:

This mode provides for the acquisition, integration, processing, recording, and display of vessel tracking data in real-time to allow VTS operators to monitor and advise vessels.

data playback:

Replays recorded radar image data, radar track data, camera video, and audio. The playback is fully integrated in a manner similar to the live mode of operation. Data playbacks are based on operator selected time periods and are restricted to a single but selectable operator display console.

Data Simulation

A simulation capability will be provided that allows operator training on the display console. Data simulation is restricted to a single but selectable operator display console.

The VTS shall be capable of concurrent live processing with either a data playback or data simulation.

In addition, the VTS shall include an integrated built-in-test capability to assist in identifying and localizing system hardware failures. This function uses software to localize equipment problems to an area where more detailed system diagnostic software can further identify problems to the board level.

System Design

This section details the system design for the primary HWCIs and CSCIs of the VTS as detailed in FIG. 2.

Hardware Configuration Item Identification.

The HWCIs for the Remote Site Subsystem (RSS) and the Vessel Traffic Control Subsystem (VTCS) are detailed in the following subparagraphs.

Remote Site Subsystem.

Figure 4A:
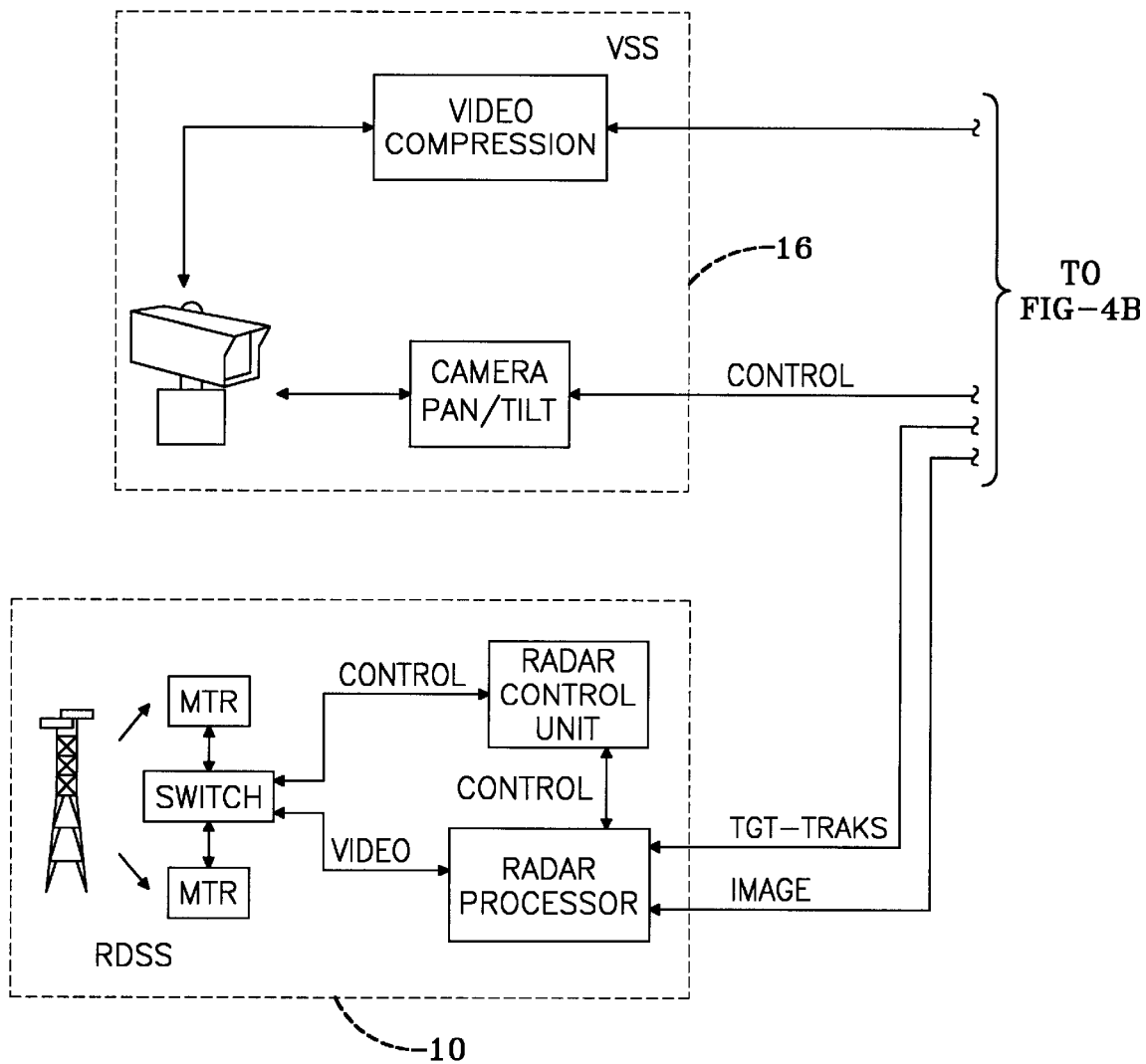
FIG. 4 is a Typical Remote Site Configuration
Figure 4B:
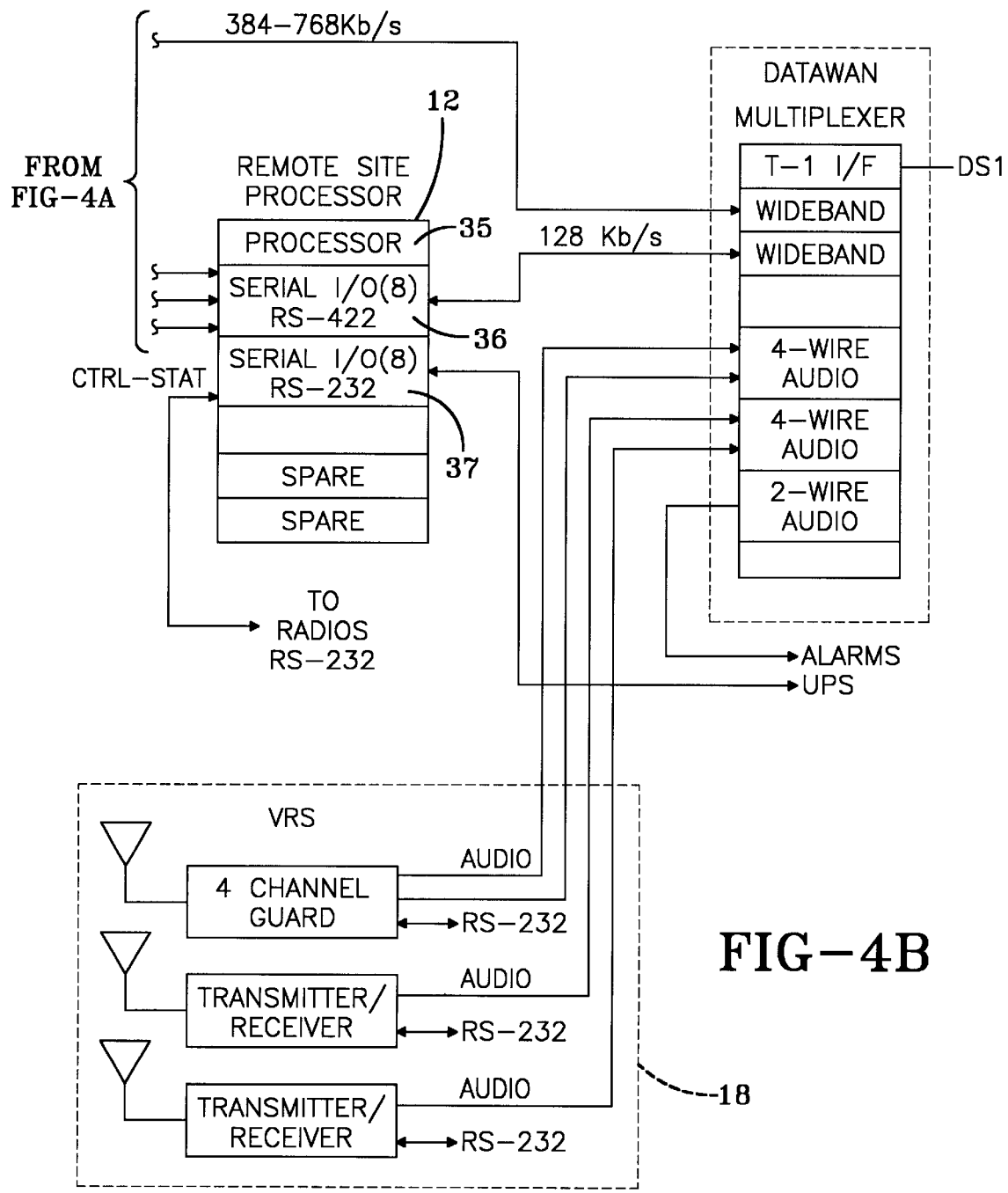

Each Remote Site Subsystem (RSS) is configured with the same set of modular hardware components as shown in a typical RSS configuration in FIG. 4, although sensor requirements will vary for individual remote sites. The RSS involves five HWCIs consisting of three types of sensors, a Remote Site Processor (RSP), and a communications HWCI, each of which are defined within the following paragraphs.

Radar Sensor System (RDSS) 10—HWCI 1.

Radar video is acquired from remote sites in a run-length encoded format from both the Radar processor and the radar processor. In addition to radar image data, 1 to 60 vessel tracks are available from each radar processor. The typical RSS radar configuration will have a primary and back-up radar with only one radar operating at a time. Some sites may not include a backup radar.

Use of the radar processor requires a separate Radar Control Unit (RCU) to be interfaced to the radar system.

Remote Site Processor 12—HWCI 2.

The Remote Site Processor (RSP) 12 provides an intelligent interface for the setup and control of all remote site sensor hardware. It consists of a 7-slot VME chassis with the following boards:

VME 35 Processor and 8 channel serial I/O daughter board. This board set provides a 68040 communications processor and eight serial channels configurable for synchronous or asynchronous operation. In addition, the processor board provides two additional asynchronous serial ports providing a total of 10 available serial I/O ports.

VCOM-8 serial I/O board 36. This board provides eight asynchronous serial I/O ports.

The RSP serial I/O ports 37 are configured as shown in Table 1. Software processing functions performed by the RSP are detailed within the Sensor Data Software CSCI.

Wide Area Network Data Communications—HWCI 3.

The Wide Area Network Data Communications 14 (DATAWAN) consists of the data WAN data communication multiplex unit interconnecting RSSs and VTCS, and a front-end data communications switch at the VTCS. All sensor data, control data, and equipment status are communicated between each RSS and the VTCS via a full duplex link. An Intraplex data WAN multiplex unit will typically be used at both ends of each link.

A breakdown of the data communications multiplexer input/outputs is presented in Table 2. Three types of multiplexer interface cards are used. The wide band interface provides for synchronous data rates ranging from 64 Kbps to 1.536 Mbps, while an RS-232 interface accommodates asynchronous data up to 19.2 Kbps. The third interface board provides a dual full-duplex channel.

The multiplexer bandwidth allocated for each video camera is shown as 768 Kbps in Table 2. Actual camera video bandwidth will, however, depend on the number and type of other RSS data sources including transceivers and guard receivers used.

In addition, the DATAWAN consists of a front-end data communications switch as shown in FIG. 3 and an order wire system. The switch will control which VTCS SDP is primary. The switch controls all SDP data communications, including:

data communications with all RSSs

Ethernet connection to Digital Voice Recording System

SCSI interface to helical scan recorder data recorder video insertion unit video switcher IRIG-B time

UPS

RS-232 connection to DBPS for automatic switch over

TABLE 1

| SIGNAL | TYPE | DIRECTION | RATE |
|---|---|---|---|
| Radar Processor | RS-422 | Full Duplex | 56 Kbps |
| • Radar Image Data | | • RP To RSP | |
| • Radar Track Data | | • RP To RSP | |
| • Radar Processor Status | | • RP To RSP | |
| • Radar Processor Setup/Control | | • RSP To RP | |
| Radar Control Unit | RS-232 | Full Duplex | 9600 baud |
| • Radar Setup/Control | | • RSP To RSU | |
| • Radar Status | | • RSU To RSP | |
| Camera and Pan/Tilt 1 | RS-232 | Full Duplex | |
| • Setup/Control | | • RSP to Camera | 9600 baud |
| • Status | | • Camera To RSP | |
| Camera and Pan/Tilt 2 | RS-232 | Full Duplex | |
| • Setup/Control | | • RSP to Camera | 9600 baud |
| • Status | | • Camera To RSP | |
| Camera and Pan/Tilt 3 | RS-232 | Full Duplex | |
| • Setup/Control | | • RSP to Camera | 9600 baud |
| • Status | | • Camera To RSP | |
| Camera 1 Azimuth Unit | RS-232 | Simplex | 1200 baud |
| • Camera Azimuth | | • Camera To RSP | |
| Camera 2 Azimuth Unit | RS-232 | Simplex | 1200 baud |
| • Camera Azimuth | | • Camera To RSP | |
| Camera 3 Azimuth Unit | RS-232 | Simplex | 1200 baud |
| • Camera Azimuth | | • Camera To RSP | |
| Transceiver 1 | RS-232 | Full Duplex | 19.2 kbaud |
| • Setup/Control | | • RSP To Tx/Rx | |
| • Status | | • Tx/Rx To RSP | |
| Transceiver 2 | RS-232 | Full Duplex | 19.2 kbaud |
| • Setup/Control | | • RSP To Tx/Rx | |
| • Status | | • Tx/Rx To RSP | |
| Guard Receivers | RS-232 | Full Duplex | 19.2 kbaud |
| • Setup/Control | | • RSP To Rx | |
| • Status | | • Tx/Rx To RSP | |

TABLE 1-continued

| SIGNAL | TYPE | DIRECTION | RATE |
|---|---|---|---|
| UPS<br>• Status | RS-232 | Simplex<br>• UPS TO RSP | 2400 baud |
| Multiplexer<br>• Radar Image Data<br>• Radar Track Data<br>• Radar Status Data<br>• Camera and Pan/Tilt 1 Status<br>• Camera and Pan/Tilt 2 Status<br>• Camera and Pan/Tilt 3 Status<br>• Camera 1 Azimuth Data<br>• Camera 2 Azimuth Data<br>• Camera 3 Azimuth Data<br>• Transceiver 1 Status<br>• Transceiver 2 Status<br>• Guard Receivers Status<br>• Radar Setup/Control<br>• Camera and Pan/Tilt 1 Setup/Control<br>• Camera and Pan/Tilt 2 Setup/Control<br>• Camera and Pan/Tilt 3 Setup/Control<br>• Transceiver 1 Setup/Control<br>• Transceiver 2 Setup/Control<br>• Guard Receivers Setup/Control | RS-422 | Full Duplex<br>• RSP To Mux<br>• RSP To Mux<br>• RSP To Mux<br>• RSP To Mux<br>• RSP To Mux<br>• RSP To Mux<br>• RSP To Mux<br>• RSP To Mux<br>• RSP To Mux<br>• RSP To Mux<br>• RSP To Mux<br>• RSP To Mux<br>• Mux To RSP<br>• Mux To RSP<br>• Mux To RSP<br>• Mux To RSP<br>• Mux To RSP<br>• Mux To RSP<br>• Mux To RSP<br>• Mux To RSP | 128 Kbps |
| Telephonics Radar Processor<br>• Radar Track Data<br>• Status Data<br>• Setup/Control Data | RS-530A | Full Duplex<br>• RP To RSP<br>• RP To RSP<br>• RSP To RP | 64 Kbps |
| Telephonics Radar Processor<br>• Radar Image Data | RS-530A | Simplex<br>• RP To RSP | 128 Kbps |
| Local RSP Maintenance Terminal Port | RS-232 | Full Duplex | 9600 baud |

TABLE 2

| SIGNAL | TYPE | DIRECTION | RATE |
|---|---|---|---|
| Camera Video 1 | RS-422 | RSS To VTCS | 768 Kbps |
| Setup/Control<br>• Radar<br>• Video (All)<br>• Audio (All)<br>Data<br>• Radar Image Data<br>• Radar Track Data<br>• Radar Status<br>• Video Status (All)<br>• Audio Status (All) | RS-422 | Full Duplex<br>• VTCS To RSS<br>• VTCS To RSS<br>• VTCS To RSS<br><br>• RSS To VTCS<br>• RSS To VTCS<br>• RSS To VTCS<br>• RSS To VTCS<br>• RSS To VTCS | 128 Kbps |
| Transceiver 1<br>• Transmit<br>• Receive | <br>Analog<br>Analog | Full Duplex<br>• VTCS To RSS<br>• RSS To VTCS | <br>32 Kbps<br>32 Kbps |
| Transceiver 2<br>• Transmit<br>• Receive | <br>Analog<br>Analog | Full Duplex<br>• VTCS To RSS<br>• RSS To VTCS | <br>32 Kbps<br>32 Kbps |
| Guard Receiver 1 | Analog | RSS To VTCS | 32 Kbps |
| Guard Receiver 2 | Analog | RSS To VTCS | 32 Kbps |
| Guard Receiver 3 | Analog | RSS To VTCS | 32 Kbps |
| Guard Receiver 4 | Analog | RSS To VTCS | 32 Kbps |
| Order Wire | Analog | RSS To VTCS | 32 Kbps |
| Facility Alarms | Analog | RSS To VTCS | 32 Kbps |

Visual Sensor System (VSS) 16—HWCI 9.

Figure 5:
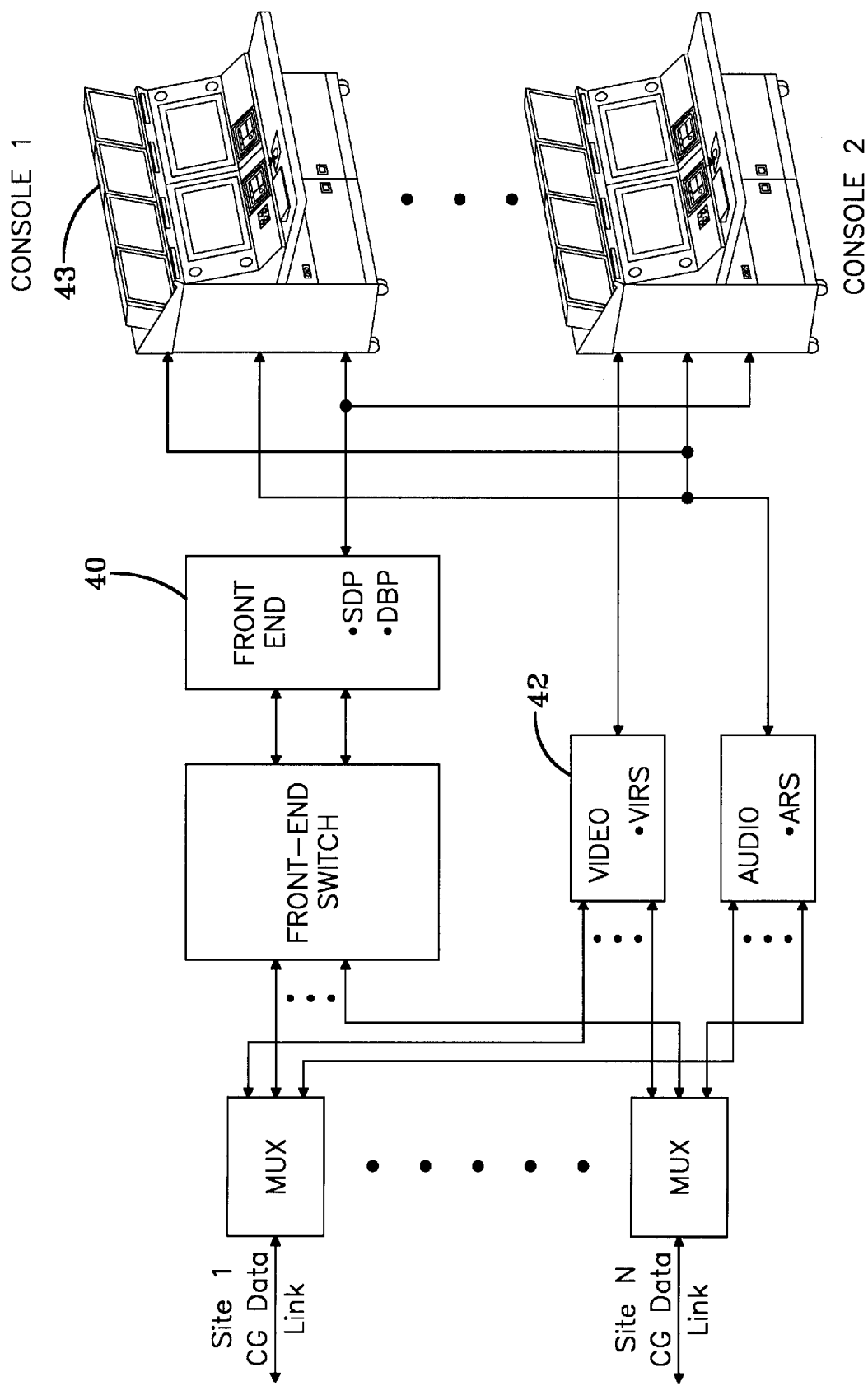
FIG. 5 is the VTCS Functional Overview
Figure 6A:
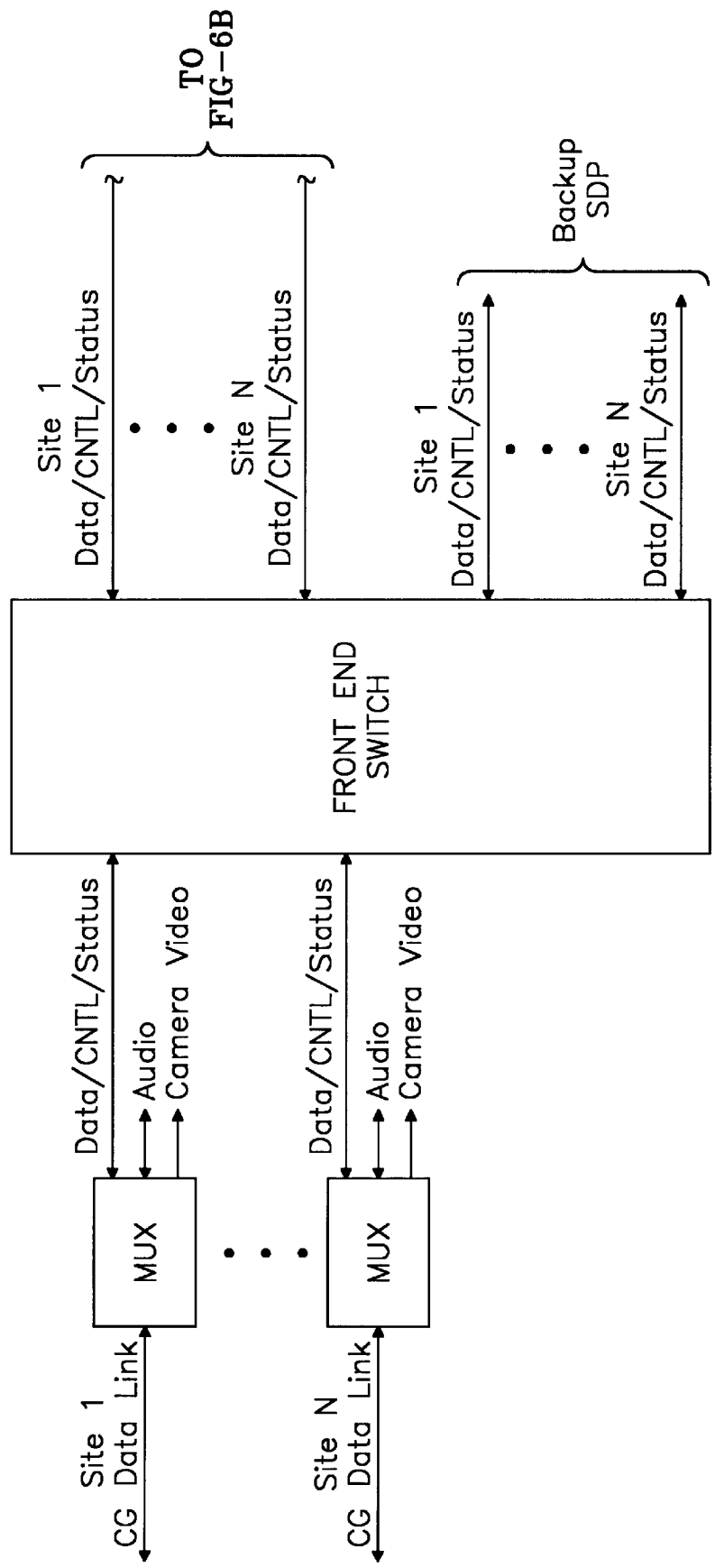
FIG. 6 is the VTCS Functional Block Diagram

Typical remote sites will be configured with one black and white (BW) camera as shown in FIG. 4. Video signals shall be compressed prior to transmission to the VTCS. Once decompressed at the VTCS, this data will provide video for viewing at the display consoles. In some instances full bandwidth camera video is provided to the VTCS via dedicated communication links Operators may manually control the cameras and associated pan/tilt units, including:
   Azimuth
   Elevation
   Zoom In/Out
   Focus
   Wash/Wipe Lens Cover
   Control Heater/Defogger
In addition, cameras may be slaved to individual radar tracks as selected by the display console operator. This feature is a future capability enhancement.
   VHF Radio System (VRS) 18—HWCI 10.
   A remote site will consist of up to two VHF-FM transceivers and four guard receivers. For sites having two transceivers, one transceiver shall be active while the other serves as a back-up for both the local and adjacent sites. Each transceiver has a separate antenna with all guard receivers sharing a common antenna. The transceiver employed is the will provide a selectable synthesized frequency, three configurable output power selections squelch control, and full duplex setup and control via RS-232. Up to four guard receivers can be employed at each site.
Vessel Traffic Control Subsystem.
   The VTCS hardware, shown in FIG. 5, includes data communications and audio routing; front-end hardware consisting of dual sensor data processors 40 and database processors ; video distribution 42; and operator display consoles 43. The following paragraphs define the hardware employed in each of these areas.
   Sensor Data Processor 20—HWCI 4.
   A functional block diagram of the VTCS is shown in FIG. 6. As shown, the front-end consists of four processors consisting of dual (primary and backup) Sensor Data Processors (SDP) 50 and dual (primary and backup) Database Processors (DBP) 52 interconnected via a Fiber Distributed Data Interface (FDDI) high-speed LAN 53.

The SDP performs the following functions:
  setup, control, and communications with remote sites.
  track processing.
  distribution of data to the database processor and display consoles.
  interface and control of other VTS components such as video switcher, video insertion unit, and helical scan data recorder.
  record and playback of integrated VTS data.

In addition, a backup SDP is provided that can perform all SDP functions in case of failure of the primary SDP.

A breakdown of an SDP chassis and its board-level components is shown in FIG. 7. The SDP consists of a general purpose RISC Computer System employing a 20-slot 6U VME chassis. Integral components include:
  Processor Board 55. This board is a standard Motorola processor board employing a single RISC processor with integral SCSI, Ethernet, printer port, and four RS-232 ports.
  FDDI LAN Board 56. A class-A FDDI LAN interface.
  VME Communications processor 57 and 8-channel serial I/O board. This board set provides a 68040 processor and 8-channels of synchronous/asynchronous configurable serial ports for interconnection with remote sites for data acquisition (radar image data, radar track data, compressed camera video data, and status) and providing setup/control of remote site hardware. Each board set accommodates up to 8 remote sites. Each port will be configured as a full duplex 128 Kbps channel employing the HDLC LAPB protocol for insuring data transfer integrity.
  GPS time board set 60. This board set provides for time acquired via the GPS satellite system. Time is distributed via FDDI to the database processor, display consoles, and remote sites as well as in IRIG-B form to the video insertion unit.
  8 Channel Async Serial Board 58. 8-channel asynchronous serial I/O board. This board provides RS-232 ports used for the direct control of RSS VHF-FM radios in VTSPS RSS configurations not employing an RSP.
  One 1.3 Gbyte system disk 57.
  One 150 Mbyte tape drive 58.

Peripherals attached to the SDP include the mass storage system 59, and the Digital Voice Recording System (DVRS). The helical scan mass stoarage system, a 580 Gbyte storage system consists of 120 8mm tapes configured in a jukebox style recorder with four tape record/replay head assemblies. The EXB-120 interfaces to the SDP via a SCSI interface and provides over 30 days of total data storage.

The Digitical Voice Recording System (DVRS) 60 digitizes and compresses up to 64 channels of audio and provides reconstructed playback audio for up to 5 channels. For an initial capability, the DVRS is provided in a stand-alone configuration with integral recording and playback of audio data. As a future capability enhancement the DVRS will be integrated into the SDP via Ethernet as part of the integrated systems data record/playback capability utilizing the EXB-120 data recorder.

Database Processor 22—HWCI 5.

The Database Processor (DBP) performs track data alarm processing, track data distribution, and all database functions associated with the VTS database. A high performance commercial workstation is used as the DBP.

Visual Image Routing System 24—HWCI 6.

Figure 8:
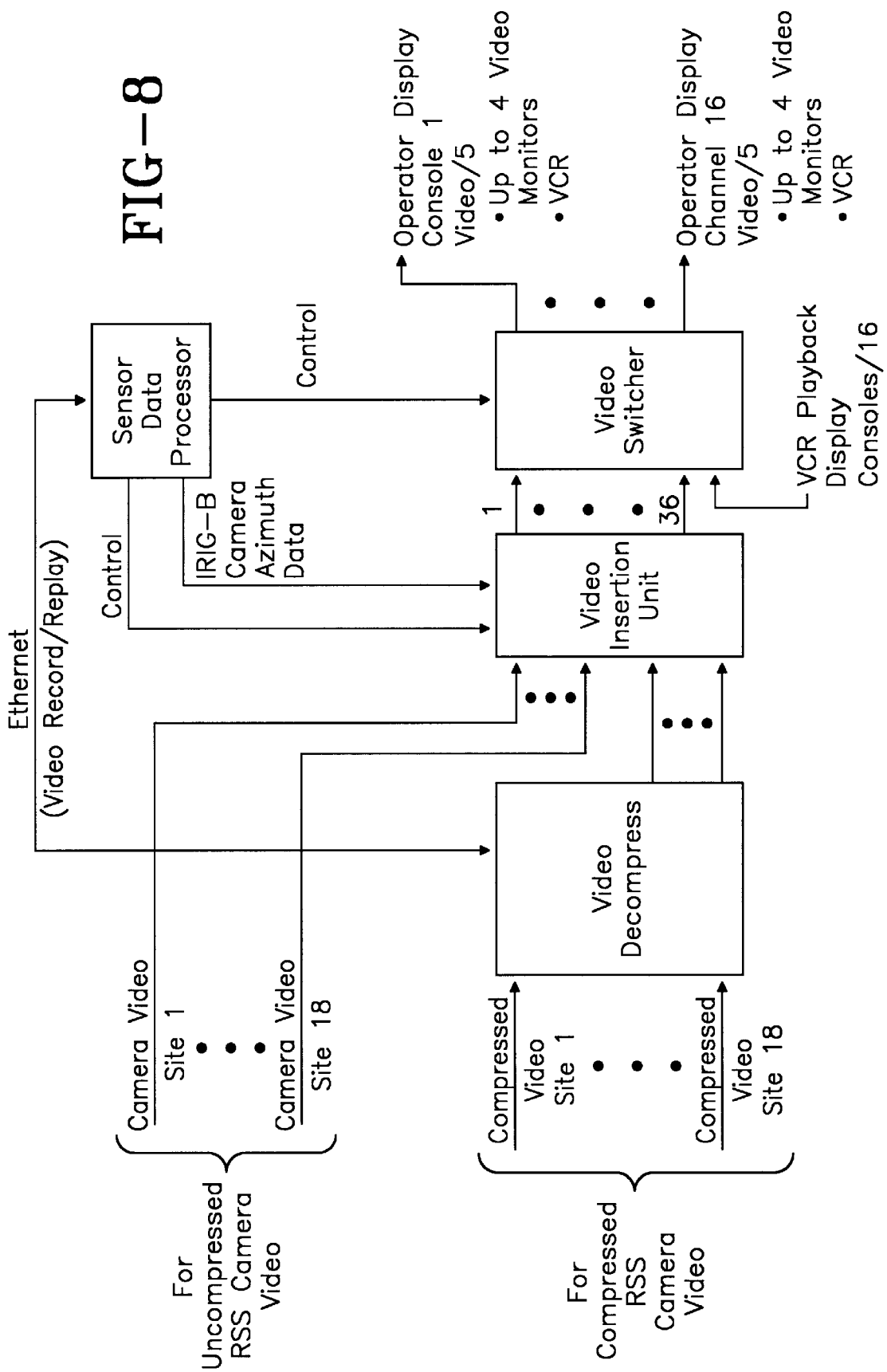
FIG. 8 is the Video Distribution/Control Block Diagram

Distribution of camera video at the VTCS is performed by the Visual Image Routing System (VIRS) as shown in FIG. 8. The VIRS can be configured to accommodate input of up to 36 cameras from all remote sites and selectivitely route video to the operator display console video monitors and VCR. Full motion camera data acquired directly from RSSs using a dedicated camera data communications links are input directly into the video insertion unit for subsequent routing to the VIRS. RSS camera data that is received in compressed and routed through the VIDEO decompression unit prior to input into the video insertion unit. The video insertion unit overlays the site ID, camera azimuth pointing angle, and the current time of day onto each video image.

The VIRS output consists of up to five outputs to each display console, consisting of four video channels; one for each of up to four display console video monitors, and an output for the display console VCR. Any of the four video channels can be selected for routing to the VCR. In a similar manner, VCR playback video can be routed to any of the four monitors. All VIRS controls are initiated by the display console touch panel and conveyed to the SDP which provides direct control over the VIRS.

In addition, the SDP provides compressed playback video to the video decompression unit in a manner identical to live video except that playback video may be further frame rate reduced. The VIRS unit employed is the Grass Valley Group, Horizon Routing System. The system is expandable to accommodate up to 36 inputs and 36 outputs.

Audio Routing System 26—HWCI 7.

Figure 9:
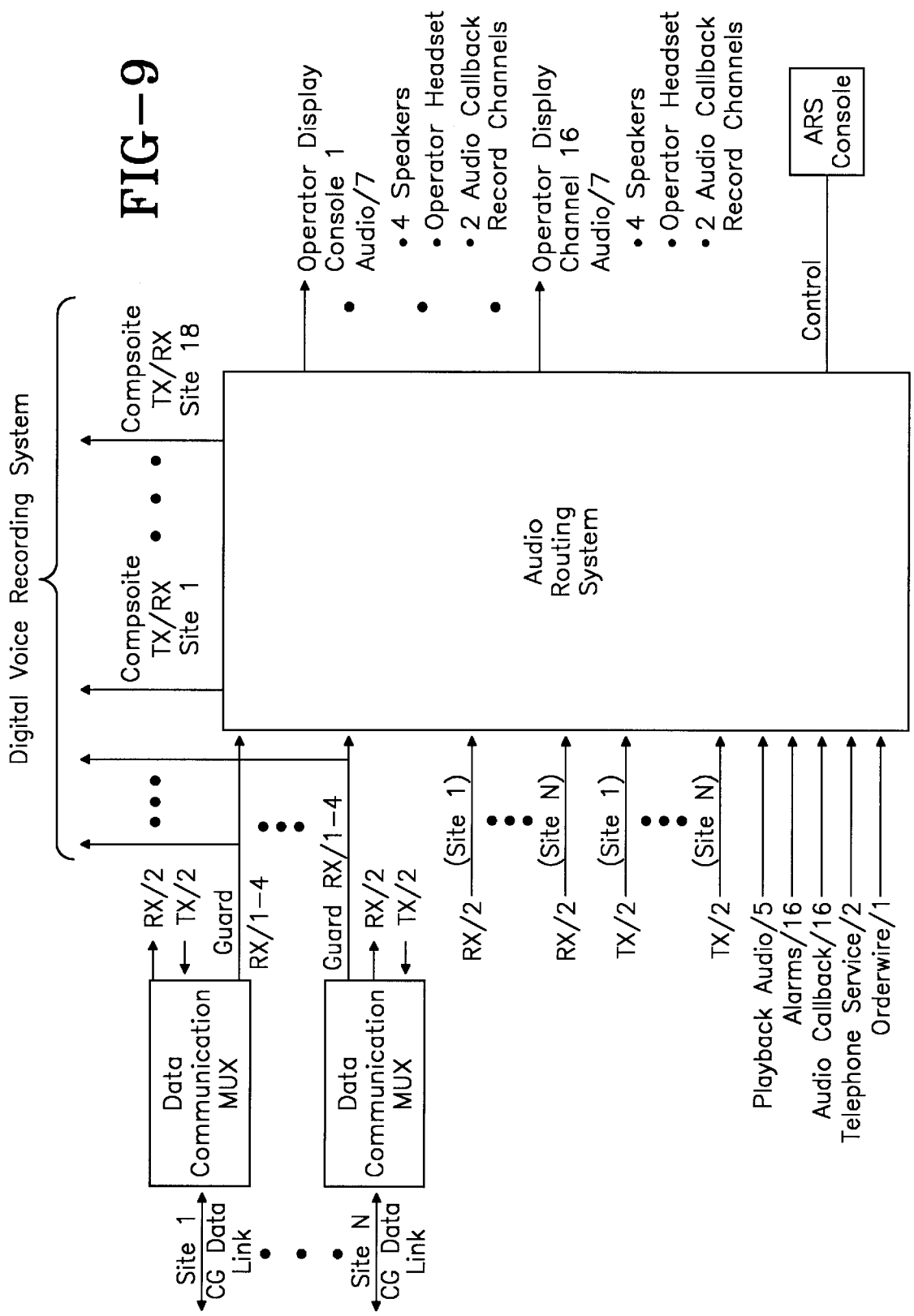
FIG. 9 is the Audio Distribution Block Diagram

The ARS will provide routing of audio to and from the data communications multiplexer, DVRS, and ODPs in support of both live VTS operations and system playbacks. An overview of the ARS is shown in FIG. 9. It provides the capability to accommodate the following audio input/outputs:
  Audio Inputs:
    Up to two transceivers for each of 18 sites Up to four guard receiver channels for each of 18 sites
    Up to sixteen audio alarms signals—One audio alarm being provided from each of the display consoles.
    Up to sixteen audio callback signals—One from each of the display consoles.
    Up to sixteen audio inputs—One from each of the display console operator's microphone/headset.
    Two standard telephone lines.
    One order wire audio input.
    Up to five audio playback channels from the SDP's Digital Voice Recording System.
  Audio Outputs:
    Up to seven audio outputs per display console, consisting of four speakers, one headset, and two audio callback channels for recording at the display console. FIG. 9
    Up to 36 composite transceiver audio signals for efficient recording of audio data.

To reduce the number of audio input channels required of the audio recording system, the ARS will function as a mixer providing one composite signal for each transceiver. In addition, each display console will provide an audio alarm signal to the ARS for distribution to the console speakers/headset. In this way, alarms can be directed to individual speakers or mixed for inclusion over the headset. Alarms normally specific to a display console can be mixed and provided to the supervisor over his respective speaker/headset. In a similar manner, "Audio Callback", which is stored at the individual display consoles, is played back through the ARS for output on selected speakers/headsets.

For integrated data playbacks, reconstructed audio data is output from the audio digitizing system and distributed to the playback console via the ARS. Up to five ADS audio playback channels can be selected for system playback. This design approach is intended to provide an audio replay capability to drive all four console speakers and operator headset during a systems playback.

In general, the ARS provides the capability for watch operators to selectively communicate with vessels using any transceiver within the local VTS system; to setup communication networks involving two or more watch operators; and to establish individual networks between operators and the supervisor as might be required. Normal telephone service is also integrated with the ARS for use as necessary by operations personnel.

The ARS provides each operator the capability to monitor and/or transmit audio over pre-assigned channels. The operator will also have the capability to assign specific channels for monitoring via console speakers and headset. Each defined audio channel has a visual indicator of channel activity.

Operator Display Processor 28—HWCI 8.

This section details the hardware configuration for the VTS operator display processor (display console).

Figure 10:
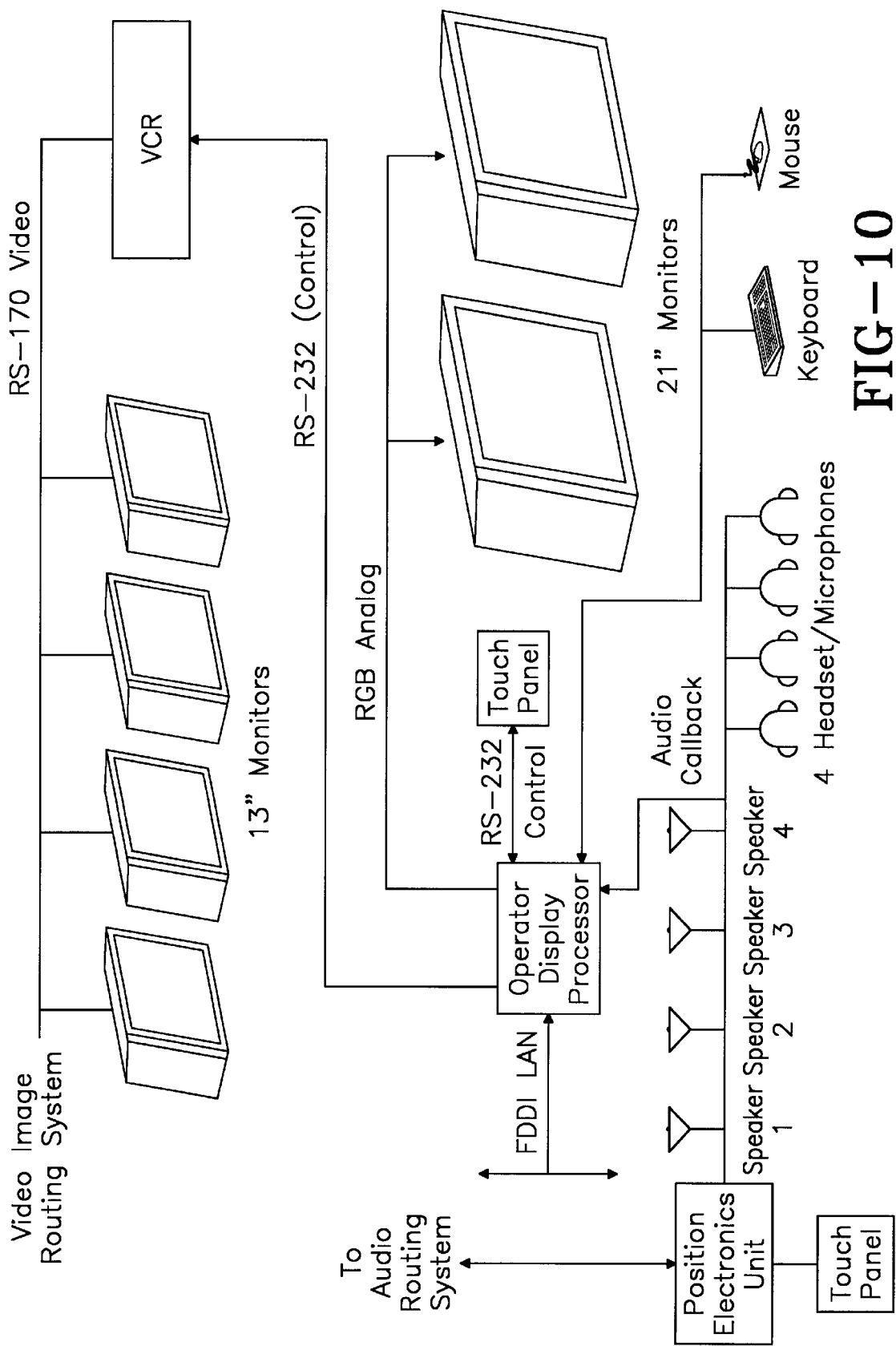
FIG. 10 is the Display Console Block Diagram

The display console provides an integrated means of conducting VTS operations. It provides the ability to setup and control remote sites, and to selectively acquire, process, and display data from any combination of remote site sensors, including audio, camera video, and radar data. A functional overview of the display console illustrating its major components is shown in FIG. 10. The TAC-3 computer system is employed as the operator display processor for the display console. The system is a UNIX based HP 700 Series processor configured with dual-headed graphics and an FDDI LAN interface for communicating with the SDP and DBP.

Figure 11:
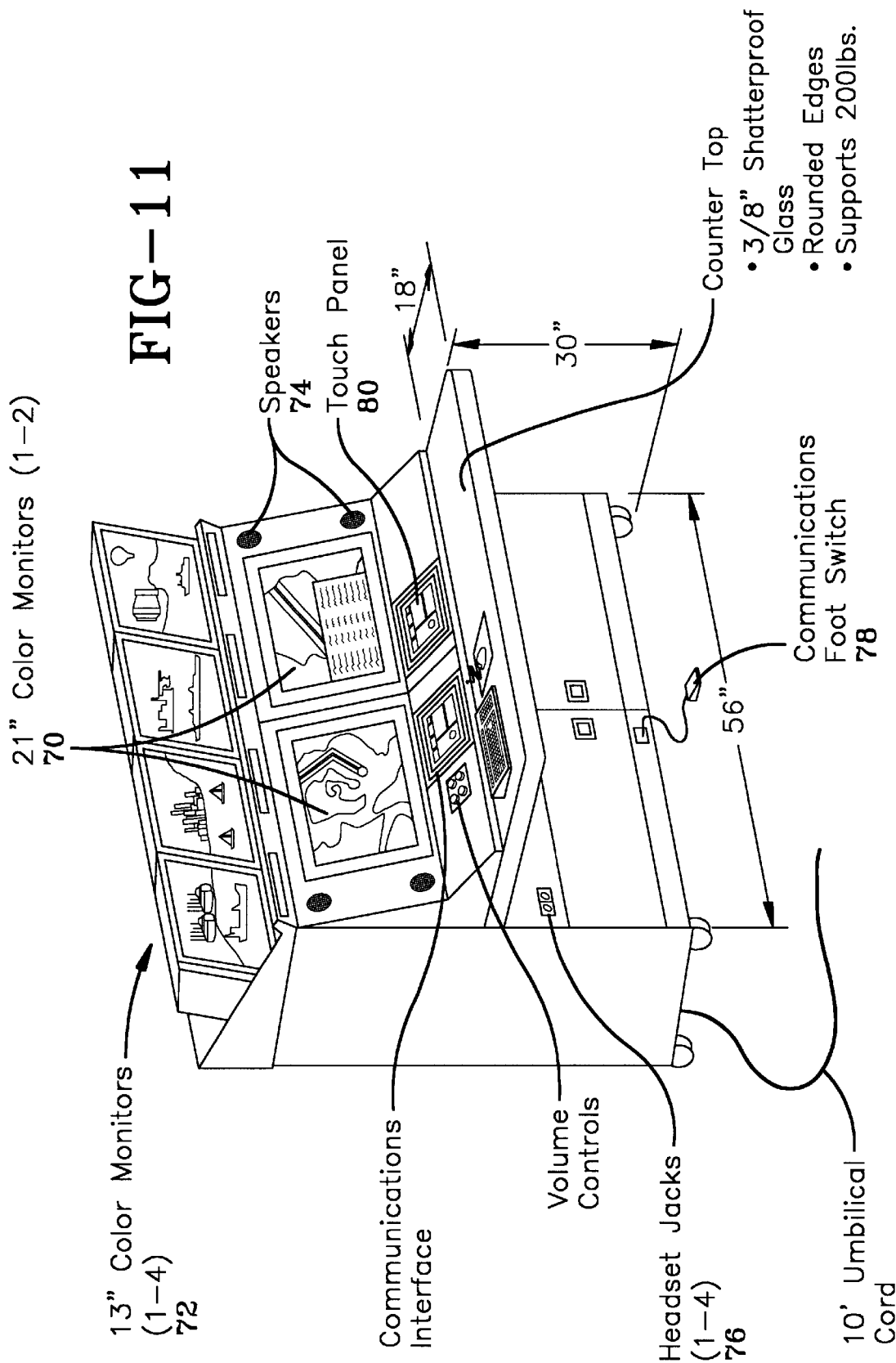
FIG. 11 is the Display Console Configuration

The display console shown in FIG. 11 has been ergonomically designed for ease of use. It incorporates internal forced air ventilation and easy access to all hardware maintenance areas from the rear of the cabinet. Display console/processor characteristics include:

identical processor and operating system compatibility as that defined for the database processor dual-head graphics driving two 21" high resolution (1280×1024) color monitors 70

Pro Audio Spectrum 16 audio digitizer board with dual input/outputs. Inputs are used for digitizing and recording up to two audio channels for use in audio callback. Outputs include audio alarm and playback of one selected audio recall channel.

FDDI, class A interface up to four 13" color monitors for video display 72 four speakers with individual volume controls and channel activity indicators 74

Four audio headset jacks located under counter-top 76 push-to-talk foot strip switch 78 video control touch panel 80

ARS control panel keyboard and mouse/trackball shatter-proof glass counter top capable of supporting 200 lbs recessed casters For purposes of clarity in understanding the display console, selected key operational features are briefly discussed below:

Display Consoles are identical and are operator selectable for use as an operational console, a data playback console, or training console.

Two high-resolution 21" color graphic displays 70 are provided in each display console. Any combination of chart displays and tabular report/displays may be concurrently selected for viewing and multiple radar images may be fused onto a single display. The VTS design accommodates the inherent geographical and operational diversity between VTSs. It may be desirable, for example, for sectors involving large anchorage areas to display a large overview chart display on one CRT with more detailed chart or tabular data selected for viewing on the second CRT. In this example, the operator may zoom in on selected chart areas of interest on the second CRT without losing the overall context of vessel traffic flow presented on the first CRT. Alternatively, for sectors involving long waterways, operators may elect to subdivide CRT displays into displays that partition multiple legs of the waterways. CRT 1, for example, might be divided into a top and bottom half with each half providing coverage of a selected leg. The second CRT could just as easily be used for displaying additional legs of a waterway or used for tabular report/displays. In effect, each VTS will be able to configure chart displays without the need for software programming or system re-configuration.

Operational guidelines and policies concerning configuration of displays should be developed at each VTS.

Each display console may be configured to receive any camera video, audio, radar image data, or radar track data available within the system.

Computer Software Configuration Item Identification.

The VTS is partitioned into three Computer Software Configuration Items (CSCI), consisting of:

Sensor Data Software (SDS)

Database Software (DBS)

Operator Display Software (ODS)

Figure 12:
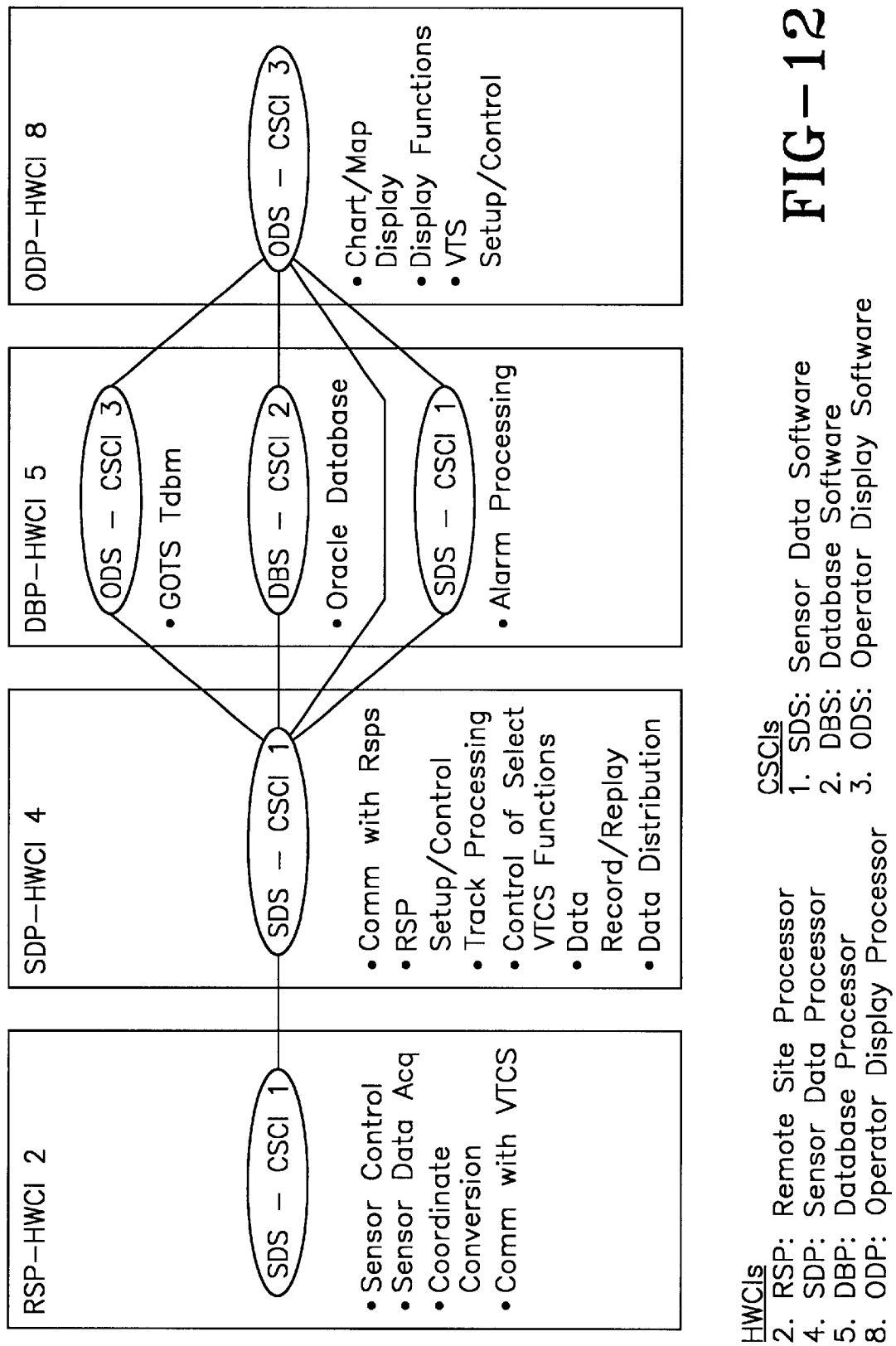
FIG. 12 is the Overview of CSCI Relation to HWCIs
FIG. 13 Software Context Diagram
Figure 13:
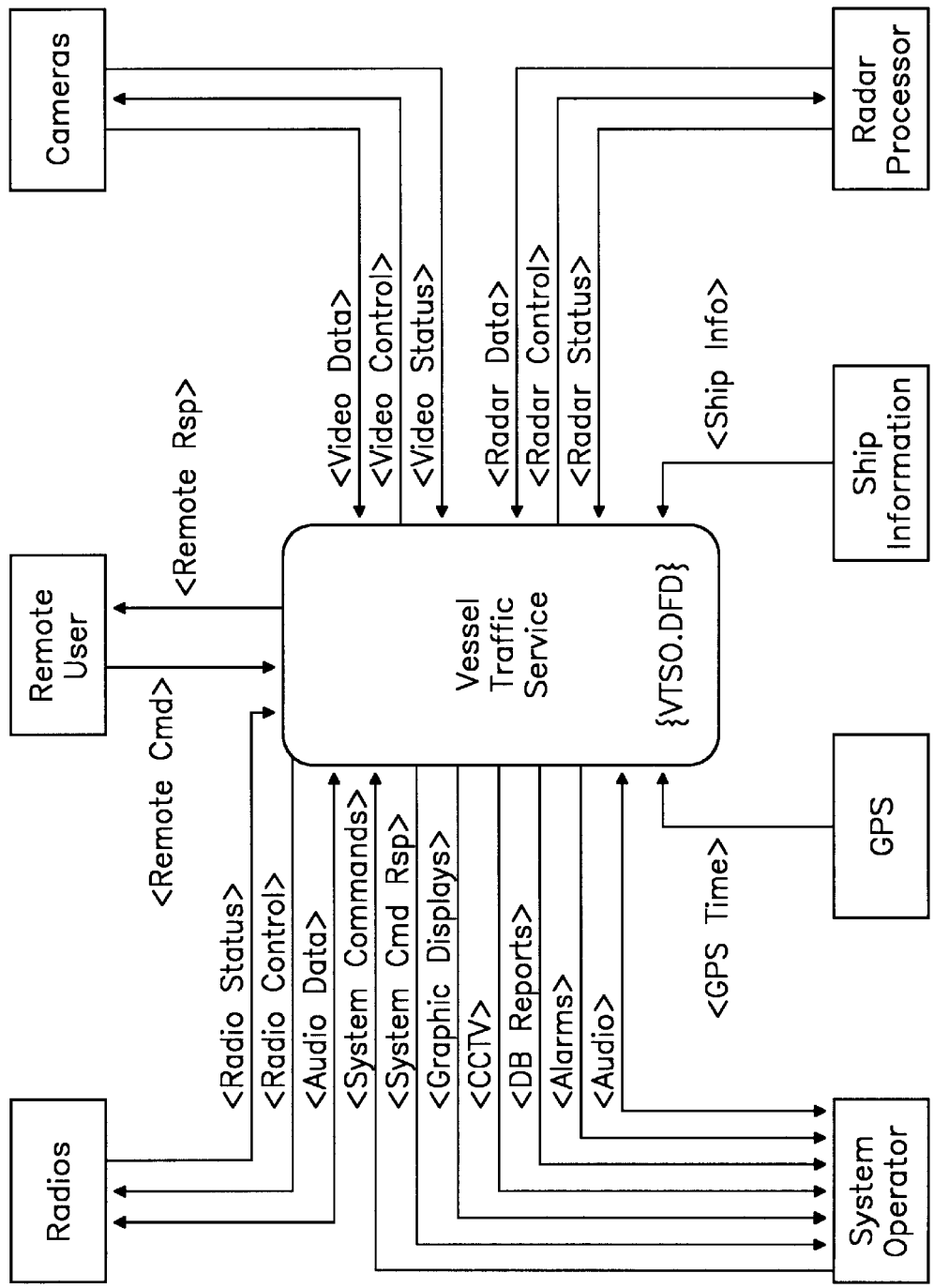
Figure 14A:
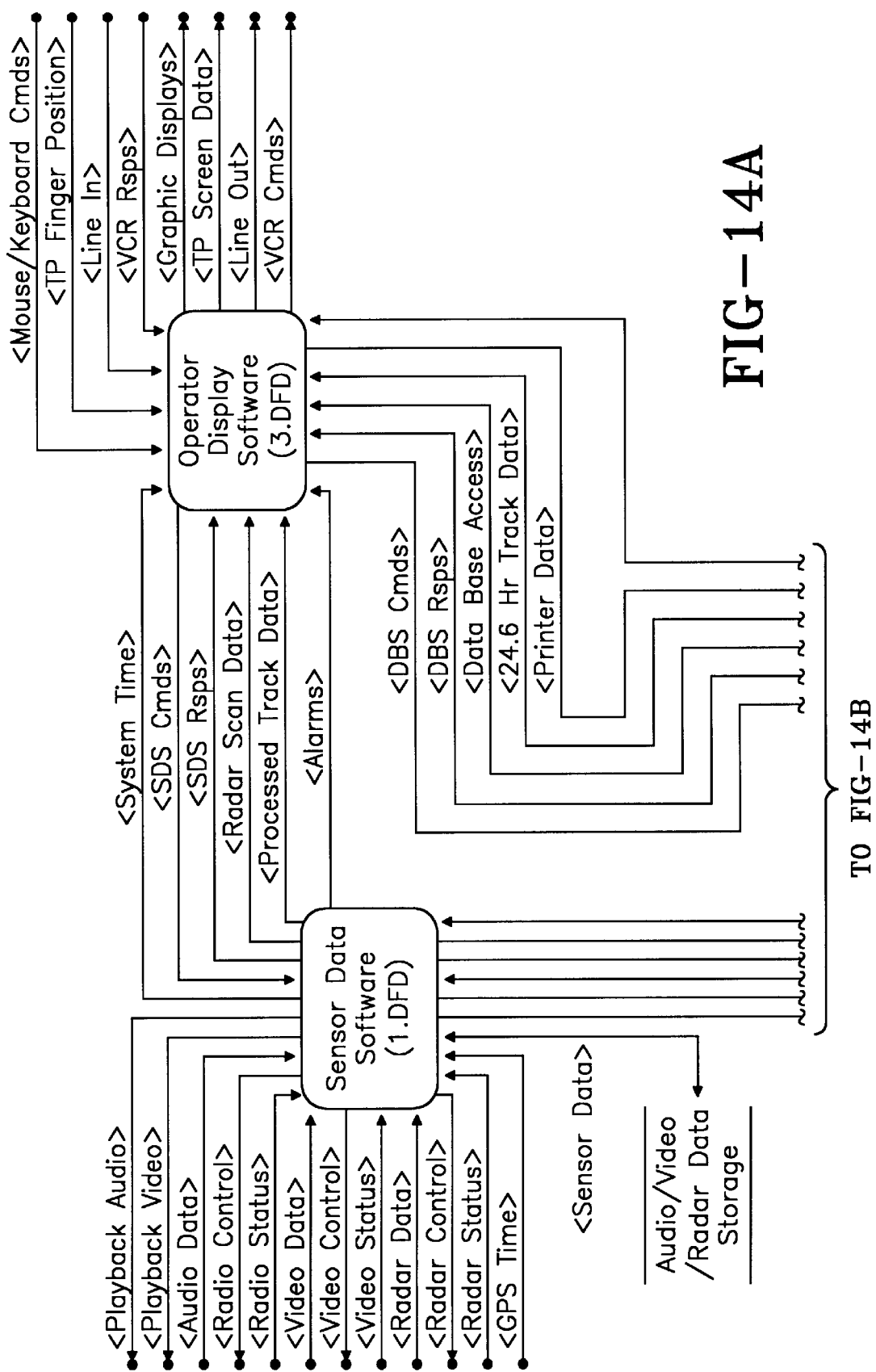
FIG. 14 is the VTS CSCI Data Flow

FIG. 12 illustrates the relationship of CSCIs to HWCIs as discussed within the following paragraphs. The overall software context diagram is shown in FIG. 13 and the three main components of the VTS data flow are shown in FIG. 14.

Sensor Data Sofware

Overview

Figure 15:
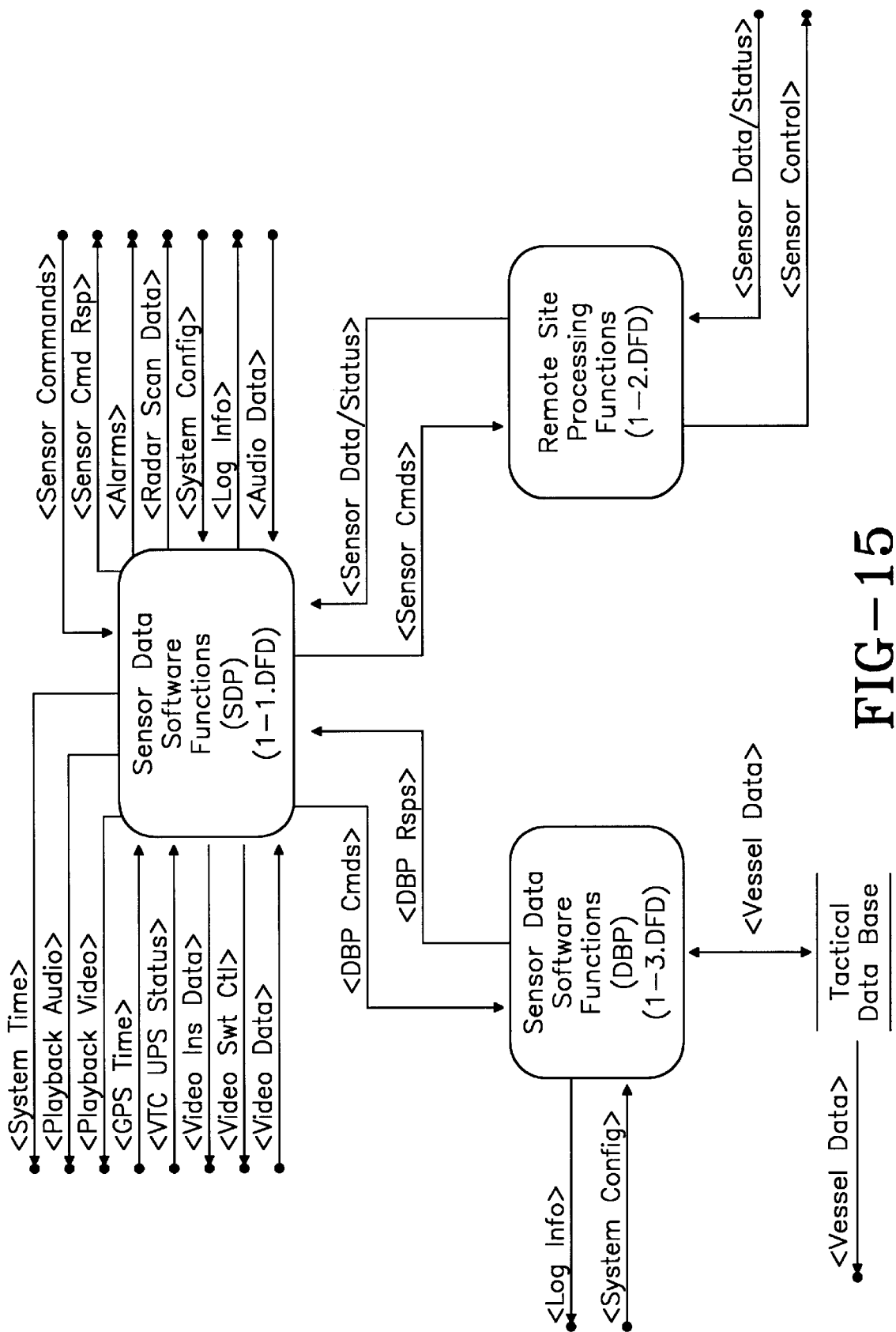
FIG. 15 is the Sensor Data Software
Figure 16:
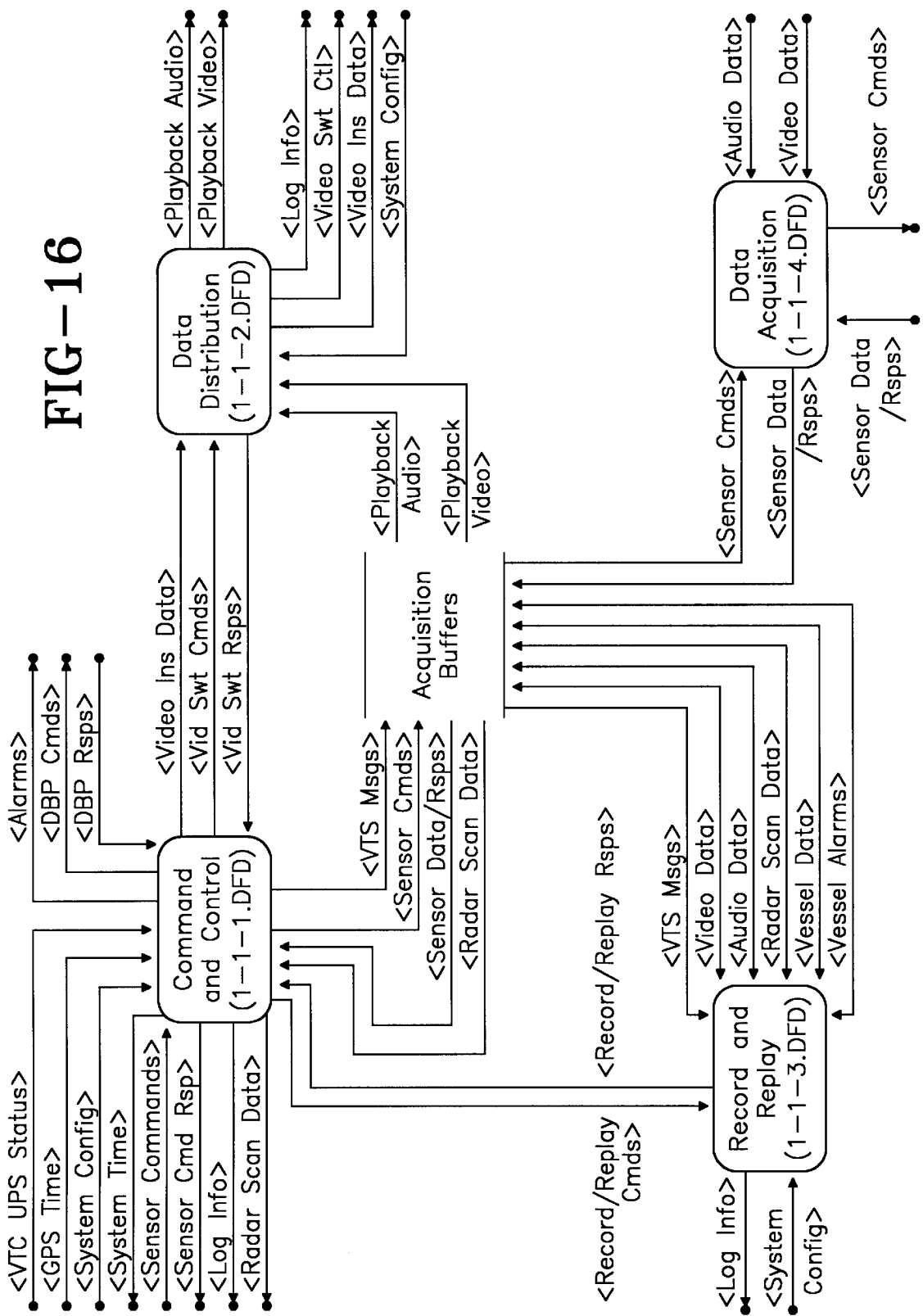
FIG. 16 is the Sensor Data Software Functions

The Sensor Data Software CSCI (FIG. 15) is the central point for receiving and processing remote sensor data. Sensor processing attributes are defined by system configuration information received from the DBS.

The SDS inputs video, radar, and site status at each remote site, packages the remote site data, and transmits it to SDS functions running on the Sensor Data Processor and Data Base Processor. Audio data is received from the digital audio recording system. Radar track data is converted, correlated, checked for alarm conditions, and recorded along with audio, video, radar scan data, vessel identification data, alarms, and GPS time. Correlated track data, alarms, time, and status information is transmitted to the Database Processor for database recording. Correlated track data, radar scan data, alarms, and time are transmitted to the ODS for display and audio alarm generation.

In playback mode, video data is transmitted to the video switcher, and audio data is transmitted to the digital audio recording system.

Sensor control commands are received from the ODS, formatted for the specific device, and transmitted to the remote site or local hardware as necessary. Sensor control command status is returned to the ODS.

CSCI Architecture

The Sensor Data Software (SDS) exists on four separate processors:
- Sensor Data Processor (SDP)
- Database Processor (DBP)
- Data Acquisition Processor (DAP)
- Remote Site Processor (RSP)

Figure 17:
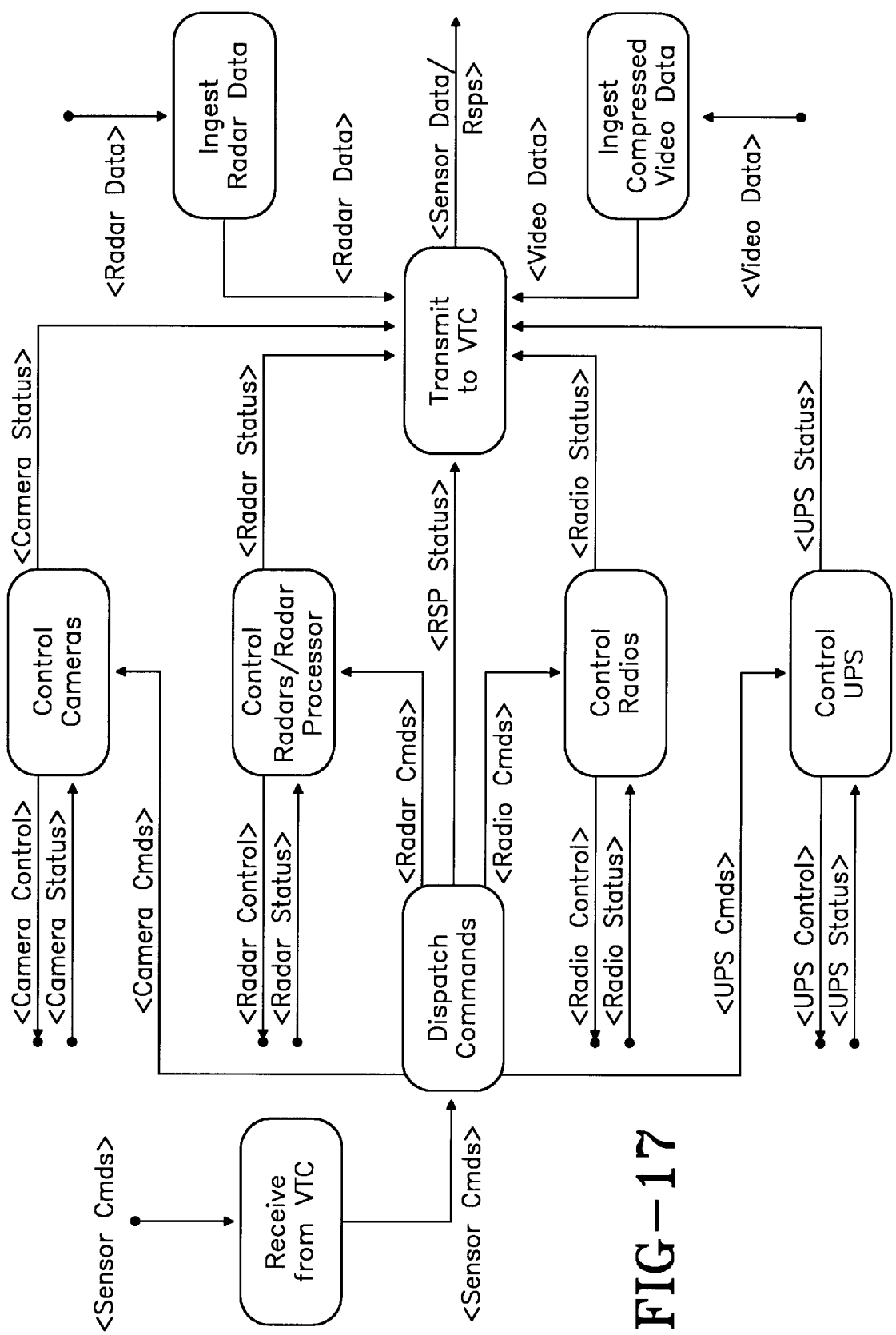
FIG. 17 is the Remote Site Processing Functions
Figure 18:
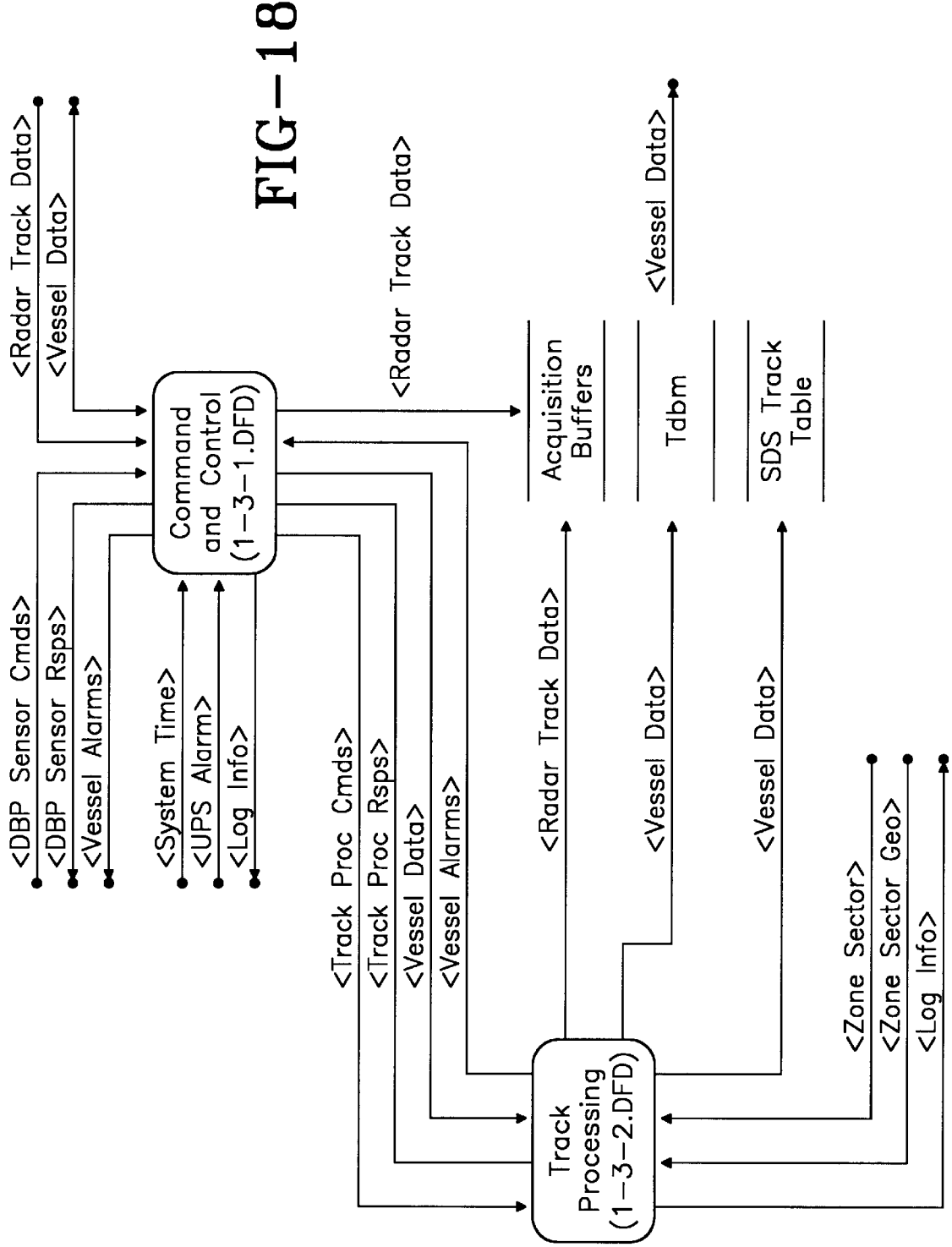
FIG. 18 is the Sensor Data Software Functions
Figure 19A:
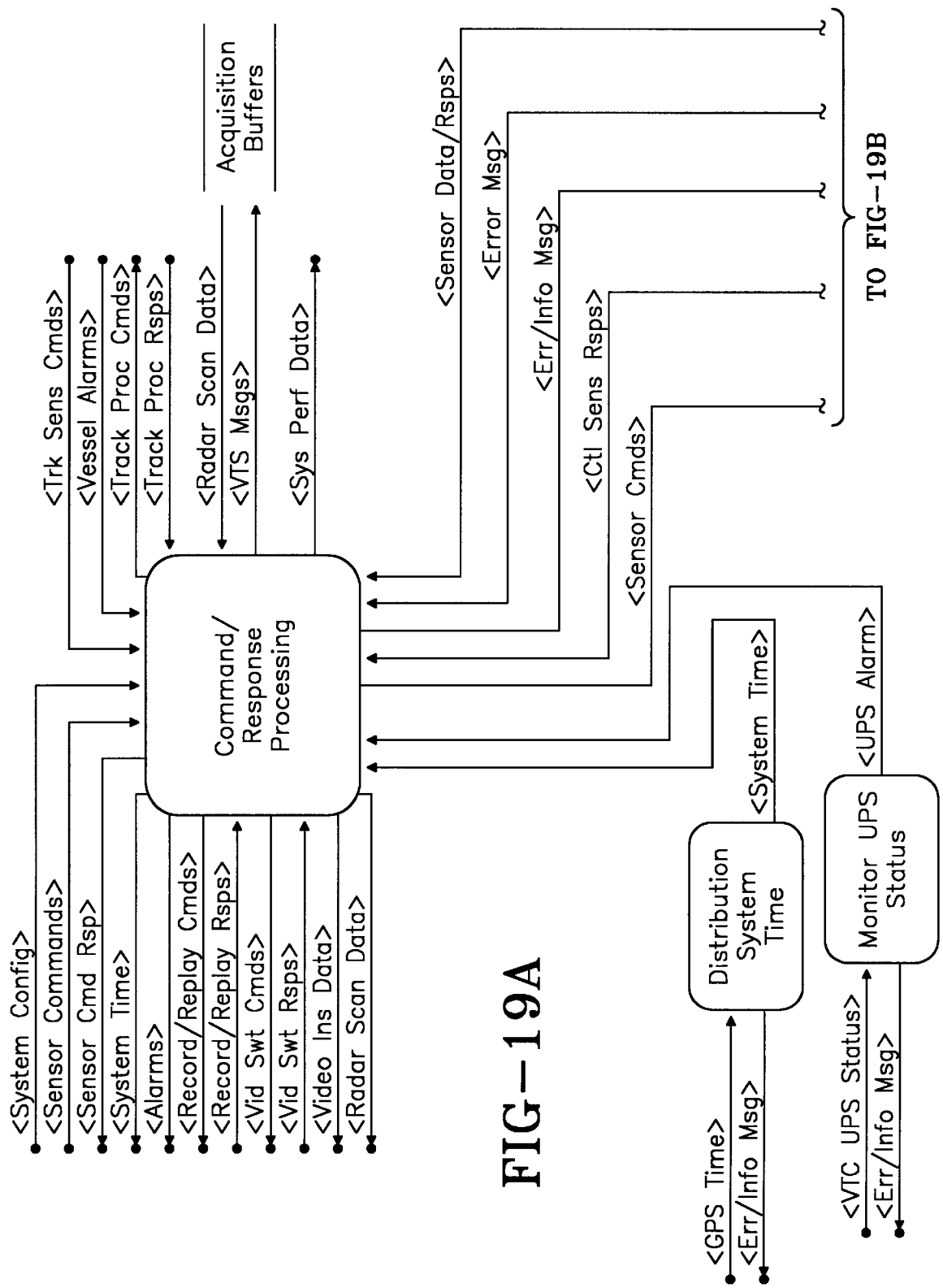
FIG. 19 is the Command and Control CSC (SDP)
Figure 19B:
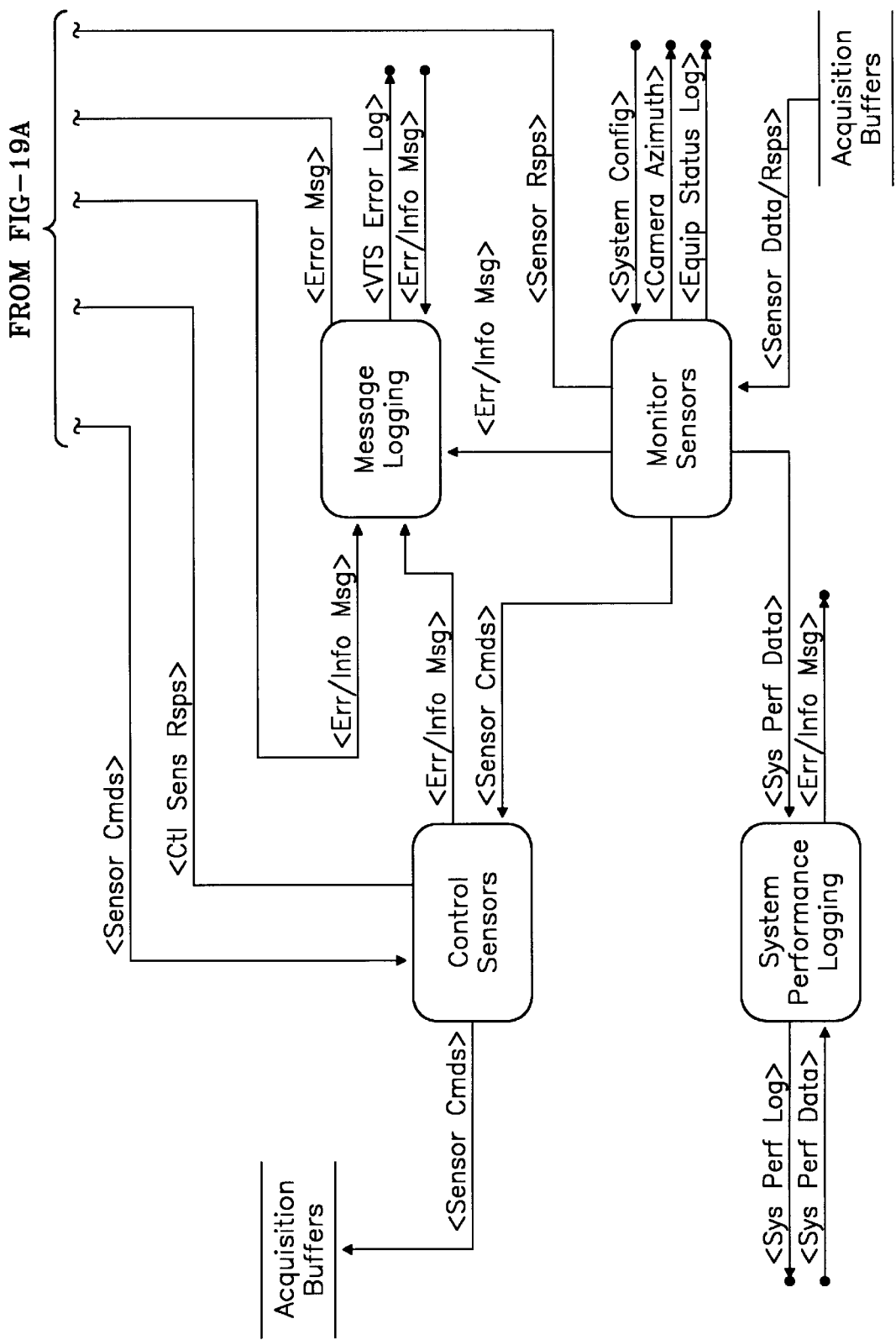
Figure 21:
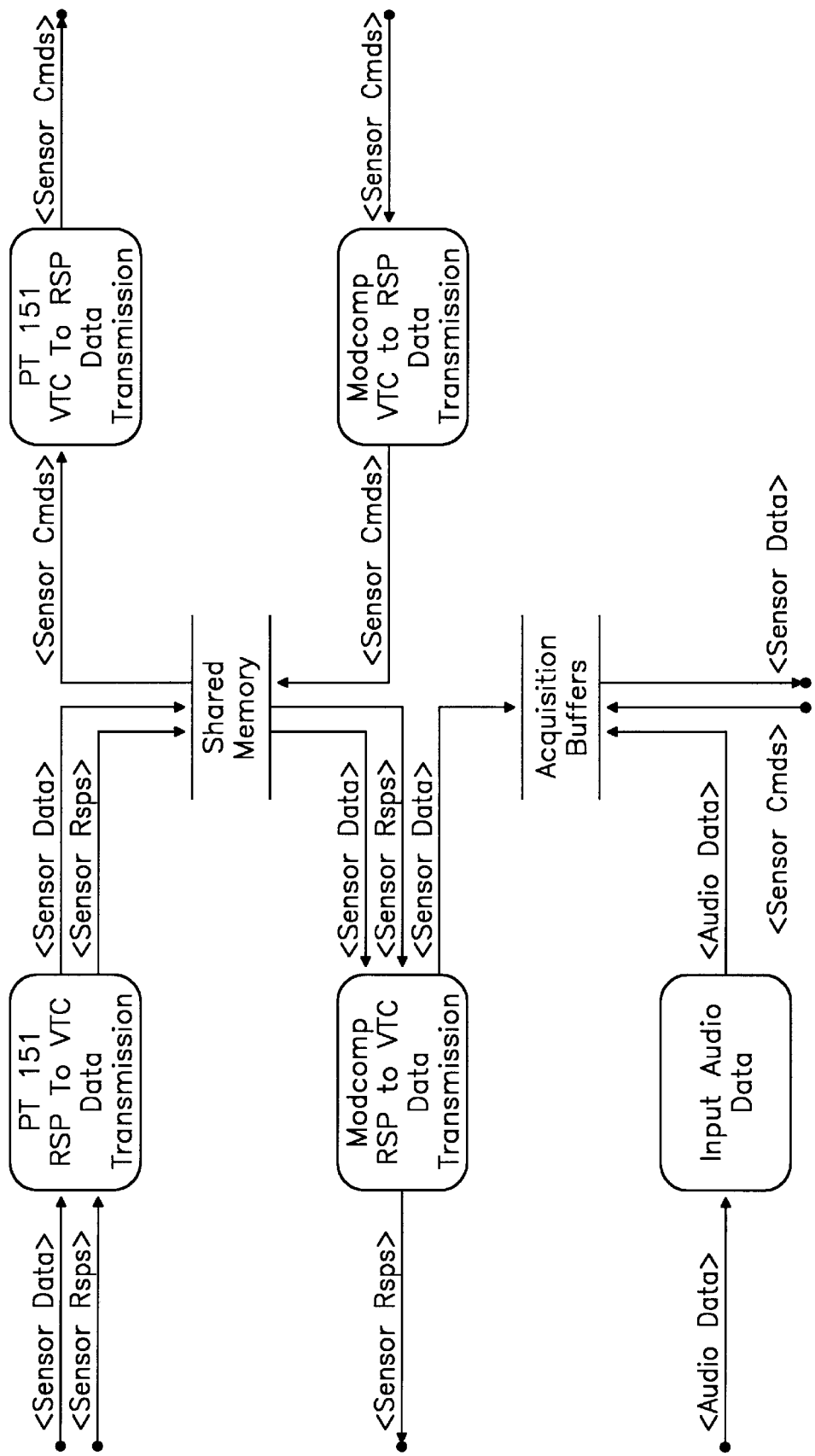
FIG. 21 is the Data Acquisition CSC
Figure 22A:
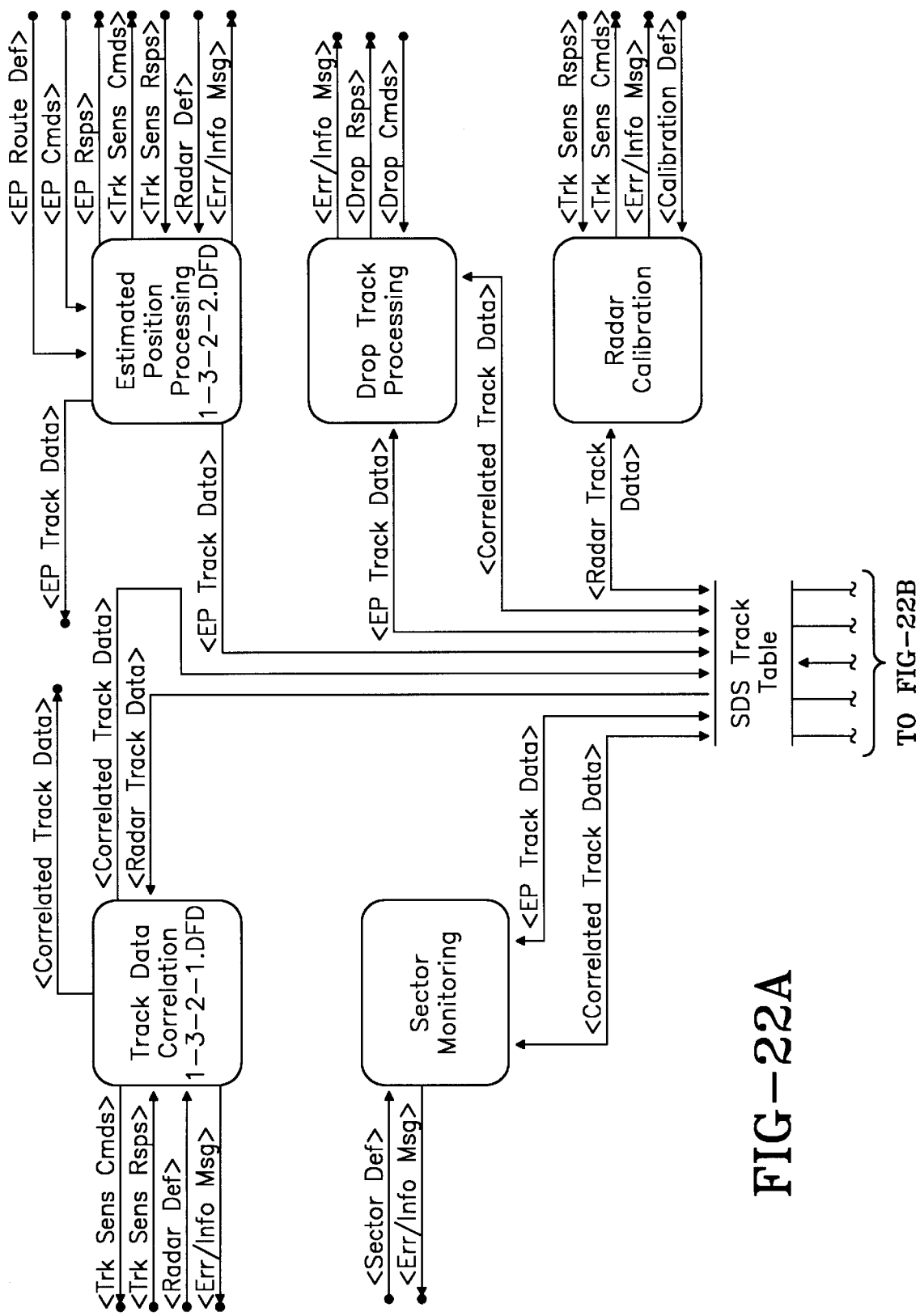
FIG. 22 is the Track Processing CSC
Figure 22B:
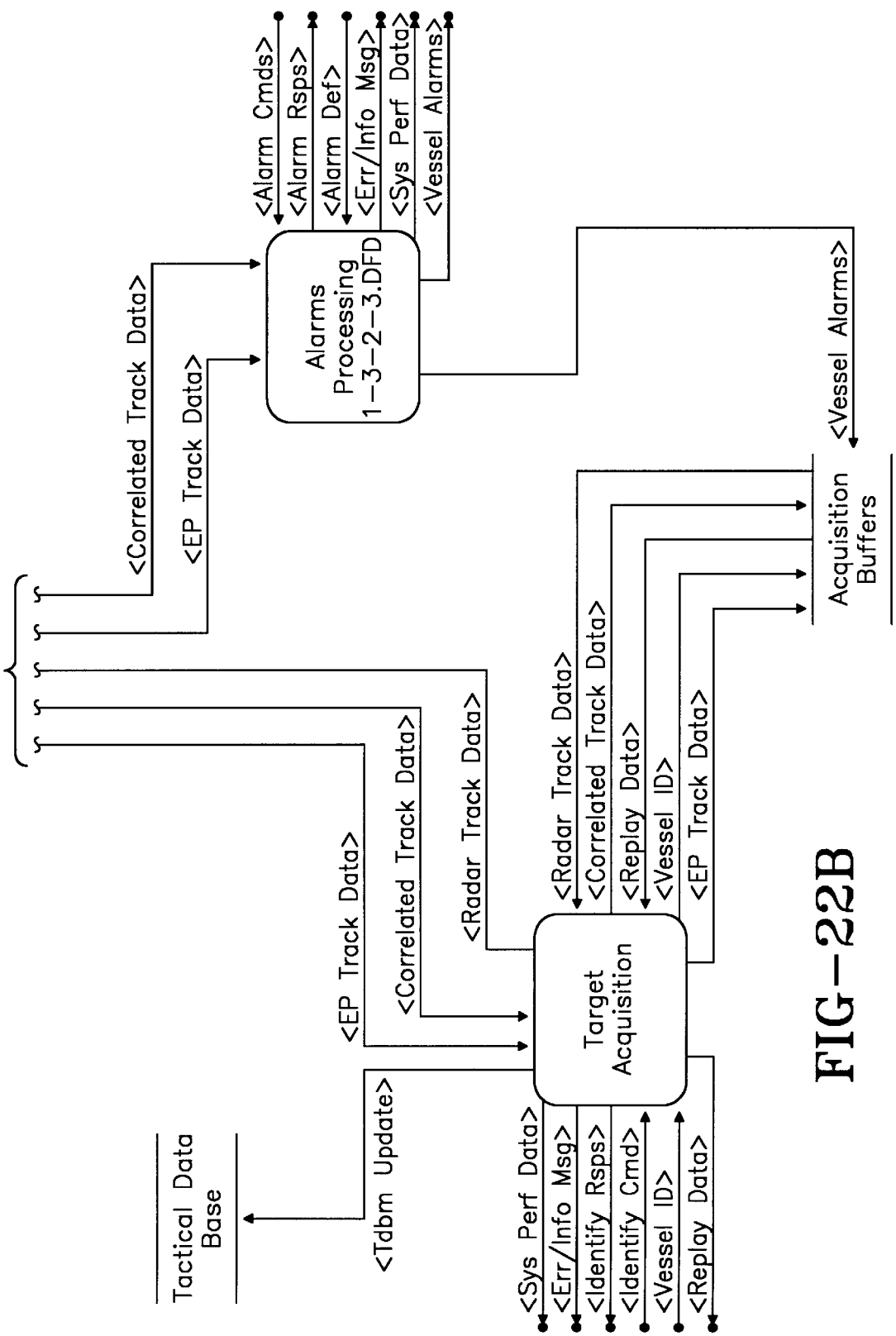
Figure 26:
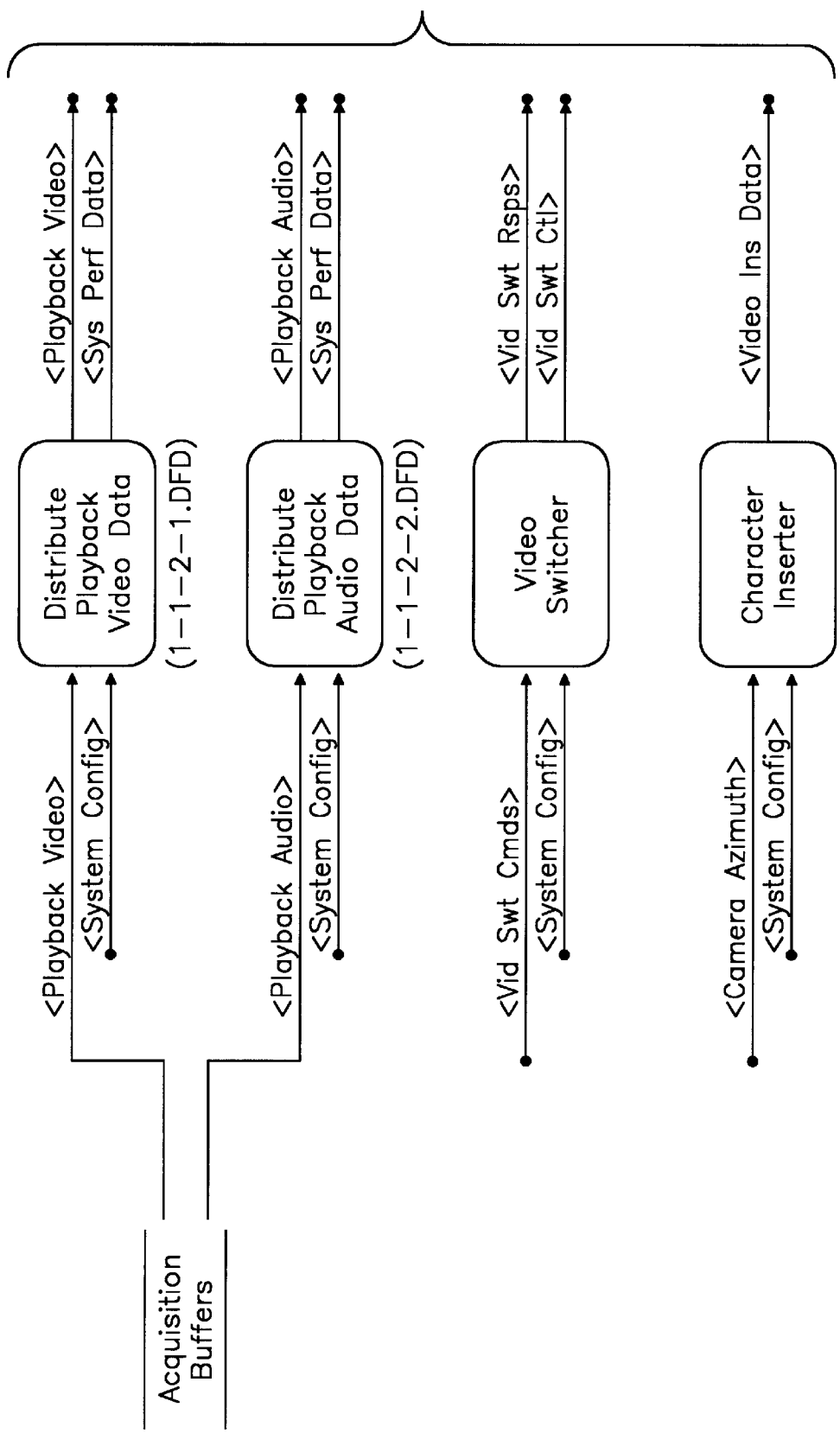
FIG. 26 is the Data Distribution CSC
Figure 29A:
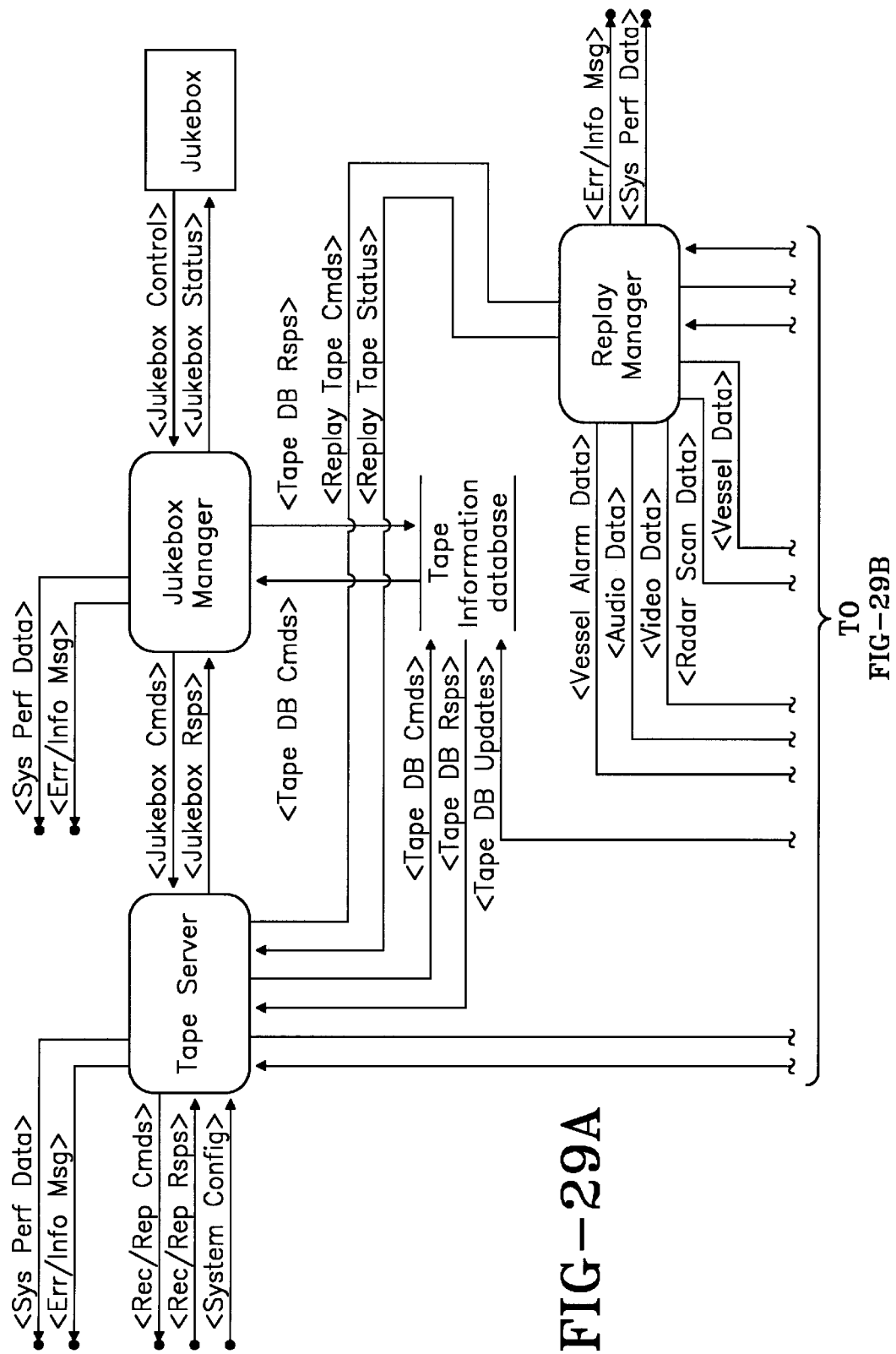
FIG. 29 is the Record and Replay Data Flow
Figure 29B:
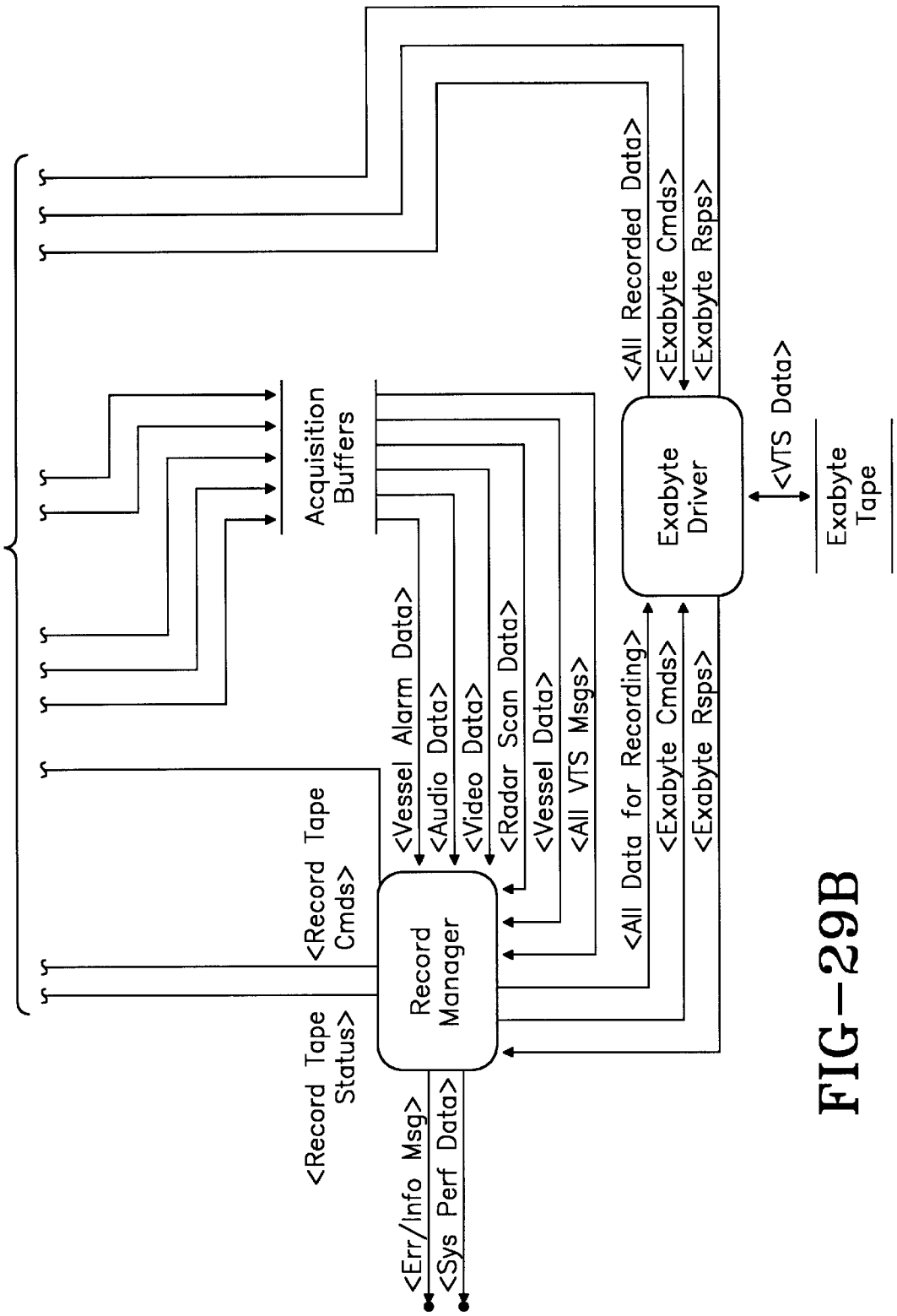

The Sensor Data Software CSCI is composed of the following CSCs:
- CSC Processor
- Command and Control, FIG. 19 SDP, DBP
- Remote Site Processing, FIG. 17 RSP
- Data Acquisition, FIG. 21 SDP (DAP)
- Track Processing, FIG. 22 DBP
- Data Distribution, FIG. 26 SDP
- Record and Replay, FIG. 29 SDP The top level flow diagrams of the Sensor Data Software is illustrated in data flow diagrams: FIG. 15, FIG. 16, FIG. 17, and FIG. 18.

Command and Control CSC (FIG. 19)

The Command and Control CSC manages inter-processor communications and sensor command processing. It produces the corresponding Uninterrupted Power Supply (UPS), radio, video, and radar control commands, which are routed to the appropriate devices. System configuration information is retrieved from the ORACLE database.

Responses to system commands are sent to the ODS. Status information provided by the various devices is collected and analyzed. If an error condition is detected, an alarm notification is generated. All device status information is stored in the database equipment status log.

The Command and Control CSC also handles notification from the UPS that power has been interrupted and passes the notification on. Time is received from the GPS and is broadcast periodically to other VTS components as the current system time.

The Command and Control CSC obtains functional performance statistics from each CSC and stores them in the ORACLE database. These statistics are used in system performance reports which indicate the level of usage of system resources and processing capacity.

Remote Site Processing CSC (FIG. 17)

The Remote Site Processing CSC executes on the Remote Site Processor. It gathers data and status information from the radar processor and video cameras at the remote site. This information is site-tagged and time-tagged, and then transmitted to the VTC. This CSC also controls the various sensors based on control commands received from the Command and Control CSC and is also designed for Automated Dependance Survielance (ADS).

Data Acquisition CSC (FIG. 21)

The Data Acquisition CSC accepts the following data from the remote sites: audio data from radios, video data from CCTV cameras, and radar data from the radar scan converter. It places the incoming data into the Acquisition Buffers for access by other CSCs. Functional performance statistics are produced for the Command and Control CSC.

Track Processing CSC (FIG. 22)

The Track Processing CSC obtains raw and filtered radar track data from the Acquisition Buffers and performs track processing to produce correlated track data. The correlated track data is compared with system configuration data (zone definitions, etc.) to determine whether the position, heading, or speed of any vessels warrant generating alarms. Functional performance statistics are produced for the Command and Control CSC.

Data Distribution CSC (FIG. 26)

The Data Distribution CSC obtains audio and video data (playback only), along with radar scan data from the Acquisition Buffers. Correlated track data is also retrieved from the Correlated Track Data table. Based on system configuration information, the playback audio is sent to the audio routing system, the playback video is sent to the Video Switcher, and the radar scan data and correlated track data are routed to the appropriate console. This CSC also controls the video insertion unit, which inserts the current time, along with remote site identification and camera azimuth into the video data. Functional performance statistics are produced for the Command and Control CSC.

Record and Replay CSC (FIG. 29)

The Record and Replay CSC obtains radar scan data, compressed video data, and audio data from the Acquisition Buffers, as well as correlated track data from the Correlated Track Data table. This data is continually recorded along with system configuration data, operator commands, and vessel data in mass storage during real-time operation. During system replay, the data is extracted from mass storage and deposited in the Acquisition Buffers, where it is treated just like real-time data. Functional performance statistics are produced for the Command and Control CSC.

System States and Modes

The Sensor Data Software supports operation in the live and replay modes. The live mode supports continuous uninterrupted system operation, including: remote site sensor control, remote site sensor data transmission, data acquisition, track processing, data recording, data distribution to the DBS and ODS CSCIs, and performance monitoring. The replay mode provides a data replay capability that runs concurrently with the live mode. The data flow between CSCs supporting the live and replay modes is illustrated in the data flow diagrams in FIG. 16 through FIG. 18.

Memory and Processing Time Allocation

SDS program processes operating on the SDP have available up to 32 Mbytes of memory to perform system operations. SDS program processes operating on the RSP have available up to 4 Mbytes of memory to perform system operations. SDS and DBS program processes operating on the DBP have available up to 96 Mbytes (in the current implementation expandable to 384 Mbytes) of memory to perform system operations.

Processes supporting live operations have priority over processes supporting replay operations.

CSCI Design Description

The following subparagraphs provide a design description of this CSCI.

Command and Control CSC

The Command and Control CSC of the Sensor Data Software (SDS) CSCI is responsible for controlling sensors as directed by operator commands, monitoring the status of all remote site sensors and devices, storing sensor status and system performance information in the database for report generation, distributing system time, and monitoring the UPS for power failure indication. It also manages inter-process network communication.

Figure 20:
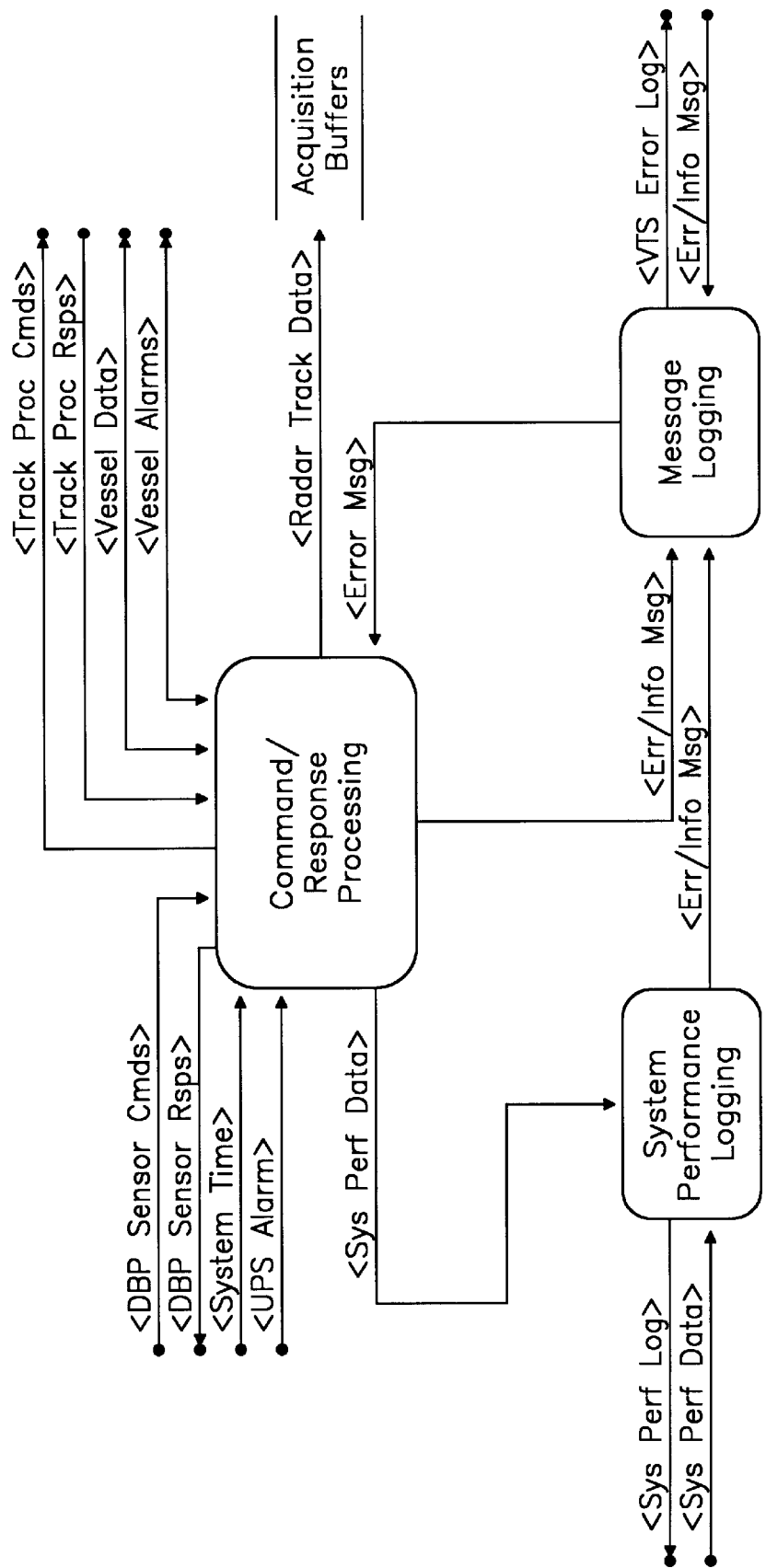
FIG. 20 is the Command and Control CSC (DBP)

The Command and Control CSC data flow is shown in data flow diagrams in FIG. 19 and FIG. 20. The Command and Control CSC is composed of the following CSUs:
- Command/Response Processing
- Control Sensors
- Monitor Sensors
- Monitor UPS Status
- Distribute System Time System Performance Logging Message Logging The Command/Response Processing, System Performance and Message Logging CSUs also run on the DBP in support of the Track Processing CSC.

Remote Site Processing CSC

The Remote Site Processing CSC of the Sensor Data Software (SDS) CSCI is responsible for controlling the various sensors and devices at the remote site (radars, radar processor, CCTV video cameras and radios) based on control commands received from the Sensor Data Processor (SDP), relaying the status of all remote site sensors to the SDP, and ingesting radar track and radar scan data and compressed video data, all of which is site tagged and transmitted to the SDP.

The Remote Site Processing CSC data flow is shown in the data flow diagram 17. The Remote Site Processing CSC is composed of the following CSUs:

Remote Site Processor Initialization

Remote Site Processor Main

Receive from VTC

Transmit to VTC

Dispatch Commands

Control Cameras

Control Radars

Control Radios

Monitor UPS

Ingest Compressed Video Data

Ingest Radar Data

Common Coordinate Conversion

Data Acquisition CSC

The Data Acquisition CSC collects multiplexed sensor data and status information from each of the remote sites and compressed audio data from the Digital Audio Recording System. The multiplexed remote site sensor information is placed in circular sensor information input buffers while waiting to be demultiplexed and distributed to other CSCs. Once the data is separated, sensor status information is routed to the Command and Control CSC, and the audio, video, radar track data, and radar scan data is placed in circular acquisition buffers for use by the Track Processing, Data Distribution, and Record and Replay CSCs.

The Data Acquisition CSC data flow is shown in the data flow diagram in FIG. 21. The Data Acquisition CSC is composed of the following CSUs:

RSP to VTC Data Transmission CSU

VTC to RSP Data Transmission CSU

RSP To VTC Data Transmission CSU

VTC To RSP Data Transmission CSU

Input Audio Data CSU

Input Video Data CSU

Track Processing CSC

The Track Processing CSC uses radar track data deposited in the acquisition buffers to perform track processing functions, including: target acquisition, drop track processing, track data correlation, position estimation, radar calibration, and alarm generation. The Command and Control CSC handles transferring the data from the acquisition buffers on the SDP over the network and into the acquisition buffers on the DBP.

Radar track data is extracted from the acquisition buffers and placed into the SDS Track Table by the Target Acquisition CSU. The Drop Track processing CSU deletes track table entries when target contact is lost by a radar, or when a system operator chooses to drop a track. The Sector Monitoring CSU determines the sector(s) containing a tracked vessel. The Track Data Correlation CSU checks vessel handoff criteria, checks for tracked vessels in radar overlap areas, and correlates the data from multiple radars. The Estimated Position sub-level CSC computes estimated position (EP) information for vessels on EP routes. The Radar Calibration CSU tracks objects which reside at a known, stationary location, and provides calibration error statistics. The Alarm Processing sub-level CSC checks for the existence of vessel alarm conditions.

The Track Processing CSC data flow is shown in the data flow diagram FIG. 22. The Track Processing CSC is composed of the following sub-level CSCs and CSUs:

Track Data Correlation sub-level CSC

Estimated Position Processing sub-level CSC

Alarm Processing sub-level CSC

Target Acquisition CSU

Drop Track Processing CSU

Radar Calibration CSU

Sector Monitoring CSU

Figure 23:
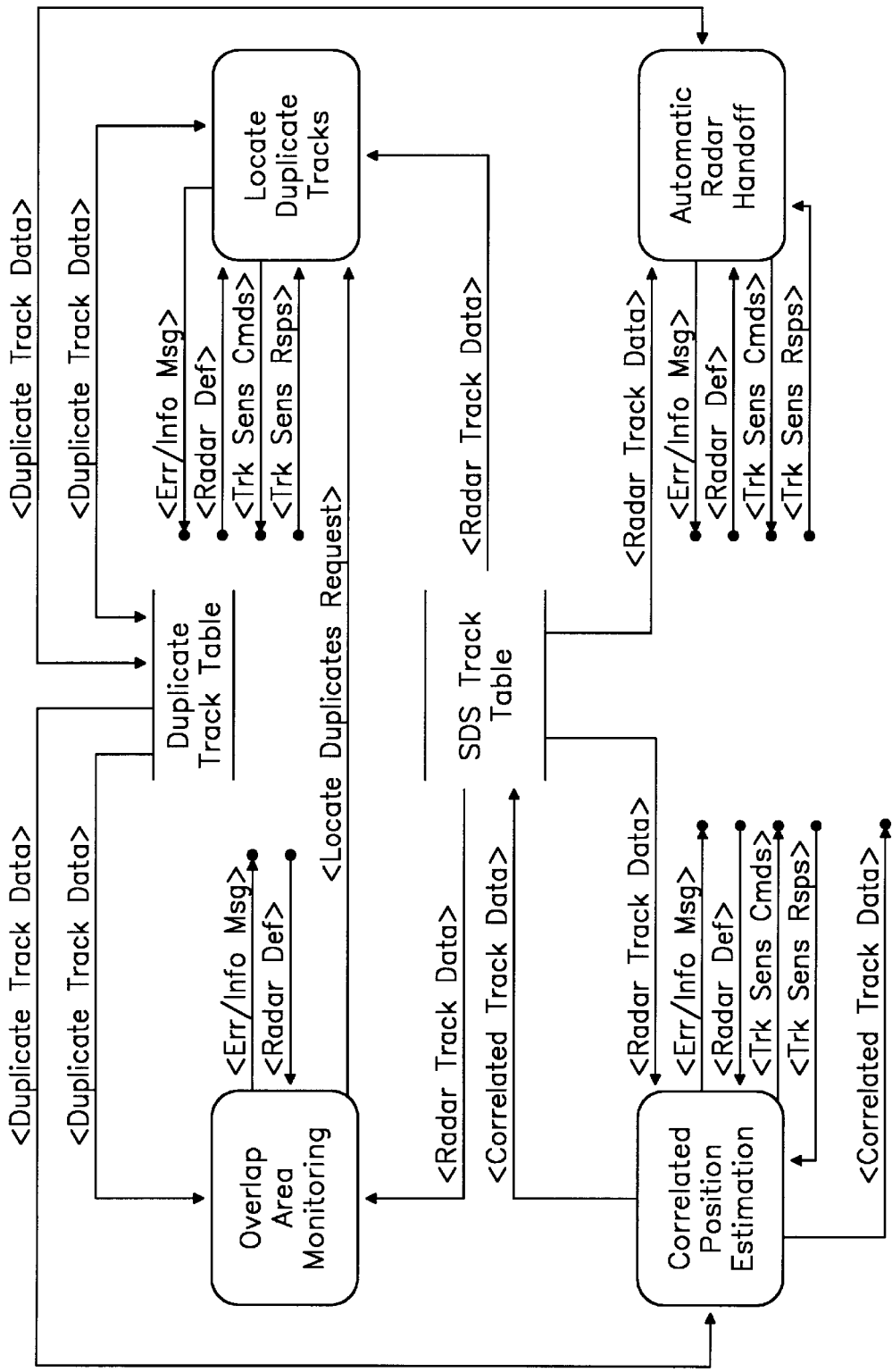
FIG. 23 is the Track Data Correlation CSC

Track Data Correlation CSC (FIG. 23)

The Track Data Correlation Sub-level CSC uses radar track data and system configuration data to determine when a vessel enters or exits a radar overlap area. When a vessel enters a radar overlap area, vessel tracking is started on the overlapping radar. The vessel is tracked by multiple radars until it exits the radar overlap area. Single radar vessel tracking is resumed when the vessel exits a radar overlap area.

Radar track data from the SDS Track Table is monitored, checking for any tracked vessel that has entered a radar overlap area. If a vessel has entered a radar overlap area, a request is made of the overlapping radar processor to start tracking that vessel. Once the multiple tracking is established, duplicate tracking data from all tracking radars is correlated to obtain a best estimate of the vessel tracking information. While the vessel is in the radar overlap area, its position and direction is monitored to determine when radar overlap area exit occurs. When the vessel does exit the radar overlap area, it is automatically handed off to the radar coverage area into which it emerges.

The Track Data Correlation Sub-level CSC data flow is shown in the data flow diagram FIG. 23. The Track Data Correlation Sub-level CSC is composed of the following CSUs:

Overlap Area Monitoring

Locate Duplicate Tracks

Correlated Position Estimation

Automatic Radar Handoff

Figure 24:
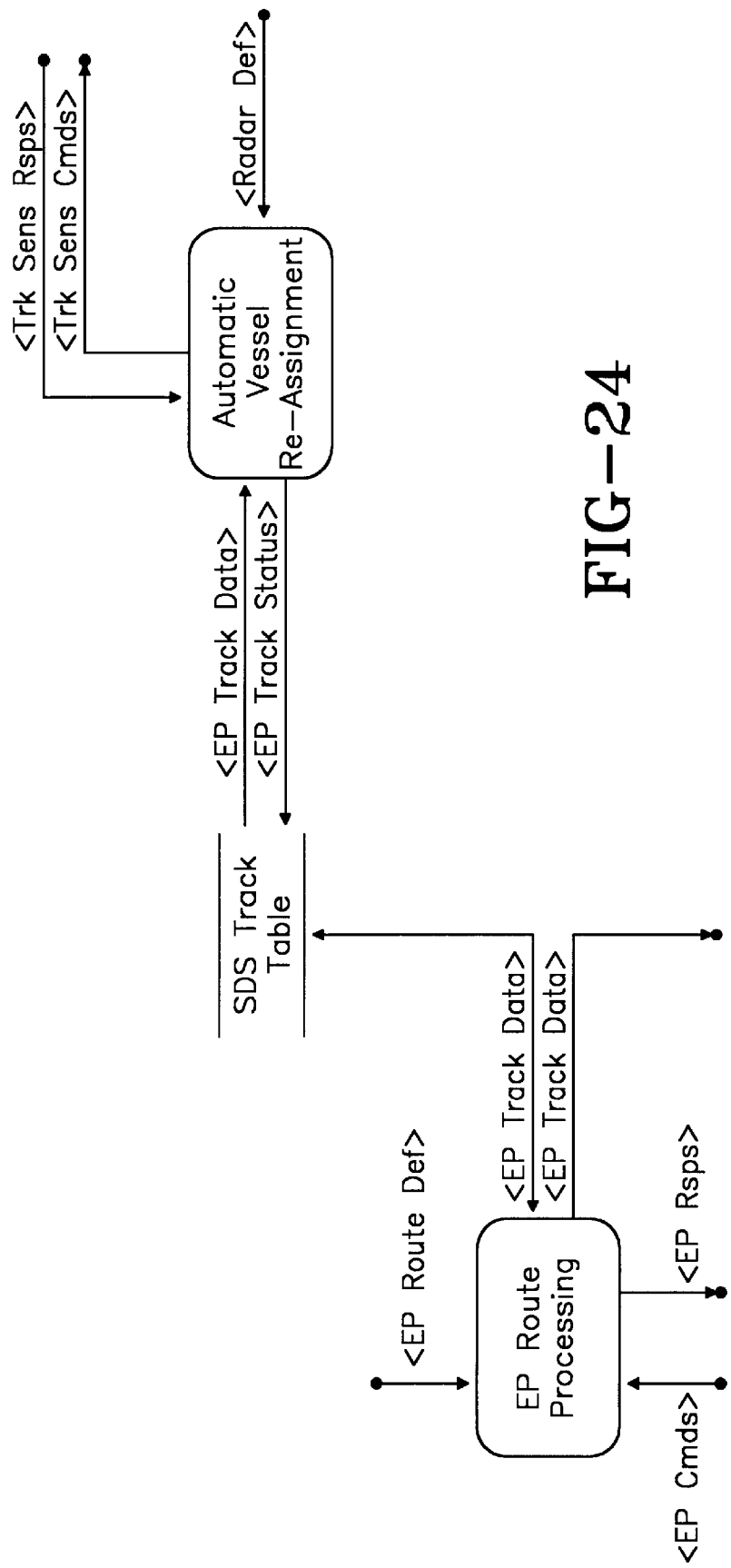
FIG. 24 is the Estimated Position Processing CSC

Estimated Position Processing CSC (FIG. 24)

The Estimated Position Processing Sub-level CSC uses radar track data, EP track data, system configuration data and operator supplied commands to generate EP tracking data which follow an operator specified EP route. When a vessel enters an area with no radar coverage, the operator can assign the vessel to a pre-defined EP route. From that point on, the vessells position, direction, and speed are estimated following the pre-defined EP route. As the vessel travels along the EP route, a system operator may correct the estimated track data to reflect the actual vessel position or speed. EP track data is generated until the vessel reaches the end of the assigned EP route, or the vessel is assigned to a track by a system operator. If the vessel is not assigned to a track before it reaches the end of the EP route, an automatic re-assignment attempt will be made.

The Estimated Position Processing Sub-level CSC data flow is shown in the data flow diagram FIG. 24. The Estimated Position Processing Sub-level CSC is composed of the following CSUs:

Automatic Vessel Re-Assignment

EP Route Processing

Figure 25A:
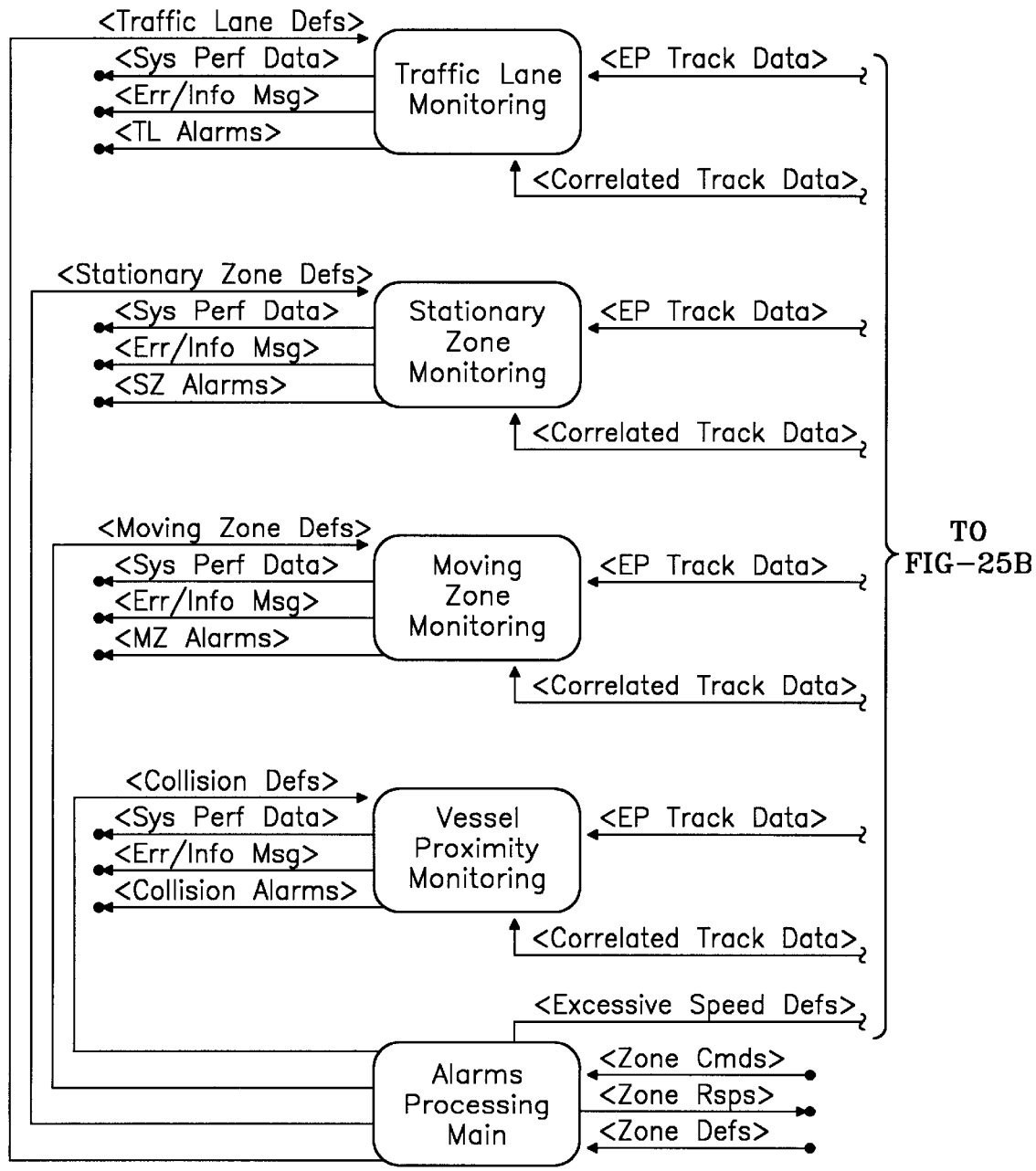
FIG. 25 is the Alarm Processing CSC
Figure 25B:
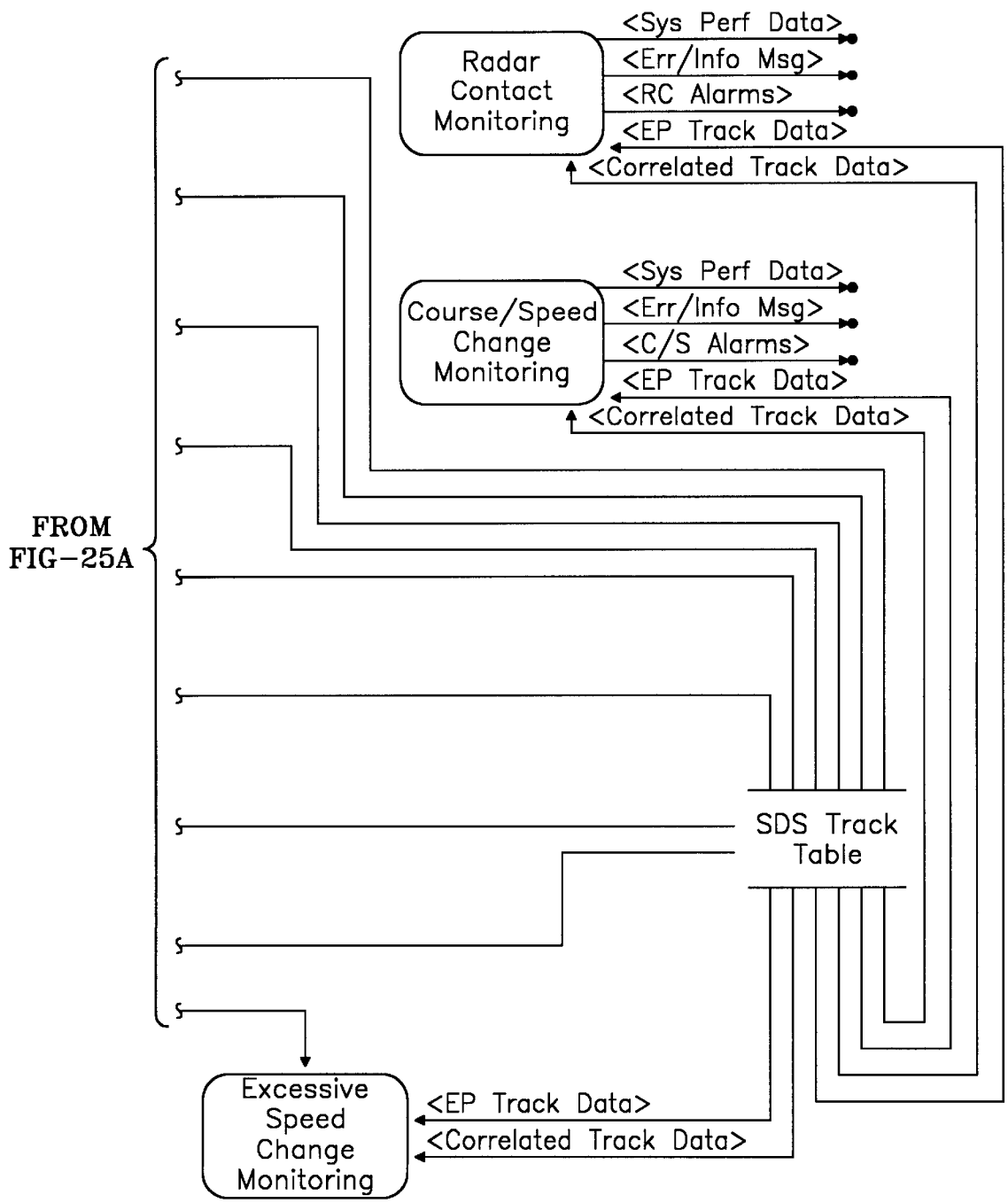

Alarm Processing CSC (FIG. 25)

The Alarm Processing Sub-level CSC uses processed track data, EP track data, and system configuration data to monitor vessel traffic safety parameters. When a vessel triggers an alarm condition, an alarm is sent to the system operator. The alarm will continue to be sent until the system operator acknowledges the alarm and the alarm condition no longer exists.

The Traffic Lane Monitoring CSU checks for any tracked vessel that is crossing a traffic lane and triggers the traffic lane violation alarm as necessary. The Stationary Safety Zone Monitoring CSU checks for any vessel crossing a stationary safety zone boundary and triggers the safety zone alarm as necessary. The Moving Safety Zone Monitoring CSU checks for any vessel crossing a moving safety zone boundary and triggers the safety zone alarm as necessary. The Collision Monitoring CSU checks tracked vessels for impending collisions and triggers the collision alarm as necessary. The Radar Contact Monitoring CSU checks for vessel tracks which have been lost by the radar and triggers the radar contact lost alarm flag as necessary. The radar contact lost flag is cleared when the vessel is reassigned or tracking discontinued by the system operator. The Sudden Course/Speed Change Monitoring CSU checks tracked vessels for course or speed changes exceeding operational parameters and triggers the course or speed change alarms as necessary. The Excessive Speed Monitoring CSU checks for tracked vessel speed violations and triggers the excessive speed alarm as necessary.

The Alarm Processing Sub-level CSC data flow is shown in the data flow diagram FIG. 25. The Alarm Processing Sub-level CSC is composed of the following CSUS:

Traffic Lane Monitoring

Safety Zone Monitoring

Moving Safety Zone Monitoring

Collision Monitoring

Radar Contact Monitoring

Sudden Course/Speed Change Monitoring

Excessive Speed Monitoring

Data Distribution CSC (FIG. 26)

This CSC maintains routing information for playback video and audio data based on operator playback setup commands. It extracts playback audio and video data deposited in the Acquisition Buffers by the Record and Replay CSC. Audio data is sent to the Audio Digitizing System for output to the Audio Distribution System, which sends it to the console for playback. Note that setup and control of the audio routing system is not a Sensor Data Software function. Video data is sent to the JPEG boards for decompression and output to the Video Insertion Unit.

Data for the Video Insertion Unit is provided for both live and playback video. The Video Insertion Unit inserts the time, remote site and camera ID, and camera azimuth into the video data. For live video data, camera azimuth data from the remote site is received for output to the Video Insertion Unit. For playback video data, the camera azimuth is obtained from the video buffer header.

The Data Distribution CSC data flow is shown in the data flow diagram FIG. 26. The Data Distribution CSC is composed of the Distribute Playback Video Data sub-level CSC, the Distribute Playback Audio Data sub-level CSC, and the Video Switcher and Character Inserter CSUs.

Figure 27:
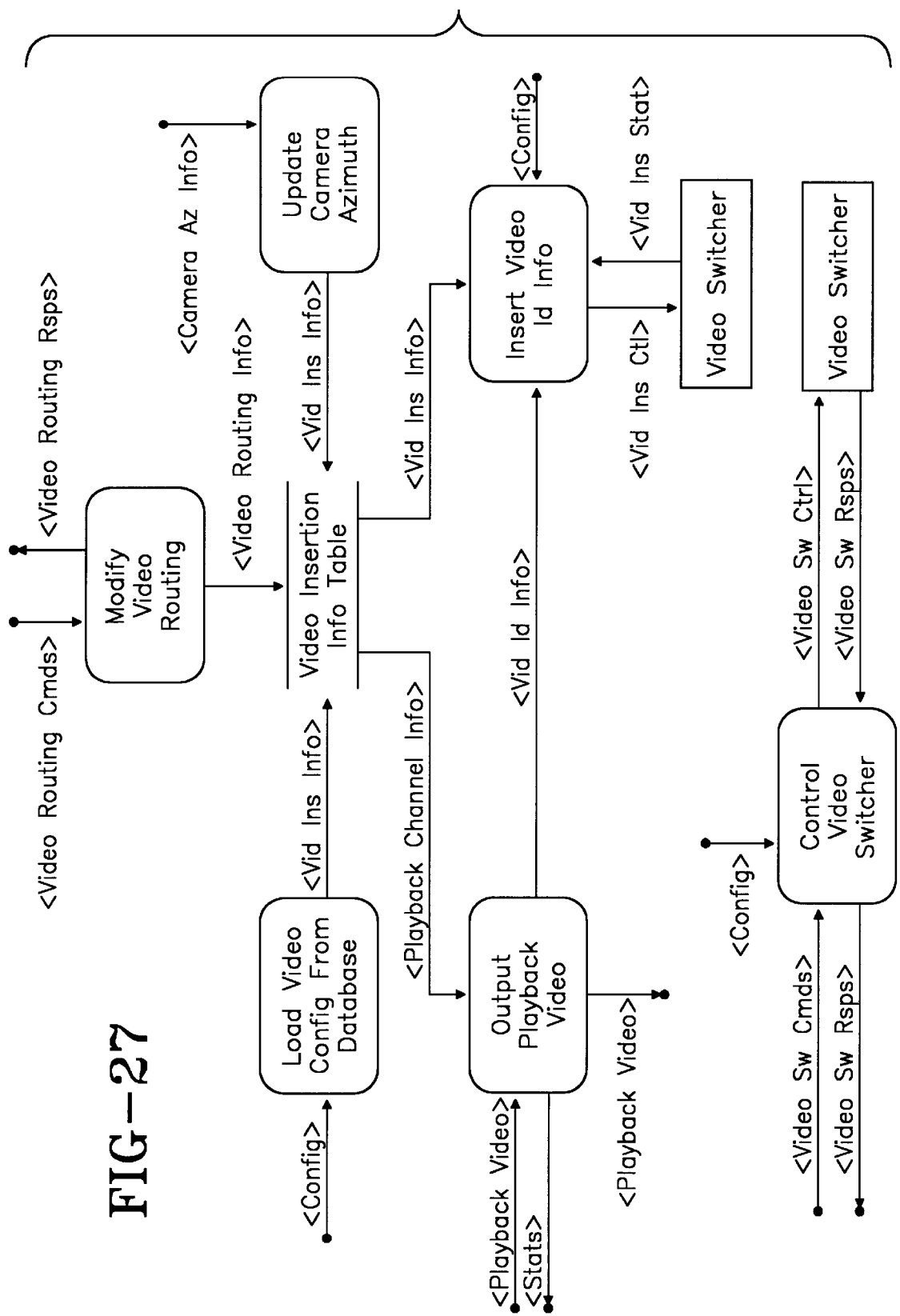
FIG. 27 is the Distribute Video Data CSC

Distribute Playback Video Data CSC (FIG. 27)

The Distribute Playback Video Data sub-level CSC is responsible for managing the insertion of video information into the live and replay video data using the Video Insertion Unit, and routing video to the specified console monitors and VCRs using the Video Switcher hardware.

Routing of the video data is controlled by routing information which is specified by Video Routing Commands and Video Switch Commands. The playback video data is contained in video data buffers which consist of the compressed video image data and a header containing the site, camera, azimuth, and time stamp.

The Distribute Video Data sub-level CSC data flow is shown in the data flow diagram FIG. 27. The Distribute Video Data sub-level CSC is composed of the following CSUs:

Load Video Config From Database CSU

Modify Video Routing CSU

Update Camera Azimuth CSU

Insert Video ID Info CSU

Output Playback Video CSU

Control Video Switcher CSU

Figure 28:
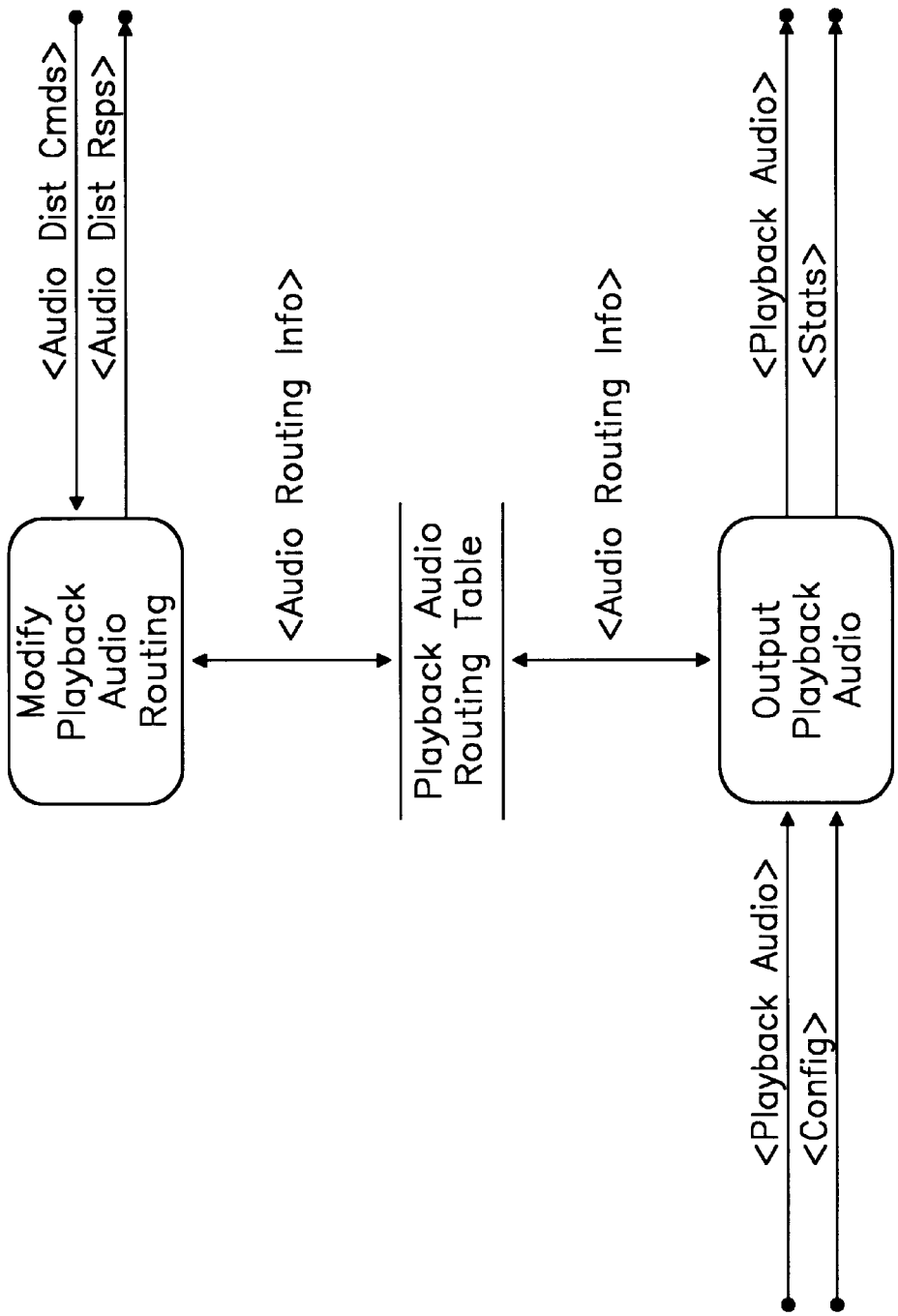
FIG. 28 is the Distribute Playback Audio Data

Distribute Playback Audio Data CSC (FIG. 28)

The Distribute Playback Audio Data sub-level CSC controls the distribution of recorded audio data during a playback operation. The routing is controlled by Audio Routing Commands, which are received when the operator sets up a playback operation. The digital audio data is sent to the Digital Voice Recording System for conversion to analog and playback on the designated console.

The Distribute Playback Audio Data sub-level CSC data flow is shown in the data flow diagram in FIG. 28. The Distribute Playback Audio Data sub-level CSC is composed of the following CSUs:

Modify Playback Audio Routing CSU

Output Playback Audio CSU

Record and Replay CSC (FIG. 29)

The Record and Replay CSC provides continuous recording of VTS operation data and also provides the capability to replay any existing VTS operation data. All VTS messages, audio data, video data, radar scan data, vessel data, and vessel alarms are recorded on 8 millimeter tape. Up to 116 tapes reside in an helical scan recorder jukebox containing four tape recorder/player units. All tapes in the helical scan recorder jukebox with write access will be recorded upon. If a blank tape exists in the jukebox, it is selected for recording first. If no blank tapes exist, VTS data tapes are overwritten in a circular manner by selecting the tape with the oldest data for recording. Recorded data may be archived by extracting the tape from the jukebox or leaving the tape in the jukebox and marking it read only.

All data assigned for recording (including audio data, video data, radar scan data, vessel data, and vessel alarms) is extracted from the acquisition buffers and recorded onto a single tape. If a replay request is received which involves data on the tape currently being recorded, data recording is initiated on a second tape. Once the second tape is recording data, recording on the first tape is terminated and the replay request can be processed. If a replay request is received which involves older data, the appropriate tape is loaded and played. Tape identification information is maintained in the ORACLE database, so database reports may be generated to view history tape identification data.

When performing replay operations all requested data is time correlated, marked as replay data, and placed in the appropriate acquisition buffers.

The Record and Replay CSC data flow is shown in the data flow diagram FIG. 29. The Record and Replay CSC is composed of the following CSUS:

Tape Controller
Jukebox Processing
Jukebox Control
Data Recording
Data Replay
Tape Processing Detailed Design
Command and Control CSC
The following subparagraphs identify and describe each of the CSUs that form the Command and Control CSC. Data flows between CSUs that form the Command and Control CSC and external CSU interfaces are shown in data flow diagram 19.

Command/Response Processing CSU
The Command/Response Processing CSU initiates the SDS by activating inter-processor communications using UNIX networking routines and the following tasks:

Message and System Performance Logging (DBP and SDP)
Character Inserter
Monitor Sensors
Data Acquisition
Monitor UPS Status
Video Switcher
Distribute System Time
Record and Replay
Track Processing (DBP)

It then concentrates on its main task of accepting commands from the operator consoles via the FDDI network interface. Each VTS message is dispatched to the appropriate Sensor Data Software function based on the message type:

Sensor Control Commands are sent to the Control Sensors CSU.
Track Processing Commands are sent to the Track Processing CSC on the DBP.
Video Switcher Commands are sent to the Data Distribution Video Switcher CSU.
Record and Replay Commands are sent to the Record and Replay CSC.
Command Responses are returned to the originating ODP.
Vessel Alarm and system error messages are sent to all ODPS.
System Time messages are sent to all ODPs, RSPs and DBPs.
UPS Alarm messages are sent to all DBPs and ODPs. A ten minute timer is set for system termination. On the DBP, Command and Control initiates a script to generate the necessary database reports when the UPS Alarm is received. UPS Alarm Cancellation message will deactivate the timer. This message can be sent by the Supervisor or the UPS Monitor CSU when normal status is encountered.
System Termination message is sent to all DBPs and ODPs, and an orderly shutdown of the SDP/DBP software/hardware is executed.
Radar scan data is retrieved from the acquisition buffer and transmitted to all ODPs.
Radar track data is received from Data Acquisition and sent to the DBP Command and Control. It is then placed in an acquisition buffer for use by Track Processing. Command and Control is split into two programs. SDP_CmdCtl handles I/O with the Command Status Daemon on the ODP and Command and Control on the DBP. SDP_RidCtl handles radar scan data transmittal to the Radar Image Daemon on the ODP. This is necessary because UNIX does not allow two communication lines (sockets) from one program. SDP_RidCtl exists only to manage the one-way communication to the ODS Radar Image Daemon.

An invalid sensor command results in a sensor command response, indicating the error, being returned to the source of the command.

All VTS messages are stored in an acquisition buffer for recording.

If this CSU detects any error condition, it generates a message and sends it to the Message Logging CSU for processing.

System configuration information is retrieved from the equipment_config database table and passed on to the appropriate tasks.

This CSU manages inter-processor communications using UNIX networking routines. These lines of communication allow data to flow between the SDP and ODP, and the DBP and SDP. VTS messages can be up to 8192 bytes in length, and all must follow the format defined in the Interface Design Document. All Command and Control communications with other CSCs on the SDP are managed through UNIX message queues.

SDP Switchover is handled automatically by Command and Control. At initialization, Command and Control remotely starts up a backup process on the backup SDP. Communication is initiated between the two to perform a health check. If it is interrupted, the backup SDP can assume control as the server after positively determining the other SDP is no longer the server, and the cycle begins again. All other processors will be made aware of the switched SDP-UNIX notifies a process if an attempt is made to communicate over a downed communication line. These processors will then attempt a reconnection to the new server.

DBP Switchover is handled by the Database Software.

Command and Control also handles building of the Radar Configuration command from the ODP. When an operator modifies the Radar Configuration via the SQL Form, the ODS is alerted and passes the site and radar ID that was modified to the SDS. Command and Control retrieves the radar configuration information from the database, builds the Radar Configuration command and submits it to the Control Sensors CSU for transfer to the remote site.

Message Logging CSU
The Message Logging CSU receives all error, warning and information messages generated by Sensor Data Software CSCs. Each of these messages is displayed at the generating machine's (SDP or DBP) system console and inserted into the vts_error_log database table. The error and warning messages are then sent on to the Command/Response Processing CSU for transmittal to each ODP.

The information messages are intended to assist the System Administrator when starting up the Sensor Data Software on the SDP and DBP, and general trouble-shooting.

There is a maximum number of messages allowed in the table at one time. Once this maximum has been reached, some of the oldest records are deleted allowing space for future messages.

A sequence number is created by the ORACLE Database Administrator and incremented by the RDBMS. Each time a record is inserted into the table, this sequence number is used for the new record. This uniquely identifies the record (from any task on any processor). Time is only accurate up to seconds and there could be more than one entry in a second. Only the Message Logging task running on the SDP will handle the removal of records.

System Performance Logging CSU

The System Performance Logging CSU receives functional performance statistics from the various Sensor Data Software CSCs and stores them in the system_perf_log database table. These statistics are used in system performance reports which indicate the level of usage of system resources and processing capacity. The System Performance Report is operator selectable from the ODS System Administration menu.

Control Sensors CSU

The Control Sensors CSU transfers sensor commands to the appropriate remote site. It verifies the command contains an appropriate site number, and if it is found to be incorrect, sends a response message to the originator of the request.

This CSU is also used by the Monitor Sensors CSU to transfer initialization commands requested by a particular remote site. If an error occurs, the Monitor Sensors CSU sends an error message to all operator consoles.

Upon request for system termination, reboot messages are sent to each Remote Site Processor.

Monitor Sensors CSU

The Monitor Sensors CSU receives requests from the remote site for down-loading of the RSP software to the remote site and for device initialization. This CSU also receives sensor status information from the various remote sites, including camera azimuth data.

- Camera azimuth data is passed on to the Data Distribution Character Inserter CSU for processing.
- Sensor command responses are returned to the requesting operator through the Command/Response Processing CSU.
- Remote site alarm notification is logged into the database through the Message Logging CSU and passed on to the ODPs by the Command/Response Processing CSU.
- Sensor status information is stored in the remote_site_equipment_status table in the database. This information includes site number, device ID, device type, time of the status, and text explaining the status. This information is explained in detail in the Interface Design Document. Remote site alarms, software download and initialization requests are also entered into this table.
- System performance data is sent to the System Performance Logging CSU for processing.

System Configuration Information for the Remote Site initialization commands are retrieved from the various database configuration tables (remote_site, radar_config, radio_config and camera_config). Sensor initialization commands are formulated using this information and sent to the Control Sensors CSU for transfer to the remote site.

Monitor UPS Status CSU

The Monitor UPS Status CSU monitors the VTC UPS for low voltage indication. If such an indication is received, this CSU sends an UPS alarm notification to the Command/Response Processing CSU for transmittal to all remote site processors, operator consoles, and the Database Processor. If an indication of normal status is received, the Command/Response Processing CSU is also notified. All warning messages from the UPS are sent to the Message Logging CSU for processing.

Distribute System Time CSU

The Distribute System Time CSU obtains the GPS time from the TPRO-VME Time Board and updates the Sensor Data Processor system time. It then sends it to the Command/Response Processing CSU for transfer to all RSPs, DBPs and ODPs as system time. If the system time and the GPS time difference is greater than five minutes, a warning message is generated and the system time is not updated. The interface to the GPS Time Board is described in the TPRO-VME Synchronizable Time Generator with VME Interface Operation and Maintenance Manual.

Remote Site Processing CSC

The following subparagraphs identify and describe each of the CSUs that form the Remote Site Processing CSC. Data flows between CSUs that form the Remote Site Processing CSC and external CSU interfaces are shown in the data flow diagram FIG. 17.

Remote Site Processor Initialization CSU

The Remote Site Processor operating system is stored in ROM and begins execution automatically upon power up or reboot. Once the RSP operating system is initialized, it invokes the program RspInit, (also stored in ROM), which performs the following operations:

1. Initializes the ram disk.
2. Copies the synchronous I/O (RS-422) driver from ROM to RAM.
3. Copies the RspServer program from ROM to RAM.
4. Starts the RspServer program.

The purpose of the RspServer program is to receive the RSP application modules that are downloaded from the SDP, as follows:

1. Open the synchronous I/O channel to the SDP.
2. Send a message to the SDP requesting a download to RSP modules.
3. Read messages from the SDP containing the modules being downloaded or commands to be executed. Reset the watchdog timer whenever a message is received.
4. If no messages from the SDP are received during a timeout period, the watchdog timer will expire, causing the RSP to reboot.
5. The final messages from the SDP cause the RspServer to start the RSP application and terminate itself. At this point, the RSP main task takes control of the RSP.

RSP Main CSU

The RSP Main CSU is the "main" program for the RSP software, the RspMain task. It is started after the SDP downloads the RSP executable programs. RspMain creates and initializes the shared memory region which is used for communication between all RSP tasks, including initialization of the buffer queues used to pass messages between RSP tasks. RspMain then creates the other RSP tasks:

RcvTask:RSP receive message (via RS-422 link) task
CmdTask:RSP command processing task
XmtTask:Transmit message (via RS-422 link) task
CamTask: Camera control task
CamSioTask:Camera serial I/O task
RdoTask:Radio control task
RdrTask:Radar control task
RdrGetData:Radar data ingest task
UpsTask:UPS control task
UpsMonTask:UPS monitoring task
VidGetData: Video data ingest task (not implemented)

Once all the RSP tasks are started, RspMain enters an "idle" loop, continuing to run until the termination flag gets set. While in this loop, RspMain sends out NEEDINIT messages to the SDP until the SDP responds with an INITSTRT message.

When the termination flag gets set, RspMain breaks out of its loop, then kills all the RSP tasks and exits.

The primary means of interprocess communication within the RSP is using buffer queues to pass messages between tasks. The buffer queues are maintained in a shared memory region. Each task reads its input messages from one queue and sends its output messages to one or more other queues. When a task tries to read from an empty input queue, that task will be suspended until some other task sends a message to that queue.

The following information lists all the RSP tasks and their corresponding input and output queues:

| Task | Input Queue(s) | Output Queue(s) |
|---|---|---|
| RcvTask | freeCmdMsgQ | fullRspCmdQ |
| CmdTask | fullRspCmdQ | freeCmdMsgQ |
|  |  | fullCamCmdQ |
|  |  | fullRdoCmdQ |
|  |  | fullRdrCmdQ |
|  |  | fullUpsCmdQ |
| CamTask | fullCamCmdQ | freeCmdMsgQ |
|  | freeOutBufQ | fullXmtBufQ |
| CamSioTask | freeOutBufQ | fullXmtBufQ |
| RdoTask | fullRdoCmdQ | freeCmdMsgQ |
|  | freeOutBufQ | fullXmtBufQ |
| RdrTask | fullRdrCmdQ | freeCmdMsgQ |
|  | freeOutBufQ | fullXmtBufQ |
| UpsTask | fullUpsCmdQ | freeCmdMsgQ |
|  | freeOutBufQ | fullXmtBufQ |
| UpsMonTask | freeOutBufQ | fullXmtBufQ |
| RdrGetData | freeScnBufQ | fullXmtBufQ |
|  | freeTrkBufQ |  |
| VidGetData | freeVidBufQ | fullXmtBufQ |
| XmtToVtc | fullXmtBufQ | freeOutBufQ |
|  | freeScnBufQ |  |
|  | freeTrkBufQ |  |
|  | freeVidBufQ |  |

The MutexQ module provides primitive queue operations which synchronize access to the queues and ensure queue structure integrity. The primitives in MutexQ encapsulate the operating system features that are used to implement the queue operations, enhancing the portability of RSP source code. Each queue structure uses two semaphore:

AVAIL—This semaphore maintains a count of the number of buffers in the queue and causes a task to suspend if it tries to read from the queue when the queue is empty. It is decremented when a buffer is removed from the queue (by GetQ) and incremented when a buffer is added to the queue (by PutQ).

MUTEX—This semaphore provides mutually exclusive access to the queue structure ensuring that only a single task may access or modify the pointers in the queue structure at one time.

MutexQ provides the following operations:
IniQ—Initialize a queue structure:
  Set number of entries to 0.
  Set head pointer to NULL.
  Set tail pointer to NULL.
  Create AVAIL semaphore; set its value to zero.
  Create MUTEX semaphore; set its value to zero.
GetQ—Get Buffer from Queue:
Wait on AVAIL semaphore for a queue node to be available.
Wait on MUTEX semaphore for exclusive use of the queue.
Remove node from head of the queue.
Decrement the queue counter.
Signal the MUTEX semaphore to release the queue structure.
Return the queue node.

PutQ—Put Buffer on Queue:
Wait on MUTEX semaphore for exclusive use of the queue.
Add node to the tail of the queue.
Increment the queue counter.
Signal the MUTEX semaphore to release the queue structure.
Signal the AVAIL semaphore to indicate that a queue node is available.

The RspBufQ module provides a set of buffer get/put routines for each buffer queue. RSP tasks call these routines to perform all message passing operations. RspBufQ hides all the details from the RSP tasks. The following information lists the Get and Put routines defined in RspBufQ that are used to access each of the queues:

| Queue | Get | Put |
|---|---|---|
| fullCamCmdQ | BQ_GetCamCmd | BQ_PutCamCmd |
| fullRdoCmdQ | BQ_GetRdoCmd | BQ_PutRdoCmd |
| fullRdrCmdQ | BQ_GetRdrCmd | BQ_PutRdrCmd |
| fullRspCmdQ | BQ_GetRspCmd | BQ_PutRspCmd |
| fullUpsCmdQ | BQ_GetUpsCmd | BQ_PutUpsCmd |
| freeCmdMsgQ | BQ_GetCmdMsg | BQ_PutCmdMsg |
| freeOutBufQ | BQ_GetOutBuf | BQ_PutOutBuf |
| freeScnBufQ | BQ_GetScnBuf | BQ_PutScnBuf |
| freeTrkBufQ | BQ_GetTrkBuf | BQ_PutTrkBuf |
| freeVidBufQ | BQ_GetVidBuf | BQ_PutVidBuf |
| fullXmtBufQ | BQ_GetXmtBuf | BQ_PutXmtBuf |

The RspShm module defines the structure of the shared memory region and provides a set of functions that RSP tasks can call to get the addresses of various items in the shared memory area:

SHM_CreShm( )—Create Shared Memory.
SHM_AddrCamCfg( )—Get address of camera configuration.
SHM_AddrRdoCfg( )—Get address of radio configuration.
SHM_AddrRdrCfg( )—Get address of radar configuration.
SHM_AddrRspCfg( )—Get address of RSP configuration.
SHM_AddrUpsCfg( )—Get address of UPS configuration.
SHM_AddrQueues( )—Get addresses of buffer queues.

The SysShrMem module provides routines to create or attach to a shared memory region. Since these operations are highly specific to the operating system, this module hides the details from the RSP tasks.

SYS_CreShm( )—Create shared memory region.
SYS_AccShm( )—Access (existing) shared memory region.

The VME Sys module provides a set of VME or OS-9 operating system specific functions, hiding the details of these operations from the RSP tasks that call these functions:

RSP_CreateTask( )( )—Create an RSP Task.
RSP_Delay( )—Sleep in 1/64 second intervals.
RSP_BumpDog( )—Reset the Watchdog Timer.
RSP_ReadDog( )—Read the Watchdog Timer Value.
RSP_Reboot( )—Reboot RSP (this function never returns!).
RSP_SetTime( )—Set Time on RSP.

Receive from VTC CSU

The Receive from VTC CSU handles the input interface between the Remote Site Processor and the Sensor Data Processor at the VTC.

This CSU is implemented as a task, called RcvTask, spawned by the RSP main task. It opens the synchronous I/O port for read access, then enters its processing loop, in which it gets an empty buffer from the free command buffer queue, waits for an incoming message from the SDP over the RS-422 synchronous communications link, then puts the command buffer on the RSP command queue for processing by the Dispatch Commands CSU.

Transmit to VTC CSU

The Transmit to VTC CSU receives data from the other remote site CSUs and transmits it to the VTC via the RS-422 synchronous communications link.

This CSU is implemented as a task, called XmtTask, spawned by the RSP main task. It opens the synchronous I/O port for write access, then enters its processing loop in which it reads a buffer from the full transmit buffer queue (it waits if the queue is empty). It gets an empty sync I/O write buffer, then copies the transmit data, enters the site ID and current time into the message header and transmits the buffer to the SDP. The transmit data buffer is then recycled onto the appropriate free buffer queue based on the buffer type.

Dispatch Commands CSU

The Dispatch Commands CSU handles the distribution of commands to the appropriate task for processing (e.g., radar commands to the Control Radars CSU), and the execution of some miscellaneous RSP commands.

This CSU is implemented as a task, called CmdTask, spawned by the RSP main task. It loops indefinitely, reading command messages from the command buffer queue and processing the command messages as follows:

Camera control commands are sent to the Control Camera CSU (CamTask) via the camera command buffer queue.

Radio control commands are sent to the Control Radio CSU (RdoTask) via the radio command buffer queue.

Radar control commands are sent to the Control Radar CSU (RdrTask) via the radar command buffer queue.

UPS control commands are sent to the Monitor UPS CSU (UpsTask) via the UPS command buffer queue.

Miscellaneous RSP commands are processed directly (boot, exit, set clock, self-test, bump watchdog, file transfer, etc.).

Note that the reason this CSU is separate from the Dispatch Commands CSU is to allow command input from sources other than the RS-422 synchronous link. In particular, this arrangement allows for the implementation of a local diagnostics program, which can place commands directly into the RSP command buffer queue.

Control Cameras CSU

The Control Cameras CSU controls the CCTV video cameras and mounts at the remote site. It also obtains current azimuth data from each camera mount for transmission to the SDP.

Camera control is performed using the American Dynamics AD1983 Code Converter, which can support up to 64 cameras. This CSU interfaces with the AD1983 via an RS-232 serial line, as specified in the Interface Design Document. Camera control is effected by inserting the camera number into a two-byte raw code, then transmitting the resulting code over the serial line either continuously or for a specific number repetitions. This CSU supports the following camera control operations:

| Function | Operation | Raw Code | Repeat Count |
|----------|-----------|----------|--------------|
| blower | on | 0x9C00 | continuous |
| focus | far | 0x8400 | continuous |
| focus | near | 0x8A00 | continuous |
| heater | off | 0x9800 | 8 |
| heater | on | 0x9A00 | 8 |
| iris | close | 0x8800 | continuous |
| iris | open | 0x8200 | continuous |
| pan | left | 0x8E00 | continuous |
| pan | right | 0x9200 | continuous |
| tilt | down | 0x9000 | continuous |
| tilt | up | 0x8000 | continuous |
| washer | on | 0x9E00 | continuous |
| wiper | off | 0x9400 | 8 |
| wiper | on | 0x9600 | 8 |
| zoom | telephoto | 0x8600 | continuous |
| zoom | wide | 0x8C00 | continuous |

Note that the AD1983 does not provide any response to the control codes, so correct operation of the camera can be verified only by observing the camera or its video output.

A device to read a raw azimuth value is installed in each camera mount. The interface to the camera azimuth feedback unit is described in the Interface Design Document. The camera azimuth feedback device reads a value (in the range 0 to 1023) representing the raw camera azimuth. This value is transmitted to the RSP via an RS-232 serial line at a rate of four updates per second. The format of the azimuth message is as follows:

Xdddr where:

X is the ASCII character 'X' d is a hexadecimal digit

\r is a carriage return

This CSU reads the azimuth input messages, performs a linear scaling to convert the value to an azimuth in degrees, and transmits the result to the SDP. The coefficients for the scaling operation are supplied as configuration data by the SDP. This CSU also supports manual calibration by allowing the operator to pan the camera to two known positions and "mark" those positions as calibration points. Using the known azimuth values and the raw data values at those two points, this CSU calculates the scaling coefficients, which may be retrieved by the SDP for storage in the database and later retrieval.

The Control Cameras CSU is implemented by two tasks which communicate through a camera configuration structure in shared memory.

1.CamTask

This task processes incoming camera control commands received from the SDP via the Dispatch Command CSU. This task causes camera control operations to be executed by placing the proper control codes into the camera configuration structure in shared memory, where they are read and transmitted by the CamSioTask. This task supports the following functions, as specified in the IDD:

Initialize Camera (MSG_CAM_INIT)—Indicates the serial I/O ports to be used for sending control codes and receiving azimuth feedback for the specified camera. This command causes the RSP to initiate serial communication with the given camera control and feedback devices and is required following an RSP reboot before any camera control commands will be accepted.

Control Camera (MSG_CAM_CTRL)—Specifies one or more camera control operations to be performed. In addition to the operations listed above, the following functions are supported:

Set Scaling Coefficients

Mark Calibration Point

Return Camera Configuration Data

2. CamSioTask

This task continually scans the camera configuration structure for command codes (inserted by CamTask) to be transmitted to the AD1983 and reads the camera azimuth feedback units to obtain raw azimuth data values. Whenever a raw azimuth data value changes, this task scales the data to obtain an azimuth in degrees and transmits a message to the SDP. To support various radio models, the Control Camera CSU is divided into a generic command processing module and a camera-specific (AD1983) module, which contains a set of functions to implement each of the control operations for the particular camera control model.

In response to a camera initialization command, the command processing module will open the I/O ports to the specified devices and establish a connection to the camera-specific module for the given camera model. It will then return a response message and device status message to the SDP.

Once camera initialization is complete, the command processing module handles control commands by invoking the camera-specific function corresponding to each bit set in the command operation mask. The operation bit mask allows the SDP to direct the RSP to execute one or more radio control functions with a single camera control command. Each camera-model specific function sets the appropriate command code in the camera configuration data structure for transmission by the CamSioTask.

A bit corresponding to each operation mask bit is set in the response bit mask to indicate which functions were successfully performed. The response message and a device status message are then sent to the SDP.

Control Radars CSU

The Control Radars CSU controls the radar processor and the radar(s) at the remote site. The interface with the radar processor is described in the Interface Design Document. The following operations with the radar processor are supported:

Setup Scan Converter
        Radar Site Name (20 alphanumeric characters)
        Latitude (ddd:mm:ss.cc N/S)
        Longitude (ddd:mm:ss.cc E/W)
        Range (0.5–300 nm)
        Azimuth Correction
        Distance Offset (0.0–300 nm)
        Azimuth Offset (0.0–359.9 degrees)
        Threshold (0–63)
        STC Range (0.2–25.0 nm)
        STC Level (0.0–48.0 db)
        Clutter Mode (0–7)
        Clutter Level (0–255)
        Fade Rate (0–120 seconds)
        Define Automatic Target Acquisition Zones
        Change range setting
    Test Scan Converter
    Get Track Table Data
    Get Scan Data
    Manually establish track
    Switch to Backup Radar, Switch to Main Radar
    Radar Calibration This CSU also accepts status data from the radar processor for transmission to the VTC.

Control Radios CSU

The Control Radios CSU controls the VHF-FM radio equipment (transceivers and guard receivers) at the remote site, based on commands received from the SDP via the Dispatch Command CSU. The following radio control commands are supported, as specified in the IDD:

Initialize Radio (MSG_RDO_INIT)—Indicates the serial I/O port and device address used to control the specified radio unit. This command causes the RSP to initiate serial communication with the given radio and is required following an RSP reboot before any radio control commands will be accepted.

Control Radio (MSG_RDO_CTRL)—Specifies one or more radio configuration items to be modified, or radio operations to be performed. The following operations are supported.

Set power (low, medium, high)
    Set mode (U.S. or International)
    Set squelch (adjust up/down or set absolute level)
    Set push to talk (enable, disable)
    Execute built-in test
    Report status
    Select channel (channel number, normal/private/weather, implex/duplex)

To support various radio models, the Control Radio CSU is divided into a generic command processing module and one or more radio-specific modules, each of which contains a set of functions to implement each of the control operations for the particular radio model.

In response to a radio initialization command the command processing module will open the I/O port to the specified device, and establish a connection to the radio-specific module for the given radio model. It will then return a response message and device status message to the SDP.

Once radio initialization is complete, the command processing module handles control commands by invoking the radio-specific function corresponding to each bit set in the command operation mask. The operation bit mask allows the SDP to direct the RSP to execute one or more radio control functions with a single radio control command. Each radio-model specific function transmits the appropriate command code to the radio via the RS-232 interface and reads the radio response.

A bit corresponding to each operation mask bit is set in the response bit mask to indicate which functions were successfully performed. The response message and a device status message are then sent to the SDP.

The control interface with the radios is described in the vendor's interface document.

Monitor UPS CSU

The Monitor UPS CSU monitors the Uninterruptible Power Supply (UPS) at the Remote Site. The UPS status is transmitted to the SDP at regular intervals. This unit also accepts commands from the SDP to control the monitoring of the UPS. The following UPS monitoring control commands are supported, as specified in the IDD:

Initialize UPS (MSG_UPS_INIT)—Indicates the serial port used to monitor the UPS. This command causes the RSP to initiate serial communications with the UPS and begin monitoring the UPS status.

Control UPS (MSG_UPS_CTRL)—Used to control monitoring of the UPS. The following operations are supported.

Disable Monitoring
    Enable Monitoring
    Set Monitoring Interval

To support various possible UPS models, the Monitor UPS CSU is divided into a generic command processing module and one or more UPS-specific modules, each of which contains a set of functions to implement each of the control operations for the particular UPS model.

In response to an UPS initialization command, the command processing module will open the I/O port to the specified device and establish a connection to the UPS-specific module for the given UPS model. It will then return a response message and device status message to the SDP.

Once UPS initialization is complete, the command processing module handles control commands by invoking the UPS-specific function corresponding to each bit set in the command operation mask. The operation bit mask allows the SDP to direct the RSP to execute one or more UPS monitoring control functions with a single UPS control command.

A bit corresponding to each operation mask bit is set in the response bit mask to indicate which functions were successfully performed. The response message and a device status message are then sent to the SDP.

The UPS Monitoring Unit is composed of two tasks which communicate through the UPS configuration structure in shared memory. The first task, UpsTask, handles incoming UPS commands and controls the other task, UpsMonTask, by placing flags and control values in the UPS configuration structure. The UpsMonTask runs cyclicly. It queries the UPS, reads back the status, and sends a status message to the SDP, then sleeps for the specified interval. If the status is other than nominal, an alarm message is generated and sent to the SDP.

The interface with the UPS is described in the vendor's interface document.

Ingest Compressed Video Data CSU

The Ingest Compressed Video Data CSU reads compressed video data from the JPEG compression board into a buffer. Each buffer of compressed video data is then passed to the Transmit to VTC CSU via a circular buffer queue that is maintained in shared memory.

Ingest Radar Data CSU

The Ingest Radar Data CSU is responsible for obtaining radar scan and track data from the Radar Scan Converter. The interface with the Radar Scan Converter is described the Interface Design Document.

The radar track data is corrected to compensate for uncorrected radar azimuth and range errors, using coefficients determined by the radar calibration procedure, then converted to a common x-y-z coordinate system that is centered at an operator- selected reference point using factors supplied by the Sensor Data Processor as part of the system configuration.

This CSU then fills a buffer with the stream of data from the Radar Scan Converter. A circular buffer queue is maintained in shared memory between the Ingest Radar Track Data CSU and the Transmit to VTC CSU. The full buffer is passed to the Transmit to VTC CSU.

The Ingest Radar Scan Data CSU accepts scan data from the Radar Scan Converter. The interface with the Radar Scan Converter is described the Interface Design Document. This CSU fills a buffer with the data received. Each buffer of radar scan data is then passed to the Transmit to VTC CSU via a circular buffer queue that is maintained in shared memory.

Common Coordinate Conversion CSU

The Common Coordinate Conversion CSU converts range and bearing data (relative to a specified radar) to the equivalent latitude and longitude for a target. It is invoked by the Ingest Radar Data CSU for each track data sample. The process uses the radar location (latitude, longitude, and height above MSL) and the range and bearing derived from the pixel location provided by the radar processor and uses the WGS-84 earth model as the basis for conversion to geocentric latitude and longitude.

The longitude is easily calculated using the geocentric y and x coordinates of a target. Calculation of the latitude is too time-consuming to be done in real time. Instead, the latitude is approximated using Bowring's Method. Bowring's method applies correction terms incorporating the eccentricity of the earth ellipsoid to the geocentric coordinates of the target. Once these easily computed correction terms are added in, calculating latitude is as simple as calculating longitude.

Test results showed average latitude and longitude errors less than one-tenth of a yard for ranges up to 30,000 meters. This degree of accuracy far exceeds that provided by the radar processor.

Data Acquisition CSC

The following subparagraphs identify and describe each of the CSUs that form the Data Acquisition CSC. CSUs that form the Data Acquisition CSC include VME RSP to VTC Data Transmission, VME VTC to RSP Data Transmission, RSP to VTC Data Transmission, VTC to RSP Data Transmission, and Input Audio Data. Data flows between CSUs that form the Data Acquisition CSC and external CSU interfaces are shown in the data flow diagram in FIG. 21.

Data Acquisition communicates with the Remote Site Processing CSC using up to three VME I/O processors residing in the VME chassis. Data is transferred between the processor and VME I/O processors through shared memory.

VME RSP to VTC Data Transmission CSU

The VME RSP to VTC Data Transmission CSU collects the remote sensor information that was multiplexed on the RSP and transferred to the SDP by the Remote Site Processing CSC. Sensor information received from each of the remote sites is placed in a shared memory between the and VME, where it resides until it is demultiplexed and processed by other Data Acquisition CSUs.

As data input occurs, transfer rates are calculated for each remote site and a cumulative transfer rate is calculated for all remote sites, and placed in the performance data tables for status logging. Error messages are written to the status log file if a data transfer error or data overrun occurs.

VME VTC to RSP Data Transmission CSU

The VME VTC to RSP Data Transmission CSU distributes remote site commands and configuration data that are received from the VTC to RSP Data Transmission CSU in the form of messages. Remote site messages are received through memory which is shared between the and VME. The remote site number in the message header is used to route the messages.

As data input occurs, transfer rates are calculated for each remote site and a cumulative transfer rate is calculated for all remote sites, and placed in the performance data tables for status logging. Error messages are written to the status log file if a data transfer error or data overrun occurs.

RSP to VTC Data Transmission CSU

The RSP to VTC Data Transmission CSU demultiplexes the sensor information that was multiplexed at each remote site. Sensor information from each site is extracted from the shared memory sensor information input buffers, separated according to sensor type, and placed in acquisition buffers for further processing. Sensor status data is sent to the Sensor Status Routing CSU for transfer to the Command and Control CSC.

As the remote site data is demultiplexed, ingest rates are calculated for each sensor type from each remote site. If a sensor information input buffer overflow occurs, a message is written to the status log file.

VTC to RSP Data Transmission CSU

The VTC to RSP Data Transmission CSU receives remote site commands and configuration data from the Command and Control or Track Processing CSCs in the form of messages. Remote site messages are received through mail boxes. The remote site number in the message header is used to route the messages to the appropriate VME shared memory.

Error messages are written to the status log file if a data overrun occurs.

Input Audio Data CSU

The Input Audio Data CSU receives digitized and compressed audio communication data which originated from remote radios and VTS operators. This audio data is used for recording and transfer rate reporting purposes only. No other use is made of this audio data for live operations.

Compressed audio data is read from the Digital Voice Recording System, and deposited into circular acquisition buffers for recording by the Record and Replay CSC. As the audio data is input, transfer rates are calculated for channels defined in the system configuration tables. These transfer rates are placed in the performance data tables for performance and status monitoring. If an input errors occurs, an error message is written to the status log file.

Track Processing CSC

The following subparagraphs identify and describe each of the CSUs that form the Track Processing CSC. CSUs that form the Track Processing CSC include Overlap Area Monitoring, Locate Duplicate Tracks, Correlated Position Estimation, Automatic Radar Handoff, Target Acquisition, Automatic Vessel Re-Assignment, Drop Track Processing, EP Route Monitoring, Collision Monitoring, Radar Calibration, Traffic Lane Monitoring, Safety Zone Monitoring, Moving Safety Zone Monitoring, Radar Contact Monitoring, Sudden Course/Speed Change Monitoring, Excessive Speed Monitoring, and Sector Monitoring. The Track Processing CSC executes on the Database Processor.

Overlap Area Monitoring CSU

The Overlap Area Monitoring CSU checks for, identifies and monitors tracked vessels which are located in an area serviced by multiple radars. Using operator supplied radar overlap definition data, each tracked vessel is checked to see if it resides in a radar overlap area. When a vessel resides in a radar overlap area, a request to identify the vessel on any overlapping radars which are not currently tracking the vessel, is sent to the Locate Duplicate Tracks CSU. This request is repeated periodically until all overlapping radars are tracking the vessel or the vessel exits the radar overlap area.

Locate Duplicate Tracks CSU

The Locate Duplicate Tracks CSU starts the multiple radar tracking of vessels which reside in a radar overlap area. A request to identify a vessel on all overlapping radars is received from the Overlap Area Monitoring CSU when a vessel resides in a radar overlap area, but is not being tracked by all overlapping radars. Using operator supplied radar overlap definition data, a command to start vessel tracking on each non-tracking radar is sent through the Remote Site Processing CSC. Once target tracking is started on an overlapping radar, the new track data is validated to insure that the new track data does represent the desired vessel. If the new track data does not represent the desired vessel, a command to drop the track is sent to the Remote Site Processing CSC. If the new track data is validated to represent the desired vessel, duplicate track identification information is placed into the Duplicate Track Table.

Correlated Position Estimation CSU

The Correlated Position Estimation CSU correlates radar track data from overlapping radar coverage areas to produce a single best estimate of a vessel's position and velocity. This correlated track data is then written to the SDS track table and is sent to Command and Control for insertion into the INRI Track Database.

Duplicate track data generated by the Locate Duplicate Tracks CSU is used to identify track data requiring correlation. Track data correlation is performed for each multiply tracked vessel, and the correlated track data is placed into the SDS track table and sent to Command and Control.

Target Acquisition CSU

The Target Acquisition CSU extracts live radar data from the data acquisition buffers and writes it to the SDS track table. It also places correlated track data, EP track data, and Vessel ID data into the acquisition buffer for recording. Replay data is read from the acquisition buffer by this CSU and routed accordingly. Replay radar data, which has already been correlated, and replay EP data is sent directly to Command and Control for insertion into the Track Database. Replay vessel identification data and replay vessel alarms are sent to the ODS.

For each live radar data acquisition buffer record, the track ID is compared to those IDs currently contained in the SDS track table. If a match is found, the position and velocity data associated with the ID in the SDS track table is updated with position and velocity data extracted from the buffer. If no match is found, then new track table records are created for the new track and initialized with the position data extracted from the buffer. A response message is then issued. This message will contain the new SDS track ID if a new track was created. When a command is received that vessel identification information has changed, an SQL*Net call is made to read the updated information from the ORACLE database.

Automatic Radar Handoff CSU

The Automatic Radar Handoff CSU hands off radar coverage responsibility when a multiply tracked vessel exits an overlapping radar coverage area. Using operator supplied radar overlap definition data, each vessel identified as residing in a radar overlap area is checked to see if it still resides in that radar overlap area. When a vessel exits a radar overlap area, tracking termination commands are sent through the Remote Site Processing CSC to all radars tracking the vessel except the radar which covers the area in which it emerges. The Duplicate Track Table is updated to indicate that multiple radar tracking is no longer provided.

If a vessel emerges into an area with no radar coverage, all radars except the original tracking radar are commanded to discontinue tracking. This will give the Radar Contact Monitoring CSU an opportunity to report a radar contact lost alarm.

Drop Track Processing CSU

The Drop Track Processing CSU deletes tracks from the SDS track table when commanded to do so. When a message is received to drop a track, the track ID is searched for in the SDS track table. If a track with the requested ID is found, then a pending drop flag is set in the track record. Each cycle (every three seconds), the current status of each track is checked. If the status of a track is TRK_LOST, and its pending drop flag has been set, then the track record is removed from the SDS track table. If the pending drop flag has not been set, an alarm message is issued. In the case of EP tracks, if the pending drop flag is set, the track is deleted. Alarm messages are also issued by this CSU when a track status goes from TRK_TRACKING to TRK_COAST.

Automatic Vessel Re-Assignment CSU

The Automatic Vessel Re-Assignment CSU attempts to automatically restart vessel tracking when the EP route transition is complete. When a vessel completes a EP route, a request is received from the EP Route Checking CSU to automatically start tracking the vessel. Using operator supplied radar coverage zone definition data and EP tracking data, a determination is made as to which radar should attempt vessel tracking. A target acquisition command is sent to that radar through the Remote Site Processing CSC. If target acquisition occurs, the track data is validated to ensure that it does represent the desired vessel. If the track data does not fall within expected parameters, a command to drop the track is sent through the Remote Site Processing CSC.

EP Route Processing CSU

The EP Route Processing CSU automatically generates EP track data when a vessel is traveling along an operator assigned EP route. When a vessel enters an area without radar coverage, an operator command is received from the ODS to assign that vessel to a predefined EP route. Using operator supplied EP route definition data read from the ORACLE database, last known vessel speed, and an operator assigned location on the EP route, EP track data is generated following the EP route. While the vessel travels the EP route, the operator may make adjustments to the vessel speed or location on the route. When the vessel reaches the EP route end, EP track data generation is stopped, and a request is made of the Automatic Vessel Re-Assignment CSU to restart vessel radar tracking.

Collision Monitoring CSU

The Collision Monitoring CSU monitors vessel tracking data to determine when two tracked vessels are in danger of colliding. A circular zone with radius specified by the operator is first constructed about each vessel being tracked. This first screening zone is used to prevent the setting of alarm flags in non-critical situations. For each such zone, if no other vessels are within the zone, the check is halted. If another vessel is found to be within the zone, the closest point of approach and time until closest point of approach for the two vessels is calculated. If this closest point of approach is less than an operator selectable minimum distance, and the TCPA is less than an operator selectable minimum time, a collision alarm message is issued. This alarm message continues to be issued until the alarm condition ceases to exist.

Calculation of the CPA and TCPA is done in the following way:

For each vessel, a project-ahead time is available for zone violation and collision monitoring. For collision monitoring, this time can be multiplied by the vessel's velocity to give a distance d. For two vessels having associated distances d1 and d2, a collision check must be performed if the sum of d1 and d2 is greater than the actual distance between the vessels, i.e., if the circle of radius d1 about vessel 1 overlaps the circle of radius d2 about vessel 2.

Let s1 and s2 be two vessels requiring a collision check. At time t=0, vessel s1 is at position (x,y) and s2 is at position (a,b). At time t, s1 is at position (x,y)+t(vx,vy) and s2 is at position (a,b)+t(va,vb), where vx=velocity of s1 in x direction
vy=velocity of s1 in y direction
va=velocity of s2 in x direction
vb=velocity of s2 in y direction At time t, the distance S between s1 and s2 is given by $$S=([x+tvx-(a+tva)]^2+[y+tvy-(b+tvb)]^2)^{1/2}$$

What we want to do is to find the time of the closest point of approach. This will be the time at which S is smallest. To calculate it, we need to differentiate the above expression with respect to t and set the result to 0, then solve for t. Let U equal everything inside the radical. Then $$dS/dt=(1/2)U^{-1/2}dU/dt$$

This will be 0 when the numerator is 0, i.e., when dU/dt=0. Now, $$dU/dt=2(xvx-avx-xva+ava+yvy-bvy-yvb+bvb)+2(vx^2-vavx-vxva+va^2+vy^2-vbvy-vyvb+vb^2)t$$

Setting this to 0 and solving for t gives $$t = \frac{-xvx + avx + xva - ava - yvy + bvy + yvb - bvb}{vx^2 - 2vxva + va^2 + vy^2 - 2vyvb + vb^2}$$

If two vessels are sufficiently close to require a collision check, the TCPA is computed using the equation above. If the TCPA is less than the threshold value specified by the operator, the CPA is computed. This is done by substituting the TCPA into the distance function. If the resulting CPA is less than the threshold value specified by the operator, then an alarm is issued.

Radar Calibration CSU

The Radar Calibration CSU validates the location of multiple fixed targets residing in each radar's coverage area. For each radar, operator supplied system configuration information is maintained which specifies surveyed locations and maximum error offsets for fixed targets. At 1 hour intervals, the Radar Calibration CSU starts tracking the fixed targets for each radar, then calculates the error difference between the surveyed location and the radar return location. The error amount for each surveyed location is placed in the performance and status tables, where it can be requested for display by a system operator. If any error amount is greater then the maximum allowed error amount for the surveyed location, a radar calibration error message is broadcast to all operator consoles for display and written to the status log.

Traffic Lane Monitoring CSU

The Traffic Lane Monitoring CSU monitors vessel tracking data to determine when a vessel approaches within an operator selected distance of either side of a traffic lane. Using operator supplied traffic lane definition data read from the ORACLE database and vessel tracking data, each tracked vessel's position and direction is checked to see if the vessel is within an operator selected distance from a traffic lane and is heading toward the traffic lane. A traffic lane violation alarm message is issued for any vessel which violates a traffic lane. This alarm continues to be issued until the alarm condition no longer exists.

Safety Zone Monitoring CSU

The Safety Zone Monitoring CSU monitors vessel tracking data to determine when a vessel violates a stationary or circular moving safety zone. Using operator supplied safety zone definition data and vessel tracking data, each tracked vessel's position and direction is checked to see if the vessel is within an operator selectable distance from a safety zone and is heading toward the safety zone boundary. Safety zones can be defined as multiple line segments, as a distance from a stationary point, or as a distance from a tracked object. A safety zone violation alarm message is issued for any vessel which violates a safety zone. This alarm message continues to be issued until the alarm condition no longer exists.

The algorithm used to monitor safety zones (as well as traffic lanes) is as follows:

Safety zones can be either circular or polyline; circular zones are defined by a center point and radius, while polyline zones are defined by a set of line segment endpoints.

The potentially large numbers of tracks and zones processed by VTS makes it impractical to check every zone for each vessel on every cycle. For a given vessel, the majority of safety zones likely will be "far away", so such exhaustive checking really isn't necessary. What Track Processing does, then, is to determine the zones that are "near" (determined by alarm criteria provided by the operator) to a vessel. These near zones are checked each cycle, while far zones are checked less frequently.

Two algorithms are required: one to check for nearness to a zone, and the other to check for an actual zone violation. The first determines if a vessel is within a given distance of a zone, and the second determines if, when the vessel is projected ahead an operator defined time using its speed and heading, it will cross a zone boundary.

First, the nearness algorithm:

Consider a vessel at point (a,b); a segment of a safety zone having endpoints (x0,y0) and (x1,y1); and a distance r. The vessel is within a distance r of the segment if:

(A) Either endpoint of the segment lies within the circle of radius r about (a,b), or (B) If neither endpoint lies within the circle, but a subsegment of the segment does; in other words, if the segment intersects the circle at two points.

Checking for (A) is straightforward. To check for (B), we can start with the equation of the circle and the line segment. For the circle we have:

$$(x-a)2+(y-b)2=r2 \quad (1)$$

and for the line segment, parameterized by the variable t, we have:

$$(x0,y0)+t(x1-x0,y1-y0) \quad 0<=t<=1. \quad (2)$$

The circle and segment intersect if there exists a value t between 0 and 1 such that the resulting coordinate pair in (2) also satisfies (1). This value, if it exists, can be found by substituting the coordinates from (2) into (1) and solving for t, i.e., solving the following equation:

$$(x0+t(x1-x0)-a)2+(y0+t(y1-y0)-b)2=r2 \quad (3)$$

This is a quadratic equation with roots $$t0=(-B+sqrt(B2-4AC))/2A$$

$$t1=(-B-sqrt(B2-4AC))/2A$$

where

A=(x1−x0)2+(y1−y0)2
B=2[(x0−a) (x1−x0)+(y0−b) (y1−y0)]
C=(x0−a)2+(y0−b)2−r2

Note that if the discriminant is negative, then there are no real roots and therefore no intersection. The algorithm is then:
1. Check if either endpoint of the segment is inside the circle. If so, flag the zone as a near zone. If not, go to step 2.
2. Calculate the discriminant. If it is negative, then the equation has no real solutions, exit; otherwise, go to step 3.
3. Calculate the roots t0 and t1. If either lies between 0 and 1, then flag the zone as near. Here is the zone violation algorithm:

The first step is to project the vessel ahead using its speed, heading, and project-ahead time. If the vessel has speed s, then in time t it will have moved a distance d=st. If the vessel has heading b, then its new X coordinate will be dsin(b) and its new Y coordinate will be dcos (b).

For circular safety zones, the radius of the zone is then compared to the distance between the project-ahead vessel position and the zone's center. If the radius is larger, then a zone violation has occurred.

For polyline zones, a line segment is drawn between the vessel's current location and project-ahead location. This line segment is then checked for intersection with each line segment in the zone definition, or until an intersection is found. An intersection indicates a zone violation.

Whether or not two segments intersect is determined in the following way:
Let segment 1 have endpoints (x0,y0) and (x1,y1), and segment 2 have endpoints (a0,b0) and (a1,b1). Using the variables t and w, where t and w are in [0,1], we can parameterize the segments:

segment 1: (x0,y0)+(x1−x0,y1−y0)t
segment 2: (a0,b0)+(a1−a0,b1−b0)t

The two segments intersect if there exists t and w in [0,1] such that $$(x0,y0)+(x1-x0,y1-y0)t=(a0,b0)+(a1-a0,b1-b0)w. \quad (4)$$

Using a vessel-centered coordinate system, we can set x0=0 and y0=0. We then solve the following two equations (from 4 above) simultaneously for t and w:

$$x1t=a0+(a1-a0)w$$

$$y1t=b0+(b1-b0)w$$

The solution is $$w=(b0x1-a0y1)/(y1(a1-a0)-x1(b1-b0))$$

$$t=(a0+w(a1-a0))/x1$$

If both w and t are in [0,1], then the segments intersect.

Moving Safety Zone Monitoring CSU

The Moving Safety Zone Monitoring CSU monitors vessel tracking data to determine when a vessel violates a non-circular moving safety zone. Simple circular moving safety zone monitoring is done by the Stationary Safety Zone Monitoring CSU. A non-circular moving safety zone is defined by the operator as a set of line segments about a given vessel. As the vessel moves, the line segments retain their relative positions about it. The position of each tracked vessel is checked to see if the vessel is within an operator selectable distance from any moving safety zone, and if it is heading toward the safety zone boundary. If both conditions are met, then a safety zone violation alarm flag is set in the track data table for the vessel. The alarm flag remains set until an operator command acknowledging the alarm is received from the ODS, and the alarm condition no longer exists.

Radar Contact Monitoring CSU

The Radar Contact Monitoring CSU checks incoming track data to determine if radar contact has been lost. With each pass of each radar, the track status fields returned by the RSP are checked for LOST or COASTING tracks. When a track is found to be COASTING, an alarm message is issued to the ODS. When a track is found to be LOST, if the drop pending flag in the SDS track table has been set for the track (indicating that a drop track message has been received), the track is removed from the SDS track table and no further track updates are made to the Track Database. If the drop pending flag has not been set, an alarm message is issued to the ODS.

Sudden Course/Speed Change Monitoring CSU

The Sudden Course/Speed Change Monitoring CSU monitors vessel course and/or speed changes to determine if they violate change criteria. To start course/speed change monitoring, an operator command is received from the ODS identifying the vessel to monitor, course change limit, course change time, speed change limit, and speed change time. For the specified vessel, a table of most recent track data is maintained which contains enough samples to cover the longest specified time. As each new track data sample is received it is compared with the sample separated by the operator specified time to see if a course or speed change violation has occurred. If a violation occurs, a course or speed change alarm flag is set in the track data table for the violating vessel. These alarms remain set until an operator command acknowledging the alarm is received from the ODS, and the alarm condition no longer exists.

Excessive Speed Monitoring CSU

The Excessive Speed Monitoring CSU monitors vessel speed to determine if it violates an operator defined maximum. To start speed monitoring, an operator command is received from the ODS identifying the vessel to monitor and maximum allowed speed. As each new track data sample for the specified vessel is received, vessel speed is compared with the maximum allowed vessel speed to see if a speed violation has occurred. If a violation occurs, a maximum speed violation alarm flag is set in the track data table for the violating vessel. This alarm remains set until an operator command acknowledging the alarm is received from the ODS, and the alarm condition no longer exists.

Sector Monitoring CSU

The sector monitoring CSU performs two tasks: the first is to determine which sector(s) a vessel is contained in, and the second is to notify the operator when a vessel is approaching a sector boundary.

The first task is accomplished in the following way:

Let C be a closed curve (sector) in the plane, Y a point in the plane outside of C, and X any other point in the plane. Let L be the line segment with endpoints X and Y. Then X is inside of C if L intersects C an odd number of times; otherwise, X is outside of C.

A point Y is selected with latitude and longitude clearly outside all operator sectors. For each vessel, a line segment L is constructed between the vessel and Y. For each sector S, the number of intersections between L and S is counted. If this number is odd, then the vessel is inside of S; otherwise, the vessel is outside of S.

The second task is performed exactly the same as for stationary safety zones.

Data Distribution CSC

The following subparagraphs identify and describe each of the CSUs that form the Data Distribution CSC. Data flows between CSUs that form the Data Distribution CSC and external CSU interfaces are shown in the data flow in FIGS. 26, 27, and 28.

Load Video Config From Database CSU

The Load Video Config From Database CSU is invoked at system startup to retrieve the stored video routing and video insertion setup information from the system configuration database. Embedded Oracle SQL*Net commands are used to obtain the information from the Database Processor. The information retrieved is entered into the Video Insertion Info Table, which contains the data to be inserted into each video channel, as well as routing data for playback video.

Modify Video Routing CSU

The Modify Video Routing CSU accepts video routing commands from the operator which specify the routing of video data during a playback operation. It updates the Video Insertion Info Table with the data.

Update Camera Azimuth Info CSU

The Update Camera Azimuth Info CSU accepts messages from the RSP to update the azimuth value for a specified camera and updates the Video Insertion Info Table accordingly. Note that camera azimuth information messages are received only for live video channels. For playback video channels, the azimuth is obtained from the video buffer header.

Insert Video ID Info CSU

The Insert Video ID Info CSU handles the interface to the Video Insertion Unit hardware. It retrieves video insertion info from the table and transmits corresponding control commands to the Video Insertion Unit, and monitors the status information returned. The control commands for the Video Insertion Unit and the status information returned is described in the Interface Design Document.

Output Playback Video CSU

The Output Playback Video CSU reads buffers of playback video data from the Acquisition Buffers. Using the site and camera identification from the buffer header, it extracts the playback channel information from the Video Insertion Info Table to determine the correct playback channel for this buffer. The video identification information (site, camera, azimuth, and time) are sent to the Insert Video Id Info Unit, along with an indicator that this is playback data, so that playback data may be easily distinguished from live data by the operator. The video data buffer is then sent to the proper playback channel for decompression and display. The interface to the JPEG video compression/decompression hardware is described in the Interface Design Document.

| Chan | Mode | Site | Camera | Az | Time |
| --- | --- | --- | --- | --- | --- |
| 1 | Live | 1 | A | nnn | ddd hh:mm:ss |
| 2 | Live | 1 | B | nnn | ddd hh:mm:ss |
| 3 | Live | 2 | A | nnn | ddd hh:mm:ss |
| . | . | . | . | . | . |
| . | . | . | . | . | . |
| . | . | . | . | . | . |
| 34 | Live | 17 | B | nnn | ddd hh:mm:ss |
| 35 | Live | 18 | A | nnn | ddd hh:mm:ss |
| 36 | Live | 18 | B | nnn | ddd hh:mm:ss |
| 37 | Pbk 1 | 5 | A | nnn | ddd hh:mm:ss |
| 38 | Pbk 2 | 5 | B | nnn | ddd hh:mm:ss |
| 39 | Pbk 3 | 7 | B | nnn | ddd hh:mm:ss |
| 40 | Pbk 4 | 11 | A | nnn | ddd hh:mm:ss |

This CSU also maintains a count of the number of live and playback video data buffers processed in a given time period and checks how full the video data queues in the Acquisition Buffers are. This information is placed in the performance data tables for performance and status monitoring.

Control Video Switcher CSU

The Control Video Switcher CSU manages the interface with the Video Switcher hardware. It accepts video channel assignment commands from the ODS. Based on the given commands, control signals are sent to the Video Switcher to direct specified video inputs to be routed to specified CCTV monitors and VCRs. The status returned from the Video Switcher is used to provide responses to the user. The control commands for the Video Switcher and the status information returned are described in the Interface Design Document.

Modify Playback Audio Routing CSU

The Modify Playback Audio Routing CSU maintains a table of routing information which specifies which playback audio data is to be sent to the audio digitizing system for decompression and conversion to analog. This CSU maintains a table for the audio channels allocated to playback. Each playback channel is assigned to playback audio data recorded from a given remote site transceiver/receiver. It accepts audio distribution commands from an operator at a display console as part of setting up a playback operation.

Output Playback Audio CSU

The Output Playback Audio CSU reads playback audio data buffers from the playback Acquisition Buffers. The buffer header is examined to determine which remote site radio is the source of the data. The routing table is then used to determine which audio channel is to receive the audio data from that source. The playback audio data is then transmitted to the audio routing system. The interface to the audio routing system is described in the Interface Design Document.

This CSU also maintains a count of the number of playback audio data buffers processed in a given time period and checks how full the playback audio data queues in the Acquisition Buffers are. This information is placed in the performance data tables for performance and status monitoring.

Video Switcher CSU

The Video Switcher CSU routes video input signals to operator selected video output channels. Using the ODP touch panel, the operator selects the input signal and a monitor for display. Initial set-up information is retrieved from the video_switcher_input and video_switcher_output database tables.

Character Inserter CSU

The Character Inserter CSU initializes the location for channel numbers, azimuth position and time for the Video Character Inserter. After initialization, it awaits camera azimuth position data from each RSP, and updates the Video Character Inserter camera azimuth as necessary. Initial setup information is retrieved from the video_insertion database table.

Record And Replay CSC

The following subparagraphs identify and describe each of the CSUs that form the Record and Replay CSC. CSUs that form the Record and Replay CSC include: Tape Controller, Jukebox Control, Data Recording, Data Replay, and Tape Processing.

Tape Controller CSU

The Tape Controller CSU coordinates all accesses to the helical scan recorder Jukebox and all helical scan recorder Tape drives. The Tape Controller CSU provides the following functions for Data Recording (automated mode):
1. Queries the Tape Information Database to determine what tape will be used next for recording data.
2. Assigns the next available helical scan recorder drive unit for recording and loads the designated tape into the drive.
3. Commands the Data Record CSU to initiate recording on the selected drive and tape.

When a new tape for recording is required, blank tapes are selected first. If no blanks are available, the tape containing the oldest data and having write access is chosen. The Tape Controller CSU also provides manual operation for assigning tapes to specific drives for recording.

For Data Replay, the Tape Controller CSU performs the following functions:
1. Queries the Tape Information Database to determine on what tape the requested replay data resides.
2. Assigns an available helical scan recorder drive unit for replay and loads the designated tape into the drive.
3. Commands the Data Replay CSU to initiate replay on the selected drive and tape.

Operator generated tape manipulation commands are received by the Tape Controller CSU from the ODS or via a stand-alone utility running on the SDP. These commands include allowing the operator to add new tapes to the jukebox, extract tapes from the jukebox, and switch a tape's status between read/write and read only, and various other system administrator commands. Operators may view the tape database contents using reports that are available through standard ORACLE report generation features.

Jukebox Control CSU

The Jukebox Control CSU provides the interface between the off the shelf Jukebox processing CSU and the Tape Controller CSU. Tape control commands received from the Tape Controller CSU are converted into the actual command sequences required to perform the requested function. These command sequences are then sent to the Jukebox which performs the requested function. Status information received from the Jukebox is returned to the Tape Controller CSU for analysis and distribution. Any command that results in changing the location or content of a tape causes updates to the tape database, which maintains an up to date record of all tapes.

Data Recording CSU

The Data Recording CSU performs sequential recording of audio data, video data, radar scan data, radar track data, vessel data, vessel alarms, and all VTS messages. Data is obtained from acquisition buffers and written to a temporary disk file. The Tape Processing CSU is then commanded to record the temporary disk file onto the tape. Two temporary disk files are used to facilitate a double-buffering scheme for recording data to tape. Once the tape is full (or recording is terminated upon request), the Data Recording CSU terminates the recording process for the specified tape, updates the Tape Information Database, ejects the tape, and sends a "finished with tape" response back to the Tape Controller CSU. Note: the Tape Controller CSU is responsible for returning the tape to the appropriate Jukebox bin and initiating other recording requests (i.e., the Data Recording CSU is controlled by the Tape Controller CSU).

Upon completion of data recording on a tape, the Data Recording CSU updates the Tape Information Database that resides in the ORACLE database and includes tape ID, recording start date/time, recording stop date/time, tape location, and write access permissions. This information is kept for all tapes residing within the jukebox or extracted from the jukebox.

Data Replay CSU

The Data Replay CSU provides sequential replay of audio data, video data, radar scan data, radar track data, vessel data, vessel alarms, and all VTS messages. Data is obtained by issuing a Tape Read Request to the Tape Driver. Data thus obtained from tape is written to one of two temporary disk files. Two temporary disk files are used to facilitate a double-buffering scheme for replaying data.

In the future, it is planned for the sensor data to be provided to the Data Distribution CSC. Audio data, video data, and radar scan data may be placed in parallel replay acquisition buffers. Radar track data and alarms may be placed in parallel replay track and alarm data tables, and the vessel data may be placed in a parallel replay section of the ORACLE database.

Tape Processing CSU

The Tape Processing CSU provides the interface between the helical scan recorder tape drives and both the Data Recording and Data Replay CSUs. All tape drive control commands are received by the Tape Processing CSU, processed, and then the specific helical scan recorder tape drive function (or functions) is performed. A status response is then returned to the initiating CSU.

CSCI Data Files

This following subparagraphs contain descriptions of each of the shared data files of this CSCI.

Data File to CSC/CSU Cross Reference

| Data File | Data File Users |
|---|---|
| ORACLE Database | Command and Control CSC |
| | Command/Response Processing CSU |
| | Monitor Sensors CSU |
| | Message Logging CSU |
| | System Performance Logging CSU |
| | Data Distribution CSC |
| | Character Inserter CSU |
| | Video Switcher CSU |
| | Track Processing CSC |
| | Estimated Position Processing Sub-level CSC |
| | EP Route Processing CSU |
| | Automatic Vessel Reassignment CSU |
| | Track Data Correlation Sub-level CSC |
| | Overlap Area Monitoring CSU |
| | Correlated Position Estimation CSU |
| | Locate Duplicate Tracks CSU |
| | Automatic Radar Handoff CSU |
| | Alarms Processing Sub-level CSC |
| | Traffic Lane Monitoring CSU |
| | Stationary Zone Monitoring CSU |
| | Moving Zone Monitoring CSU |
| | Collision Monitoring CSU |
| | Excessive Speed Monitoring CSU |
| | Target Acquisition CSU |
| | Sector Monitoring CSU |
| | Radar Calibration CSU |
| | Record and Replay CSC |

-continued

| Data File | Data File Users |
|---|---|
| Long Term History | Tape Information Tracking CSU<br>Record and Replay CSC<br>Data Recording CSU<br>Data Replay CSU |

ORACLE Database

The ORACLE Database is accessed by this CSCI using a structured query language. Information residing in the ORACLE Database that is used by this CSCI includes: system configuration data, tape tracking data, video data, vessel data, alarm data, and VTS error and system performance logs.

Long Term History

Long Term History files are recorded onto and replayed from multiple 8 millimeter tapes. Tape recording and replay is performed with sequential access methods using record sizes dependent upon the data volume requiring recording.

Database Software Overview

The Database Software CSCI is responsible for database design, report processing, vessel identification processing, database synchronization and recovery, database archive and restore, and performance tuning of the Oracle database.

DBS interfaces with the SDS and ODS CSCIs are primarily through embedded SQL calls to Oracle tables. Since these calls are a part of the SDS and ODS software, the DBS role is a passive one—limited to providing appropriate table designs. The ODS CSCI also invokes DBS forms and the DBS main menu and gains access to all DBS menus, forms, and reports. The DBS role, as mentioned earlier, is a passive one because these calls can also be made from the Unix command line.

There are three external interfaces that directly involve DBS software. One of these involves the radar configuration form. When radar configuration data is modified, DBS communicates the change to SDS through a C user exit. The other two involve the vessel ID and search screens. ODS calls a C program that invokes the vessel search form and returns status information. When a vessel is selected, the vessel search form calls a C user exit that updates the Tactical Database Manager (TDBM)

The DBS provides the following capabilities:

Database mirroring, shutdown, and recovery. Redundant disk and processor configurations to minimize database server downtime. The DBS performs UPS/VTS shutdown processing based on an input from SDS.

Non-Map definition storage is provided by the DBS for all ODS display consoles.

Maintenance screens are provided for the transit movement database.

System configuration definition is maintained in the ORACLE database.

User access definition is provided for authorization, security control and classification of users.

The traffic summary report provides traffic movement information.

Log Recording and detail report data support.

Ad Hoc Query for casual reporting requirements and extraction of data in special formats for further processing.

On-line Built-in-test functions for ensuring operability and performance monitoring for troubleshooting.

Printer output for all ODS display and all other VTS printed reports.

CSCI Architecture

The DBS architecture utilizes the ORACLE Relational Database Management System. It is derived from a methodology that is well- suited for ORACLE and the associated development tools.

The logical database design is the central focus of DBS architecture. It is the basis for most of the CSUs in the subsystem. Physical database design and performance tuning is conducted after CSU development and data conversion. Tasks and CSUs required for operational support are also addressed. This CSCI contains the following CSC's:

SQL*MENU CSC
SQL*FORMS CSC
C&PRO*C CSC
Data Conversion CSC
Operational Support CSC Methodology The application development methodology used for DBS is data-driven and predicated on the use of Oracle 4GL development tools, including SQL*Forms, SQL*Menu, Pro*C, and SQL*Loader. It entails logical database design, application design and development, data conversion, and physical database design.

Logical database design starts with a study of both data and processes. The goal is to identify and define entities and attributes. A preliminary implementation of the application database is done by creating a table for each entity, where each attribute becomes a column.

The definition of entities is a prerequisite for application design using SQL*Forms. This is because a form contains one or more blocks, where each block is based on a table. SQL*Menu is used to tie together SQL*Forms modules and provide user-based access privileges to both menus and forms. SQL and PL/SQL scripts are used for simple processing and report generation. When more complex logic is required, C and Pro*C functions are used.

SQL*Loader is used for data conversion involving large volumes. Code tables are loaded using SQL*Forms modules.

Physical database design involves the definition of indexes and space management. This is done during performance tuning which includes both application and Oracle kernel tuning.

Logical Database Design

Logical database design involves the identification and definition of entities and attributes. An entity is an abstraction of interest to the application. An attribute is a fact about an entity.

While studying the data and processes of the application, the rules of data normalization are applied to the entities initially identified. In theory, an entity relationship model (logical database design) is complete when it is in fifth normal form. Since such a high degree of normalization is never practical due to performance reasons, the database is de- normalized during performance tuning.

This entails substantial modifications to SQL*Forms modules, which are table-based. To avoid this re-work, it is more practical to leave the database in second or third normal form. A database is in third normal form when each attribute is a fact about the complete concatenated key.

Application Modules

DBS application modules are written in SQL*Forms, SQL*Menu, SQL, PL/SQL, C, and Pro*C. SQL*Forms provides full-screen access to VTS tables, including a powerful ad-hoc capability. SQL is used for simple reports and batch-processing. PL/SQL is used for more complex processing and for triggers in SQL*Forms. Pro*C functions are used for user exits in SQL*Forms, and for reports and processing that are beyond the capabilities of SQL and PL/SQL. C functions are used to provide bridges between DBS modules and the ODS/SDS subsystems. SQL*Menu ties the DBS modules together and provides secured access to VTS users.

SQL*Forms provides default I/O and query capabilities for each block in a form. The query capabilities in particular are very powerful and would take many person-years of effort to duplicate in a custom application. To avail of these default capabilities, it is necessary to adhere to the block-based structure of SQL*Forms. In practice, this requires some stringent design and layout restrictions. Very seldom do these restrictions constrain the functionality of an application. In those rare cases where they do, it is more economical to use Pro*C instead of SQL*Forms, rather than try to circumvent them. In the DBS subsystem, all modules that involve screen I/O are written in SQL*Forms.

SQL*Menu provides a consistent and easy-to-develop means of tying together the DBS modules. It also provides a layer of security at the application level, in addition to that implemented at the database level. Depending on the user's access level, the contents of a menu can be dynamically changed at run-time.

SQL is the standard interface to an RDBMS. PL/SQL introduces procedural capabilities in SQL, which is non-procedural by design. Pro*C allows SQL to be embedded in C functions. All of these tools are used in developing DBS modules.

Data Conversion

Data from the Marine Safety Management System is used for the initial load of vessel information. This data is obtained in flat files and loaded into Oracle tables using SQL*Loader.

DBS also uses several code tables to validate input data. These tables contain small volumes of data. Both SQL*Loader and SQL*Forms modules are used to load this data.

Physical Database Design

Physical Database Design involves the definition of indexes and space management. It is done during performance tuning, which includes both application and Oracle kernel tuning.

Data volume estimates are compiled and reviewed for each of the logical tables. Application modules and SQL statements are reviewed to define transactions and usage frequencies. This information is the basis for denormalization, clustering, index definition, block organization, data and index segment definitions, and tablespace and data file definitions.

Application tuning is focused primarily on the construction of SQL statements so that the use and non-use of indexes is deliberate. The wording of an SQL statement can cause the query optimizer to follow different access paths. Application tuning also involves array processing, cursor management, and transaction definition.

Oracle database tuning entails the management of kernel parameters to ensure optimal through-put for all applications. Optimization involves efforts in the following areas: data buffer cache, dictionary cache, rollback segments, redo logs, disk drive contention, sorts, free lists, checkpoints, and init.ora parameters such as sessions, processes, transactions, Data Manipulation Locks, Data Definition Locks, etc.

Operations Support

This category includes activities that are critical to DBS performance. This includes shutdown processing, database processor shadowing, printer output, and built in test.

System States and Modes

The Database Software supports operation in both live and data simulation modes. The live mode supports continuous uninterrupted system operation, including: configuration updates, log information, vessel information, shutdown processing, hardcopy display prints, and built in test. The live mode provides for reports and data administration.

Memory and Processing Time Allocation

There are two DBPs. Each DBP has 96 megabytes, in the current implementation expandable up to 384 Mbytes, of memory to perform system, DBS, and other operations. DBS program processes share application memory with the SDS track processes and the Government Off The Shelf (GOTS) TDBM server executing on the DBP.

CSCI Design Description

The DBS CSCI is divided into five CSCs. The following sections describe each of these components.

SQL*Menu CSC

The DBS menus are written in SQL*Menu. They provide access to all DBS forms and reports. Based upon a user's access level, the same menu may show a different set of selections.

SQL*Forms CSC

A form provides access to one or more tables. There will be, at a minimum, one form designed for each table residing on the DBP for the purpose of maintaining the data contained in that table. As a result, even when a table is expected to be accessed only through SDS or ODS software, a default form will still be provided.

C & Pro*C CSC

These modules represent functions written in C or Pro*C. This includes user exits called from SQL*Forms, bridge functions used to call SQL*Forms from ODS, and reports programs.

Data Conversion CSC

This component uses SQL*Loader modules to initially load data from flat files. This includes vessel data and code table information. Where data volumes are small, SQL*Forms screens developed for maintenance are also used for the initial data load.

Operations Support CSC

These modules provide operational support and fulfill one or more DBS requirements. The CSUs included in this component are shutdown processing, database processor shadowing, printer output, built in test, backup/recovery, and archive/restore functionality for vessel ID, vessel transit, remote site equipment status, and VTS error log tables.

Detailed Design

This section defines all computer software units that comprise the DBS subsystem. These units are grouped into five computer software components: menus, forms, C & Pro*C functions, data conversion, and operations support.

General detailed design information includes: input/output data elements, local data elements, interrupts and signal, algorithms, error handling, data conversion, logic flow, data structures, local data files, and limitations. Not all of these items apply to the DBS CSCI. The use of Oracle 4GL tools results in most of this information being standardized and moved from the application to the database, (e.g., interrupts and signals, logic flow, local data files). Consequently, these considerations are covered at the CSU level on an exception basis only. The INP and DMM files generated for forms and menus contain detail information on input/output data elements, edit algorithms, and error handling.

SQL*Menu CSC

The DBS menus are written in SQL*Menu. They provide access to all DBS forms and reports. Based upon a user's access level, the same menu may show a different set of selections.

The DBS main menu is invoked from the Unix command line. It may also be called from the ODS CSCI.

DBS Main Menu CSU

Figure 30:
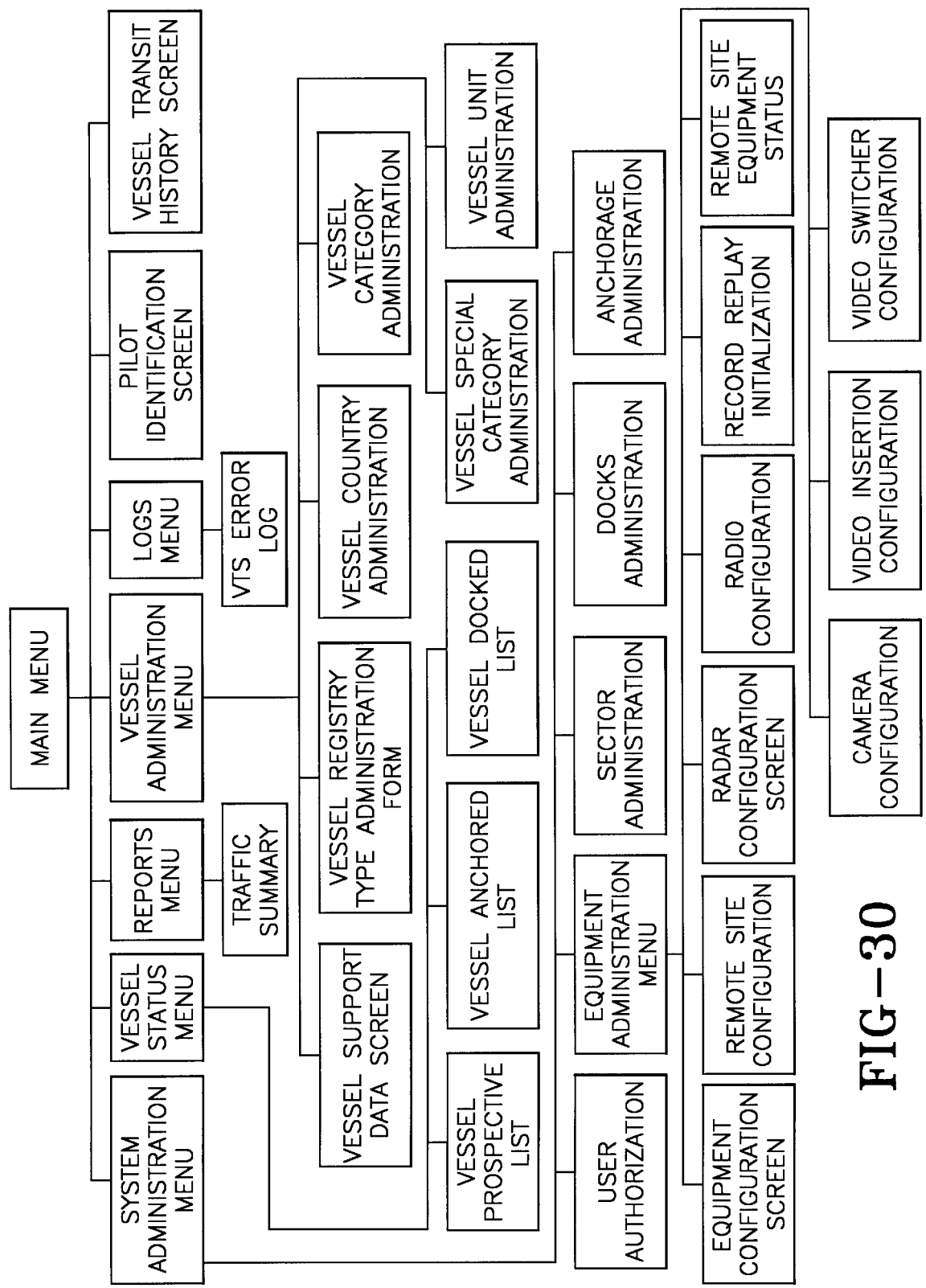
FIG. 30 is the Menu Hierarchy Diagram
Figure 31:
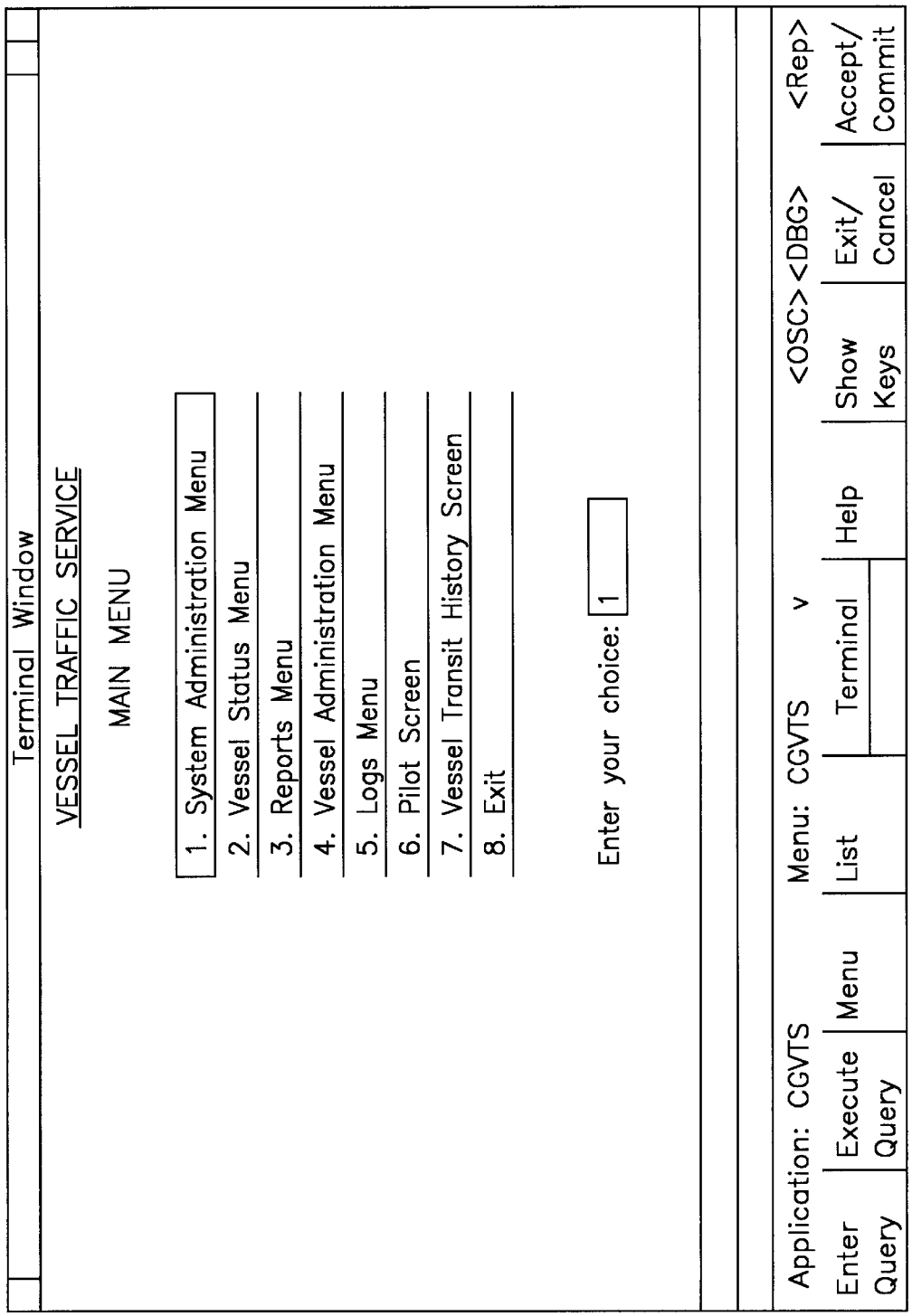
FIG. 31 is the Main Menu

This is the main database menu that is displayed to users when they log into the system. The main menu consists of sub- menus and forms available to the users allowing them to utilize the system. The selections are System Administration Menu, Vessel Status Menu, Reports Menu, Vessel Administration Menu, Pilot Screen, and Vessel Transit History Screen. Refer to FIGS. 30 and 31 for both a flowchart showing what is called from this menu and a picture of the actual menu.

System Administration Menu CSU

Figure 32:
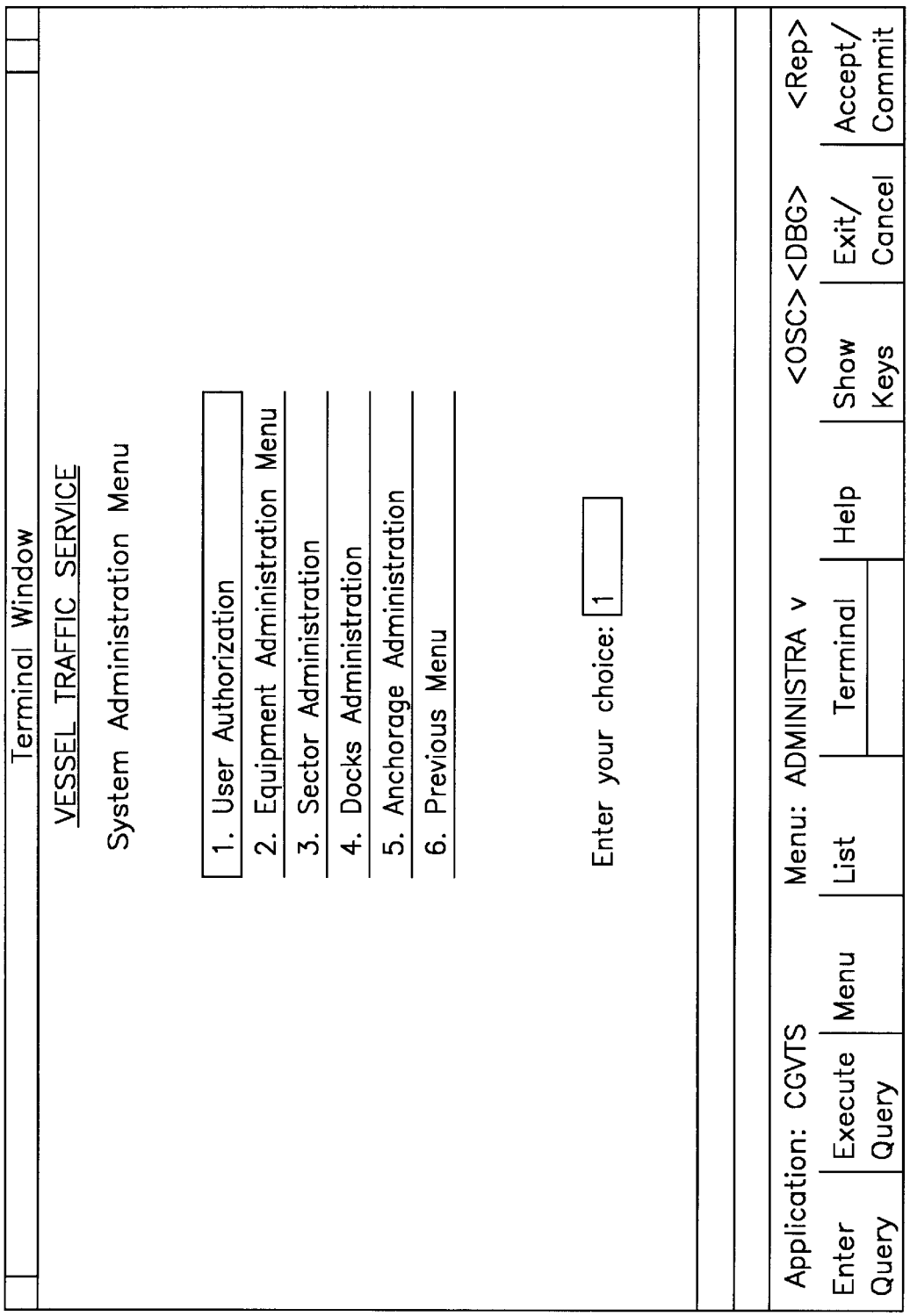
FIG. 32 is the System Administration Menu

This menu is called from the DBS main menu. It consists of selections for the following screens: user authorization, equipment administration, sector administration, docks administration, anchorage administration. Upon selecting an option, the menu transfers control to the corresponding SQL*Forms module, which in turn, provides access to an Oracle table. See FIG. 32 for a sample of this menu.

Equipment Administration Menu CSU

This menu is called from the system administration menu. It is used to access the forms that add and maintain the equipment configuration, remote site configuration, radar configuration, radio configuration, record replay configuration, remote site equipment status, camera configuration, video insertion configuration, and video switcher configuration. Upon selecting an option the menu transfers control to the corresponding SQL*Forms module, which, in turn, provides access to an Oracle table. See FIG. 33 for a sample of this menu.

Vessel Status Menu CSU

This menu is called from the main menu. It consists of selections for the anchored list, docked list, and prospective list forms, and for previous menu. After a list selection is made the appropriate SQL*Forms screen is presented. See FIG. 34 for a picture of the menu screen.

Report Menu CSU

Figure 35:
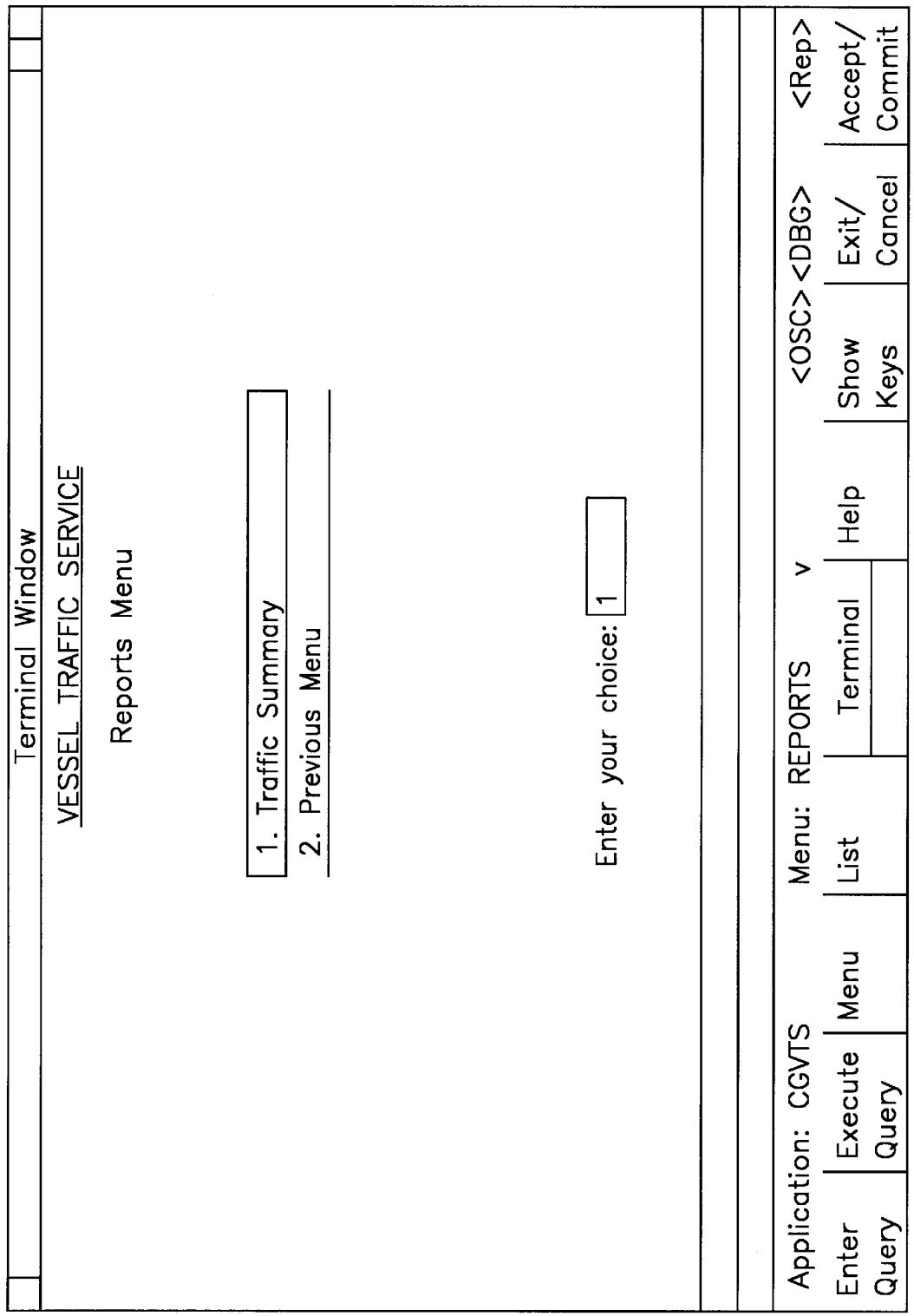
FIG. 35 is the Reports Menu

This menu is called from the DBS main menu. It consists of selections for the traffic summary reports. Upon making a selection, a SQL*Forms screen is presented to obtain parameters for the selected report. See FIG. 35 for a sample of this menu.

Vessel Administration Menu CSU

This menu is called from the DBS main menu. It consists of selections for the vessel support data screen, registry type, country, category, special category, and units. Upon selecting any of these options, the menu transfers control to the corresponding SQL*Forms module, which in turn, provides access to an Oracle table. While working with the support data screen, the screens are also accessible as pop-up windows. See FIG. 36 for a sample of this menu.

Logs Menu CSU

Figure 37:
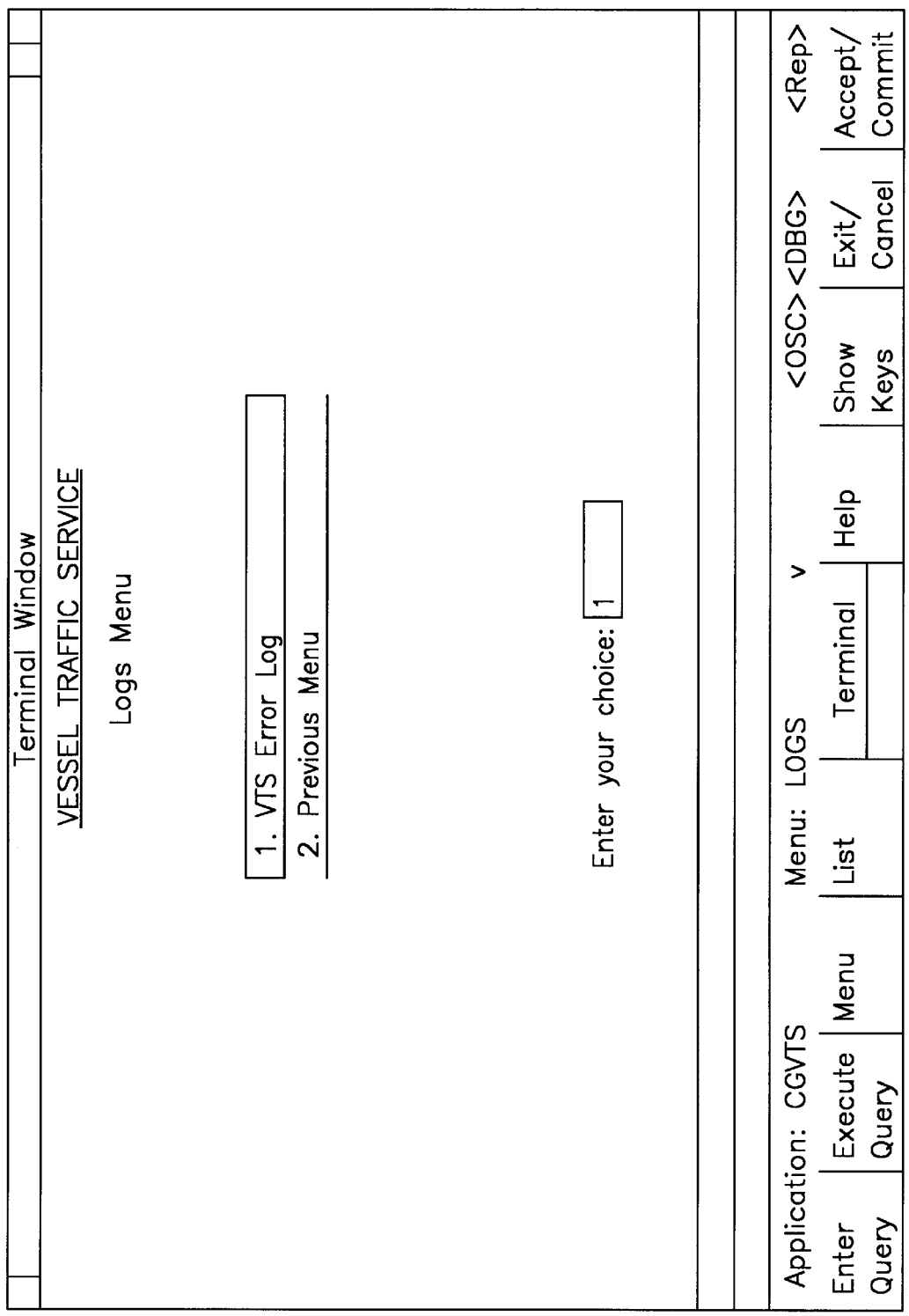
FIG. 37 is the Logs Menu

This menu is called from the DBS main menu. It consists of the VTS error log. Upon selecting an option, the menu transfers control to the corresponding SQL*Forms module, which, in turn, provides access to an Oracle table. See FIG. 37 for a sample of this menu.

SQL*Forms CSC

A form provides access to one or more tables. There usually will be at least one form designed for each table residing on the DBP for the purpose of maintaining the data contained in that table. Some tables are actively used and maintained by ODS and SDS. These tables have no form created for them unless the user needs to see the information in the table.

User Authorization CSU

This form is called from the system administration menu. It is used by the administrator for enrolling new users, granting privileges, deleting users, and revoking privileges. This data is stored in the cgvts_auth table. See FIG. 38 for a sample of this screen.

Sector Administration

The sector administration form is used to configure the system. The sectors are set up and associated with remote sites. A copy of this screen is in FIG. 39.

Docks CSU

Figure 40:
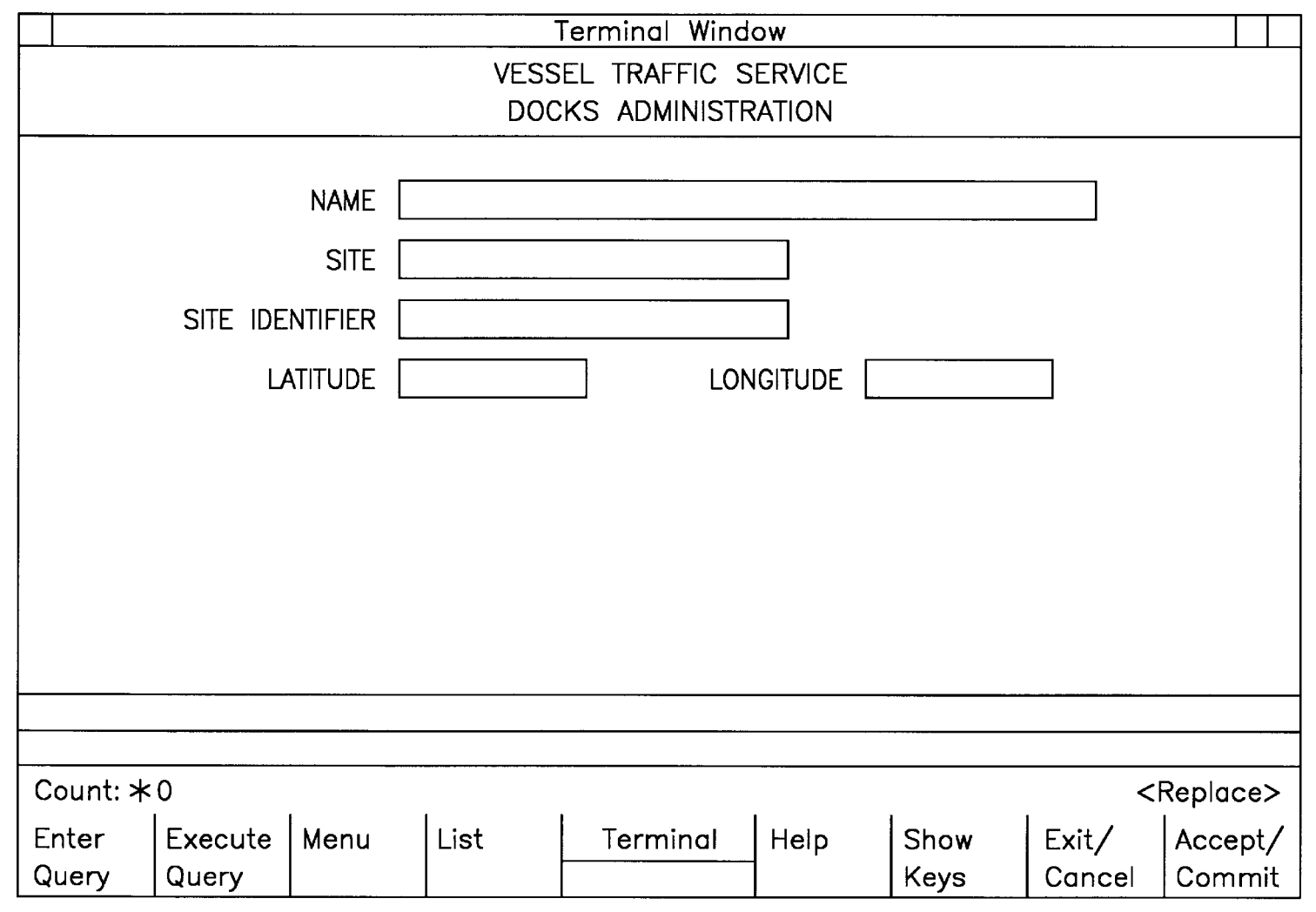

This form is used to access and update the docks table. The 15 table contains all valid dock locations. The form can be accessed from the docks administration menu. See FIG. 40 for a sample of this screen.

Anchorage CSU

This form is used to access and update the anchor table. The table contains all valid anchor locations. The form can be accessed from the anchorage administration menu. See FIG. 41 for a sample of this screen.

Equipment Configuration CSU

This form is called from the equipment configuration menu. It allows the user to query and maintain the equipment_config table. See FIG. 42 for a sample of this screen.

Remote Site Configuration CSU

This form is called from the system administration menu. It is used to maintain the configuration of remote sites. The form is used to query, add, and modify data in the remote_site table. See FIG. 43 for a sample of this screen.

Radar Configuration CSU

This is a 2 page form and is called from the equipment configuration menu and allows the user to query and update the radar configuration data. This form is only used by the system administrator. This data is stored in the radar_config table. See FIGS. 44 and 45 for a sample of this form.

Radar Set CSU

This form is called from GOTS and allows the user to query and update the radar operation data. This data is stored in the radar_config table. See FIG. 46 for a sample of this form.

Radio Configuration CSU

This form, called from the equipment administration menu, is used to configure, monitor, and maintain the configuration of the radio equipment. It is used to query, add, and modify data in the radio_config table. See FIG. 47 for a sample of this screen.

Record/Replay Initialization CSU

This form allows for the input of initial states or checking of the helical scan recorder tape jukebox and the helical scan recorder tape units 1 through 4 and setting the paths for record and replay. See FIG. 48 for a sample of this screen.

Remote Site Equipment Status CSU

Figure 49:
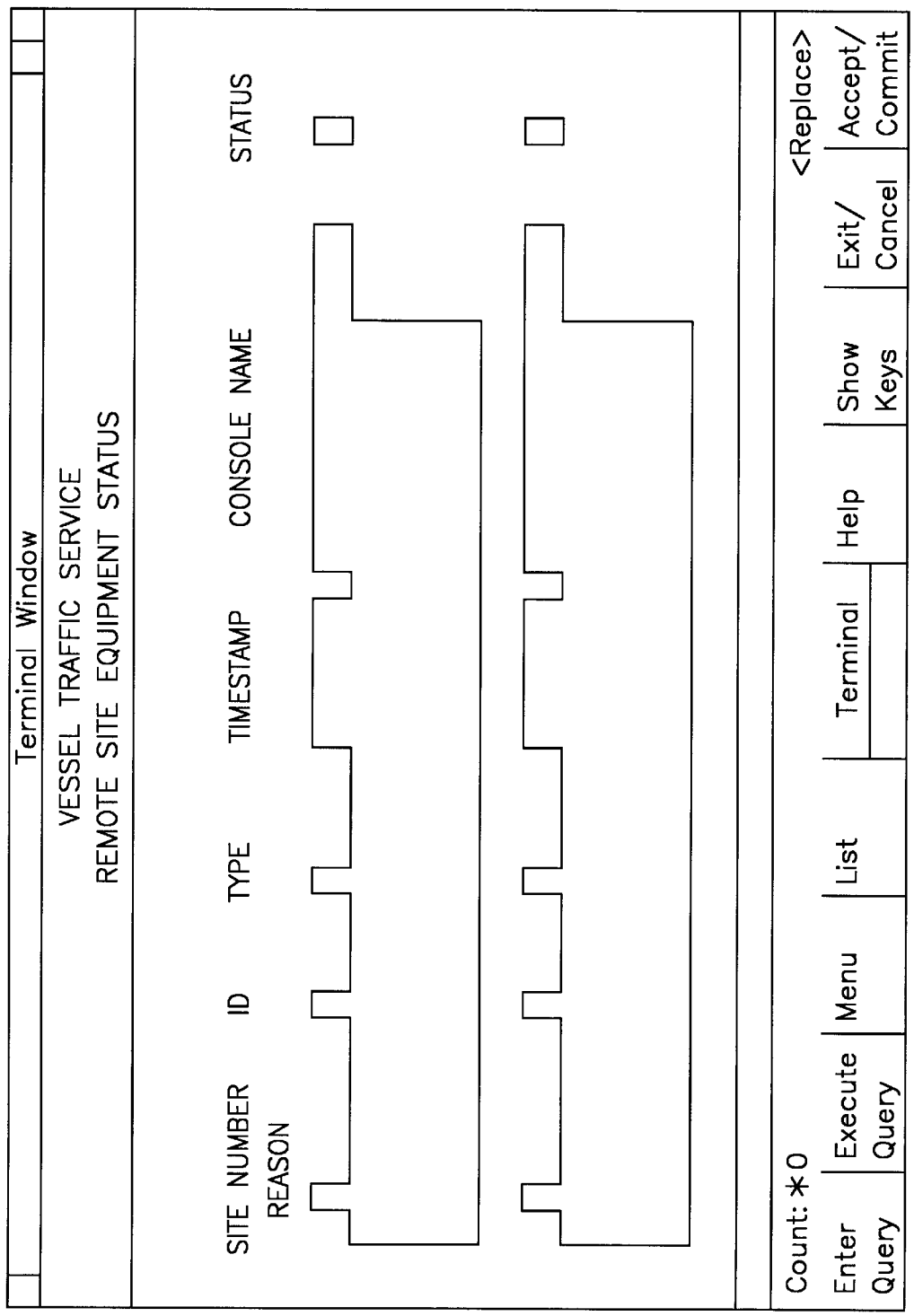
FIG. 49 is the Remote Site Equipment Status Form
Figure 59:
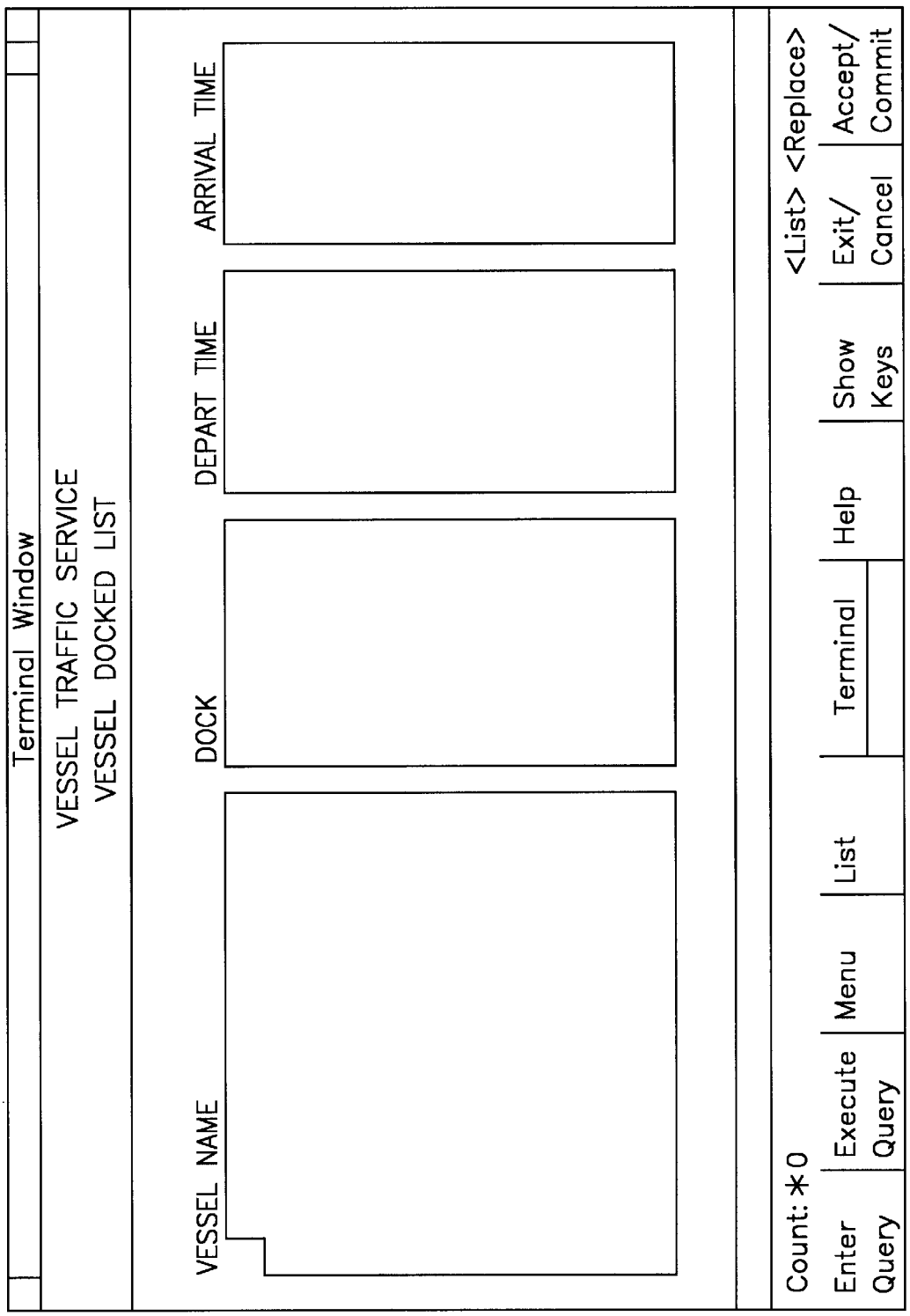
FIG. 59 is the Docked List Form—A

This form allows for checking the status of the remote site equipment. This form interfaces with the remote_site_equipment_status table. The information in this table is inserted and maintained by the SDS. See FIG. 49 for a sample of this screen.

Camera Configuration CSU

This form is called from equipment configuration menu. It is used to query and update the information in the camera_config table. See FIG. 50 for a sample of this screen.

Video Insertion Configuration CSU

This form, called from the equipment administration menu, allows input to set up the configuration of the sites with camera IDs and video channels. This form is used to insert, query, update and delete data from the video_insertion table. See FIG. 51 for a sample of this screen.

Video Switcher Configuration CSU

This form allows for input to the video_switcher_input and video_switcher_output tables and also allow for the configuration of the video switcher. See FIG. 52 for a sample of this screen.

Prospective List CSU

This form is used to access and update the vessel_track table. The form can be accessed either from the vessel status menu or from GOTS. See FIG. 53 for a sample of this screen.

Anchored List CSU

This form is used to access and update the vessel_track table. The form can be accessed either from the vessel status menu or from GOTS. This screen is a scrolling screen. The right half of the screen changes to view or enter information giving the appearance of 5 screens. See FIGS. 54, 55, 56, 57 and 58 for samples of this screen.

Docked List CSU

This form is used to access and update the vessel track__ table. The form can be accessed either from the vessel status menu or from GOTS. This screen is a scrolling screen. The right half of the screen changes to view or enter information giving the appearance of 5 screens. See FIGS. 59, 60, 61, 62, and 63 for samples of this screen.

Traffic Summary CSU

The Traffic Summary form, see FIG. 64, is used to enter the time period for the Traffic Summary Report.

Vessel Support Data Screen CSU

This form is used to insert, update, query, and delete all vessel identification and configuration information stored in the vessel__id table. This form is called both from the vessel administration menu and the GOTS vessel data card screen. In addition to the vessel ID table, this form is also responsible for inserts to and deletes from the alternate vessel ID table which tracks old vessel identification information. See FIG. 65 for a sample of this screen.

Vessel Registry Type CSU

Figure 66:
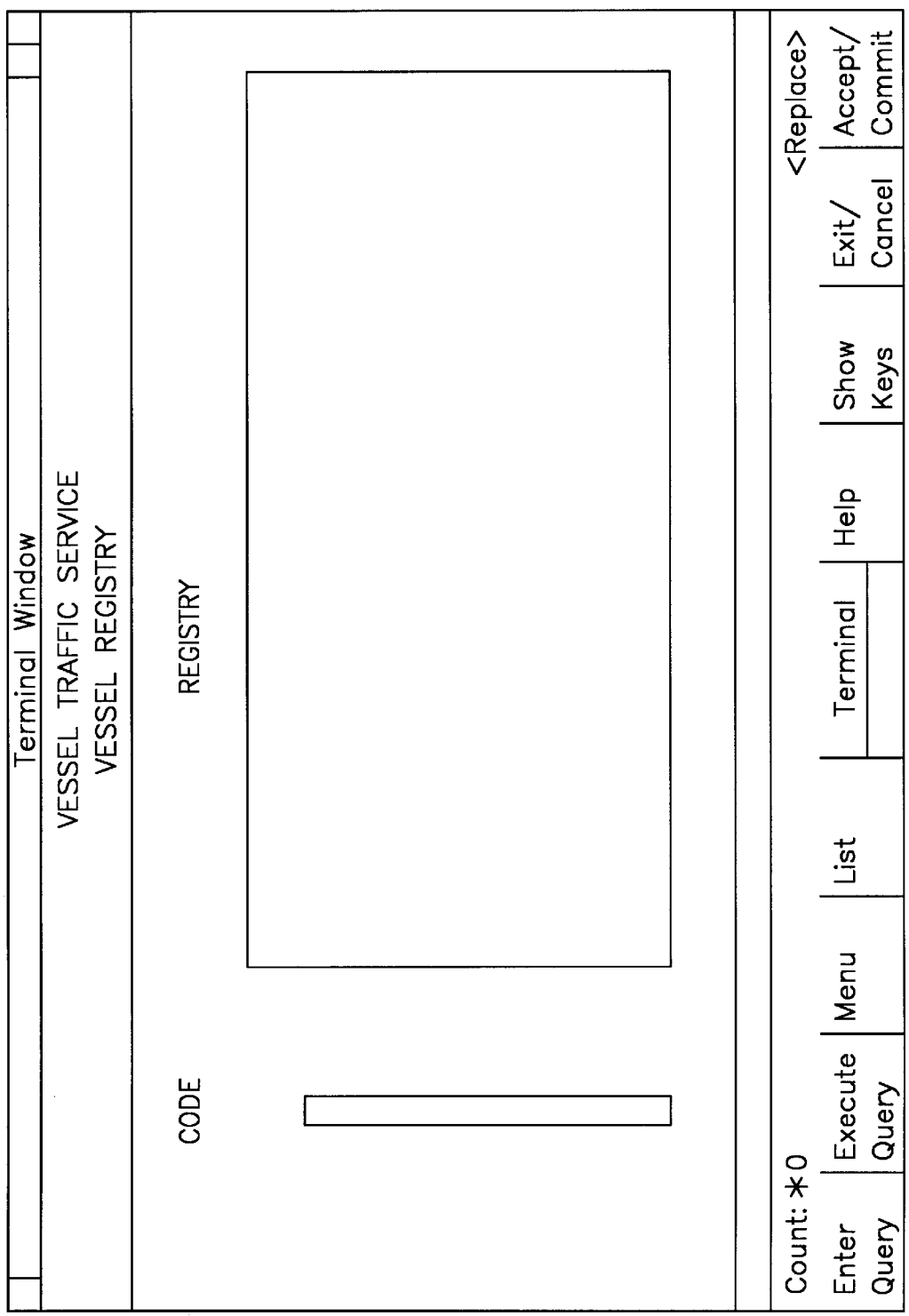
FIG. 66 is the Vessel Registry Type Administration Form

This form is used to access and update the vessel__registry__type table. The table contains all valid vessel registry types. The form can be accessed from the vessel administration menu. See FIG. 66, page for a sample of this screen.

Vessel Country CSU

Figure 67:
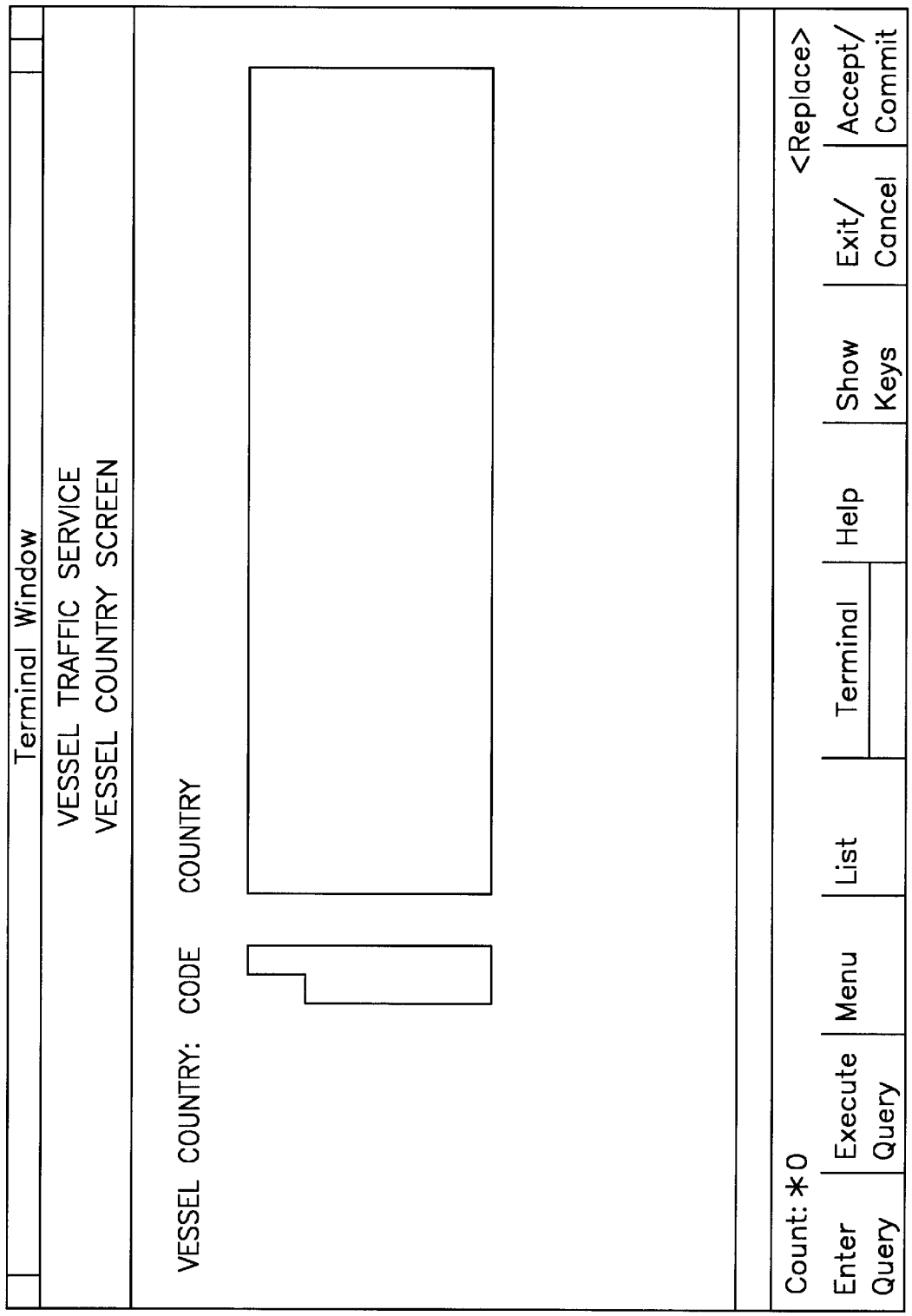
FIG. 67 is the Vessel Country Administration Form

This form is used to access and update the vessel__country table. The table contains all valid vessel country codes. The form can be accessed from the vessel administration menu. See FIG. 67, page for a sample of this screen.

Vessel Category Code CSU

Figure 68:
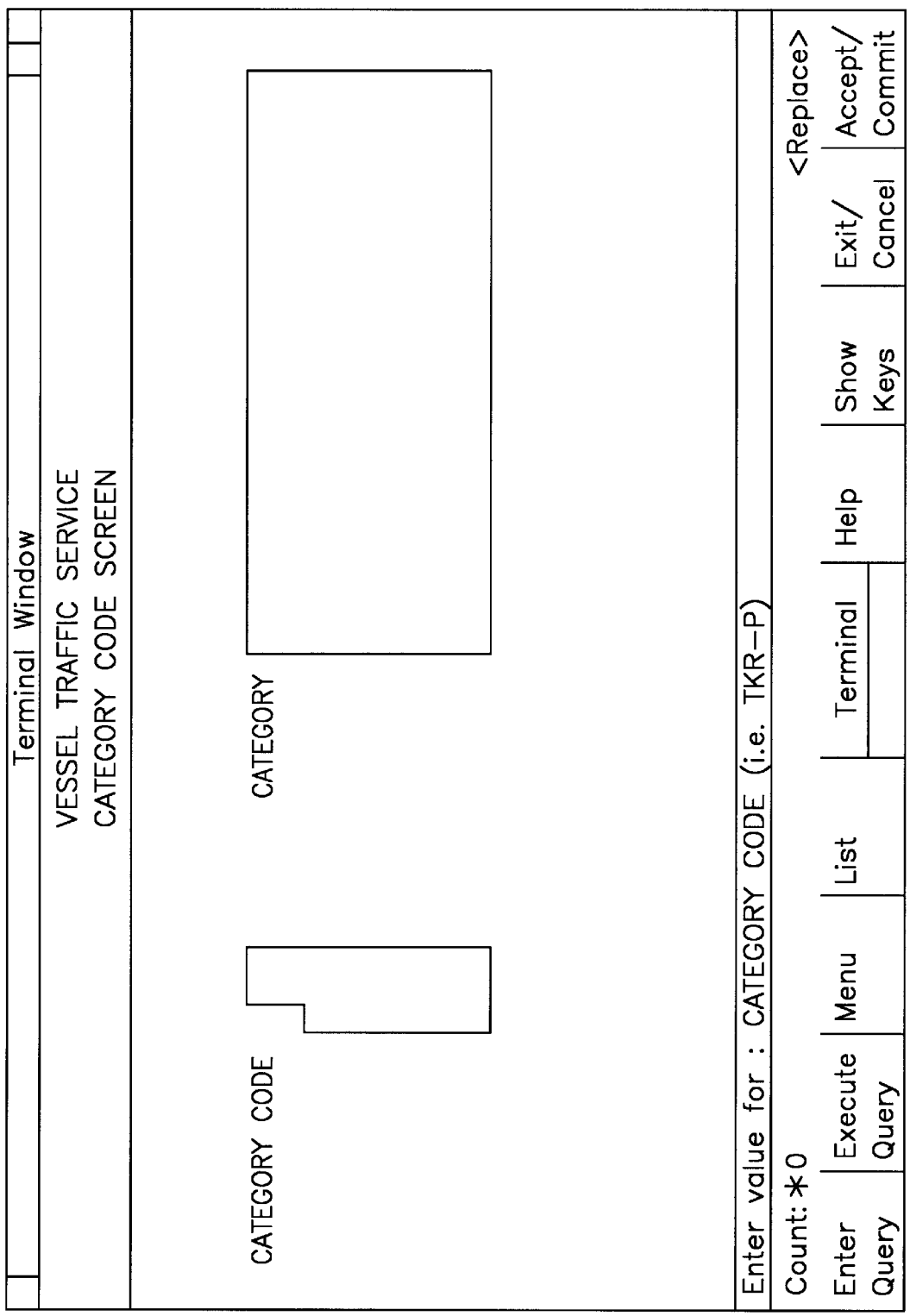
FIG. 68 is the Vessel Category Administration Form

This form is used to access and update the vessel__category__code table. The table contains the valid categories and category codes. This form can be accessed from the vessel administration menu. See FIG. 68, page for a sample of this screen.

Vessel Special Category CSU

Figure 69:
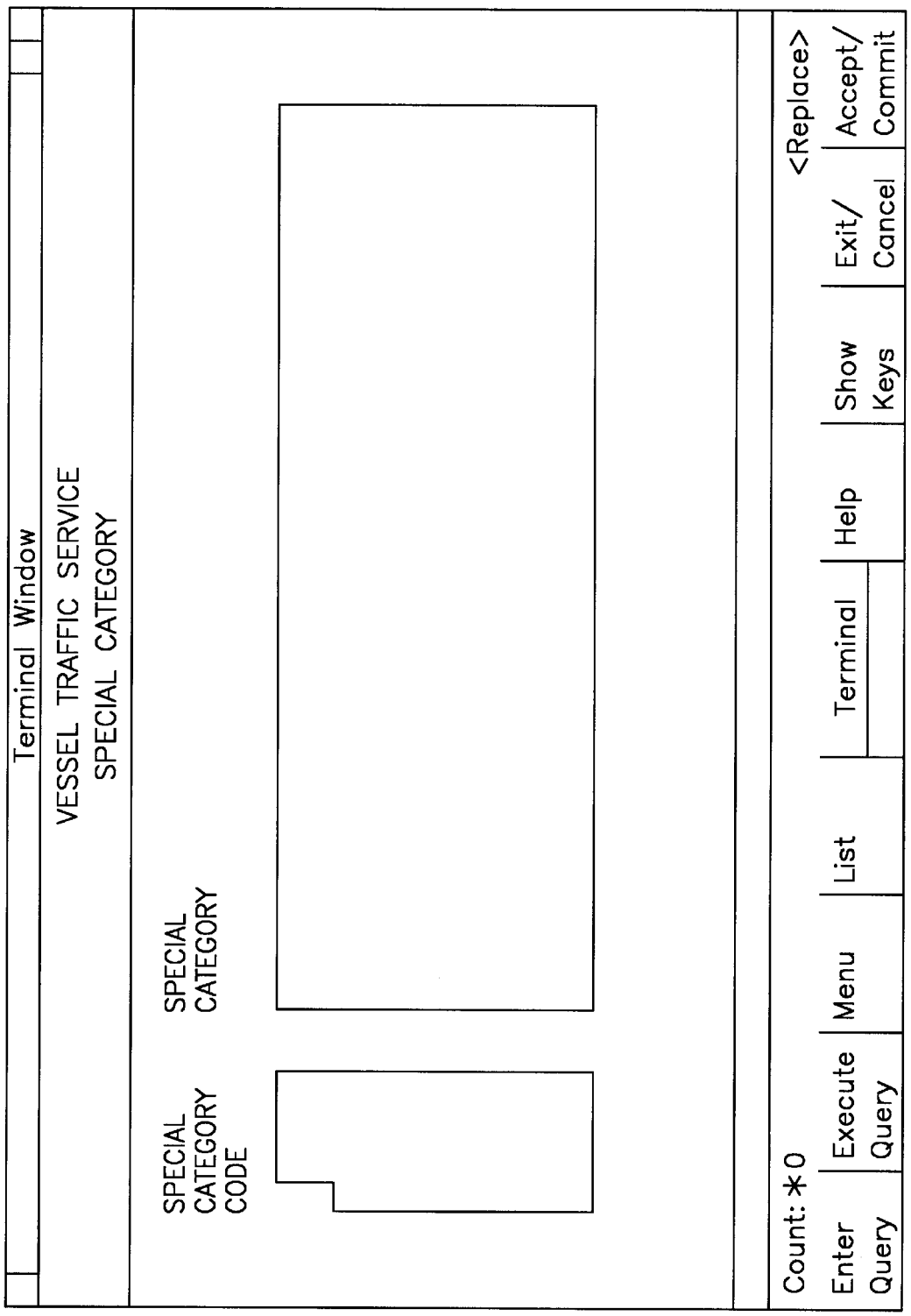
FIG. 69 is the Vessel Special Category Administration Form

This form is used to access and update the vessel__spec__cat table. The table contains all valid vessel registry types. The form can be accessed from the vessel administration menu. See FIG. 69, page for a sample of this screen.

Vessel Units CSU

Figure 70:
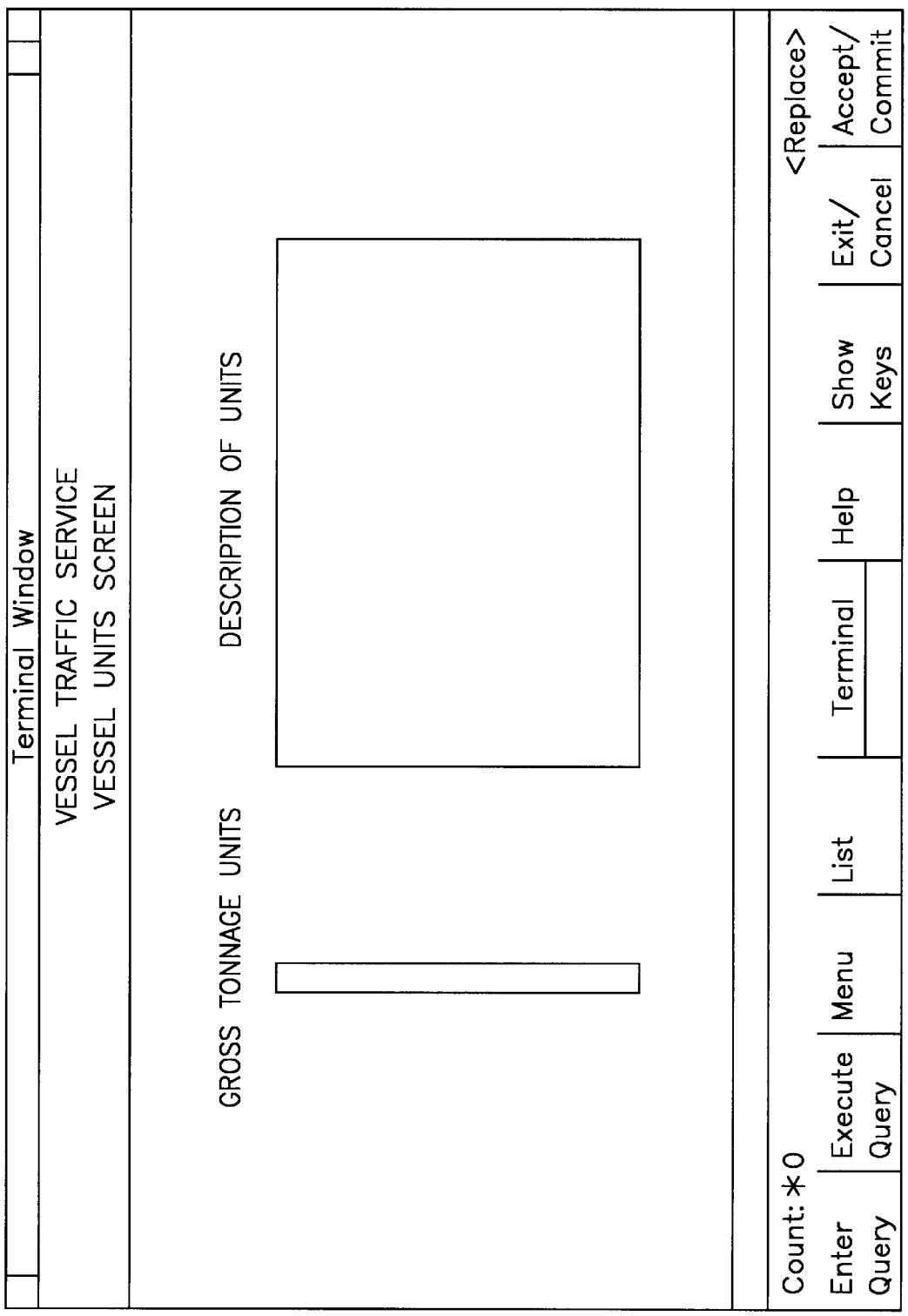
FIG. 70 is the Vessel Units Administration Form

This form is used to access and update the vessel__units table. The table contains all valid vessel tonnage units. The form can be accessed from the vessel administration menu. See FIG. 70, page for a sample of this screen.

VTS Error Log CSU

Figure 71:
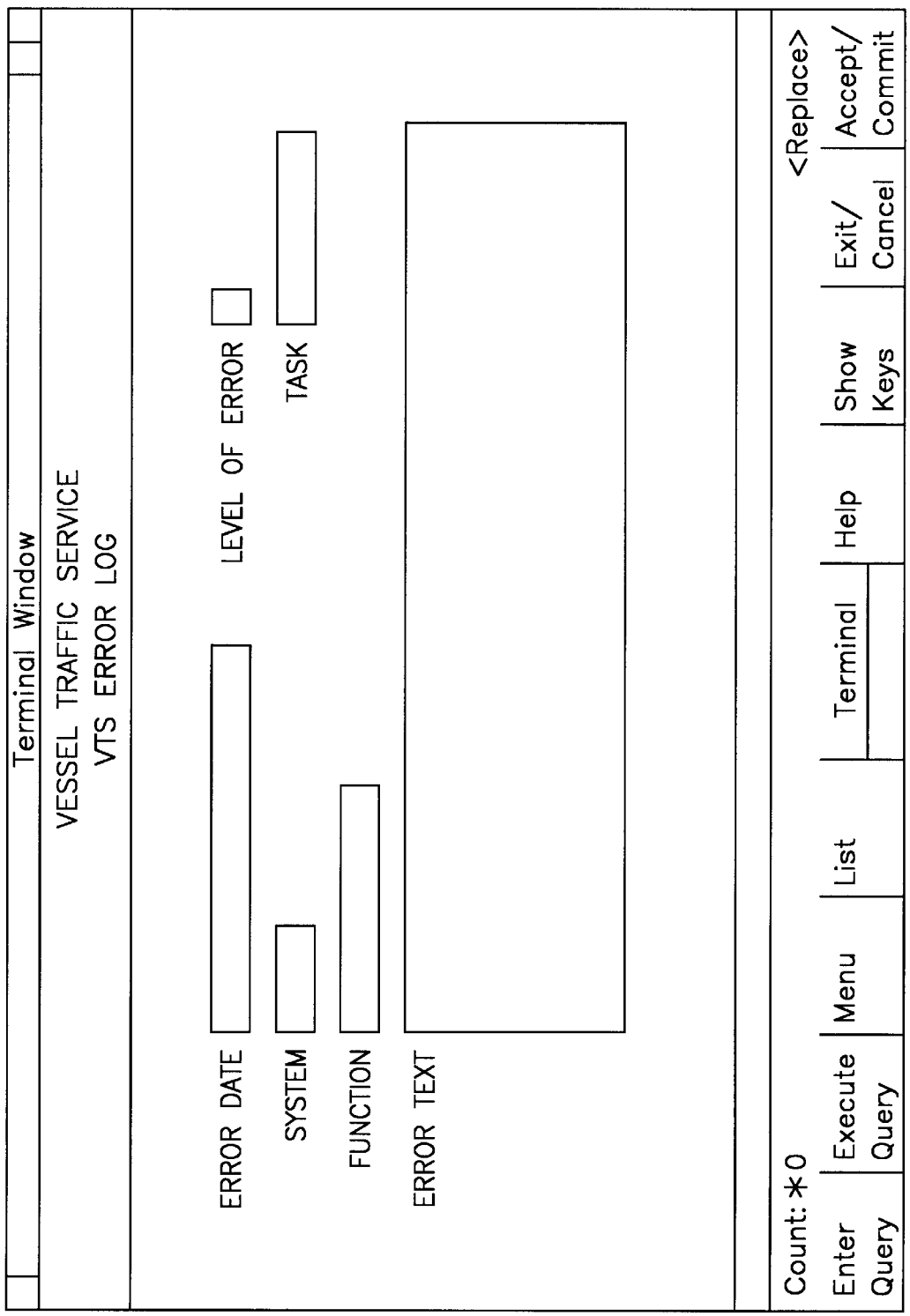
FIG. 71 is the VTS Error Log
Figure 76:
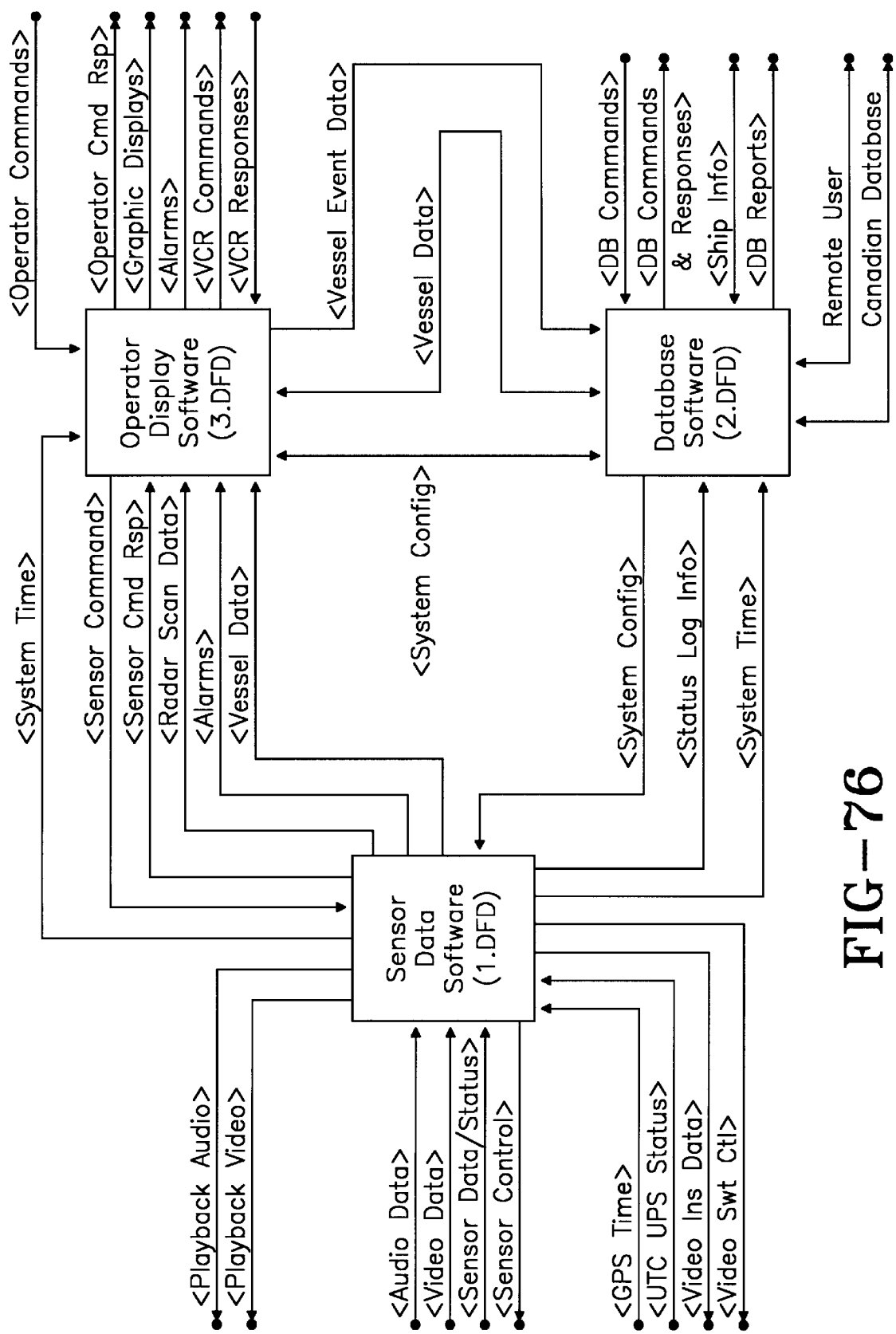
FIG. 76 is the CGVTS Inter-CSCI Data Flow
Figure 77:
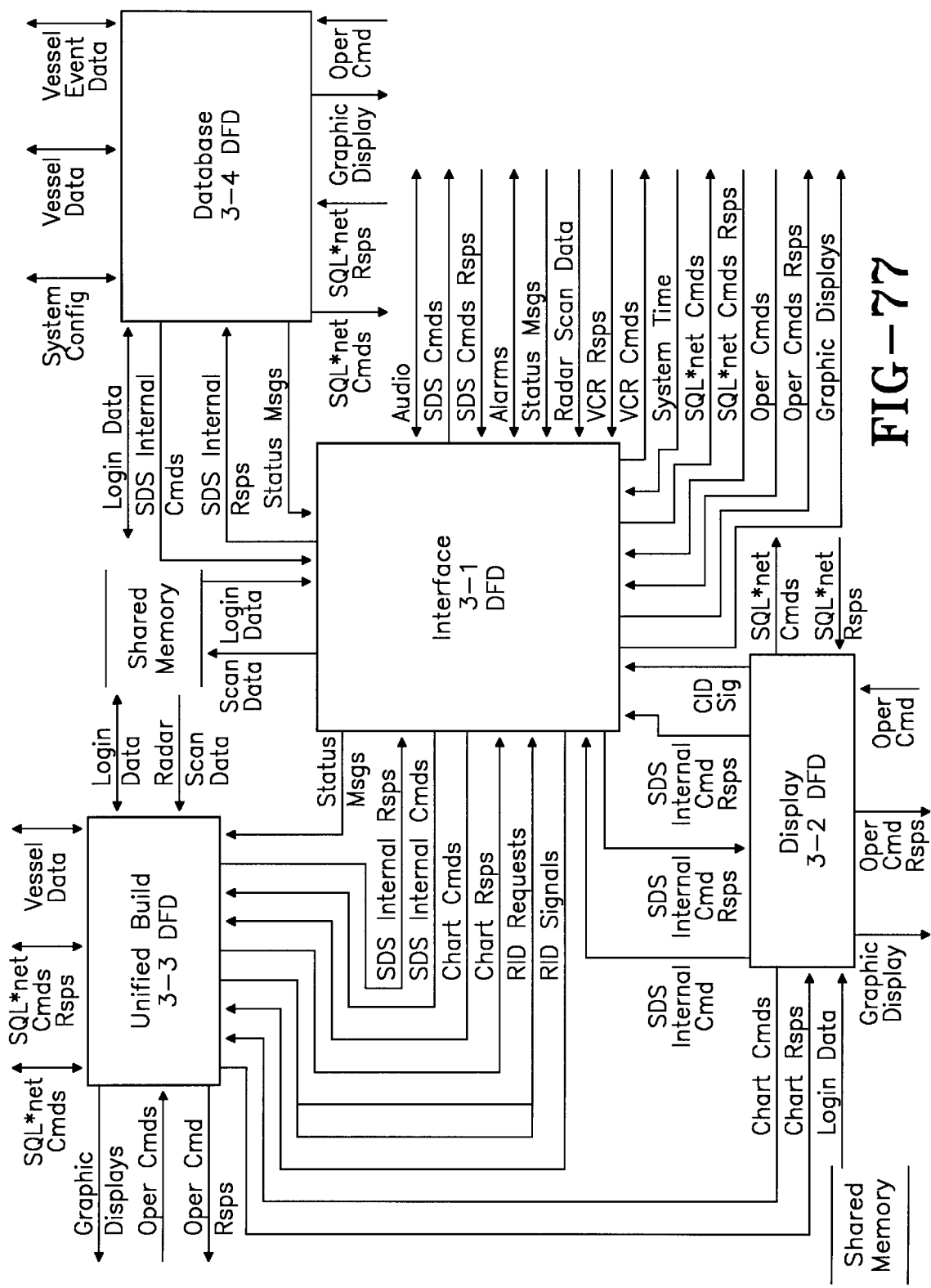
FIG. 77 is the Operator Display Software Intra-CSCI Data Flow

This form, called from the logs menu, allows system errors encountered by the SDS, which have previously been recorded in the VTS Error Log Table, to be queried or purged as required. See FIG. 71, page for a sample of this screen.

Pilot CSU

This form is called from the DBS Main Menu. It is used to query, add, and modify data in the pilot table. See FIG. 72, page for a sample of this screen.

Vessel Transit History CSU

Figure 73:
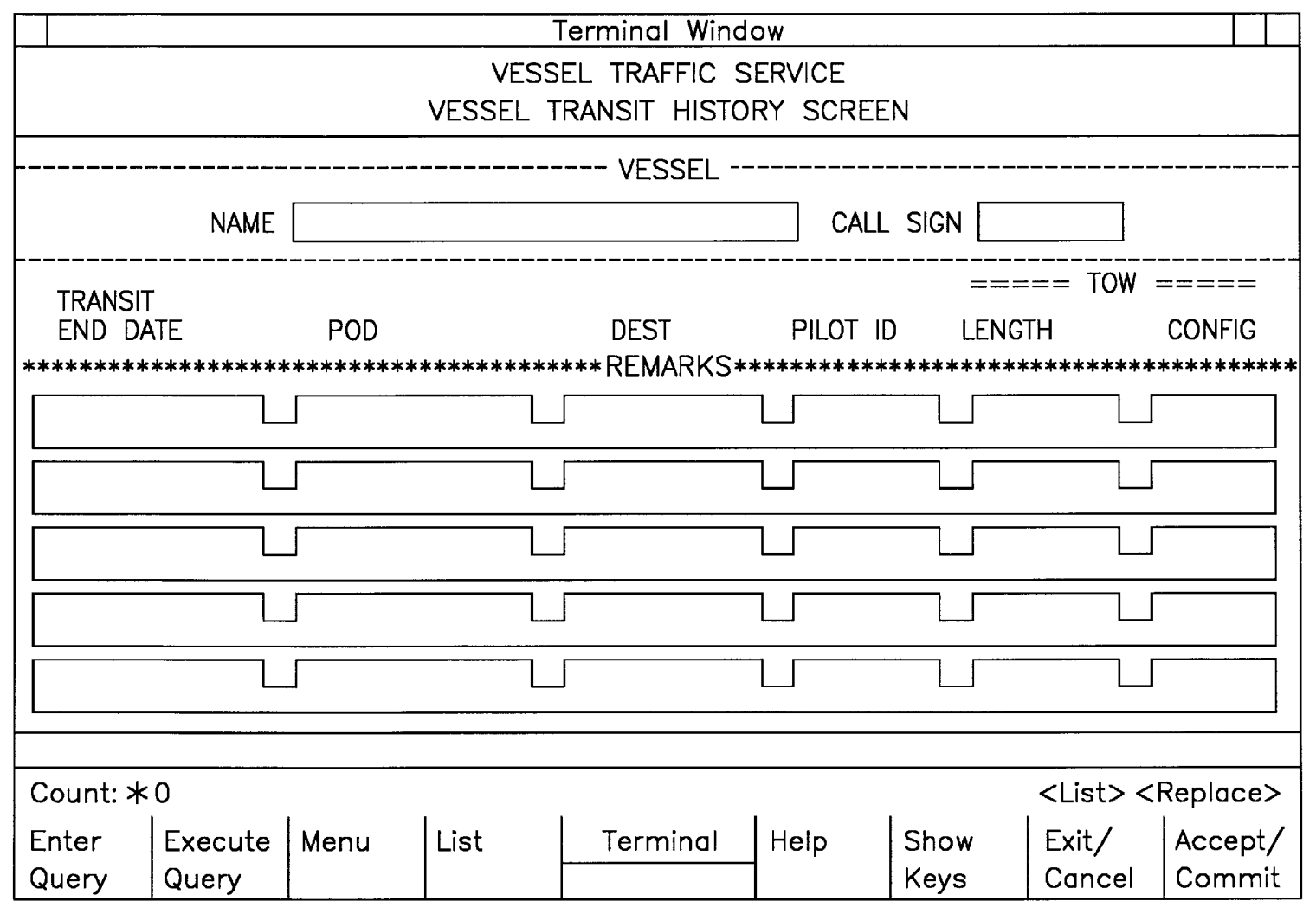

This form is used to query all vessel transit information stored in the vessel__transit table. The vessels are identified by vessel registry number and call sign, which, through the use of the vessel ID table, are further identified by the vessel name. Information as to point of origination, destination, estimated time of arrival, estimated time of departure, configuration of vessel, cargo, etc. are tracked for the transit. This form is accessed from the reports menu only and is used to provide access to the transit history of a vessel. See FIG. 73, page for a sample of this screen.

Identify Vessel CSU

This form, called from the GOTS vessel data card (VDC), is used by the console operator to search the vessel__ID table or prospective list and identify a vessel. If the vessel is not found in the table, the operator may create an unknown temporary vessel id. This is accomplished by using the NEXT key. Once a vessel is selected, the form passed the information to GOTS. See FIG. 74 for a sample of this screen.

C & Pro*C CSC

These modules represent functions written in C or Pro*C. This includes user exits, bridge function, and reports.

Radar Configuration User Exit CSU

This user exit is called from the radar configuration form, once for each radar__config table row that is modified. It calls an ODS function and passes it the site number and radar ID of the modified row. ODS then notifies SDS of the change.

Traffic Summary CSU

This CSU produces the traffic summary report. An example report can be found in FIG. 75, on page. It can be generated for any time period that is valid. The transit movement data in the vessel__transits table are read for the specified time period and the number of transits are summed for each vessel type. The report is executed via a form mentioned earlier in this document. The program that extracts the data and formats the report.is written in C. Pro*C functions are used to execute SQL select statements that extract data from the log tables.

Data Conversion CSC

This component uses SQL*Loader modules to initially load data from flat files. This includes vessel data and code table information. Where data volumes are small, SQL*Forms screens developed for maintenance are also used for the initial data load.

MSMS Initial Load CSU

Data from the Marine Safety Management System is used for the initial load of requested vessel information. This data is obtained in flat files and loaded in to Oracle tables using SQL*Loader.

USCG Data CSU

DBS also uses several code tables to validate input data. These tables contain small volumes of static look up data. When table sizes are small, SQL*forms will be used to manually enter this data, however for larger tables either SQL*Loader or SQL*Forms modules may be used to load this data.

Operations Support CSC

These modules provide operational support and fulfill one or more DBS requirements. They require little or no custom software. The CSUs included in this component are shutdown processing, database processor shadowing, printer output, built in test, archive/restore, and backup/recovery.

Shutdown Processing CSU

Database shutdown is part of the shutdown script for the 15 UNIX system. The command to shutdown the Oracle database is placed in the "/etc/shutdown" directory. Before shutdown begins, a hardcopy listing of vessels currently being tracked by the system is produced. This enables manual tracking of these vessels.

Database Processor Shadowing CSU

To minimize downtime due to equipment failure, redundancy is provided in the database processor and associated disks. The backup processor and disks are maintained under Oracle and TDBM control.

The Oracle redo logs are operated under archive mode on the active database processor. These logs are copied to the shadow processor. The Oracle database on the shadow processor is run in recovery mode, fed by the redo logs from the active processor.

TDBM has a similar built-in feature. The GOTS software senses database processor failure and signals activation of the backup processor. After completing recovery, Oracle is brought up followed by TDBM.

Printer Output CSU

The VTS printer is connected to the database processor. All printer output from both ODS and SDS is directed to this printer via the DBP.

Built in Test CSU

Oracle database and UNIX system performance statistics are accumulated for the DBP. These statistics are used for performance tuning and trouble-shooting. Utility programs supplied with Oracle and Unix can be configured to accumulated and tabulate this information.

Backup and Recovery CSU

A three tier backup scheme is used to provide protection against data loss up to the last committed transaction.

The first level consists of image backups that are performed on a monthly basis or anytime the physical structure of the database is changed. This consists of copying all database files to tape. Recovery from this backup consists of restoring from tape a consistent set of files.

The next level of backup consists of complete exports performed on an hourly basis. The Oracle Export utility is used to make the complete export. Recovery from this backup consists of several steps. First, the tables are dropped from the current database. The export dump file is then imported, without grants and indexes. Index definitions are extracted into a separate SQL script and run after importing the table definitions and data rows. Finally, the SQL scripts containing the public synonym definitions and grants are run.

The third tier backup consists of running redo logs in the archive mode. Recovery from the current redo log is automatically done whenever Oracle is brought up. Recovery from older redo logs requires an image backup. After restoring from the image backup, each redo log file generated since the backup is applied to the database.

CSCI DATA

Detailed descriptions of global data elements within this CSCI are provided in the Interface Design Document. The Oracle DBMS maintains the data described below for use by the ODS and SDS. The following data by category is maintained for the ODS and SDS:

Alarm Defintion Storage

The DBS maintains user defined alarm conditions accessed by SDS at initialization and upon completion of changes or addition of new alarm defintions by the operator.

Configuration Data

The DBS maintains configuration data for the purposes of identifying the display and remote site hardware configuration and user options. These configuration tables are described in the IDD. The ODS creates and maintains these entries. After any modification is made to adapt to real time operating environment, these tables are updated so that in case of system recovery, these configuration settings will be used.

The DBS maintains the number of remote sensor sites for the port. Configuration data for remote sites is maintained in the IDD. The DBS maintains initial configuration data for the video system and video insertion unit.

The DBS indicates the number of workstations, their network addresses, and the initial default radar and sector map display for each ODP.

User Access Definition

The DBS maintains a list of users and provides the ability to create and update the user access information. A password for each user is provided in encrypted form. Users are classified according to authorization level into the following categories:

1. system administrator
2. watch supervisor
3. watch operator
4. external operator Log Recording The DBS maintains a history of log entries. Log entries are classified by log type and the log entry refers to one or more participating vessels. Log entry types supported include: opnotices (in GOTS), VTS error log, and pass down log (in GOTS)

A maintenance function is provided to allow modification, and addition to the log entries. The maintenance function is restricted to only authorized users. An audit history record is kept for each modification.

Operator Display Software Overview

The Operator Display Software (ODS) CSCI is responsible for command and control, map and vessel displays, playback control of recorded sensor data, performing alarm notification, . generating training scenario vessel data, configuration of sensors, maps, operators, and sectors, and monitoring the performance of the Operator Display Processor.

Architecture

The ODS dataflow is shown in Figures 1a and 1b. The ODS CSCI is split into four groups, the ODS Interface, ODS Display, ODS Database, and ODS-Unified Build (UB) CSCs.

Figure 78:
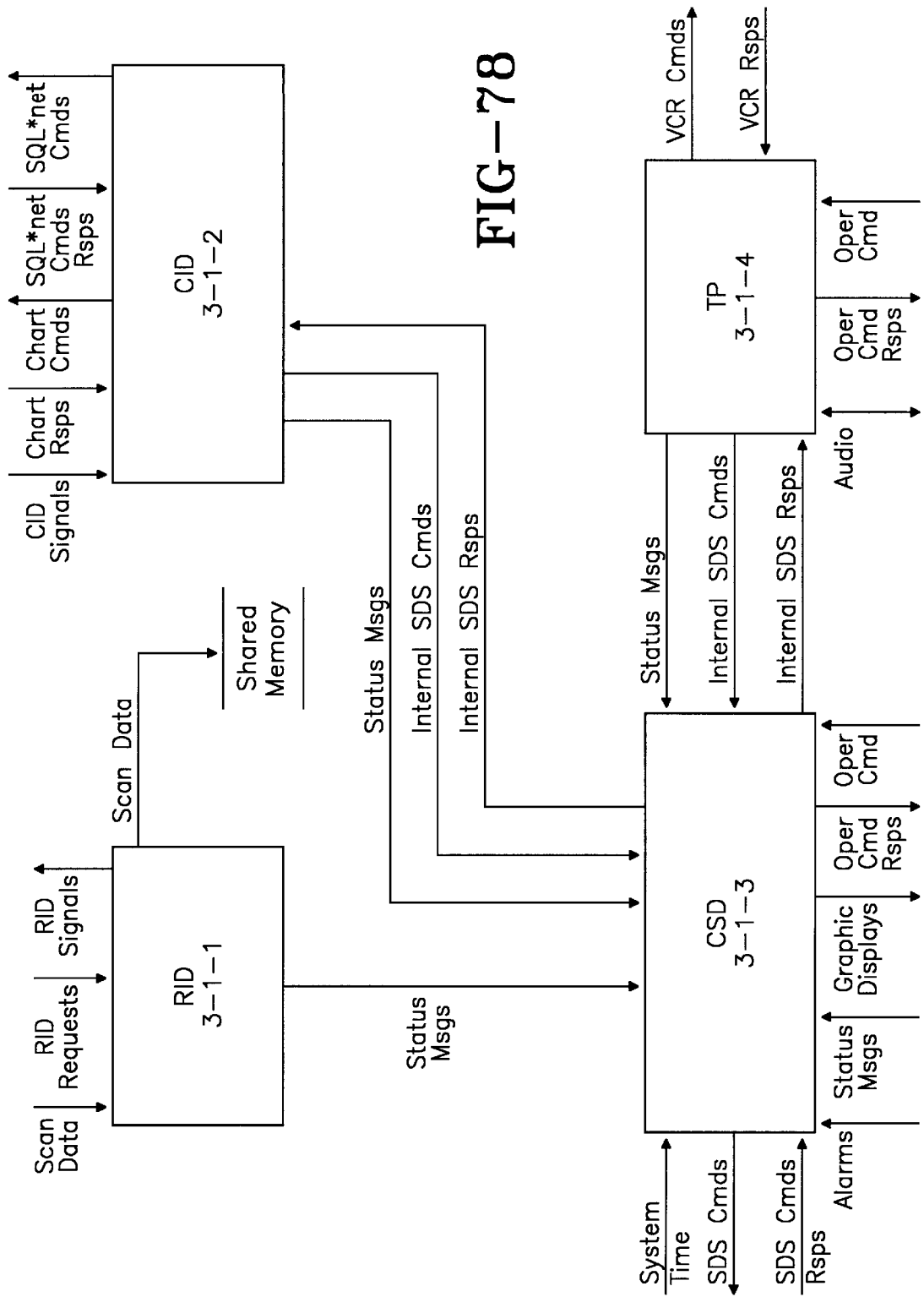
FIG. 78 is the ODS Interface CSC Data Flow
Figure 81:
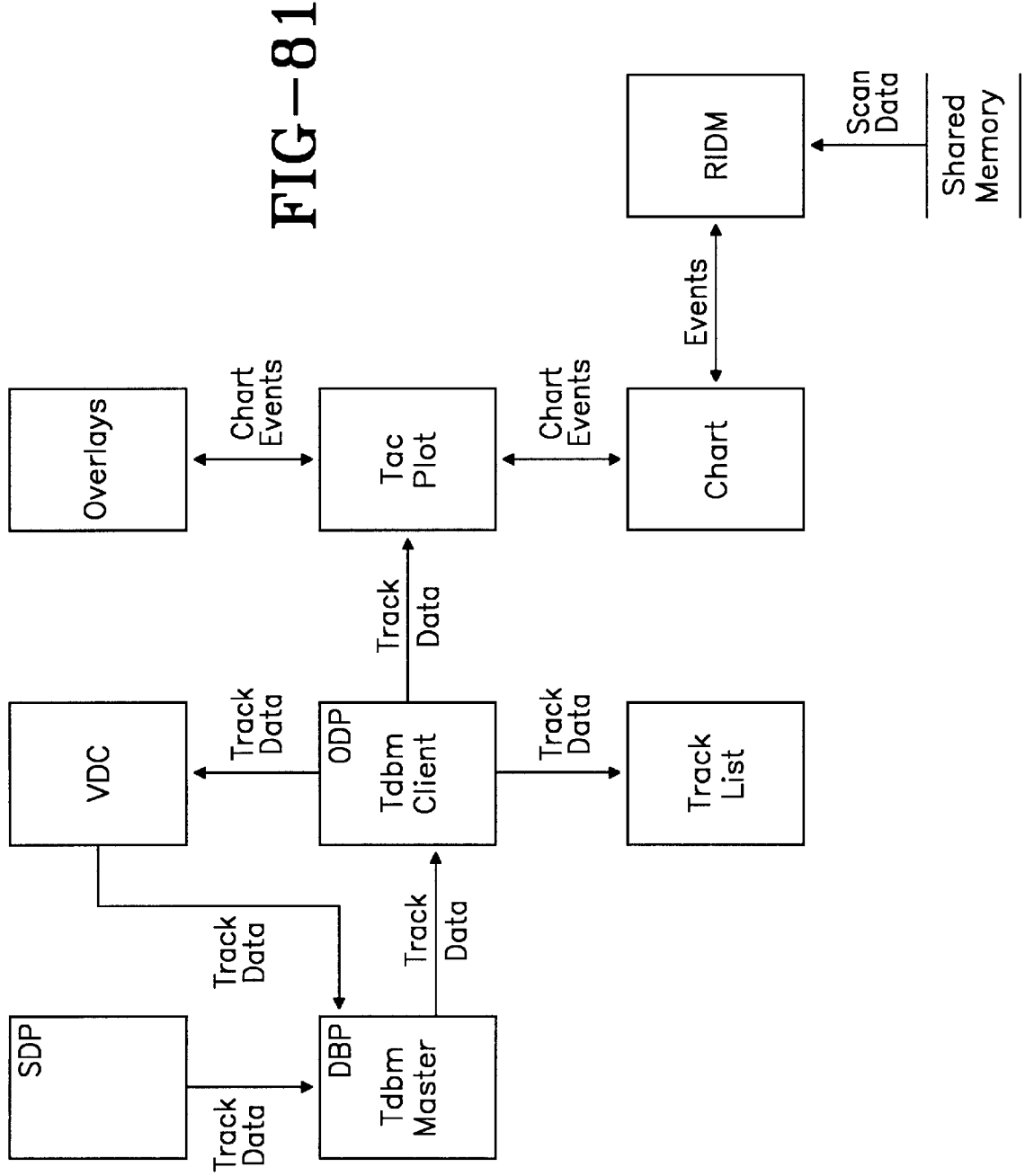
FIG. 81 is the ODS-UB CSC Data Flow

The ODS-UB CSCs consists of the following (see FIG. 81):

Tactical Database Manager (TDBM)
Radar Image Draw Module (RIDMO)
Vessel Data Card (VDC)
Track List
System Chart The ODS Interface CSCs consist of the following (see FIG. 78):

Radar Image Daemon (RID)
Chart Interface Daemon (CID)
Command/Status Daemon (CSD)
Touch Panel (TP)

Figure 79:
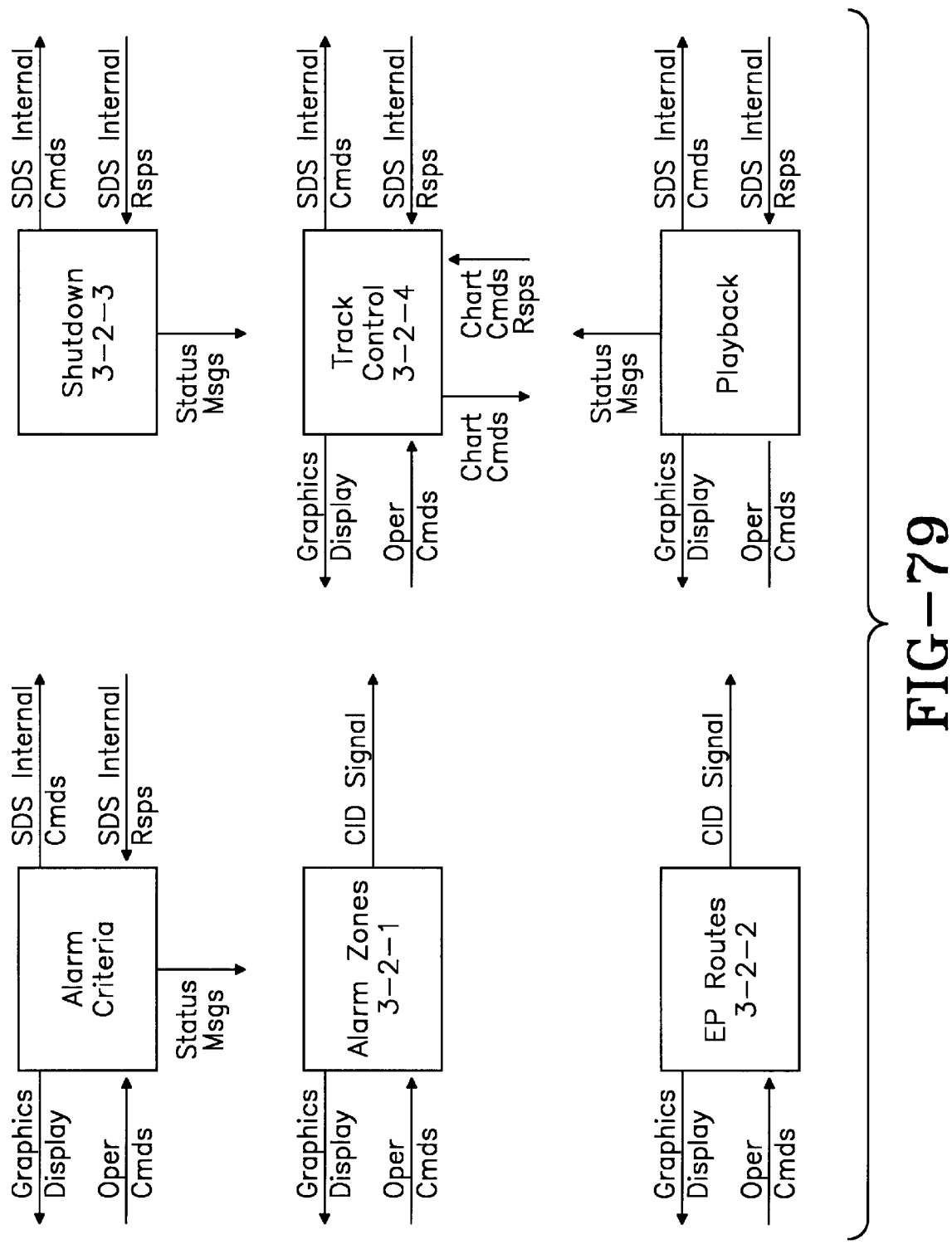
FIG. 79 is the ODS Display Data Flow

The ODS Display CSCs consist of the following (see FIG. 79):

Shutdown
Alarm Zone Control
Alarm Criteria
Estimated-Positioning Route Control
Track Control
Playback Control
X-Window Print (XPWIN)

Figure 80:
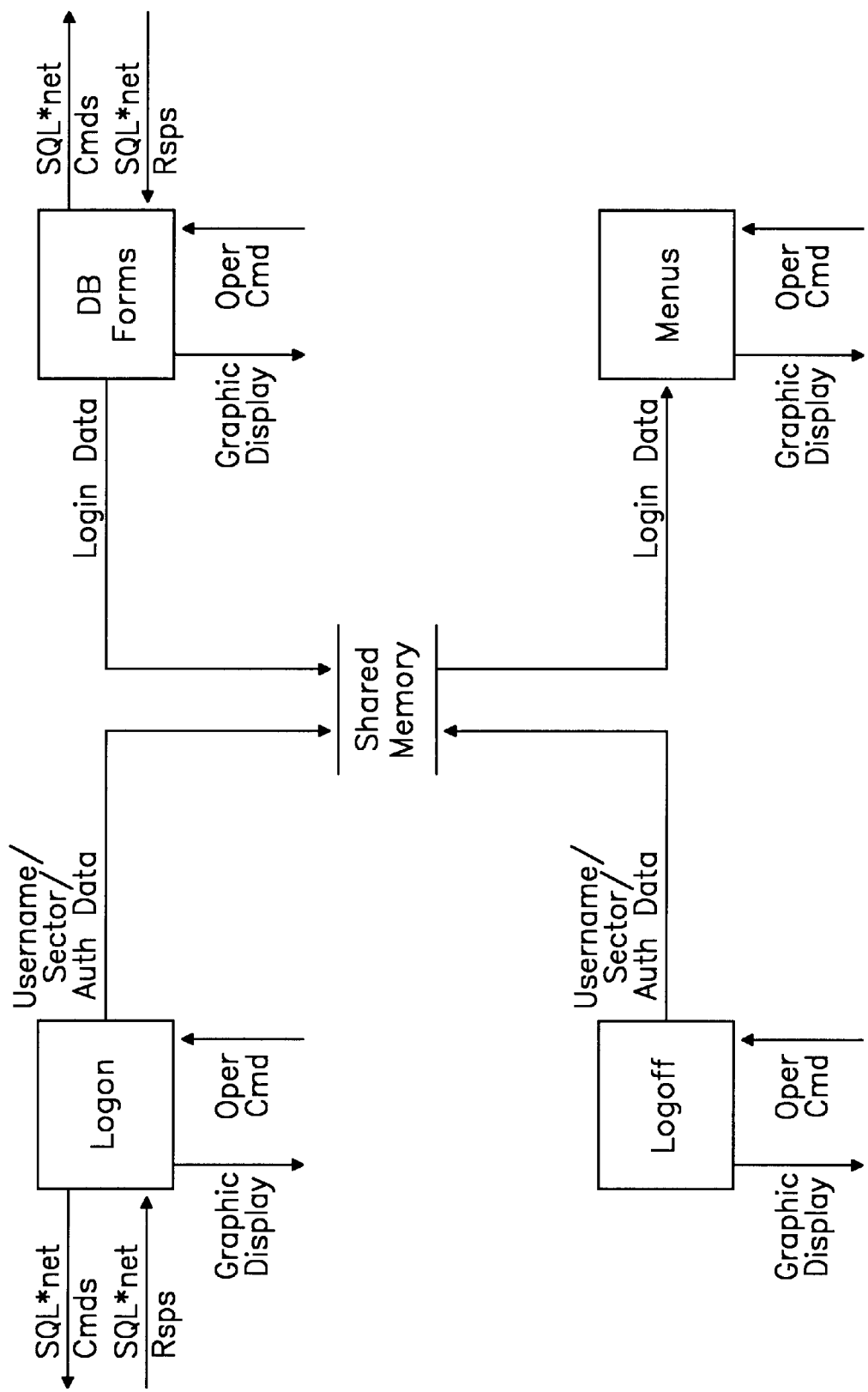
FIG. 80 is the ODS Database Data Flow

The ODS Database CSCs consist of the following (see FIG. 80):

Logon/Logoff
Database Form Interface
Radar Configuration Interface
Database Forms
Database Menus Radar Image Daemon (RID) CSC The radar image daemon is responsible for receiving up to 18 radar images from the Sensor Data Software (SDS) and storing them in the ODS shared memory buffer. In addition, it provides a status input to the Command/Status Daemon CSC for error messages and an update signal.to the RIDMO CSC. Each RIDMO process sends a request to enable or disable signals to it. The format of images from the SDS is described in the CGVTS Interface Design Document (IDD).

The storage formats for the radar images and Command/Status Daemon CSC messages are described infra. The RIDMO actually displays the image.

Chart Interface Daemon (CID) CSC

The chart interface daemon is responsible for maintaining alarm zone and EP route information on the map displays. It retrieves definition information from the Oracle database and instructs the Unified Build chart manager to plot the appropriate lines and circles. When updates occur, the CID is notified via a defined signal mechanism.

Command/Status Daemon (CSD) CSC

The command/status daemon is responsible for receiving SDS commands from ODS CSC's, notifying operators of alarm conditions and remote site status, and sending valid commands to the SDS. Command status from the SDS is then relayed back to the appropriate ODS CSC.

A status window appears in the righthand monitor display that is resizable and can be minimized to an icon if desired. It cannot be removed from the display completely, however.

A message queue receives status updates from ODS CSC's that are displayed in the status window. If a system status message (e.g. UPS notification) is received from the SDS, it is displayed in the status window as well. An audible indicator is sounded when new status messages are displayed; this can be disabled by the operator.

Remote site status is retrieved from the Oracle database at 30 second intervals and displayed in tabular format in the-upper portion of the status window.

Vessel alarms received from the SDS are displayed in small windows next to the vessel icon on the screen. If the icon is not on the screen, the window is placed on the screen using a simple tiling formula. Detailed information is displayed in the status message list. Both visual and audible alarm notification can be enabled/disabled by the operator for each class of alarm through pull-down menus in the status window. The default is to notify both audibly and visually for all alarm classes.

The following commands are routed by the command/status daemon:

Camera Commands
    Pan left/right
    Stop panning
    Tilt up/down
    Stop tilt
    Zoom in/out
    Stop zoom
    Focus in/out
    Stop focus
    Turn wiper/washer/defogger on/off
    Get camera status/state
    Video Switcher Commands (console specific)
    Select video source for monitor 1–4
    Get switcher status/state
    Tracking Commands
    Add track at specified position, radar or EP
    Drop or swap track
    Modify EP track to specified position, route, speed
    Update track vessel data from DBS
    Radar Commands
    Update radar configuration from DBS
    Get radar status/state
    Playback Commands
    Start playback at specified time and date
    Stop playback
    Select sensors for playback
    Get playback status/state
    Radio Setup Commands
    Set/get radio configuration
    Get radio status/state
    Alarm Commands
    Update alarm generation criteria
    Update zone or EP route definitions from DBS
    Shutdown Commands
    UPS Alarm, Cancel
    Terminate System Operations Touch Panel (TP) CSC The touch panel CSC is responsible for Closed-Circuit TeleVision (CCTV) camera, Video Cassette Recorder (VCR), video switcher, and radio control. It also provides an audio callback capability (up to 10 minutes) for the primary and secondary radio transceiver frequencies. Operator commands are initiated from a touch panel located in the console turret and sent to the Command/Status Daemon CSC (for camera, radio, and video switching commands), to the VCR via RS-232C (for VCR commands), or to the Touch Panel Audio Device (for audio callback).

The touch panel display uses site name abbreviations from the DBS configuration tables. Site access control is provided through the site mask table initialized by the Logon/Logoff CSC in shared memory.

Shutdown CSC

The shutdown CSC allows a supervisor to shutdown the console or entire VTS. It also allows the supervisor to cancel a pending VTS shutdown before the 10 minute grace period has expired. The shutdown of a console occurs immediately without printing vessel data cards, sector summary, or screen images. The shutdown of the VTS causes the printout of all reports and starts a 10 minute countdown on the SDS before a shutdown of the VTS processors occurs.

Alarm Zone Control CSC

The alarm zone control CSC allows the operator to define or delete stationary and traffic lane safety zones composed of line segments or swing circle zones composed of a circle of specified radius ('shots'). Alarm zones are enabled for the sector or sectors an operator is presently logged onto. Zones are colored by zone type: red for stationary safety zones, magenta for traffic lanes, orange for swing circles.

Alarm Criteria CSC

The alarm criteria CSC allows the supervisor to adjust the global alarm generation criteria for CPA/TCPA alarms.

Estimated-Positioning Route Control CSC The EP route control CSC allows the operator to define or delete EP routes composed of line segments. EP routes are one- way and cause EP-tracked vessels to move from the first to last defined point along the route. Arrows are drawn at each waypoint on the route to indicate direction of movement. EP route lines are colored light blue.

Track Control CSC

The track control CSC allows the operator to add a radar or EP track and swap, handoff, accept, drop, dock, anchor, or 'out-of-area' tracked vessels. Only those vessels with sector masks matching the current console sector mask may be manipulated.

Playback Control CSC

The playback control CSC allows the replay of VTS data from the SDS for vessel, audio, radar, and CCTV video data. The operator selects the time, type of data, and sensors of interest, and may start and stop playback at will. When playback is active, a visual indicator is provided on both screens.

X-Windows Print (XPWIN) CSC

The X-Windows Print CSC is a standalone program that outputs an X window on a screen to an Hewlett-Packard (HP) Page Control Language (PCL) or compatible printer or to a file in PC Paintbrush (PCX) format. By default, it prints the window the ouse pointer is in, but can be instructed to print a specific indow or screen.

Logon/Logoff CSC

The logon/logoff CSC provides an interface to the operator for changing the sector(s) which a console controls and logging onto and off of the Oracle database. Each operator has an Oracle account with a password; the password is encrypted by Oracle and may contain up to 30 characters. Once an operator's login to Oracle has been accepted, a checklist of available sectors is displayed for the operator to select.

The operator name, password, and sector mask are stored in a shared memory buffer along with site control masks and site names that are generated for the sector(s) the operator has selected. The site control masks are used to limit use of sensors to those who need them.

Database Form Interface CSC

The database form interface CSC is a 'C' program that gets the current Oracle username and password from the Logon/Logoff shared memory buffer and starts the specified database form.

Radar Configuration Interface CSC

The radar configuration interface CSC is a 'C' program that sends a radar configuration update message to the SDS. The radar configuration form passes the remote site ID to this CSC on the command-line.

Database Forms CSC

The database forms CSC contains the DBS SQL*FORM CSCs used for database access.

Database Menus CSC

The database menus CSC contains the DBS SQL*MENU CSCs used for database access.

Tactical Database Manager (TDBM) CSC

TDBM is the component of the Unified Build software that provides multi-source correlation and database management of tactical track data. The records of the Unified Build software are non-homogeneous and are grouped into separate types of track information. Other CSC's and their relationship to the TDBM CSC are as follows:

Vessel Data Card CSC: Functions as support for TDBM, i.e., provides a mechanism for adding, editing, updating, deleting and archiving TDBM's tactical track data.

Track List CSC: Receives track data from TDBM which it sorts and displays.

System Chart CSC: TDBM provides information to this CSC for display of tracks on the chart.

Track Control CSC: This CSC provides track information (e.g., add radar track, add EP track, swap track, etc.) to TDBM either directly or through SDS.

Radar Image Draw Module (RIDMO) CSC

The RIDMO CSC provides the capability to display a composite radar bitmap image on the VTS operator display. RIDMO supports the required manual target acquisition function. Other CSC's and their relationship to the RIDMO CSC are as follows:

System Chart CSC: Radar bitmaps are sent to the System Chart CSC from the RIDMO. The System Chart CSC then sends the bitmap objects to the display.

Vessel Data Card (VDC) CSC

The VTS operator is required to keep track of certain information related to all VTS participant vessels within a harbor area. This information must be included in any automated vessel tracking system. The VTS operator is already familiar and comfortable with the paper version of the vessel data card. Therefore, the electronic vessel data card mimics the familiar paper version. Hence, the Vessel Data Card CSC provides an electronic user interface for entering track data information. Other CSC's and their relationship to the Vessel Data Card CSC are as follows:

TDBM CSC: refer to section 3.1.1.17 of this document.

System Chart CSC: The System Chart CSC controls the actual display of the Vessel Data Card.

Track List CSC: The Track List CSC provides a means for user access to the Vessel Data Card.

Track List CSC

The Track List CSC provides the operator with the ability to monitor vessel traffic within an area of interest. This is accomplished by maintaining a list of all vessels that are within a defined sector along with all pertinent associated data. The Track List CSC updates vessel data and keeps the operator notified of tracks that go into a "coast" mode. It also allows the operator to select entries from the list and access more detailed data via the Vessel Data Card. Other CSC's and their relationship to the Track List CSC are as follows:

TDBM CSC: refer to section 3.1.1.17 of this document

Vessel Data Card CSC: refer to section 3.1.1.19 of this document.

System Chart CSC: The System Chart CSC displays Track List data on the operator's screen.

System Chart CSC

The System Chart is responsible for drawing objects to a indow on the display. It is structured so that there is a Chart anager which performs the actual drawing functions. There are "chart clients" (which are simply application programs) which communicate various commands to the Chart Manager to accomplish the drawing of various objects on the screen. Other CSC's and their relationship to the System Chart CSC are as follows:

TDBM CSC: refer to section 3.1.1.17 of this document.

Radar Image Draw Module CSC: refer to section 3.1.1.18 of this document.

Vessel Data Card CSC: refer to section 3.1.1.19 of this document.

Track List CSC: refer to section 3.1.1.20 of this document.

System States and Modes

The Operator Display Software supports operation in the live and playback modes.

Live Mode

While in live mode, realtime vessel, radar, and alarm data is displayed at the console. Control commands (radar configuration, track control, etc) are active in this mode.

Playback Mode

While in playback mode, a visual indicator is displayed on both screens. Since processed vessel data is stored for replay, only those alarms that occurred at the time of recording are indicated. Control commands are disabled in this mode.

CSCI Design Description

Radar Image Daemon CSC

Figure 82:
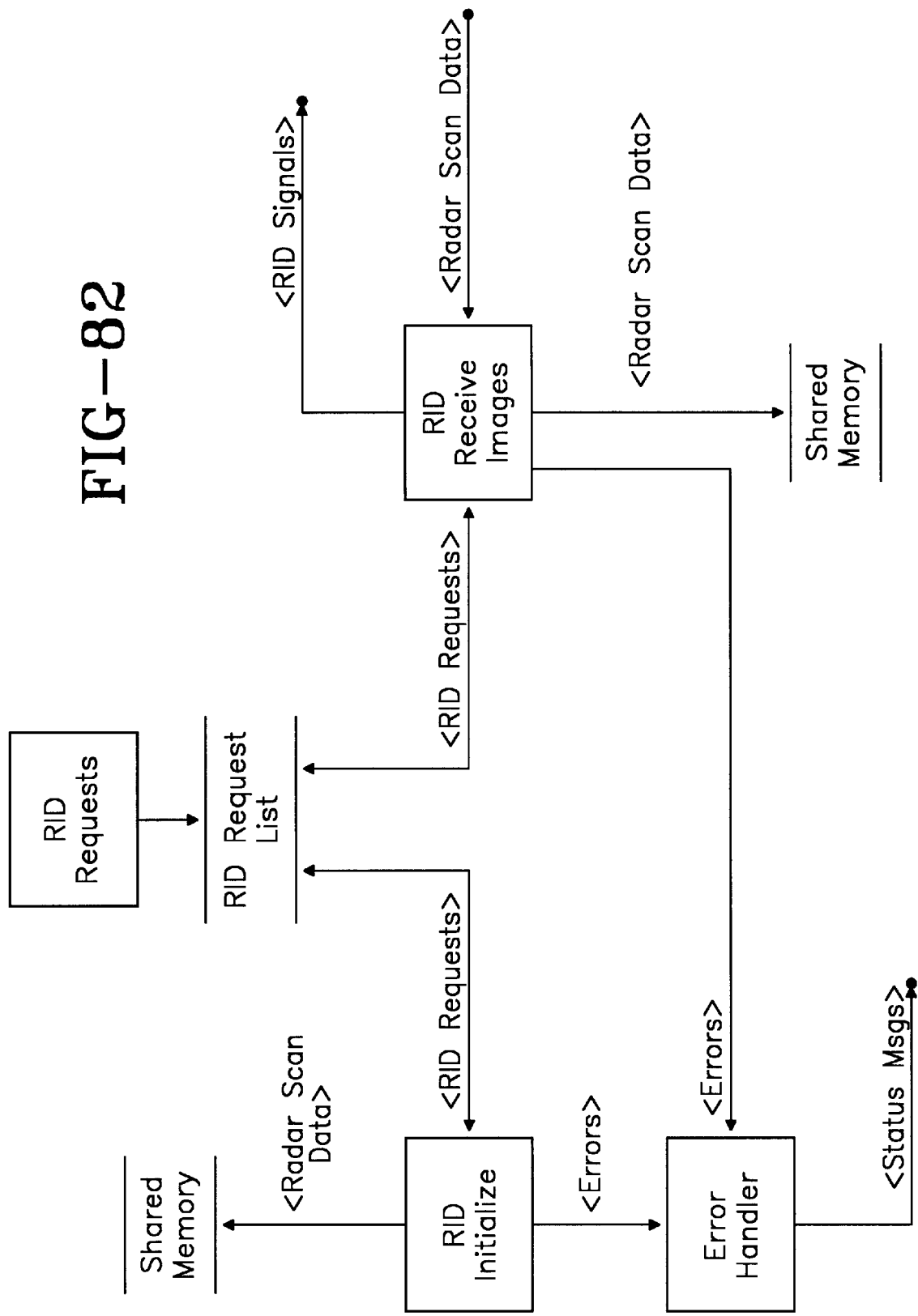
FIG. 82 is the Radar Image Daemon Dataflow
Figure 83:
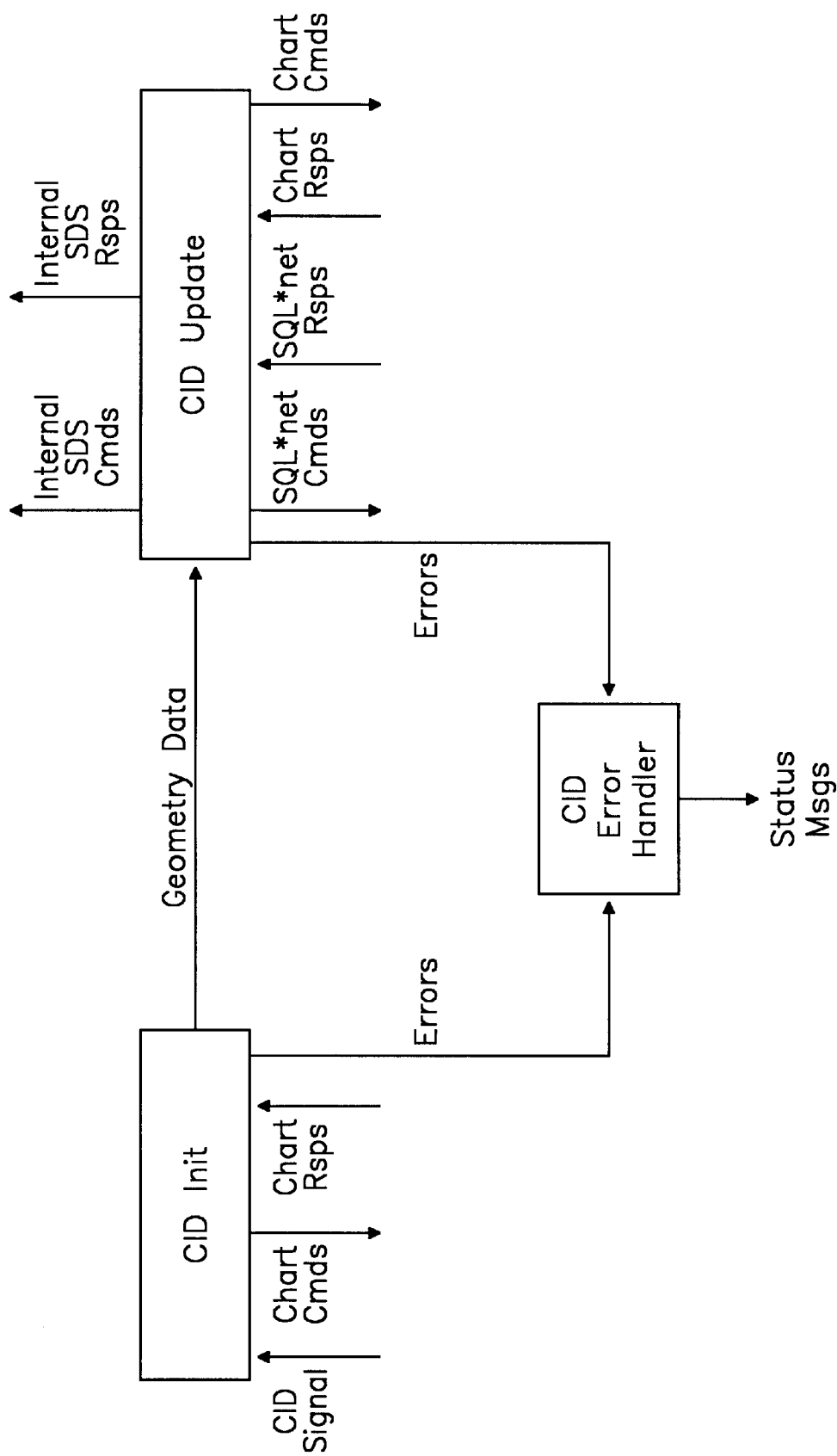
FIG. 83 is the Chart Interface Daemon Dataflow

The Radar Image Daemon (RID) receives digitized radar images from the SDS via FDDI and stores these images in a shared memory buffer. As soon as a new image has been received by the RID, a signal is sent to each Radar Image Draw Module (RIDMO) so that it can update the image on the screen if necessary; each RIDMO process sends a request message telling the RID which process and signal it is to send (see FIG. 82).

The RID handles up to 18 real-time and 4 playback digitized radar images. Each image is 512 by 512 or 1024 by 1024 pixels in size; each pixel is composed of two bits for a total of 64 kilobytes (kb) or 256 kb respectively per image (total of 1.13 or 4.5 Mb). Images are received in compressed format; the algorithm used is a modified run-length encoding. The image is decompressed and stored in its literal form in the buffer. Each image has a header describing the dimensions, location, offset, range, and site ID of the image. [260]

Chart Interface Daemon CSC

The Chart Interface Daemon (CID)is responsible for nteracting with the Chart Manager. The user interface routines for alarm zones and EP routes send an event to the CID which then interacts with the Chart Manager through application program interfaces (api's). The CID opens connections to each of the charts and handles user mouse and keyboard input to define and delete safety zones and EP routes. The CID also stores and deletes the information in the database and then sends appropriate commands to SDS for alarm zone activation.

Command/Status Daemon CSC

Figure 84:
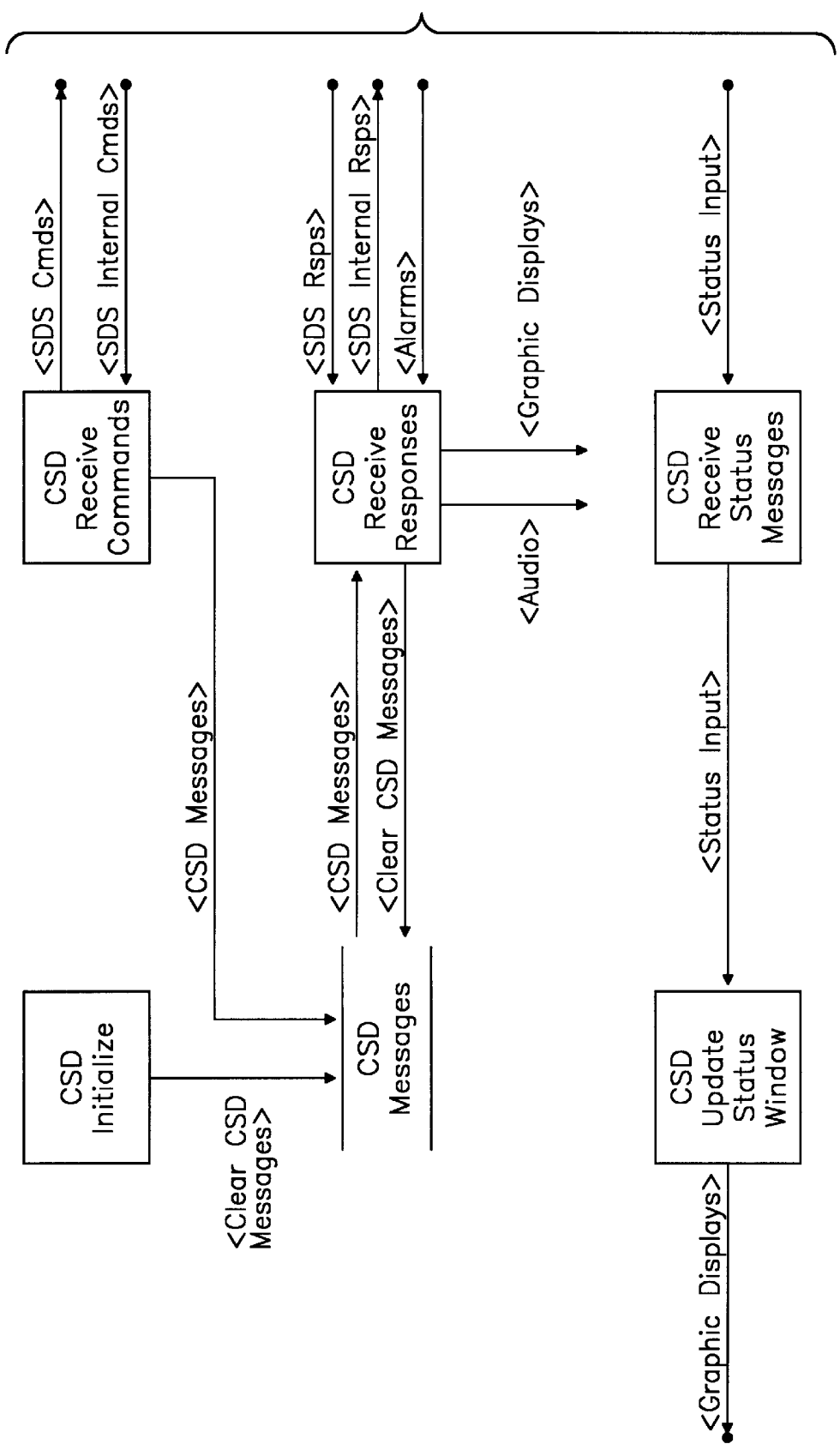
FIG. 84 is the Command Status Daemon Dataflow

The Command/Status Daemon (CSD) receives status updates from the SDS and ODS CSC's and sends ODS commands to the SDS for processing. It also maintains a status window with audible and visible indicators for system errors and alarm conditions (see FIG. 84).

Each command/status message consists of approximately 1024 bytes of data. One command/status message is sent per operator control request (pan/tilt, etc). [120, 150, 340, 470]

Each alarm message consists of approximately 32 bytes of data. One alarm message is sent for each alarm condition per SDS update. No indication is provided for cessation of an alarm condition.

Touch Panel CSC

Figure 85:
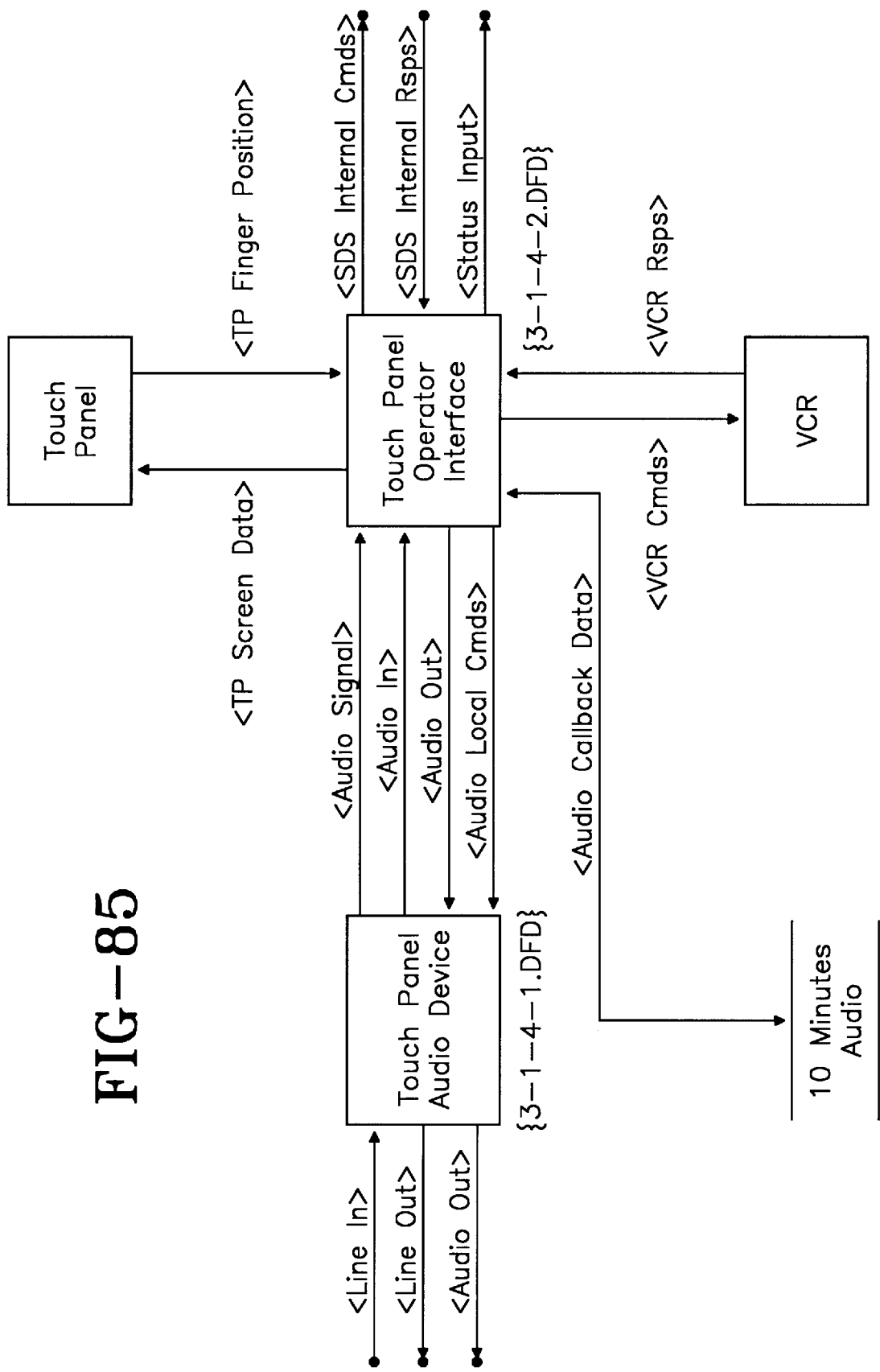
FIG. 85 is the TP Dataflow
Figure 86:
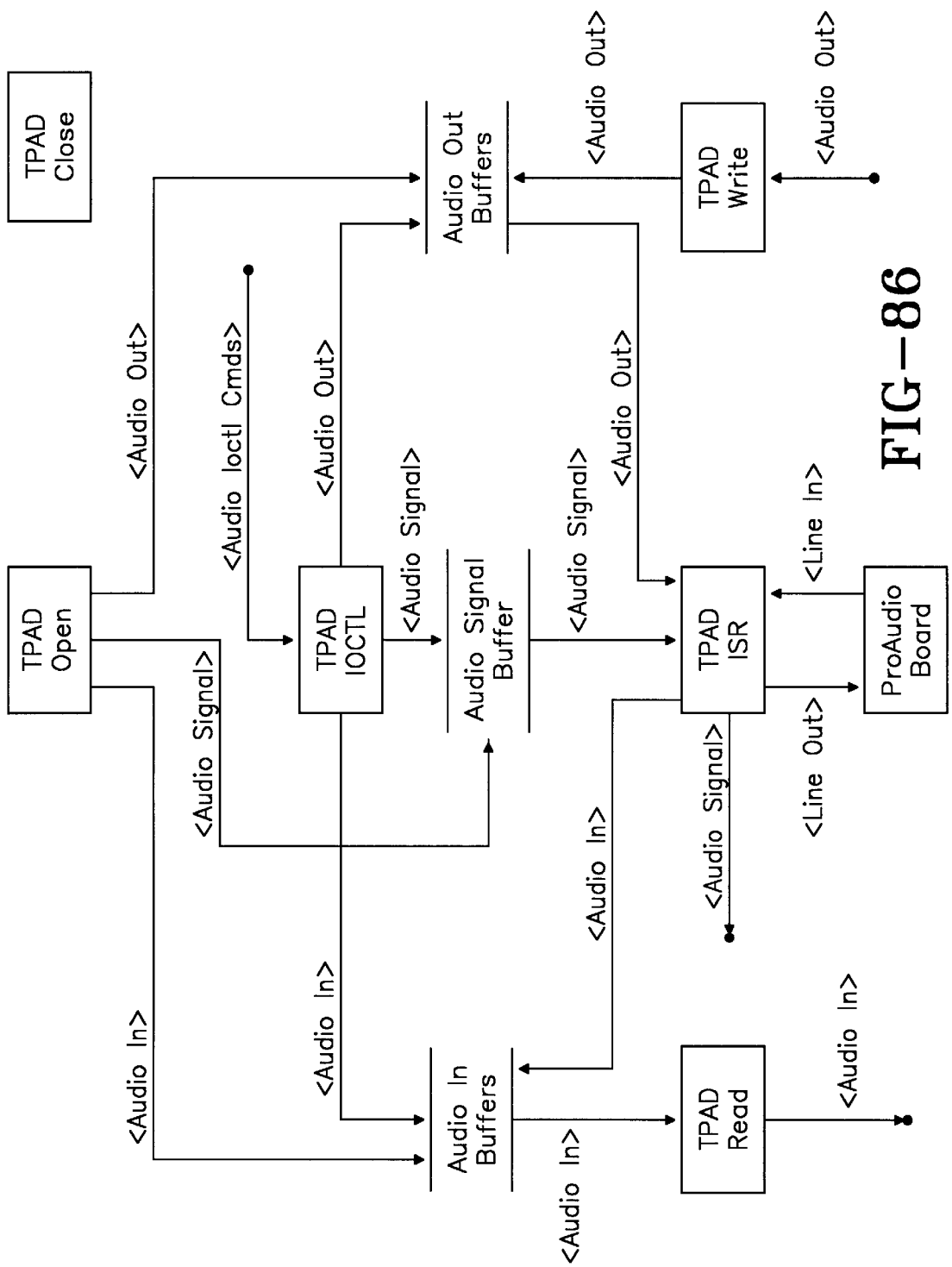
FIG. 86 is the TPAD CSC Dataflow
Figure 87:
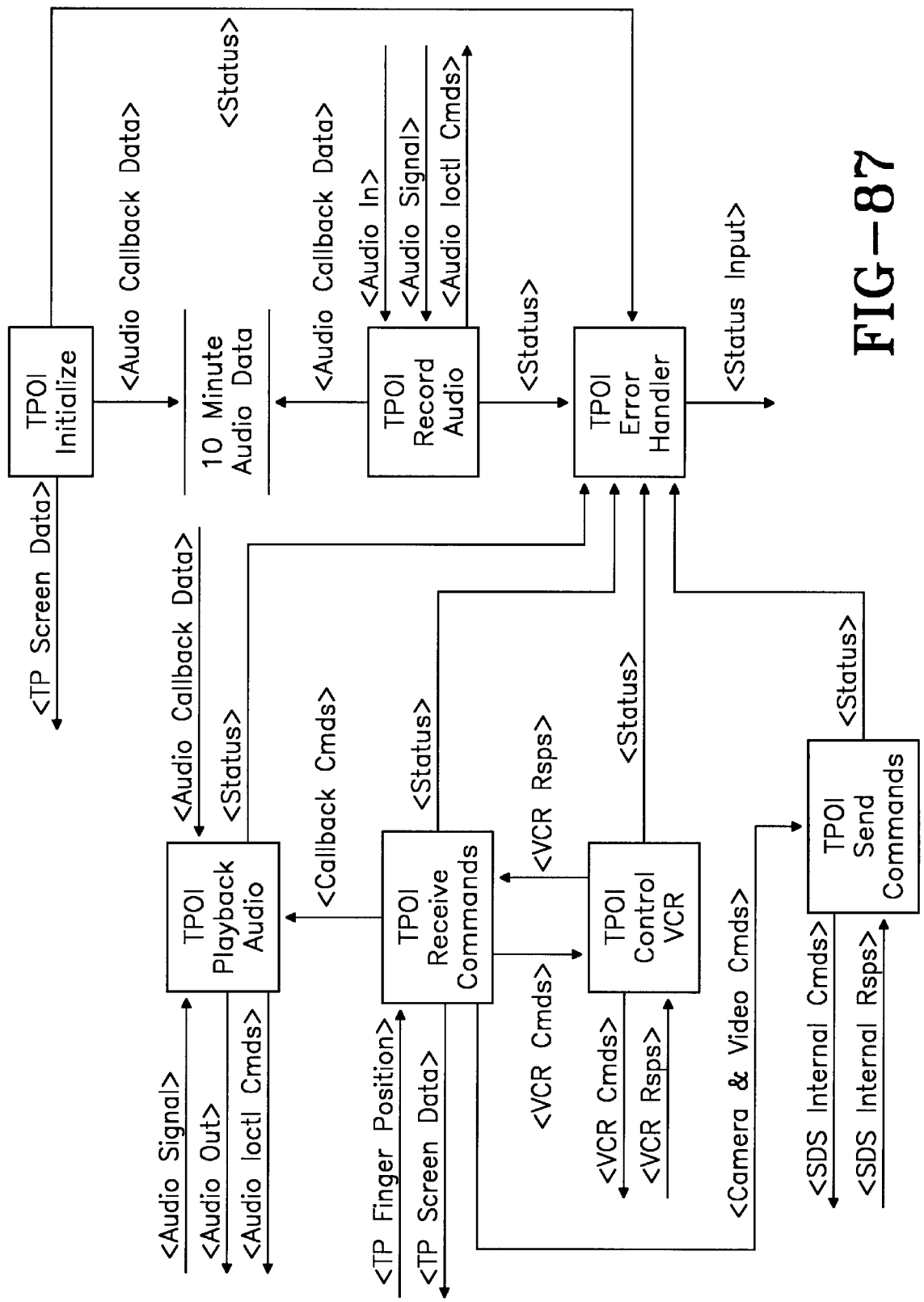
FIG. 87 is the TPOI CSC Dataflow

The Touch Panel is composed of two sub-level CSCs; the first handles the low-level interface to the audio board, and the second handles operator commands through the touch panel (see FIGS. 85, 86, and 87).

Touch Panel Audio Device (TPAD) CSC

The TPAD is a collection of three UNIX device drivers that provide a standard interface for 8-bit stereo sound playback and recording, FM synthesized tones (notes), and input/output mixer control. Normally, read( ) and write( ) calls are used to record and playback audio, respectively. An ioctl( ) interface provides configuration of volume, configuration of frequency, reset & flush buffers, and block/noblock mode. The TPAD maintains 1024 kb recording and playback buffers, which is roughly 32 seconds of audio at 16.384 kHz frequency (32 seconds×16,384 samples/second×2 channels×1 byte/channel sample=1024 kb). [230, 240, 250, 940]

Touch Panel Operator Interface (TPOI) CSC

The TPOI CSC receives operator commands through a touch panel mounted in the console turret via RS-232C. The touch panel sends three-byte escape sequences when the operator touches, drags, or takes his finger off the panel. The escape sequences identify the position and type of contact made on the touch panel.

The TPOI CSC communicates to a VHS VCR via RS-232C. Commands to and responses from the VCR consist of ASCII strings 5 to 16 bytes in length.

Finally, the TPOI CSC polls the Touch Panel Audio Device (TPAD) for radio audio and places the digitized audio into a 10 inute circular buffer (1024 kb in length). During callback, audio data is sent to the TPAD to be played over the console speakers. [230, 240, 250]

Shutdown CSC

The shutdown CSC allows a supervisor or system administrator to shutdown a console, shutdown the VTS, or cancel a VTS shutdown. Console shutdown is immediate using the HP/UX rebooto system call with the halt-and-sync option. VTS shutdown and cancel shutdown are messages sent to the SDS to start and stop a 10 minute shutdown counter; the VTS shutdown message triggers reports and console shutdowns in a manner identical to an UPS power alarm.

Alarm Zone Control CSC

The alarm zone control CSC allows a system operator to create or delete a stationary safety zone, a traffic lane or a swing circle. The user interface for each of these programs interprets the requested action and sends an appropriate user event to the Chart Interface Daemon (CID).

Alarm Criteria CSC

The alarm criteria CSC allows a supervisor or system administrator to set the desired time and distance values to be used in proximity alarm calculations. A user interface retrieves the previously set values from the database and displays them for review. The new values are then saved in the database and a command sent to SDS to initiate the change in the calculations.

Estimated-Positioning Route Control CSC

The estimated-positioning route control CSC allows a system operator to create or delete a route upon which an estimated position track can be placed. The user interface interprets the requested action from the operator and sends an appropriate user event to the Chart Interface Daemon (CID)

Track Control CSC

The track control CSC is composed of sub-CSCs to do the following:

Add radar track

Add EP track

Swap track

Change To Radar track

Change To EP track

Handoff track

Accept track

Drop track

Dock track

Anchor track

Out-of-area track

Only those vessels with sector masks matching the current console sector mask may be manipulated.

Add Radar Track CSC

Add Radar Track CSC allows an operator to command the VTS radars to begin tracking a certain object based on radar returns as reflected by the Radar Image Draw Module. The requirement is for a VTS operator to have the capability to perform manual track acquisition. The execution/data flow is as follows: the Add Radar Track CSC sends latitude/longitude, sector mask and radar site ID to the Command Status Daemon, which in turn sends a track message to the SDS. The SDS notifies the radar processor of the desired acquisition. The radar processor then sends data on the acquired track back to SDS.

Add EP Track CSC

Add EP Track CSC allows an operator to command the SDS to begin calculating the position of a track along an estimated positioning route. The requirement is for a VTS operator to have the capability to designate the initial position and speed of the EP track. The execution/data flow is as follows: the Add EP Track CSC sends latitude/longitude, speed and EP route ID to the Command Status Daemon, which in turn sends a track message to the SDS. The SDS then initiates the track and updates the track's movement within the track database.

Swap Track CSC

The Swap Track CSC allows an operator to command the SDS to swap the track information for two specific tracked objects. The execution/data flow is as follows: the Swap Track CSC sends the track ID's to the Command Status Daemon, which in turn sends a track message to the SDS. The SDS then swaps the track information in the track database which causes the operator display to reflect the icon and track tags displayed for the selected objects to be swapped.

Change To Radar Track CSC

Change To Radar Track CSC allows an operator to command the VTS radars to begin tracking an object that had previously been calculated as an EP track. The execution/data flow is as follows: the Change to Radar Track CSC sends an EP track ID, latitude /longitude, sector mask and radar site ID to the Command Status Daemon, which in turn sends a track message to the SDS. The SDS notifies the radar processor of the desired acquisition. The radar processor then sends data on the acquired track back to SDS. The SDS then performs a swap track that attaches the track information of the EP track to the new radar acquisition and then deletes the extraneous extra track.

Change To EP Track CSC

Change To EP Track CSC allows an operator to command SDS to begin performing an estimated positioning calculation on an object that had previously been an active radar track. The execution/data flow is as follows: the Change to EP Track CSC sends a track ID and EP route ID to the Command Status Daemon, which in turn sends a track message to the SDS. The SDS notifies the radar processor to drop the designated track. SDS then begins an EP track at the last position of the track at its last reported speed. The SDS then performs a swap track that attaches the track information of the radar track to the new EP track and then deletes the radar track.

Handoff Track CSC

The handoff track CSC is supplied with a Tdbm track ID. If the vessel associated with the Tdbm track has a sector mask matching that of the current console sector mask, the following steps are performed:
  a. The Tdbm sector mask field is changed to all one's.
  b. The SDS is notified that vessel information has changed.

Otherwise, an error message is displayed in the command-status daemon window notifying the operator of the problem.

Accept Track CSC

The accept track CSC is supplied with a Tdbm track ID. If the vessel associated with the Tdbm track has a sector mask of all one's, the following steps are performed:
  a. The Tdbm sector mask field is changed to match the console sector mask.
  b. The SDS is notified that vessel information has changed.
  c. The DBS VESSEL_TRACK table is updated to contain the new sector mask and sector mask history.

Otherwise, an error message is displayed in the command-status daemon window notifying the operator of the problem.

Drop Track CSC

The Drop Track CSC provides the operator the capability of dropping a track that is either no longer of interest or was begun inadvertently. Once the track is designated for dropping, it will be removed from the track database and the display. The data flow for the Drop Track CSC consists of a message sent to SDS to stop generating updates for the track.

Dock Track CSC

The Dock Track CSC enables the operator to indicate that a vessel in his/her area of responsibility has docked. Once a vessel has reached a destination within the port where it will dock, the operator will choose the "DOCK" option from the Vessel Action Menu. The status of the vessel in the track database will then be changed to "docked".

Anchor Track CSC

Within a VTS operator's area of responsibility, when a vessel has reached an anchorage destination, the Anchor Track CSC provides a mechanism for entering anchorage information into the system. The Anchor Track CSC is invoked from the Vessel Action Menu. This CSC will cause the selected vessel's status to change in the track table to "anchored". It also changes the traffic count and causes the swing circle user interface to be invoked, allowing the operator to construct a swing circle for that vessel.

Out-of-Area Track CSC

When a vessel exits the port, the Out-of-Area Track CSC, enables the VTS operator to enter this information into the system. The Out-of-Area Track CSC is invoked from the Vessel Action Menu. A status change to "OutofAOR" will occur in the track database upon execution. Additionally, the traffic count will be altered.

Playback Control CSC

The playback CSC allows the replay of VTS data from the SDS, including vessel, audio, radar, and CCTV video data. No additional storage is required.

X-Windows Print (XPWIN) CSC

The XPWIN CSC is a standalone utility program that provides greyscale hardcopy or PCX output of a window or screen. Several command-line options are provided to alter the output and are documented in the XPWIN(LX) manual page.

If no window ID is specified on the command-line, XPWIN first queries the window manager for the window ID the mouse pointer resides in.

Next, the window location, attributes, and image are obtained from the window manager.

Once the image has been retrieved, the colormap used by the window is converted to a series of grey levels using the National Television Standards Committee (NTSC) mapping G=0.30R+0.59G+0.11B. The grey level table is then contrast expanded using the equation G=contrast(G−mean-grey-level)+mean-grey-level.

Using the grey level table, the image is dithered to the printer using the Burke dithering coefficients. The printer bitmap is compressed if the output printer supports that feature (LaserJet 4, III, IIp, and DeskJet all support compression).

The XPWIN program requires approximately (width× height×2) bytes of additional storage to copy a window image.

Logon/Logoff CSC

The logon/logoff CSC provides database and display access control for each operator at the VTC. It also allows an operator to select the sector(s) to control at the console. [350–387]

The user is first presented with a window containing username and password boxes; the operator types the username and password on the keyboard, but only the username text is echoed on the screen. Once the operator has entered the password, an embedded SQL connect call to Oracle is performed to attempt the login. If the connection fails, an error message is displayed and the username, password, and authorization level in the console configuration buffer are cleared.

If the connection succeeds, a query of the user authorization table is performed to get the operator's authorization level and real name which is then placed in the console configuration buffer. A second window is displayed listing the available sectors in the database for the operator to choose from. Once chosen, a sector mask is built using the sector ID(s) of the selected sector(s), where bit 0 corresponds to sector 1, bit 1 corresponds to sector 2, etc.

The console configuration buffer is a shared-memory buffer that contains the current user name, password, authorization level, sector mask, remote site masks, and remote site names. For those remote sites that are not accessible from the current sector(s), the masks and names are cleared.

Database Form Interface CSC

The database form interface CSC first checks for the current user that is logged onto the database (via the Logon/Logoff CSC). If no user is presently logged on, an error message is displayed. Otherwise, the specified database form is run using the current username/password. No additional storage is required.

Radar Configuration Interface CSC

The Radar Configuration Interface CSC is executed from the Radar Configuration database form when a change has been posted by a user. The form passes the radar ID and remote site ID affected by the change to the radar configuration interface. A radar command is then constructed and sent to SDS through the command status daemon.

Database Forms CSC

The database forms CSC consists of all applicable DBS SQL*FORMs that reside on the ODP. Consult the DBS SDD for details.

Database Menus CSC

The database menus CSC consists of all applicable DBS SQL*MENUs that reside on the ODP. Consult the DBS SDD for details.

Tactical Database Manager (Tdbm) CSC

The Tactical Database Manager, as stated in section 3.1.1.17, is the component of the Unified Build software that provides multi-source correlation and database management of tactical track data. There is a copy of Tdbm executing on the VTS Database processor (DBP) as well as a copy executing on each Operator Display Processor (ODP). Tdbm on the DBP handles all system track data while Tdbm on each ODP handles track data for the sector(s) currently being handled by the operator on that particular ODP. For more information on Tdbm execution control consult the TDBM . . . .

Radar Image Draw Module (RIDMO) CSC

The Radar Image Draw Module CSC creates and integrates a draw module that provides the capability to display a composite bitmap image of an operators area of responsibility. The Radar Image Draw Module CSC is begun when a signal is generated by the Radar Image Daemon. RIDMO gets radar data from shared memory (where Radar Image Daemon stored the data). RIDMO then sends radar bitmaps to the Chart Manager. RIDMO also receives data input by the operator indicating radar selection and attribute changes.

Vessel Data Card CSC

The Vessel Data Card CSC assists the operator in keeping track of certain information related to all VTS participant vessels within a harbor area. The Vessel Data Card will appear in a window when the VTS operator performs any of several track manipulation functions. These functions can be found in the CGVTS Software Users Manual.

Track List CSC

The Track List CSC provides the operator with the ability to monitor vessel traffic within an area of interest by displaying a list, on the screen, of all vessels currently in track within his/her sector. The Track List is executed after selection on the TRACKS pull-down menu. Once the user selects Track List, control will pass to another module and the Track List window will appear on the screen.

System Chart CSC

The System Chart CSC manages object drawing to a window on the VTS operator display. The System Chart is started up with the VTS system and awaits commands from "clients". Once the system chart receives this command, it creates a window. The client then sends commands to the system chart to draw objects. The System Chart draws the objects, the client waits for any events and upon receipt sends a command to System Chart to destroy the window. For more information on this CSC refer to the "GOTS 2.0 Chart Service Programming Guide."

CSCI Detailed Design

For all system inter-process communication (IPC) resources that use a 4 byte 'key' to identify the resource, the CSC abbreviation and a resource number are used; for example, the RID shared memory IPC resource key would be:

'R' 'I' 'D' 0 (5249440016)

If an IPC resource is shared by all ODS CSCS, the abbreviation 'CSC' is used.

All CSUs shall be coded in the ANSI-standard C language.

Radar Image Daemon CSC

The Radar Image Daemon is composed of five CSU's:

RID Initialize
RID Receive Image
RID Receive Request
RID Error Handler
RID Shutdown Each radar image is placed in the RID shared memory buffer as it is formatted in the Radar Scan Data Update message (described in the CGVTS IDD).

RID Initialize CSU

The RID Initialize CSU creates, attaches, and maps the shared memory buffer for up to 18 radar images, opens connections to the CSD incoming and outgoing IPC message queues, opens a connection to the SDS via FDDI, creates the RID incoming IPC message queue, and resets the list of RIDMO processes. The shared memory key for the RID is 5249440016. The message queue key for the RID is 5249440116. The CSD incoming and outgoing message queue keys are 4353440016 and 4353440116 respectively.

The RID message is 4 bytes long and is used to enable and disable signals to a RIDMO process:

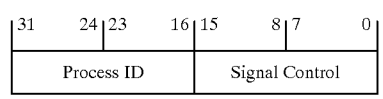

Process ID=Process to signal when a new image is received
　Format: 16-bit unsigned integer
　Range: 1 to 30000
Signal Control=
　Format: 16-bit unsigned integer
　Range:0=remove process from signal list, 1 to 65535= send this signal # to the process when an update occurs (see signal(3C)).

RID Receive Image CSU

The RID Receive Image CSU monitors the SDS connection and reads update messages when they are available. If no update messages are received within 1 minute, or if an image transfer is interrupted for more than 5 seconds, a status message is sent to the CSD with the text, "Radar Image Daemon: FDDI timeout!". The update message format is described in the CGVTS IDD.

RID Receive Request CSU

Each RIDMO process sends a RID request on initialization and shutdown. The RID polls the message queue for incoming requests and processes them as necessary. If the requested signal is 0, the process is removed from the signal list; if the process has already made a request and the requested signal is non-zero, the process's signal is reset to the new value; if the process is not in the signal list, it is added to the list. The signal list will be an array of MAX_RID_REQUESTS signal entries; if the signal list becomes full, the requesting process will be killed and a message string sent to the CSD stating, "RID Error: Too many processes using radar images!"

RID Error Handler CSU

If for some reason the RID should fail to initialize, have a bad request, or have a data timeout, the error handler is called to send a message string to the CSD and the system log file.

RID Shutdown CSU

If RID receives a signal requesting its termination, the shutdown routine provides for a clean termination by dropping the network connection, detaching from shared memory and deleting it, and removing the message queues used to receive requests. Then the error handler is called to send a message string to the CSD and the system log file stating, "RID: Shutdown complete".

Chart Interface Daemon CSC

The Chart Interface Daemon is composed of five CSU's:
  CID Initialize
  CID Create Template
  CID Map Interaction
  CID Error Handler
  CID Shutdown A user event from the safety zones or estimated positioning routes interfaces is received by CID and directs the path of execution in the Initialize and Map Interaction CSUs.

Command/Status Daemon CSC

The CSD is composed of the following CSUs:
  CSD Initialize
  CSD Receive Commands
  CSD Receive Responses
  CSD Receive Status Messages
  CSD Update Status Window
  CSD Update Remote Status
  CSD Alarm Notify CSD Initialize CSU The CSD Initialize CSU opens a connection to the SDS, creates the command, response, and status message queues, and opens the CSD status window. The CSD command message queue key is 4353440016; the response message queue key is 4353440116; the status message queue key is 4353440216.

CSD Receive Commands CSU

After initialization, the CSD polls the command message queue; when messages are available, the CSD puts the SDS message header at the top of the command message, assigns the message a unique ID, places the message in a 'waiting for response' queue, and sends the message to the SDS via FDDI. The SDS message header is described in the CGVTS IDD; the CSD message header is as follows:

| 31 | 24 | 23 | 16 | 15 | 8 | 7 | 0 |
|---|---|---|---|---|---|---|---|
| Process ID of Sender ||||||||
| Message Type |||| Message Length ||||
| Message Time Seconds ||||||||
| Message Time Microseconds ||||||||
| Message Data (SDS format) ||||||||

Process ID of Sender=
  Format: 32-bit unsigned integer
  Range: 1 to 30000
Message Type=
  Format: 16-bit unsigned integer Rang
  e: See CGVTS IDD SDS message format description
Message Length=
  Format: 16-bit unsigned integer
  Range: 16 to 4096 bytes
Message Time Seconds=
  Format: 32-bit unsigned integer
  Range: 0 to 232-1 seconds (since Jan. 1, 1970)
Message Time Microseconds=
  Format: 32-bit unsigned integer
  Range: 0 to 999999 microseconds
Message Data=
  Format: varies
  Range: varies; see CGVTS IDD SDS message format description CSD Receive Responses CSU After initialization, the CSD polls the SDS FDDI connection; when messages are available, the CSD puts the CSD message header at the top of the response message, removes the message from a 'waiting for response' queue, and sends the message to the ODS process via the CSD response message queue. The SDS message header is described in the CGVTS IDD; the CSD message header is as described in Section 4.3.2.

CSD Receive Status Messages CSU

Any system errors are logged to the system log file and sent the CSD for display in the status window. The CSD polls the status message queue for new messages and sends each new message to the CSD Update Status Window CSU. The status message format is as follow:

| 31 | 24 | 23 | 16 | 15 | 8 | 7 | 0 |
|---|---|---|---|---|---|---|---|
| Message Type |||| Message Length ||||
| Message Time ||||||||
| Message Text ||||||||

Message Type=
  Format: 16-bit unsigned integer
  Range:
    0=System error
    1=Hardware error
    2=Miscellaneous error
Message Length=
  Format: 16-bit unsigned integer
  Range: 8 to 4096 bytes Message Time=
  Format: 32-bit unsigned integer
  Range: 0 to 232-1 seconds (since Jan. 1, 1970)
Message Text=
  Format: Variable length nul-terminated ASCII string
  Range:
    0016=end of text
    0916=tab to next 8th column
    0A16=end of line
    2016 to 7F16=ASCII text
    All other values ignored CSD Update Status Window CSU As status messages are received from ODS CSCs and alarm messages are received from the SDS, they are displayed in the Status Window. The Status Window is divided into two halves.

The top half of the status window contains a list of statuses for each sensor connected to the VTS. When the sensor is online and operating properly, the word 'UP' is displayed; when the sensor is offline and not available, the word 'DOWN' is displayed. This portion of the screen is only updated by SDS alarm messages.

The bottom half of the status window contains a scrollable text window displaying status messages from the ODS CSCs; messages are coded as to their nature (system error, hardware error, miscellaneous error) and are time-tagged. Messages may be erased by the operator.

Figure 88:
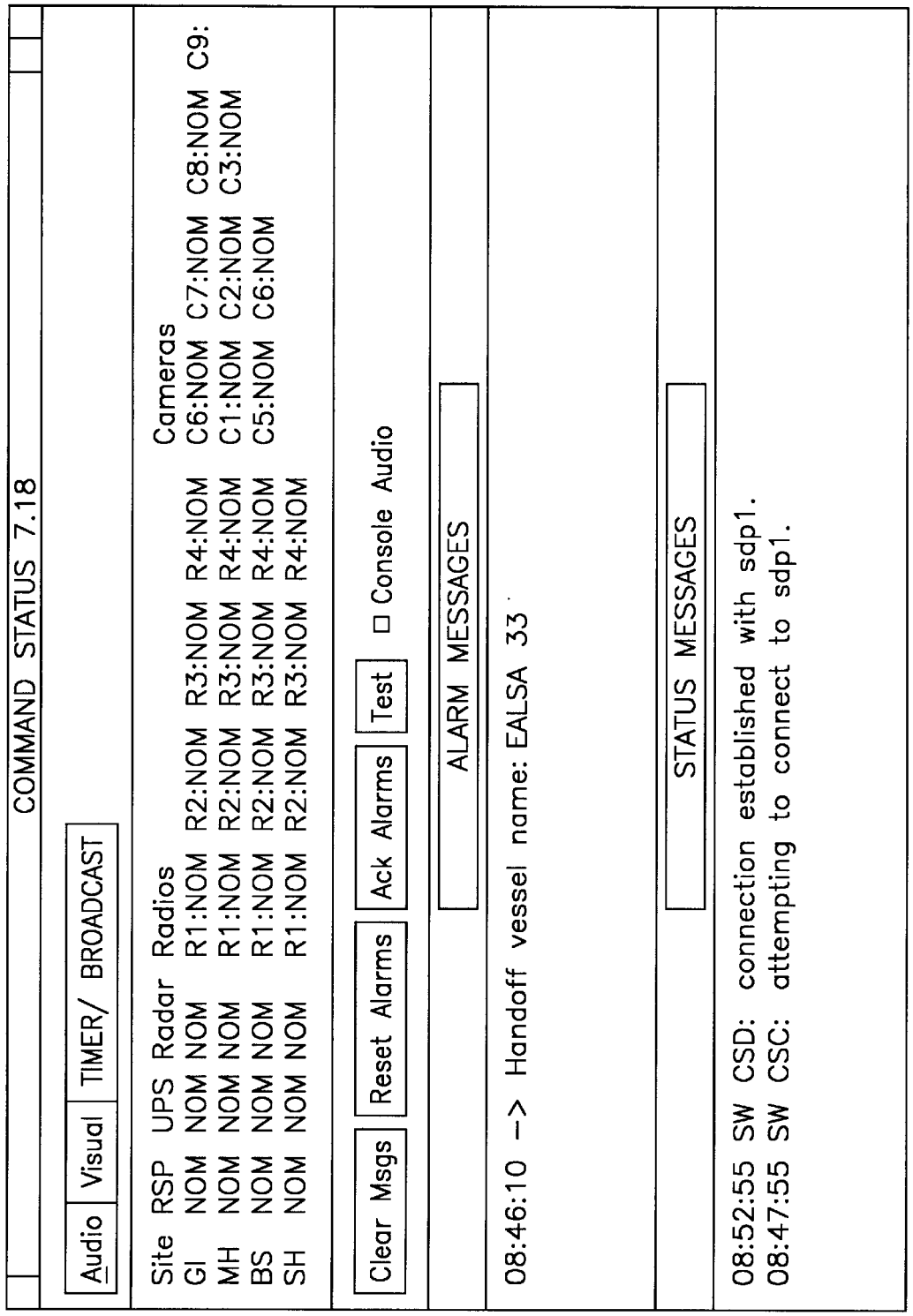
FIG. 88 is the CSD Status Window

When the status window is updated, an audible indicator is sounded; this feature may be disabled by the operator. A toggle button is provided for this purpose (see FIG. 88).

CSD Update Remote Status CSU

The CSD Update Remote Status CSU performs a database query of the REMOTE_SITE_CURRENT_STATUS table for all records that have been added since the last update; updates occur at approximately 30 second intervals.

For each remote site status record, the appropriate radar, radio, or camera status is updated in static storage. Once all records have been processed, the remote site status list in the upper portion of the command-status daemon window is updated to reflect any changes.

CSD Alarm Notify CSU

As alarm messages are received from SDS, CSD allocates alarm message queue nodes to hold the alarm messages. There are five different alarm types:
  1. Track Lost
  2. Proximity
  3. Zone Traffic
  4. Zone Stationary
  5. Zone Swing Once CSD receives an alarm message, it checks for the alarm in the message queue. If it is already allocated in the message queue, it will not be added. Elements in the message queue contain alarm type, track id, zone id, zone type, window id, time stamp, widget id, and display status.

Visual and audio alarm indicators can also be disabled or enabled by the operator. The operator can set each indicator individually.

The CSD also has three push buttons: Clear msgs, Reset alarms, Ack alarms. The Clear msgs button only clears messages from the status window. The Reset alarms button removes all alarm pop-ups from the display map(s) and all alarm message queue nodes from the message queue. The Ack alarms button clears all alarm pop-ups from the display map(s) and resets all alarm flags to false.

The System Audio radio button toggles audio sounds on or off.

Alarm pop-ups are displayed on all maps present. The CSD will display alarm pop-ups only on one map if there is only one map present.

Touch Panel CSC
  Touch Panel Audio Device CSU
    Initialization

Device availability and configuration is determined during the HP-UX boot phase called "attach". EISA configuration information is made available to the driver and used to configure interrupt level, DMA channel and base address for 10 control. This information is utilized to initialize data structures within the device driver, map memory addresses to access board control registers in ISA data space and to configure the board's hardware registers. Following successful detection and configuration of the board, a confirmation message is provided indicating status of the audio board and of the driver.

Open access to the audio driver by a user routine, administrative checking is made of setup parameters, following which two 16 element FIFO's of 64 KB buffer elements are constructed as doubly linked lists. These lists are used for playback and recording operations. These are only constructed on first "open" of the device, or upon specific request to resize either FIFO queue.

These queues are the memory constructs from which actual interaction with the sound board are accomplished, in background processing modes. Foreground operations, in service to user calls to read( ), write( ), and ioctl( ) routines, influence and control operation of the background data acquisition modes without ever directly dealing with the audio board hardware. This is necessary in order to prevent gaps in audio signal due to lapses in Pulse Code Modulation (PCM) operation.

Operation of the mixer and synthesizer circuitry on the audio board is under direct control of the foreground processing routines, without buffering of any kind. These operations are also independent of PCM function in order to allow concurrent operation.

Record

Record operations are intended to initiate DMA transfer operations in background mode. Following request, recording continues under interrupt control until flags are set to stop data acquisition.

Playback

Playback operations are initiated by loading the playback buffers and initiation of the background processing mode. Background processing continues to drain the playback buffer until flags are set to abort or stop, or until the playback buffer is empty. Users may request playback in a blocking mode, which will return control to the user program when playback has ceased, or non-blocking, which allows user processing while playback buffers are being drained in background.

Tone Generator

Tones are generated through ioctl( ) calls to the synthesizer module. This module sends controls to the synthesizer circuitry on the audio board resulting in tone generation. Controls include duration, decay and attack.

Mixer Control

Volume Control is accomplished through ioctl() calls to the mixer module. This module sends controls to the mixer circuitry on the audio board resulting in volume level controls. This includes control for the master volume, bass, treble, fm, PCM, recording monitor and others.

Touch Panel Operator Interface CSC
  TPOI Initialize CSU

The TPOI Initialize CSU clears the 10-minute audio buffer, opens the TPAD for reading and writing, opens the serial ports to the Touch Panel and VCR for reading and writing, and sends the primary screen to the Touch Panel. Site name abbreviations are retrieved from the DBS via embedded SQL queries. The TPOI Record Audio CSU is setup to be called when audio data is available. Playback is disabled.

The 10-minute audio buffer is stored in an array of audio data records and has a head and tail pointer into the array for recording (head) and playback (tail). The Touch Panel is connected to the first serial port /dev/tty01; the VCR is connected to the second serial port /dev/tty02

TPOI Record Audio CSU

The TPOI Record Audio CSU is activated from the main loop or from the TPOI Receive Commands CSU and reads audio data from the TPAD into the 10-minute audio buffer. The head pointer is then updated to the next position in the buffer, wrapping around to the beginning of the buffer if necessary. The tail pointer is updated if necessary.

TPOI Playback Audio CSU

The TPOI Playback Audio CSU is activated from the main loop or from the TPOI Receive Commands CSU and writes audio data to the TPAD out of the 10-minute audio buffer. The tail pointer is then updated to the next position in the buffer, wrapping around to the beginning of the buffer if necessary.

During playback the corresponding callback buttons on the touch panel are flashed.

TPOI Receive Commands CSU

The TPOI Receive Commands CSU waits for input from the Touch Panel and decodes the sequence of characters from it into operator commands. The Touch Panel returns a status and position sequence for each operator finger action; the status can be press, drag, or release. If a valid button on the touch panel is pressed, a short tone is sounded as feedback to the operator.

If the command directly involves the VCR, the appropriate command is sent to the VCR through the TPOI Control VCR CSU. The Touch Panel screen is updated to reflect the new VCR status (e.g. Recording . . . ).

If the command involves audio callback, the TPOI Playback CSU is setup to start or stop output at a specific time. Playback continues until stopped.

Otherwise, the command is sent to the TPOI Send Commands CSU for processing by the SDS. These include the camera and video commands.

TPOI Send Commands CSU

The TPOI Send Commands CSU sends commands to the CSD to be sent to the SDS and then waits for a response (if necessary) and returns it.

TPOI Error Handler CSU

The TPOI Error Handler CSU receives error statuses from the various TPOI CSUs and sends these messages to the CSD and system log file.

TPOI Control VCR CSU

The TPOI Control VCR CSU passes VCR commands to the VCR through the serial port, waits up to 1 second for a response, and returns a status to the caller. If no response from the VCR is received, a timeout status is returned.

TPOI VCR Status CSU

The TPOI VCR Status CSU queries the VCR for the current playback/record mode and tape counter value and updates the touch panel display accordingly. If no tape is loaded in the VCR, the tape counter is replaced with the message "NO TAPE". If the VCR is powered off or in an unknown condition, all VCR control buttons are highlighted and disabled.

Shutdown CSC

The Shutdown CSC is composed of three CSU's:
  VTS Shutdown
  Console Shutdown
  Shutdown Override
  VTS Shutdown CSU The VTS Shutdown CSU allows a system supervisor or administrator to request a complete system shutdown be initiated. A confirmation interface is displayed and upon acknowledgement, a command is sent to SDS requesting a system shutdown begin. This would result in the same series of events to occur as when an UPS low battery alarm is received by SDS. The Vessel Data Cards for any active vessels are queued to the system printer, the database is secured, and a Unix shutdown of all machines begin. This process may be interupted by the Override Shutdown CSU.

Console Shutdown CSU

The Console Shutdown CSU allows a system supervisor or administrator to request a shutdown of the current ODP console. A confirmation interface is displayed and upon acknowledgement, the processes currently running on that ODP are terminated and a Unix shutdown command is initiated. There is no interuption to this task.

Shutdown Override CSU

The Shutdown Override CSU allows a system supervisor or administrator to request a shutdown of the system to be aborted. A confirmation interface is displayed and upon acknowledgement, a command is issued to SDS to abort the proceeding system shutdown. If the override is requested before the Unix shutdown commands have been issued, the SDS will interupt shutdown proceedings and resume processing. If the Unix shutdown commands have been issued by the SDS there is no override and the shutdown of the system proceeds.

Alarm Zone Control CSC

The Alarm Zone Control CSC is composed of three CSUs:
  Stationary Safety Zone CSU
  Traffic Lane Safety Zone CSU
  Swing Circle Safety Zone CSU
  Stationary Safety Zone CSU The Stationary Safety Zone CSU allows the operator to construct or delete a stationary safety zone. An operator interface menu allows the operator to select the desired action. A corresponding user event is then issued to the Chart Interface Daemon to allow the appropriate map, database, and SDS interaction to occur. Upon successful creation of the zone, alarm notification will occur if a vessel is in close proximity of the Safety Zone boundary.

Traffic Lane Safety Zone CSU

The Traffic Lane Safety Zone CSU allows the operator to construct or delete a traffic lane safety zone. An operator interface menu allows the operator to select the desired action, A corresponding user event is then issued to the Chart Interface Daemon to allow the appropriate map, database, and SDS interaction to occur. Upon successful creation of the zone, alarm notification will occur if a vessel is in close proximity of the Traffic Lane boundary.

Swing Circle Safety Zone CSU

The Swing Circle Safety Zone CSU allows the operator to construct or delete a swing circle safety zone. An operator interface menu allows the operator to select the desired action. A corresponding user event is then issued to the Chart Interface Daemon to allow the appropriate map, database, and SDS interaction to occur. If the operator has requested to create a swing circle, an additional interface is displayed to allow the operator to input the number of shots of chain to be used in the calculation of the swing circle radius. This interface is automaticly invoked when a vessel is anchored through the Vessel Action Menu. Upon successful creation of the zone, alarm notification will occur if a vessel is in close proximity of the swing circle perimeter.

Alarm Criteria CSC

The alarm criteria CSC allows a supervisor or system administrator to set the desired time and distance values to be used in proximity alarm calculations. A user interface retrieves the previously set values from the database and displays them for review. The user logon information is retrieved from shared memory and the authorization level is verified. IF the user is logged on with as a supervisor or administrator then the values may be changed. If the values are changed then the new values are saved in the database and a command sent to SDS to initiate the change in the calculations.

Estimated-Positioning Route Control CSC

The estimated-positioning route control user interface allows the user to add or delete an EP route. The interface interprets the requested action from the operator and sends an appropriate track message to CSD, which in turn sends a track message to the SDS for track initiation.

Track Control CSC

Add Radar Track CSC

Add Radar Track CSC allows an operator to command the VTS radars to begin tracking a certain object based on radar returns as reflected by the Radar Image Draw Module. The requirement is for a VTS operator to have the capability to perform manual track acquisition. The execution/data flow is as follows: the Add Radar Track CSC sends latitude/longitude, sector mask and radar site ID to the Command Status Daemon, which in turn sends a track message to the SDS. The SDS notifies the radar processor of the desired acquisition. The radar processor then sends data on the acquired track back to SDS.

Add EP Track CSC

Add EP Track CSC allows an operator to command the SDS to begin calculating the position of a track along an estimated positioning route. The requirement is for a VTS operator to have the capability to designate the initial position and speed of the EP track. The execution/data flow is as follows: the Add EP Track CSC sends latitude/longitude, speed and EP route ID to the Command Status Daemon, which in turn sends a track message to the SDS. The SDS then initiates the track and updates the track's movement within the track database.

Swap Track CSC

The Swap Track CSC allows an operator to command the SDS to swap the track information for two specific tracked objects. The execution/data flow is as follows: the Swap Track CSC sends the track ID's to the Command Status Daemon, which in turn sends a track message to the SDS. The SDS then swaps the track information in the track database which causes the operator display to reflect the icon and track tags displayed for the selected objects to be swapped.

Change Radar Track CSC

Change To Radar Track CSC allows an operator to command the VTS radars to begin tracking an object that had previously been calculated as an EP track. The execution/data flow is as follows: the Change to Radar Track CSC sends an EP track ID, latitude/longitude, sector mask and radar site ID to the Command Status Daemon, which in turn sends a track message to the SDS. The SDS notifies the radar processor of the desired acquisition. The radar processor then sends data on the acquired track back to SDS.

The SDS then performs a swap track that attaches the track information of the EP track to the new radar acquisition and then deletes the extraneous extra track.

Change EP Track CSC

Change To EP Track CSC allows an operator to command SDS to begin performing an estimated positioning calculation on an object that had previously been an active radar track. The execution/data flow is as follows: the Change to EP Track CSC sends a track ID and EP route ID to the Command Status Daemon, which in turn sends a track message to the SDS. The SDS notifies the radar processor to drop the designated track. SDS then begins an EP track at the last position of the track at its last reported speed. The SDS then performs a swap track that attaches the track information of the radar track to the new EP track and then deletes the radar track.

Handoff Track CSC

The Handoff Track CSC is passed the Tdbm track ID of the vessel to handoff. The following pseudocode demonstrates its functioning:
get the Tdbm track ID from the command-line
get the Tdbm track information for the specified track ID
get the current logon data
IF the vessel's sector mask matches the current console sector mask THEN
change the sector mask to all one's
update the Tdbm track information
send an 'Update Track' message to the SDS with the specified track ID
ELSE
send an error message to the command-status daemon
ENDIF Accept Track CSC The Accept Track CSC is passed the Tdbm track ID of the vessel to accept. The following pseudocode demonstrates its functioning:
get the Tdbm track ID from the command-line
get the Tdbm track information for the specified track ID
get the current logon data
IF the vessel's sector mask is all one's THEN
change the sector mask to the console sector mask
update the Tdbm track information
send an 'Update Track' message to the SDS with the specified track ID
get the SECTOR_MASK_HISTORY field from the VESSEL_TRACK table from the database for the specified vessel
bitwise OR the sector_mask_history with the console sector mask update the SECTOR_MASK and SECTOR_MASK_HISTORY fields in the VESSEL_TRACK table in the database for the specified vessel
ELSE
send an error message to the command-status daemon
ENDIF Drop Track CSC The Drop Track CSC provides the operator the capability of dropping a track that is either no longer of interest or was begun inadvertently. Once the track is designated for dropping, it will be removed from the track database and the display. The data flow for the Drop Track CSC consists of a message sent to SDS to stop generating updates for the track.

Dock Track CSC

The Dock Track CSC enables the operator to indicate that a vessel in his/her area of responsibility has docked. Once a vessel has reached a destination within the port where it will dock, the operator will choose the "DOCK" option from the Vessel Action Menu. The status of the vessel in the track database will then be changed to "docked".

Anchor Track CSC

Within a VTS operator's area of responsibility, when a vessel has reached an anchorage destination, the Anchor Track CSC provides a mechanism for entering anchorage information into the system. The Anchor Track CSC is invoked from the Vessel Action Menu. This CSC will cause the selected vessel's status to change in the track table to "anchored". It also changes the traffic count and causes the swing circle user interface to be invoked, allowing the operator to construct a swing circle for that vessel.

Out-of-Area Track CSC

When a vessel exits the port, the Out-of-Area Track CSC, enables the VTS operator to enter this information into the system. The Out-of-Area Track CSC is invoked from the Vessel Action Menu. A status change to "OutofAOR" will occur in the track database upon execution. Additionally, the traffic count will be altered.

X-Windows Print (XPWIN) CSC

The XPWIN CSC is divided into 4 CSUS:
- XPWIN Mainline
- XPWIN Decolorize Image
- XPWIN Print Window
- XPWIN Print Line XPWIN Mainline CSU The XPWIN mainline CSU parses command-line arguments, determines the window to print, gets a copy of the window to print, opens a connection to the printer, and calls the Decolorize Image and Print Window CSUs to print the window.

XPWIN Decolorize Image CSU

The XPWIN decolorize image CSU converts the window colormap to greyscale values and finds the minimum, maximum, and mean grey levels in the window. Using the mean grey level, it then performed a linear contrast expansion on each greyscale value; the amount of expansion is selectable from the command-line and defaults to 110%.

XPWIN Print Window CSU

The XPWIN print window CSU scales and dithers a window image to fit the size of the page and outputs the resulting image to the printer. The scaling assumes a 1:1 pixel aspect ratio. The dithering uses the Burke coefficients and a serpentine scan over the window image. The Burke coefficients are as follows:

|   |   |   | x | 4 | 2 |
|---|---|---|---|---|---|
| 1 | 2 | 4 | 2 | 1 |   |

These coefficients allow the use of bit-shift operations to distribute the brightness error in the output image. For more information on dithering, consult "Bit-Mapped Graphics", McGraw-Hill, Rimmer, ISBN 0-8306-3558-0.

XPWIN Print Line CSU

The XPWIN print line CSU outputs a line of bitmapped graphics to the printer. If compression is not enabled, the line of graphics is sent straight through. Otherwise, it is run-length encoded as specified for 'Mode 2' compression and then sent to the printer; compression generally achieves a 75% reduction in output data size.

For more information on sending graphics to an HP LaserJet printer, consult "HP LaserJet Programming", Hewlett Packard, Binstock, Babcock, & Luse, ISBN 0-201-57736-4.

Logon/Logoff CSC

The logon/logoff CSC provides database and display access control for each operator at the VTC. It also allows an operator to select the sector(s) to control at the console. [350-387]

The user is first presented with a window containing username and password boxes; the operator types the username and password on the keyboard, but only the username text is echoed on the screen. Once the operator has entered the password, an embedded SQL connect call to Oracle is performed to attempt the login. If the connection fails, an error message is displayed and the username, password, and authorization level in the console configuration buffer are cleared.

If the connection succeeds, a query of the user authorization table is performed to get the operator's authorization level and real name which is then placed in the console configuration buffer. A second window is displayed listing the available sectors in the database for the operator to choose from. Once chosen, a sector mask is built using the sector ID(s) of the selected sector(s), where bit 0 corresponds to sector 1, bit 1 corresponds to sector 2, etc.

The console configuration buffer is a shared-memory buffer that contains the current user name, password, authorization level, sector mask, remote site masks, and remote site names. For those remote sites that are not accessible from the current sector(s), the masks and names are cleared.

Database Form Interface CSC

The Database Form Interface CSC retrieves the current Oracle username and password from the Logon/Logoff shared-memory buffer and runs the specified form. The following pseudocode demonstrates its functioning:
get the logon/logoff data
get the form filename from the command-line
change to the form directory
create a command string of the form "hpterm -e runform30 USERNAME/PASSWORD FORM-NAME"
execute the command string Radar Configuration Interface CSC The Radar Configuration Interface CSC is executed from the Radar Configuration database form when a change has been posted by a user. The form passes the radar ID and remote site ID affected by the change to the radar configuration interface. A radar command is then constructed and sent to SDS through the command status daemon.

Tactical Database Manager (Tdbm) CSC

The Tdbm CSC software is considered COTS. Therefore, contents of this section are considered completed by Tdbm manuals available from INRI.

Radar Image Draw Module (RIDMO) CSC

The Radar Image Draw Module CSC creates and integrates a draw module that provides the capability to display a composite bitmap image of an operators area of responsibility. The Radar Image Draw Module CSC is begun when a signal is generated by the Radar Image Daemon. RIDMO gets radar data from shared memory (where Radar Image Daemon stored the data). RIDMO then sends radar bitmaps to the Chart Manager. RIDMO also receives data input by the operator indicating radar selection and attribute changes.

Vessel Data Card CSC

The Vessel Data Card CSC assists the operator in keeping track of certain information related to all VTS participant vessels within a harbor area. The Vessel Data Card will appear in a window when the VTS operator performs any of several track manipulation functions.

CSCI Data

Internal CSCI data elements and structures are documented with the relevant CSC or CSU discussions in this document.

CSCI Data Files

This following subparagraphs contain descriptions of each of the shared data files of this CSCI.

Data File to CSC/CSU Cross Reference

| Data File | Data File Users |
|---|---|
| Oracle Database | All |
| Tdbm Data | ODS-UB CSCS, Track Control CSCs |
| Radar Scan Data | Radar Image Daemon, Radar Image Draw Module |
| UB Map Files | UB CHART |
| Menu Files | UB Finder |

Oracle Database

The Oracle Database is accessed by this CSCI using embedded structured query language (SQL-ANSI standard xxxx) calls. The Oracle Database provides the following information to this CSCI:

Operator authorization data
Remote site equipment configuration
VTC equipment configuration
Vessel identification and transit data The method of access is through embedded SQL calls from the ANSI C language. Oracle's PRO*C manages the communications to and from the SQL server. Oracle's SQL*Net provides access transparently over the network to the database processor as if the database was local. This is accomplished using the SQL*NET alias file, /etc/sqlnet.

Tdbm Data

The Tdbm data is maintained by the SDS and is loaded on each console in shared memory by the Tdbm CSC.

Radar Scan Data

The radar scan data (image) is maintained by the SDS and is loaded on each console in shared memory by the RID. Each RIDMO process uses this data to update the UB CHART displays.

UB Map Files

UB Map Files reside on each ODP in the directory /home2/mapdata. The UB CHART process manages access to these files.

Menu files

The menu files reside on each odp in the directory /h/Nauticus/data/local/System/Menus and describe the menus and menubar of the ub finder program.

What is claimed is:

1. A harbor vessel traffic service system, comprising:
   a computer network;
   a plurality of radar sensor means for tracking ship location;
   a plurality of remote site means, connected to said computer network and said plurality of radar sensor means, for obtaining remote site radar sensor data inputs from said plurality of radar sensor means, pre-processing said remote site radar sensor data inputs and inputting pre-processed remote site radar sensor data inputs to said computer network;
   a display; and
   a vessel traffic control subsystem means, connected to said computer network and to said display and having a digital database and a processor, the digital database having a digital map of a harbor including all underwater obstacles that pose a danger to shipping, and vessel identification data of potential and current vessels using the harbor, and the processor computing multiple tracks of vessels in the harbor from the pre-processed remote site radar sensor data inputs and digitally fusing and displaying multiple tracks of vessels in the harbor with the digital map of the harbor and displaying a menu of the vessel identification data of an operator-selected vessel onto the display.

2. The harbor vessel traffic service system of claim 1, wherein said digital database further comprises:
   an ORACLE database; and
   a track database manager that stores and distributes vessel track data.

3. The harbor vessel traffic service system of claim 1, wherein said vessel identification data comprises:
   a registry number and a call sign of a vessel;
   a name of a captain of the vessel;
   a configuration of the vessel;
   an identification of the vessel's cargo including an identification of any hazardous material;
   an identification of a point of origination for the vessel;
   an identification of the vessel's destination;
   an estimated time of arrival of the vessel;
   an estimated time of departure for the vessel; and
   an identification of the last time the vessel was in port.

4. The harbor vessel traffic service system of claim 1, wherein the menu of the vessel identification data is provided to an operator when a cursor is moved over a track of a vessel in the harbor and a mouse button is clicked.

5. The harbor vessel traffic service system of claim 1, wherein the processor calculates collision alarms between the multiple tracks of vessels in the harbor and all underwater obstacles that pose a danger to shipping.

6. The harbor vessel traffic service system of claim 1, further comprising a plurality of operator displays and the processor displaying onto a single operator display, selected from the plurality of operator displays, the digitally fused multiple tracks of vessels in the harbor, the digital map, and the vessel identification data.

7. The harbor vessel traffic service system of claim 1, wherein the vessel traffic control subsystem further comprises:
   a means to backup and preserve the digital map of the harbor, the vessel identification data of potential and current vessels using the harbor, and the multiple tracks of vessels in the harbor; and
   a means to detect faults and recovery from faults in the vessel traffic control subsystem.

8. The harbor vessel traffic service system of claim 7, further comprising a backup processor and a means to detect faults and recovery from faults in the processor.

* * * * *